(12) United States Patent
Kamon et al.

(10) Patent No.: US 7,667,764 B2
(45) Date of Patent: Feb. 23, 2010

(54) IMAGE SENSING APPARATUS

(75) Inventors: Koichi Kamon, Sakai (JP); Kazuchika Sato, Kobe (JP); Jun Minakuti, Sakai (JP)

(73) Assignee: Konica Minolta Holdings, Inc., Tokyo (JP)

( * ) Notice: Subject to any disclaimer, the term of this patent is extended or adjusted under 35 U.S.C. 154(b) by 938 days.

(21) Appl. No.: 11/143,988

(22) Filed: Jun. 2, 2005

(65) Prior Publication Data

US 2005/0270412 A1 Dec. 8, 2005

(30) Foreign Application Priority Data

| Jun. 4, 2004 | (JP) | ............................. 2004-166614 |
| Jun. 29, 2004 | (JP) | ............................. 2004-191993 |
| Mar. 17, 2005 | (JP) | ............................. 2005-077725 |
| Mar. 17, 2005 | (JP) | ............................. 2005-077825 |

(51) Int. Cl.
*H04N 5/238* (2006.01)

(52) U.S. Cl. .................................................... 348/364

(58) Field of Classification Search ................ 348/362, 348/364, 221.1, 230.1
See application file for complete search history.

(56) References Cited

U.S. PATENT DOCUMENTS 5,861,621 A 1/1999 Takebe et al.
6,833,864 B1 * 12/2004 Ashida ..................... 348/229.1
7,061,529 B2 * 6/2006 Nakamura ................ 348/222.1
7,489,351 B2 * 2/2009 Frey, Jr. ...................... 348/294
2002/0054389 A1 5/2002 Takada et al.

FOREIGN PATENT DOCUMENTS

| JP | 2002-77733 A | 3/2002 |
| JP | 2002-300476 A | 10/2002 |

* cited by examiner

*Primary Examiner*—Nhan T Tran
*Assistant Examiner*—Akshay Trehan
(74) *Attorney, Agent, or Firm*—Sidley Austin LLP

(57) ABSTRACT

An image sensing apparatus is constructed in such a manner that a calculation priority setter 5111 (5111a) sets a priority between exposure amount control by an exposure amount control parameter calculator 511 (511a) serving as exposure amount controller, and dynamic range control by a dynamic range control parameter calculator 512 (512a) serving as dynamic range controller. Exposure control is executed by performing the exposure amount control and the dynamic range control based on a photoelectric conversion characteristic, by using exposure evaluation values detected by an evaluation value detector 405, based on the priority set by the calculation priority setter 5111 (5111a). This arrangement provides an image sensing apparatus capable of performing exposure control with high latitude, wherein a user is allowed to capture a subject in an optimal exposure state, with an appropriate dynamic range being secured, and control primarily based on the exposure amount control or control primarily based on the dynamic range control is performed on the priority basis.

8 Claims, 58 Drawing Sheets

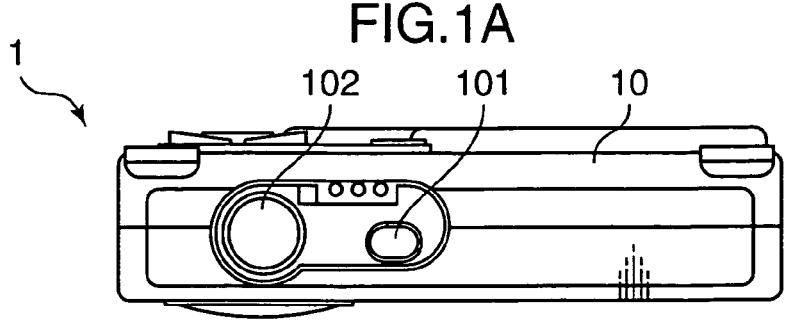
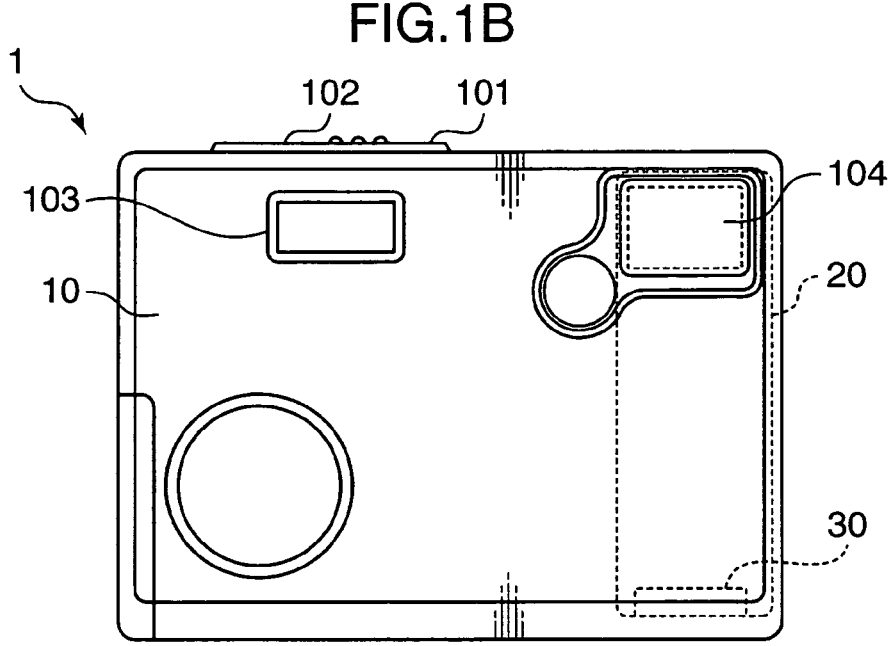
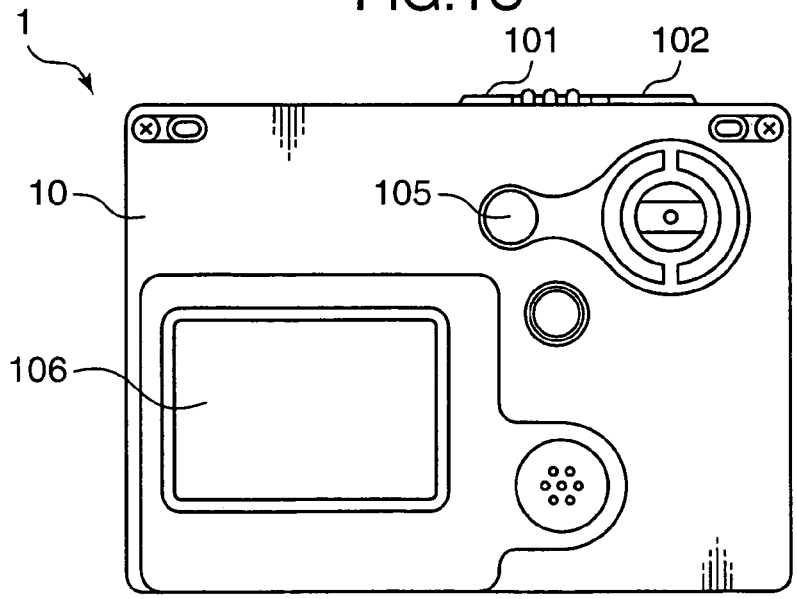

FIG.3

COLOR FILTER FORMAT

| R00 | Gr10 | R20 | Gr30 |
|---|---|---|---|
| Gb01 | B11 | Gb21 | B31 |
| R02 | Gr12 | R22 | Gr32 |
| Gb03 | B13 | Gb23 | B33 |

G:GREEN PIXEL

R:RED PIXEL

B:BLUE PIXEL

※NUMERAL SHOWS PIXEL ADDRESS NUMBER

FIG.6

| | CONTROL FACTOR | EXAMPLES OF CONTROLLING MEANS |
|---|---|---|
| EXPOSURE CONTROL = AE CONTROL | PHOTOELECTRIC CONVERSION CHARACTERISTICS OF IMAGE SENSOR (DYNAMIC RANGE) | ○ CONTROL OF SWITCHING POINT (INFLECTION POINT) OF LINEAR CHARACTERISTIC AREA AND LOGARITHMIC CHARACTERISTIC AREA |
| | EXPOSURE AMOUNT $\left(\begin{array}{c}\text{TOTAL AMOUNT OF LIGHT THAT}\\\text{REACHES IMAGE SENSING PLANE}\\\text{WHILE PHOTOELECTRIC CONVERSION}\\\text{FUNCTION IS EFFECTIVE}\end{array}\right)$ | ○ CONTROL OF APERTURE VALUE<br>○ CONTROL OF INTEGRATION TIME SUCH AS SHUTTER SPEED |

FIG.15

| 1 | 2 | 3 | 4 | 5 |
|---|---|---|---|---|
| 6 | A | B | C | D | E | F | 7 |
|   | G | H | I | J | K | L |   |
| 8 | M | N | O | P | Q | R | 9 |
|   | S | T | U | V | W | X |   |
| 10| Y | Z | AA| AB| AC| AD| 11|
|   | AE| AF| AG| AH| AI| AJ|   |
| 12| 13 | 14 | 15 | 16 |

~330
~331
~332
~333

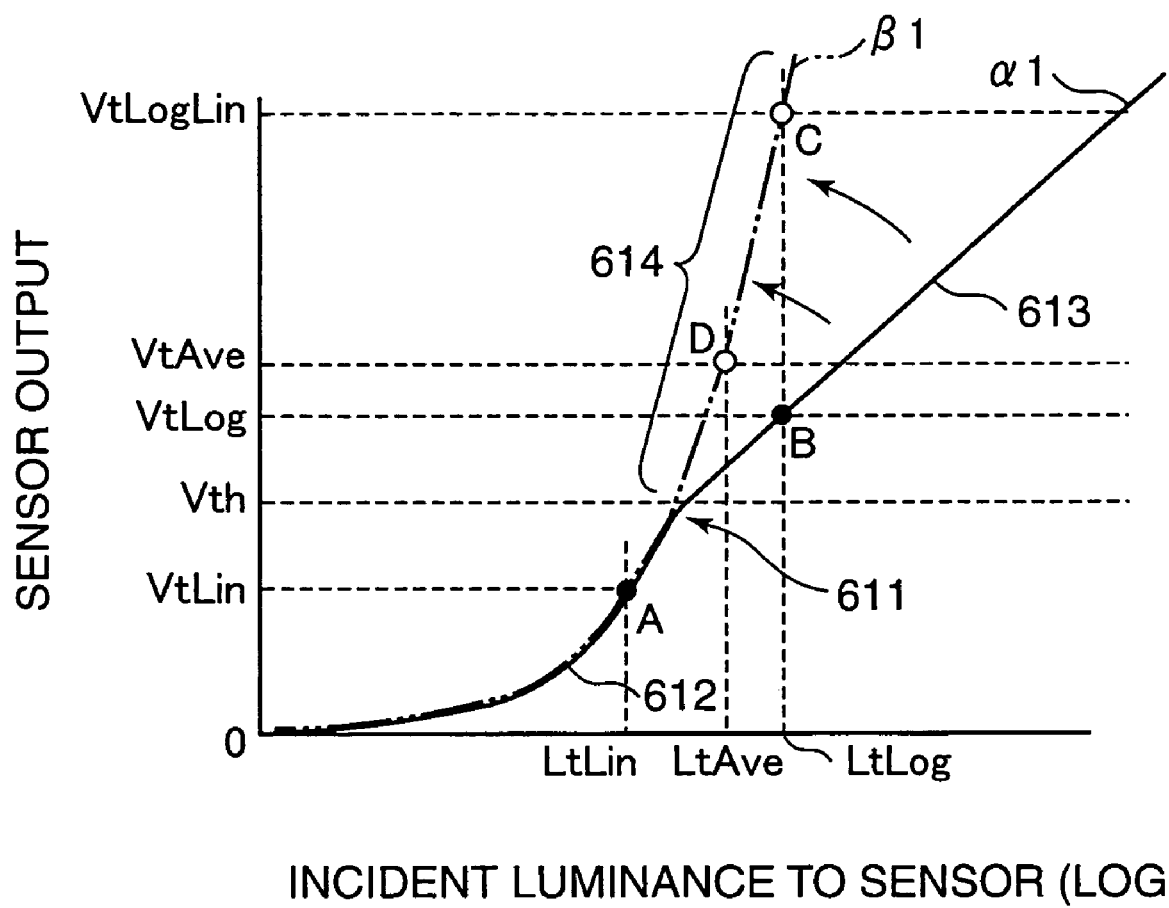

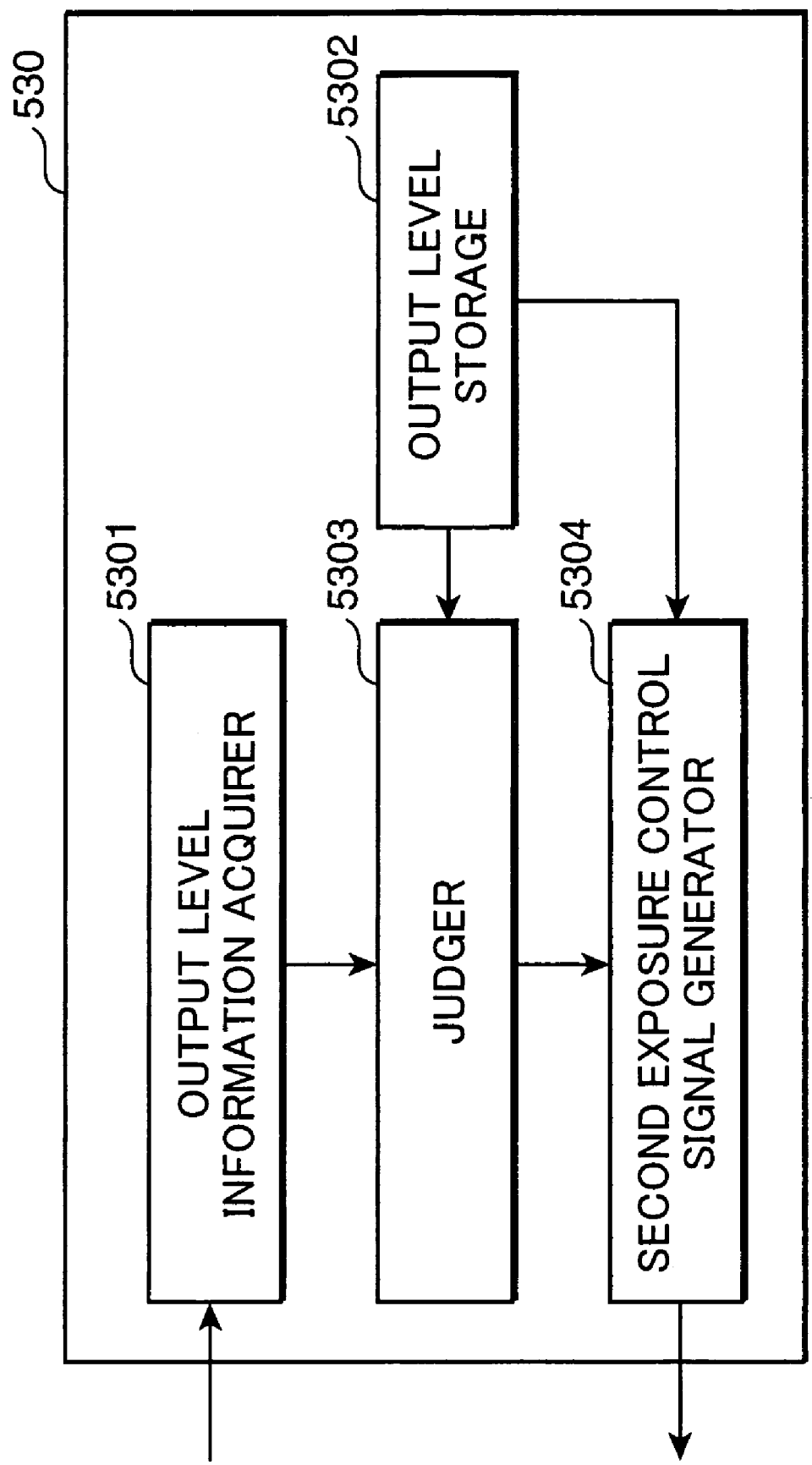

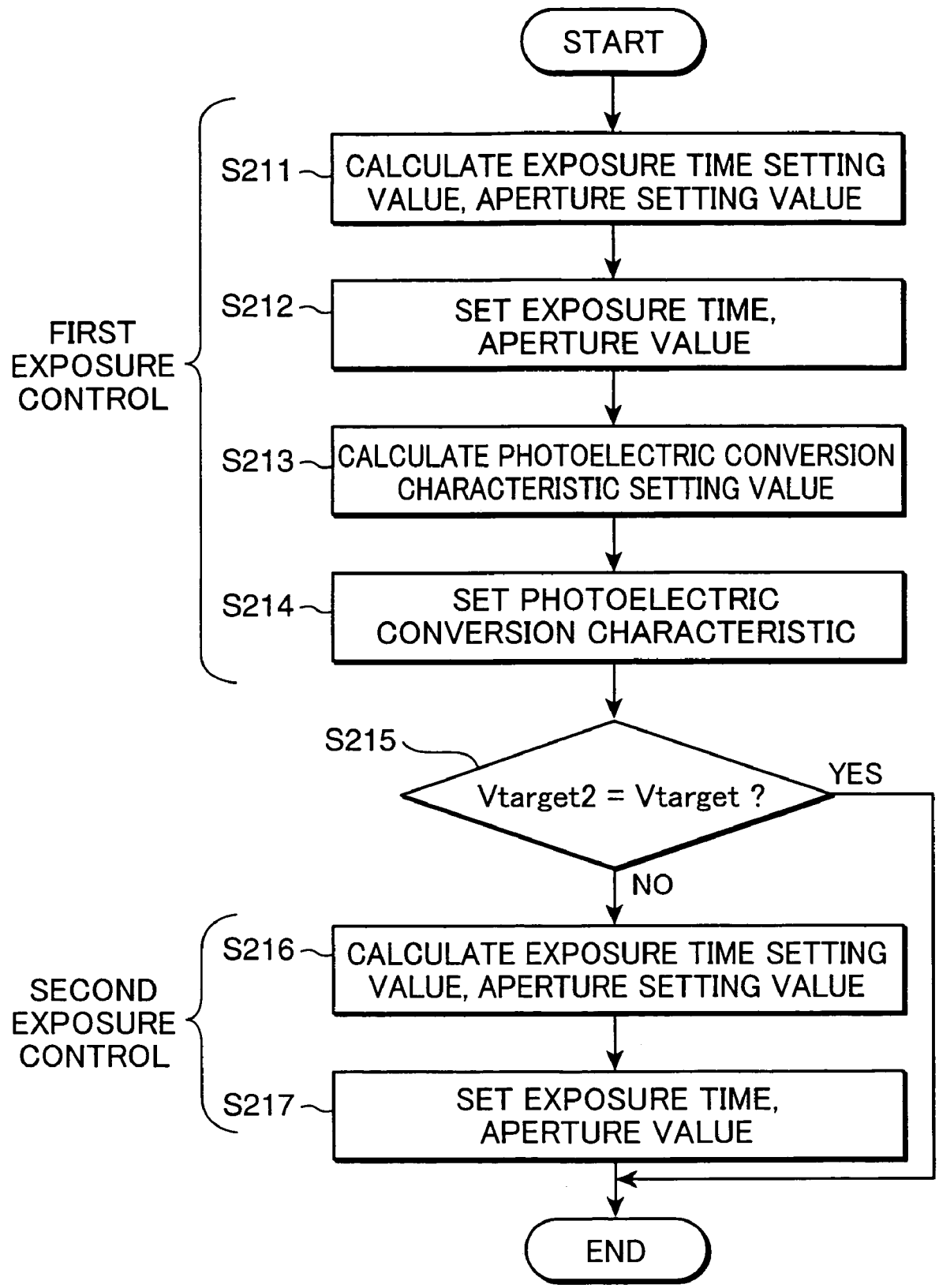

DURING VERTICAL BLANK PERIOD
(DRIVE ALL PIXELS SIMULTANEOUSLY)

DURING HORIZONTAL BLANK PERIOD
(CONTROL ROW BY ROW)

IMAGE SENSING APPARATUS

This application is based on Japanese Patent Application Nos. 2004-166614, 2004-191993, 2005-77725, and 2005-77825 respectively filed on Jun. 4, 2004, Jun. 29, 2004, Mar. 17, 2005, and Mar. 17, 2005, the contents of which are hereby incorporated by reference.

BACKGROUND OF THE INVENTION

1. Field of the Invention

The present invention relates to an image sensing apparatus provided with an image sensor for generating an electrical signal commensurate with the amount of incident light, and particularly relates to an image sensing apparatus using an image sensor having a photoelectric conversion characteristic comprised of two different characteristic areas, as represented by an image sensor which has a photoelectric conversion characteristic comprised of a first area where the electrical signal is outputted after being converted according to a first characteristic in relation to the amount of incident light, and a second area where the electrical signal is outputted after being converted according to a second characteristic different from the first characteristic in relation to the amount of incident light, namely, an image sensor that is switchable between a linear operative state and a log operative state.

2. Description of the Related Art

Heretofore, there has been known an image sensor (also called as "log sensor") constructed such that a logarithm conversion circuit provided with a MOSFET or a like device is added to a solid-state image sensing device comprised of photoelectric conversion elements such as photodiodes arrayed in a matrix, wherein an output characteristic of the solid-state image sensing device are converted in such a manner that an electrical signal is logarithmically converted according to the amount of incident light by utilizing a sub-threshold characteristic of the MOSFET. Among such image sensors, there is known an image sensor that is switchable between a linear operative state in which an electrical signal is outputted after being linearly converted according to the amount of incident light, and the aforementioned log operative state, according to the output characteristic inherent to the solid-state image sensing device, namely, according to the amount of incident light.

For instance, Japanese Unexamined Patent Publication No. 2002-77733 discloses an image sensing apparatus constructed such that the apparatus is automatically switchable from a linear operative state to a log operative state by applying a specific reset voltage to a MOSFET, and that the switching point of the linear operative state and the log operative state is substantially identical to each other in all the pixels. Further, Japanese Unexamined Patent Publication No. 2002-300476 discloses an image sensing apparatus constructed such that the apparatus is automatically switchable from a linear operative state to a log operative state, and that the potential state of a MOSFET is controllable by controlling the reset time of the MOSFET.

The aforementioned image sensor has a merit that, in the linear operative state thereof, a high contrast image signal, namely, an image signal having high gradation performance, is obtainable from a low luminance subject image because the output proportional to the amount of electric charge generated in the photoelectric conversion elements is obtained. However, the image sensor has a demerit that the dynamic range is narrow. On the other hand, in the log operative state of the image sensor, although a wide dynamic range is secured because the output that has been natural-logarithmically converted according to the amount of incident light is obtained, contrast becomes poor because the image signal is logarithmically compressed.

The image sensing apparatuses recited in the above publications merely disclose that the image sensor is automatically switchable from the linear operative state to the log operative state. In light of the merits and demerits of the linear operative state and the log operative state, it is desirable to provide an image sensing apparatus which not only enables to perform automatic switching but also enables to perform a sensing operation by positively utilizing the merits of the linear operative state and the log operative state. For instance, in automatic exposure control, controlling the exposure in association with the subject luminance, and with the switching point from the linear operative state to the log operative state enables to perform optimal automatic exposure control, utilizing the merits of the linear operative state and the log operative state.

SUMMARY OF THE INVENTION

In view of the problems residing in the prior art, it is an object of the present invention to provide an image sensing apparatus that enables to capture a subject in an optimal exposure state, with a certain dynamic range being secured, commensurate with the amount of light from the subject, namely, according to a subject luminance by correlating exposure control of the image sensing apparatus with a photoelectric conversion characteristic of an image sensor in the image sensing apparatus, and enables to perform exposure control with high latitude, and in accordance with respective shooting conditions, such as exposure control primarily based on exposure amount control, or exposure control primarily based on dynamic range control.

One aspect of the invention is directed to an image sensing apparatus comprising an image sensor which generates an electrical signal commensurate with an amount of incident light, and has a photoelectric conversion characteristic comprised of a first area where the electrical signal is outputted after being converted according to a first characteristic in relation to the amount of incident light, and a second area where the electrical signal is outputted after being converted according to a second characteristic different from the first characteristic in relation to the amount of incident light; an exposure evaluation value detector which detects an exposure evaluation value based on luminance information acquired from a subject in sensing an image of the subject; an exposure controller which determines a subject luminance for exposure setting based on the exposure evaluation value detected by the exposure evaluation value detector to control exposure of the image sensing apparatus, the exposure controller including: an exposure amount controller which controls an exposure amount to the image sensor, and a dynamic range controller which controls the photoelectric conversion characteristic of the image sensor, and a priority setter which sets a priority between the exposure amount control by the exposure amount controller and the dynamic range control by the dynamic range controller.

These and other objects, features and advantages of the present invention will become more apparent upon reading of the following detailed description along with the accompanying drawings.

BRIEF DESCRIPTION OF THE DRAWINGS

FIGS. 1A through 1C are illustrations showing an external appearance of a digital camera to which an image sensing apparatus as a first embodiment and a second embodiment of the invention is applied, wherein FIG. 1A is a top plan view, FIG. 1B is a front view, and FIG. 1C is a rear view.

FIG. 3 is an illustration showing an example of a color filter format of an image sensor used in the digital camera.

FIG. 6 is a chart for explaining definitions of terms relating to exposure control.

FIG. 15 is a diagram showing how an image sensing area to be metered is divided into blocks according to multi-pattern metering by the image sensor.

FIGS. 16A and 16B are graphs showing examples of luminance histograms by the multi-pattern metering, wherein FIG. 16A is a main subject entire luminance histogram, and FIG. 16B is a peripheral subject entire luminance histogram.

FIGS. 18A and 18B are graphs showing how the photoelectric conversion characteristic of the image sensor is changed in performing AE control, wherein FIG. 18A shows a case that the exposure amount is controlled, and FIG. 18B shows a case that the dynamic range is controlled.

FIG. 19 is a graph for explaining a linear conversion process in calculating an exposure amount control parameter.

FIGS. 22A and 22B are graphs each for explaining a process for calculating the position of an inflection point of a photoelectric conversion characteristic in calculating a dynamic range control parameter, wherein FIG. 22A shows a case that the photoelectric conversion characteristic is changed to achieve a predetermined sensor output corresponding to the luminance Lmax, and FIG. 22B shows a case that the photoelectric conversion characteristic is modeled.

FIGS. 23A and 23B are graphs each for explaining a process in calculating the dynamic range control parameter, wherein FIG. 23A shows a case that the output level at the inflection point is lowered by saturation of the output level, and FIG. 23B shows a relation between the number of saturated pixels and the lowered amount in output level at the inflection point.

FIGS. 24A and 24B are graphs each for explaining how the photoelectric conversion characteristic of the image sensor is changed under AE control in the exposure amount control parameter calculation prioritizing mode in the first embodiment, wherein FIG. 24A shows a change in calculating the exposure amount control parameter, and FIG. 24B shows a change in calculating the dynamic range control parameter.

FIGS. 25A and 25B are graphs each for explaining how the photoelectric conversion characteristic of the image sensor is changed under AE control in the dynamic range control parameter calculation prioritizing mode in the first embodiment, wherein FIG. 25A shows a change in calculating the dynamic range control parameter, and FIG. 24B shows a change in calculating the exposure amount control parameter.

FIG. 30 is a functional block diagram for explaining functions of an output level judging section in the second embodiment.

FIG. 31 is a flowchart showing a flow of AE control according to the target level prioritizing system in the second embodiment.

FIGS. 39A and 39B are examples of timing charts concerning an image sensing operation of each pixel constituting the image sensor shown in FIG. 38, wherein FIG. 39A is a timing chart concerning a charge accumulating operation or an exposing operation in a vertical blank period of all the pixels, and FIG. 39B is a timing chart concerning electric charge sweeping operation of pixels in each row by vertical scanning in a horizontal blank period after termination of the charge accumulation.

DETAILED DESCRIPTION OF THE PREFERRED EMBODIMENTS

Brief Description on Embodiments

Figure 2:
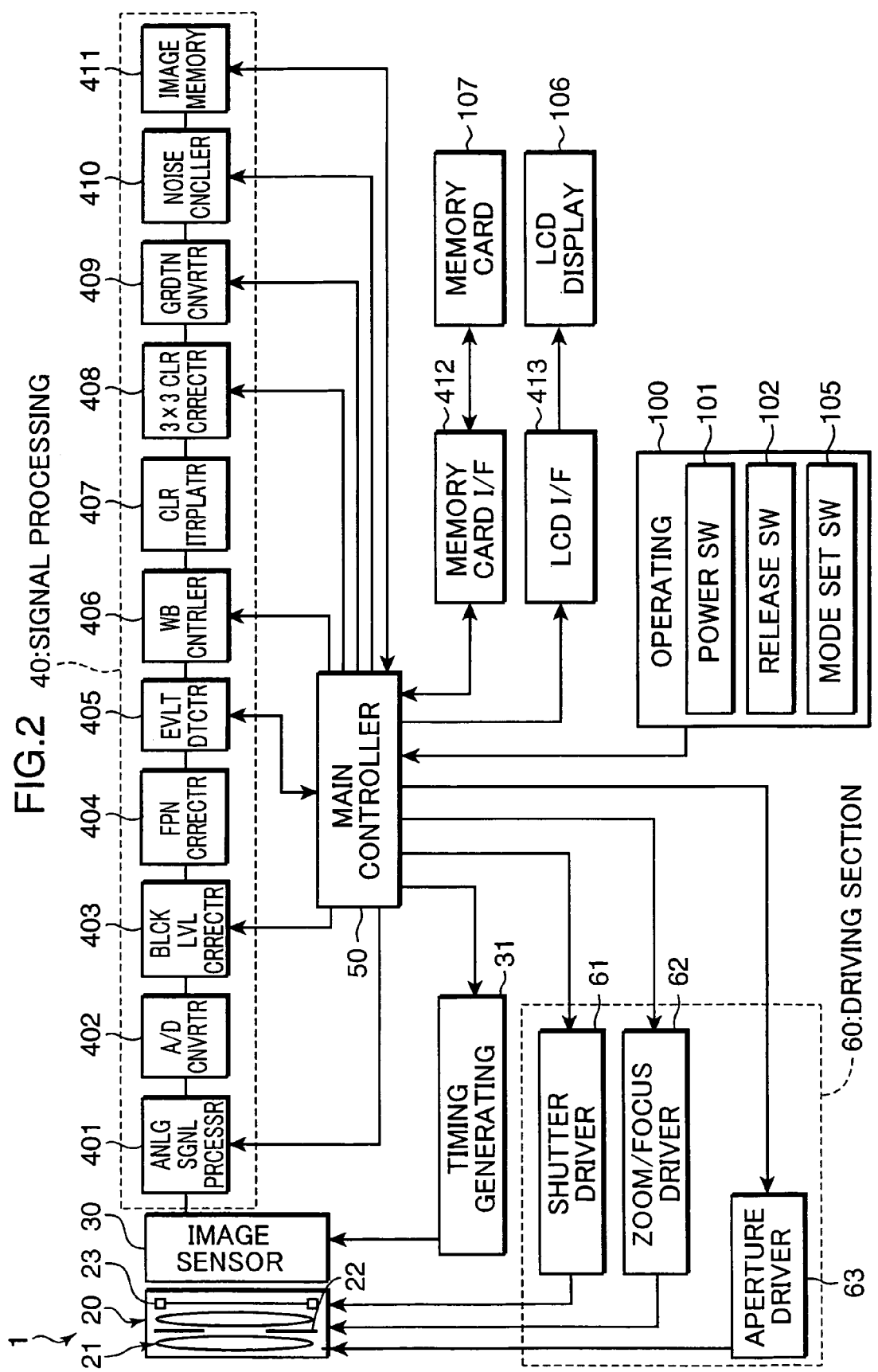
FIG. 2 is a block diagram of an image sensing process to be implemented by the digital camera.

First, preferred embodiments of the invention are described briefly.

(1) An image sensing apparatus according to an aspect of the invention is directed to an image sensing apparatus comprising an image sensor which generates an electrical signal commensurate with an amount of incident light, and has a photoelectric conversion characteristic comprised of a first area where the electrical signal is outputted after being converted according to a first characteristic in relation to the amount of incident light, and a second characteristic area where the electrical signal is outputted after being converted according to a second characteristic different from the first characteristic in relation to the amount of incident light; an exposure evaluation value detector which detects an exposure evaluation value based on luminance information acquired from a subject in sensing an image of the subject; an exposure controller which determines a subject luminance for exposure setting based on the exposure evaluation value detected by the exposure evaluation value detector to control exposure of the image sensing apparatus, the exposure controller including: an exposure amount controller which controls an exposure amount to the image sensor, and a dynamic range controller which controls the photoelectric conversion characteristic of the image sensor, and a priority setter which sets a priority between the exposure amount control by the exposure amount controller and the dynamic range control by the dynamic range controller.

In the arrangement (1), the exposure control is performed in such a manner that the evaluation value detector detects the exposure evaluation value based on the luminance information acquired from the subject, the exposure amount controller performs the exposure amount control, and the dynamic range controller performs the dynamic range control based on the photoelectric conversion characteristic by using the exposure evaluation value. The priority setter sets the priority between the exposure amount control by the exposure amount controller and the dynamic range control by the dynamic range controller. In this way, the exposure amount control by the exposure amount controller and the dynamic range control by the dynamic range controller are performed in correlation with the photoelectric conversion characteristic of the image sensor equipped in the image sensing apparatus, and the exposure control of the image sensing apparatus by the exposure amount control and the dynamic range control is executable according to the priority. This arrangement provides an image sensing apparatus capable of performing the exposure control with high latitude, wherein the subject is captured in an optimal exposure state in relation to the subject luminance, with a certain dynamic range being secured, and the exposure control primarily based on the exposure amount control or the exposure control primarily based on the dynamic range control is performed depending on the respective shooting conditions.

Here, the definition of the term "exposure control (hereinafter, also called as "AE control") is described referring to FIG. 6. In image sensing apparatuses such as digital cameras and digital movie cameras, unlike so-called silver halide cameras, there are two factors in AE control: one is a control in association with a photoelectric conversion characteristic of an image sensor, namely, a control by intentionally changing the photoelectric conversion characteristic; and the other is a control on the total amount of light that reaches the image sensing plane of the image sensor, and the integration time of a photoelectric conversion current, namely, a photocurrent after photoelectric conversion. Throughout the specification and the claims, the former is called as "dynamic range control", and the latter is called as "exposure amount control". The dynamic range control is executed, for instance, by controlling the switching point (hereinafter, called as "inflection point") of the first area or the linear characteristic area and the second area or the logarithmic characteristic area of the image sensor. Further, the exposure amount control is executed by controlling the aperture amount of a diaphragm, controlling the shutter speed of a mechanical shutter, or controlling the integration time of electric charge by control of resetting operation to the image sensor.

(2) In the arrangement (1), preferably, the priority represents information as to which is to be prioritized between calculation of an exposure amount control parameter by the exposure amount controller and calculation of a dynamic range control parameter by the dynamic range controller. The priority setter sets the calculation of the exposure amount control parameter as the priority. The exposure controller implements the calculation of the exposure amount control parameter by the exposure amount controller, and the calculation of the dynamic range control parameter by the dynamic range controller in this order according to the priority set by the priority setter.

In the arrangement (2), the priority setter sets the information indicating that the calculation of the exposure amount control parameter is prioritized, and the calculation of the exposure amount control parameter is performed prior to the calculation of the dynamic range control parameter based on the setting, followed by the calculation of the dynamic range control parameter. Thus, the arrangement enables to perform the exposure control in prioritizing the exposure amount control, namely, securing a desired exposure amount based on the priority, and yet securing a required dynamic range e.g. a minimally necessary dynamic range.

(3) In the arrangement (1), preferably, the priority represents information as to which is to be prioritized between calculation of an exposure amount control parameter by the exposure amount controller and calculation of a dynamic range control parameter by the dynamic range controller. The priority setter sets the calculation of the dynamic range control parameter as the priority. The exposure controller implements the calculation of the dynamic range control parameter by the dynamic range controller, and the calculation of the exposure amount control parameter by the exposure amount controller in this order according to the priority set by the priority setter.

In the arrangement (3), the priority setter sets the information indicating that the calculation of the dynamic range control parameter is prioritized, and the calculation of the dynamic range control parameter is performed prior to the calculation of the exposure amount control parameter based on the setting, followed by the calculation of the exposure amount control parameter. Thus, the arrangement enables to perform the exposure control of prioritizing the dynamic range control namely, securing a desired dynamic range based on the priority, and yet securing a required exposure amount e.g. a minimally necessary exposure amount.

(4) In the arrangement (2), preferably, the exposure amount controller calculates the photoelectric conversion characteristic, so that an output level of the image sensor corresponding to a subject luminance (Lt1) for exposure amount setting coincides with a predetermined target output level (Vtarget) in the linear characteristic area, and calculates an exposure amount setting value as the exposure amount control parameter in relation to the calculated photoelectric conversion characteristic, and the dynamic range controller calculates, after the calculation of the exposure amount setting value by the exposure amount controller, the photoelectric conversion characteristic, so that an output level of the image sensor corresponding to a subject luminance (Lm20) for dynamic range setting coincides with a predetermined saturated output level (Vmax), and calculates a photoelectric conversion characteristic setting value as the dynamic range control parameter in relation to the calculated photoelectric conversion characteristic.

In the arrangement (4), the exposure amount is controlled, so that the output level of the image sensor corresponding to a certain subject luminance for exposure amount setting coincides with the predetermined target output level in the linear characteristic area. This arrangement enables to secure a desired exposure amount, based on the priority, in a sensing operation in the linear characteristic area where a high contrast image signal is obtained even from a subject of a low luminance, and to secure a required dynamic range, namely, a certain range of the subject luminance, so that the output level of the image sensor corresponding to the subject luminance e.g. a maximum subject luminance for dynamic range setting coincides with the saturated output level, in other words, the sensor output corresponding to the subject luminance, namely, the range of the subject luminance falls within the range of the output level of the image sensor.

(5) In the arrangement (4), preferably, the dynamic range controller calculates the dynamic range control parameter, so that an output level (Vth2) of the image sensor at an inflection point of the calculated photoelectric conversion characteristic is equal to or above a predetermined reference lower limit (Vlimit).

In the arrangement (5), the dynamic range controller calculates the dynamic range control parameter, so that the output level of the image sensor at the inflection point is equal to or above the lower limit. This arrangement enables to prevent likelihood that the exposure amount that has been secured by the exposure amount control based on the priority may be lost by the dynamic range control, which follows the exposure amount control, namely, by the calculation of the dynamic range control parameter after the calculation of the exposure amount control parameter, in other words, to prevent failure of securing the exposure amount for matching the output level of the image sensor corresponding to the subject luminance (Lt1) for exposure amount setting with the target output level (Vtarget). Thus, the exposure control prioritizing the exposure amount control can be securely carried out.

(6) In the arrangement (3), preferably, the dynamic range controller calculates the photoelectric conversion characteristic, so that an output level of the image sensor corresponding to a subject luminance (Lm20) for dynamic range setting coincides with a predetermined provisional saturated output level (Vmax1), which is preliminarily set for the dynamic range setting in the priority setting, and calculates a photoelectric conversion characteristic setting value as the dynamic range control parameter in relation to the calculated photoelectric conversion characteristic, and the exposure amount controller calculates, after the calculation of the photoelectric conversion characteristic setting value by the dynamic range controller, the photoelectric conversion characteristic, so that an output level of the image sensor corresponding to a subject luminance (Lt1) for exposure amount setting coincides with a predetermined target output level (Vtarget) in the linear characteristic area, and calculates an exposure amount setting value as the exposure amount control parameter in relation to the calculated photoelectric conversion characteristic.

In the arrangement (6), the exposure amount is controlled in such a manner that a desired dynamic range is secured based on the priority, so that the output level of the image sensor corresponding to the subject luminance e.g. a maximum subject luminance for dynamic range setting coincides with the predetermined provisional saturated output level, which is preliminarily set based on an assumption that the provisional saturated output level will be changed in the succeeding exposure amount control, in other words, the sensor output corresponding to the subject luminance, namely, the range of the subject luminance falls within the range of the output level of the image sensor, and that the output level of the image sensor corresponding to the subject luminance for exposure amount setting coincides with the predetermined target output level in the linear characteristic area. This arrangement enables to secure a required exposure amount in a sensing operation in the linear characteristic area where a high contrast image signal is obtained even from a subject of a low luminance.

(7) In any of the arrangement (6), preferably, the exposure amount controller calculates the exposure amount control parameter, so that a reference output level (Vmax2) of the image sensor corresponding to the subject luminance (Lm20) for dynamic range setting in the calculated photoelectric conversion characteristic is equal to or below a predetermined saturated output level (Vmax).

In the arrangement (7), the exposure amount controller calculates the exposure amount control parameter, so that the reference output level is equal to or below the saturated output level. This arrangement enables to prevent likelihood that the dynamic range that has been secured by the dynamic range control based on the priority may be lost or reduced by the exposure amount control, which follows the dynamic range control, namely, by the calculation of the exposure amount control parameter after the calculation of the dynamic range control parameter, in other words, to prevent the output level of the image sensor corresponding to the subject luminance (Lm20) for dynamic range setting from increasing over the saturated output level (Vmax), which may lead to failure of securing a wide dynamic range by maximally utilizing the range of the output level of the image sensor. Thus, the exposure control prioritizing the dynamic range control can be securely performed.

(8) In the arrangement (2), preferably, the image sensor is configured in such a manner as to perform photoelectric conversion in the logarithmic characteristic area independently of an exposure time, the image sensing apparatus further comprises a diaphragm, the exposure amount controller includes an aperture controller which controls the exposure amount based on an aperture setting value relating to control of an aperture area of the diaphragm, and/or an exposure time controller which controls the exposure amount based on an exposure time setting value relating to control of the exposure time to the image sensor, the priority setter sets the calculation of the exposure amount control parameter comprised of calculation of an aperture control parameter by the aperture controller, and/or an exposure time control parameter by the exposure time controller, as the priority, and the exposure controller performs the calculation of the aperture control parameter and/or the calculation of the exposure time controller parameter, and the calculation of the dynamic range control parameter in this order according to the priority set by the priority setter in exposure control by the aperture controller and/or the exposure time controller, and by the dynamic range controller, the aperture controller, the exposure time controller, and the dynamic range controller being configured to perform the exposure control independently of each other.

In the arrangement (8), the image sensor is configured in such a manner that the photoelectric conversion in the logarithmic characteristic area is executable independently of the exposure time. The aperture controller of the exposure amount controller controls the exposure amount based on the aperture setting value relating to control of the aperture area of the diaphragm. The exposure time controller of the exposure amount controller controls the exposure amount based on the exposure time setting value relating to control of the exposure time to the image sensor. The priority setter sets the calculation of the exposure amount control parameter, namely, calculation of the aperture control parameter by the aperture controller and/or the exposure time control parameter by the exposure time controller, as the priority. The exposure controller performs the calculation of the aperture control parameter and/or the calculation of the exposure time control parameter, and the calculation of the dynamic range control parameter in this order according to the priority set by the priority setter in exposure control by the aperture controller and/or the exposure time controller, and by the dynamic range controller, wherein the aperture controller, the exposure time controller, and the dynamic range controller are configured to perform the exposure control independently of each other. In this way, the calculation of the aperture control parameter and/or the calculation of the exposure time control parameter, and the calculation of the dynamic range control parameter are performed in this order according to the priority set by the priority setter in correlation with the photoelectric conversion characteristic of the image sensor having the feature that the photoelectric conversion in the logarithmic characteristic area is performed independently of the exposure time. This arrangement provides an image sensing apparatus capable of performing efficient exposure control with high latitude and in accordance with the priority, wherein the exposure control primarily based on the exposure amount control by the aperture control and/or by the exposure time control is performed according to needs, and the priority is set between the aperture control and the exposure time control in the exposure amount control which is prioritized over the dynamic range control. It should be noted that the priority is not set if the exposure amount control is performed solely by the aperture control or by the exposure time control.

(9) In the arrangement (8), preferably, the dynamic range controller calculates the dynamic range control parameter, so that an output level (Vth2) of the image sensor at an inflection point of the calculated photoelectric conversion characteristic is equal to or above a predetermined reference lower limit (Vlimit).

In the arrangement (9), the dynamic range controller calculates the dynamic range control parameter, so that the output level of the image sensor at the inflection point is equal to or above the provisional saturated output level. This arrangement enables to prevent likelihood that that the exposure amount that has been secured by the exposure amount control based on the priority may be lost by the dynamic range control, which follows the exposure amount control, namely, by the calculation of the dynamic range control parameter after the calculation of the aperture control parameter and/or the exposure time control parameter, in other words, to prevent failure of securing the exposure amount for matching the output level of the image sensor corresponding to the subject luminance (Lt1) for exposure amount setting with the target output level (Vtarget). Thus, the exposure control prioritizing the exposure amount control can be securely performed.

(10) In the arrangement (3), preferably, the image sensor is configured in such a manner as to perform photoelectric conversion in the logarithmic characteristic area independently of an exposure time, the image sensing apparatus further comprises a diaphragm, the exposure amount controller includes an aperture controller which controls the exposure amount based on an aperture setting value relating to control of an aperture area of the diaphragm, and/or an exposure time controller which controls the exposure amount based on an exposure time setting value relating to control of the exposure time to the image sensor, the priority setter sets the calculation of the dynamic range control parameter, as the priority, over calculation of an aperture control parameter by the aperture controller, and/or calculation of an exposure time control parameter by the exposure time controller, and the exposure controller performs the calculation of the dynamic range control parameter, and the calculation of the aperture control parameter and/or the calculation of the exposure time control parameter in this order according to the priority set by the priority setter in exposure control by the aperture controller and/or the exposure time controller, and by the dynamic range controller, the aperture controller, the exposure time controller, and the dynamic range controller being configured to perform the exposure control independently of each other.

In the arrangement (10), the image sensor is configured in such a manner that the photoelectric conversion in the logarithmic characteristic area is executable independently of the exposure time. The aperture controller of the exposure amount controller controls the exposure amount based on the aperture setting value relating to control of the aperture area of the diaphragm. The exposure time controller of the exposure amount controller controls the exposure amount based on the exposure time setting value relating to control of the exposure time to the image sensor. The priority setter prioritizes the calculation of the dynamic range control parameter over the calculation of the exposure amount control parameter, namely, calculation of the aperture control parameter by the aperture controller and/or the exposure time control parameter by the exposure time controller. The exposure controller performs the calculation of the dynamic range control parameter, the calculation of the aperture control parameter and/or the calculation of the exposure time control parameter in this order according to the priority set by the priority setter in exposure control by the aperture controller and/or the exposure time controller, and by the dynamic range controller, wherein the aperture controller, the exposure time controller, and the dynamic range controller are configured to perform the exposure control independently of each other. In this way, the calculation of the dynamic range control parameter, the calculation of the aperture control parameter and/or the calculation of the exposure time control parameter are performed in this order according to the priority set by the priority setter in correlation with the photoelectric conversion characteristic of the image sensor having the feature that the photoelectric conversion in the logarithmic characteristic area is performed independently of the exposure time. This arrangement provides an image sensing apparatus capable of performing efficient exposure control with high latitude and in accordance with the priority, wherein the exposure control primarily based on the dynamic range control is performed according to needs, and the priority is set between the aperture control and the exposure time control in the exposure amount control which is executed after the dynamic range control. It should be noted that the priority is not set if the exposure amount control is performed solely by the aperture control or by the exposure time control.

(11) In the arrangement (10), preferably, the exposure amount controller calculates the exposure amount control parameter, so that a reference saturated output level (Vmax2) of the image sensor corresponding to a subject luminance (Lm20) for dynamic range setting in the calculated photoelectric conversion characteristic is equal to or below a predetermined saturated output level (Vmax) of the image sensor.

In the arrangement (11), the exposure amount controller calculates the exposure amount control parameter, so that the provisional saturated output level is equal to or below the saturated output level. This arrangement enables to prevent likelihood that the dynamic range that has been secured by the dynamic range control based on the priority may be lost by the exposure amount control, which follows the dynamic range control, namely, by the calculation of the aperture control parameter and/or the calculation of the exposure time control parameter after the calculation of the dynamic range control parameter, in other words, to prevent the output level of the image sensor corresponding to the subject luminance (Lm20) for dynamic range setting from increasing over the saturated output level (Vmax), which may lead to failure of securing a wide dynamic range by maximally utilizing the range of the output level of the image sensor, even in a case that the dynamic range control, and the aperture control and/or the exposure time control are performed in this order according to the priority set by the priority setter. Thus, the exposure control prioritizing the dynamic range control can be securely performed.

(12) In any of the arrangements (8) through (11), preferably, the image sensor includes a floating diffusion which accumulates electric charge from a photodiode for generating a photocurrent in response to incidence of light to convert the charge into a voltage, and a transistor which applies a reset bias to the floating diffusion, and the image sensor outputs a signal having the photoelectric conversion characteristic comprised of the linear characteristic area and the logarithmic characteristic area in response to setting of a gate voltage of the transistor to a medium potential between a high potential and a low potential.

In the arrangement (12), the image sensor includes the floating diffusion and the transistor for applying the reset bias to the floating diffusion, and the image sensor outputs the signal having the photoelectric conversion characteristic comprised of the linear characteristic area and the logarithmic characteristic area in response to setting of the gate voltage of the transistor to the medium potential. This arrangement enables to obtain the photoelectric conversion characteristic comprised of the linear characteristic area and the logarithmic characteristic area by using the image sensor having a simplified construction, and to realize the exposure control by the aperture control and/or the exposure time control, and by the dynamic range control, wherein the aperture control the exposure time control, and the dynamic range control, as the exposure control, are performed independently of each other, so that a different change of the photoelectric conversion characteristic is obtained among these controls, and the priority on the control has been set.

(13) An image sensing apparatus according to another aspect of the invention is directed to an image sensing apparatus comprising: an image sensor which generates an electrical signal commensurate with an amount of incident light, and has a photoelectric conversion characteristic comprised of a first characteristic area where the electrical signal is outputted after being converted to a first characteristic in relation to the amount of incident light, and a second characteristic area where the electrical signal is outputted after being converted to a second characteristic in relation to the amount of incident light, the second characteristic having a smaller output variation in relation to the amount of incident light than the first characteristic; an exposure evaluation value detector which detects an exposure evaluation value based on luminance information acquired from a subject in sensing an image of the subject; an exposure controller which determines a subject luminance for exposure setting based on the exposure evaluation value detected by the exposure evaluation value detector to control exposure of the image sensing apparatus, the exposure controller including: an exposure amount controller which controls an exposure amount to the image sensor, and a dynamic range controller which controls the photoelectric conversion characteristic of the image sensor, and an output level judger which compares an output level of the image sensor corresponding to the subject luminance for exposure setting with a predetermined target output level after a first exposure control by combination of the exposure amount controller and the dynamic range controller, the exposure controller being so configured as to execute a second exposure control by the exposure amount controller or by the dynamic range controller based on the comparison result by the output level judger.

In the arrangement (13), the exposure control is performed in such a manner that a predetermined output level or a target level in accordance with a target subject luminance is secured and yet, a certain dynamic range is secured in a sensing operation of the subject by combination of the exposure amount control and the dynamic range control in the first exposure control. There is a case, however, that a desired target level or an appropriate dynamic range is not obtained, namely, an actually obtained value is slightly off the target value for control due to the co-existence of the two different exposure controls i.e. the exposure amount control, and the dynamic range control, if the photoelectric conversion characteristic after the exposure control is applied as it is. In view of this, the output level judger compares the output level corresponding to the subject luminance for exposure setting, namely, the subject luminance for exposure amount setting in case of the exposure amount control, or the subject luminance for dynamic range setting in case of the dynamic range control, with the desired output level, and confirms or judges whether these output levels coincide with each other. Then, the second exposure control is performed based on the comparison result by the output level judger. Specifically, the target level or the dynamic range is additionally controllable by performing the exposure amount control or the dynamic range control in the second exposure control. This arrangement enables the user to re-execute the control of the target level or the dynamic range, which the user wishes to secure on a priority basis, namely, which the user wishes to securely control.

According to the arrangement (13), the exposure control by the exposure amount controller or the dynamic range controller is performed in the second exposure control. Accordingly, control of the target level or the dynamic range, which a user wishes to secure on a priority basis, namely, which the user wishes to securely control is re-executable. In other words, this arrangement enables to perform the exposure control of securing the output level of the image sensor corresponding to the target subject luminance, and yet securing an appropriate dynamic range, or conversely, to perform the exposure control of securing the target dynamic range of the image sensor, and yet securing an appropriate exposure amount. This arrangement is advantageous in allowing the user to perform a shooting operation with an optimal exposure amount commensurate with the amount of light from the subject and with an appropriate dynamic range, according to needs of the user.

(14) In the arrangement (13), preferably, the first exposure control is such that the exposure amount control by the exposure amount controller and the dynamic range control by the dynamic range controller are executed in this order, and the second exposure control is such that the exposure amount control by the exposure amount controller is executed.

In the arrangement (14), since the exposure amount control is performed in the second exposure control, the exposure control of securing a desired exposure amount in relation to the subject luminance for exposure amount setting, and yet securing an appropriate dynamic range is performed. With this arrangement, even if the target level is not secured after the first exposure control the second exposure control can correctively set the target level to thereby perform exposure control prioritizing the target level. This arrangement enables the user to perform a shooting operation in a state that a sufficient exposure amount is secured for a main subject, for instance.

(15) In the arrangement (14), preferably, the output level judger compares an output level (Vtarget2) corresponding to a subject luminance (Lt1) for exposure amount setting after the first exposure control with a predetermined target output level (Vtarget) corresponding to the subject luminance (Lt1) for exposure amount setting.

In the arrangement (15), the output level judger compares the output level (Vtarget2) corresponding to the subject luminance (Lt1) for exposure amount setting after the first exposure control with the target output level or the target level (Vtarget) which has been set in advance in relation to the subject luminance (Lt1) for exposure amount setting. This arrangement enables to judge, with a simplified arrangement, whether the target level has been secured by the first exposure control, whereby the judgment as to whether the second exposure control is necessary is made easy.

(16) In the arrangement (15), preferably, the second exposure control is such that the output level (Vtarget2) corresponding to the subject luminance (Lt1) for exposure amount setting after the first exposure control coincides with the predetermined target output level (Vtarget).

In the arrangement (16), the second exposure control is performed to match the output level (Vtarget2) corresponding to the subject luminance (Lt1) for exposure amount setting after the first exposure control with the target output level or the target level (Vtarget). Thereby, the exposure control of securing the target level can be performed. This arrangement is advantageous in allowing the user to perform a shooting operation in a state that a sufficient exposure amount is secured for a main subject or the like.

In the arrangements (15) and (16), the exposure control of securing a desired target level can be performed.

(17) In the arrangement (13), preferably, the first exposure control is such that the dynamic range control by the dynamic range controller and the exposure amount control by the exposure amount controller and are executed in this order, and the second exposure control is such that the dynamic range control by the dynamic range controller is executed.

In the arrangement (17), since the dynamic range control is performed in the second exposure control, the exposure control of securing a desired dynamic range in a sensing operation of the subject, and yet securing an appropriate exposure amount is performed. Accordingly, even if a sufficient dynamic range is not secured after the first exposure control, the second exposure control can correctively set the dynamic range to thereby perform exposure control prioritizing the dynamic range. This arrangement enables the user to perform a shooting operation in a state that a required dynamic range is secured in a sensing operation of the subject.

(18) In the arrangement (17), preferably, the output level judger compares an output level (Vmax2) corresponding to a subject luminance (Lm10) for dynamic range setting after the first exposure control with a predetermined saturated output level (Vmax) corresponding to the subject luminance (Lm10) for dynamic range setting.

In the arrangement (18), the output level judger compares the output level (Vmax2) corresponding to the subject luminance (Lm10) for dynamic range setting after the first exposure control with the saturated output level (Vmax) which has been set in advance in relation to the subject luminance (Lm10) for dynamic range setting. This arrangement enables to judge, with a simplified arrangement, whether the required dynamic range has been secured by the first exposure control, whereby the judgment as to whether the second exposure control is necessary is made easy.

(19) In the arrangement (18), preferably, the second exposure control is such that the output level (Vmax2) corresponding to the subject luminance (Lm10) for dynamic range setting after the first exposure control coincides with the desired output level (Vmax).

In the arrangement (19), since the second exposure control is performed to match the output level (Vmax2) corresponding to the subject luminance (Lm10) for dynamic range setting after the first exposure control with the saturated output level (Vmax), the exposure control of securing the desired dynamic range is carried out. This arrangement enables the user to perform a shooting operation in a state that the desired dynamic range is secured for the subject.

In the arrangements (18) and (19), the exposure control of securing a desired dynamic range is performed.

(20) In any of the arrangements (13) through (19), preferably, the image sensing apparatus further comprises a priority setter which sets a priority on the exposure control between the exposure amount controller and the dynamic range controller.

In the arrangement (20), since the user can arbitrarily select the target level or the dynamic range, which the user wishes to secure on a priority basis, this arrangement is advantageous in allowing the user to arbitrarily set the target level or the dynamic range according to the user's preference, whereby operability in the shooting operation is improved.

(21) An image sensing apparatus according to yet another aspect of the invention is directed to an image sensing apparatus comprising: an image sensor which generates an electrical signal commensurate with an amount of incident light, and has a photoelectric conversion characteristic comprised of a first characteristic area where the electrical signal is outputted after being converted to a first characteristic in relation to the amount of incident light, and a second characteristic area where the electrical signal is outputted after being converted to a second characteristic in relation to the amount of incident light, the second characteristic having a smaller output variation in relation to the amount of incident light than the first characteristic; an exposure controller which controls exposure of the image sensing apparatus, the exposure controller including: an exposure amount controller which controls an exposure amount to the image sensor, and a dynamic range controller which controls the photoelectric conversion characteristic of the image sensor, and an exposure evaluation value detector which detects an exposure evaluation value based on luminance information acquired from a subject in sensing an image of the subject; an exposure control parameter determiner which determines a subject luminance for exposure setting based on the exposure evaluation value detected by the exposure evaluation value detector, and determines an exposure amount control parameter by the exposure amount controller for controlling the exposure amount, and a dynamic range control parameter by the dynamic range controller for controlling the dynamic range, and an output level judger which compares an output level of the image sensor corresponding to the subject luminance for exposure setting with a predetermined desired output level, the exposure control parameter determiner determining the exposure amount control parameter and the dynamic range control parameter by carrying out steps comprising: a first stage of controlling the exposure amount control parameter and the dynamic range control parameter based on the subject luminance for exposure setting; comparing the output level of the image sensor with the predetermined desired output level by the output level judger after the first stage of controlling; and a second stage of controlling the exposure amount control parameter or the dynamic range control parameter based on the comparison result, the exposure controller being so configured as to execute the exposure control based on the determined exposure amount control parameter and the determined dynamic range control parameter.

In the arrangement (21), the actual exposure control operation is carried out based on the exposure amount control parameter and the dynamic range control parameter by performing the steps comprising the first stage of controlling the exposure amount control parameter and the dynamic range control parameter, and the second stage of controlling the exposure amount control parameter or the dynamic range control parameter based on the computation result on the exposure amount control parameter and the dynamic range control parameter in the first stage, without performing exposure control operations such as setting of the exposure time or the aperture value, or setting of the photoelectric conversion characteristic each time the exposure amount control parameter and the dynamic range control parameter are calculated.

According to the arrangement (21), in the first stage of controlling, the exposure amount control parameter and the dynamic range control parameter are controlled, and in the second stage following the first stage, the exposure amount control parameter or the dynamic range control parameter is controlled. Thereby, the user can re-execute control of the target level or the dynamic range, which the user wishes to secure on a priority basis, namely, which the user wishes to control. In other words, this arrangement enables to perform exposure control of securing the output level of the image sensor corresponding to the target subject luminance, and yet securing an appropriate dynamic range, or conversely to perform exposure control of securing the target dynamic range of the image sensor, and yet securing an appropriate exposure amount. This arrangement is advantageous in allowing the user to perform a shooting operation with an optimal exposure amount commensurate with the amount of light from the subject and with the adequate dynamic range according to needs of the user.

It should be noted that the image sensing apparatus having the arrangement (21) can take arrangements corresponding to the arrangements (14) through (20).

(22) In the arrangement (21), preferably, the first stage of controlling is such that the control of the exposure amount control parameter and the control of the dynamic range control parameter are executed in this order, and the second stage of controlling is such that the control of the exposure amount control parameter is executed.

According to the arrangement (22), since the exposure amount control parameter is controlled in the second stage of controlling, exposure control of securing an exposure amount in relation to the subject luminance for exposure amount setting on a priority basis, and yet securing an appropriate dynamic range is carried out. With this arrangement, the target level can be correctively secured by the second stage of controlling, even if the target level is not secured after the first stage of controlling. This arrangement enables to perform the exposure control prioritizing the target level, and to allow the user to perform a shooting operation in a state that a sufficient exposure amount is secured for the main subject, for instance.

(23) In the arrangement (22), preferably, the output level judger compares an output level (Vtarget2) corresponding to a subject luminance (Lt1) for exposure amount setting after the first stage of controlling with a predetermined target output level (Vtarget) corresponding to the subject luminance (Lt1) for exposure amount setting.

According to the arrangement (23), the output level judger compares the output level (Vtarget2) corresponding to the subject luminance (Lt1) for exposure amount setting after the first stage of controlling with the target output level or the target level (Vtarget) which has been set in advance in relation to the subject luminance (Lt1) for exposure amount setting. This arrangement enables to judge, with a simplified arrangement, whether a required target level has been secured by the first stage of controlling, whereby the judgment as to whether the second stage of controlling is necessary is made easy.

(24) In the arrangement (23), preferably, the second stage of controlling is such that the output level (Vtarget2) corresponding to the subject luminance (Lt1) for exposure amount setting after the first stage of controlling coincides with the predetermined target output level (Vtarget).

According to the arrangement (24), since the second stage of controlling is performed to match the output level (Vtarget2) corresponding to the subject luminance (Lt1) for exposure amount setting after the first stage of controlling with the target output level or the target level (Vtarget), the exposure control of securing a desired target level is carried out. This arrangement enables the user to perform a shooting operation in a state that the desired exposure amount is secured for the main subject, for instance.

(25) In the arrangement (21), preferably, the first stage of controlling is such that the control of the dynamic range control parameter and the control of the exposure amount control parameter are executed in this order, and the second stage of controlling is such that control of the dynamic range control parameter is executed.

According to the arrangement (25), since the dynamic range control is performed in the second stage of controlling, the exposure control of securing a desired dynamic range, and yet securing an appropriate exposure amount in relation to the subject luminance for exposure amount setting is performed. According to this arrangement, even if a sufficient dynamic range is not secured after the first stage of controlling, the second stage of controlling can correctively set the dynamic range to thereby perform exposure control prioritizing the dynamic range. This arrangement enables the user to perform a shooting operation in a state that a required dynamic range is secured in a sensing operation of the subject.

(26) In the arrangement (25), preferably, the output level judger compares an output level (Vmax2) corresponding to a subject luminance (Lm10) for dynamic range setting after the first stage of controlling with a predetermined saturated output level (Vmax) corresponding to the subject luminance (Lm10) for dynamic range setting.

According to the arrangement (26), the output level judger compares the output level (Vmax2) corresponding to the subject luminance (Lm10) for dynamic range setting after the first stage of controlling with the saturated output level (Vmax) which has been set in advance in relation to the subject luminance (Lm10) for dynamic range setting. This arrangement enables to judge, with a simplified arrangement, whether a required dynamic range has been secured by the first stage of controlling, whereby the judgment as to whether the second stage of controlling is necessary is made easy.

(27) In the arrangement (26), preferably, the second stage of controlling is such that the output level (Vmax2) corresponding to the subject luminance (Lm10) for dynamic range setting after the first stage of controlling coincides with the predetermined saturated output level (Vmax).

According to the arrangement (27), since the second stage of controlling is performed to match the output level (Vmax2) corresponding to the subject luminance (Lm10) for dynamic range setting after the first stage of controlling with the saturated output level (Vmax), the exposure control of securing a desired dynamic range is carried out. This arrangement enables the user to perform a shooting operation in a state that the desired dynamic range is secured for the subject.

(28) In any of the arrangements (21) through (27), preferably, the image sensing apparatus further comprises a priority setter which sets a priority on control between the exposure amount control parameter and the dynamic range control parameter.

According to the arrangement (28), since the user can arbitrarily select the target level or the dynamic range, which the user wishes to secure on a priority basis, this arrangement is advantageous in allowing the user to arbitrarily set the target level or the dynamic range according to the user's preference, whereby operability in the sensing operation is improved.

(29) In the arrangement (13), preferably, the image sensor is configured in such a manner as to perform photoelectric conversion in the logarithmic characteristic area independently of an exposure time, the image sensing apparatus further comprises a diaphragm, the exposure amount controller includes an aperture controller which controls the exposure amount based on an aperture setting value relating to control of an aperture area of the diaphragm, and/or an exposure time controller which controls the exposure amount based on an exposure time setting value relating to control of the exposure time to the image sensor, the aperture controller and the exposure time controller being configured to perform the exposure amount control independently of each other, the output level judger compares the output level of the image sensor corresponding to the subject luminance for exposure setting with the predetermined desired output level after the first exposure control by combination of the exposure amount controller and the dynamic range controller, the exposure controller performs the second exposure control by the exposure amount controller or by the dynamic range controller based on the comparison result by the output level judger.

In the arrangement (29), the first exposure control is performed in such a manner that the exposure amount control by the aperture control and/or by the exposure time control, and the dynamic range control are carried out, wherein the aperture control, the exposure time control, and the dynamic range control are independently operable for exposure amount control or exposure control, namely, the respective control parameters for the aperture control, the exposure time control and the dynamic range control are obtained by changing the photoelectric conversion characteristic according to the respective controls. Thereby, the exposure control of securing the predetermined target level in relation to the target subject luminance, and yet securing a certain dynamic range in a sensing operation of the subject is performed. There is a case, however, that a desired target level or an appropriate dynamic range is not obtained, namely, an actually obtained value is slightly off the target value for control due to the co-existence of the two different exposure controls i.e. the exposure amount control, and the dynamic range control, if the photoelectric conversion characteristic after the exposure control is applied as it is. In view of this, the output level judger compares the output level corresponding to the subject luminance for exposure setting, namely, the subject luminance for exposure amount setting in case of the exposure amount control, or the subject luminance for dynamic range setting in case of the dynamic range control, with the target output level, and confirms or judges whether these output levels coincide with each other. Then, the second exposure control is performed based on the comparison result by the output level judger. Specifically, in the second exposure control, the target level or the dynamic range is additionally controllable by operating the exposure amount controller, namely, the aperture controller and/or the exposure time controller, or the dynamic range controller. This arrangement enables the user to re-execute the control of the target level or the dynamic range, which the user wishes to secure on a priority basis, namely, which the user wishes to securely control. In this arrangement, the exposure amount control can be executed by using the aperture control and the exposure time control which are operated independently of each other, including a case that the aperture control or the exposure time control is singly operated. This arrangement enables to efficiently perform the AE control by the first exposure control and the second exposure control based on the priority with high latitude, and in accordance with the combination of the respective controls.

This arrangement enables to perform the exposure control of securing the output level of the image sensor corresponding to the target subject luminance, and yet securing an appropriate dynamic range, and conversely, to perform the exposure control of securing the target dynamic range of the image sensor, and yet securing an appropriate exposure amount. This arrangement is advantageous in allowing the user to perform a shooting operation with an optimal exposure amount commensurate with the amount of light from the subject and with the adequate dynamic range according to needs of the user.

(30) In the arrangement (29), preferably, the first exposure control is such that the aperture control and/or the exposure time control by the aperture controller and/or the exposure time controller, as the exposure amount control by the exposure amount controller, and the dynamic range control by the dynamic range controller are executed in this order, and the second exposure control is such that the aperture control and/or the exposure time control, as the exposure amount control by the exposure amount controller, is executed.

In the arrangement (30), in the first exposure control, the aperture control and/or the exposure time control, and the dynamic range control are performed in this order, and in the second exposure control, the exposure amount control by the aperture control and/or the exposure time control is performed. This arrangement enables to efficiently perform the exposure control of securing the exposure amount in relation to the subject luminance for exposure amount setting on a priority basis, and yet securing an appropriate dynamic range with high latitude. According to this arrangement, even if the target level is not secured after the first exposure control, the second exposure control can correctively set the target level. This arrangement enables the user to perform exposure control prioritizing the target level, and to perform a shooting operation in a state that the exposure amount is secured for the main subject, for instance.

(31) In the arrangement (30), preferably, the output level judger compares an output level (Vtarget2) corresponding to a subject luminance (Lt1) for exposure amount setting after the first exposure control with a predetermined target output level (Vtarget) corresponding to the subject luminance (Lt1) for exposure amount setting.

According to the arrangement (31), the output level judger compares the output level (Vtarget2) corresponding to the subject luminance (Lt1) for exposure amount setting after the first exposure control with the target output level or the target level (Vtarget) which has been set in advance in relation to the subject luminance (Lt1) for exposure amount setting. This arrangement enables to judge, with a simplified arrangement, whether a required target level has been secured by the first exposure control, whereby the judgment as to whether the second exposure control is necessary is made easy.

(32) In the arrangement (31), preferably, the second exposure control is such that the output level (Vtarget2) corresponding to the subject luminance (Lt1) for exposure amount setting after the first exposure control coincides with the predetermined target output level (Vtarget) by the exposure amount control by the aperture control and/or the exposure time control.

According to the arrangement (32), since the second exposure control is performed to match the output level (Vtarget2) corresponding to the subject luminance (Lt1) for exposure amount setting after the first exposure control with the target output level or the target level (Vtarget) by the exposure amount control by the aperture control and/or by the exposure time control, the exposure control of securing a desired target level is efficiently carried out with high latitude. This arrangement enables the user to perform a shooting operation in a state that the desired exposure amount is secured for the main subject, for instance.

In the arrangements (31) and (32), the exposure control of securing a desired target level can be efficiently performed with high latitude.

(33) In the arrangement (29), preferably, the first exposure control is such that the dynamic range control by the dynamic range controller, and the aperture control and/or the exposure time control by the aperture controller and/or the exposure time controller, as the exposure amount control by the exposure amount controller, are executed in this order, and the second exposure control is such that the dynamic range control by the dynamic range controller is executed.

In the arrangement (33), in the first exposure control, the dynamic range control, and the aperture control and/or the exposure time control are performed in this order, and in the second exposure control, the dynamic range control is performed. This arrangement enables to efficiently perform the exposure control of securing a required dynamic range in a sensing operation of the subject, and yet securing an appropriate exposure amount with high latitude. According to this arrangement, even if the dynamic range is not secured after the first exposure control, the second exposure control can correctively set the dynamic range. This arrangement enables the user to perform exposure control prioritizing the dynamic range, and to perform a shooting operation in a state that the required dynamic range is secured in a sensing operation of the subject.

(34) In the arrangement (33), preferably, the output level judger compares an output level (Vmax2) corresponding to a subject luminance (Lm10) for dynamic range setting after the first exposure control with a predetermined saturated output level (Vmax) corresponding to the subject luminance (Lm10) for dynamic range setting.

According to the arrangement (34), the output level judger compares the output level (Vmax2) corresponding to the subject luminance (Lm10) for dynamic range setting after the first exposure control with the saturated output level (Vmax) which has been set in advance in relation to the subject luminance (Lm10) for dynamic range setting. This arrangement enables to judge, with a simplified arrangement, whether a desired dynamic range has been secured by the first exposure control, whereby the judgment as to whether the second exposure control is necessary is made easy.

(35) In the arrangement (34), preferably, the second exposure control is such that the output level (Vmax2) corresponding to the subject luminance (Lm10) for dynamic range setting after the first exposure control coincides with the predetermined saturated output level (Vmax) by the dynamic range control.

According to the arrangement (35), since the second exposure control is performed to match the output level (Vmax2) corresponding to the subject luminance (Lm10) for dynamic range setting after the first exposure control with the saturated output level (Vmax) by the dynamic range control, the exposure control of securing a desired dynamic range is carried out. This arrangement enables the user to perform a shooting operation in a state that the desired dynamic range is secured for the subject.

In the arrangements (34) and (35), the exposure control of securing a desired dynamic range can be efficiently performed with high latitude.

(36) In any of the arrangements (29) through (35), preferably, the image sensing apparatus further comprises a priority setter which sets a priority on control between an aperture control parameter and/or an exposure time control parameter, and a dynamic range control parameter.

In the arrangement (36), since the user can arbitrarily select the target level or the dynamic range, which the user wishes to secure on a priority basis, with high latitude, the user can arbitrarily set the target level or the dynamic range according to the user's preference, whereby operability in the sensing operation is improved.

(37) An image sensing apparatus according to still another aspect of the invention is directed to an image sensing apparatus comprising: an image sensor which generates an electrical signal commensurate with an amount of incident light, and has a photoelectric conversion characteristic comprised of a first characteristic area where the electrical signal is outputted after being converted to a first characteristic in relation to the amount of incident light, and a second characteristic area where the electrical signal is outputted after being converted to a second characteristic in relation to the amount of incident light, the second characteristic having a smaller output variation in relation to the amount of incident light than the first characteristic, the image sensor being so configured as to perform photoelectric conversion in the second characteristic independently of an exposure time; an exposure controller which controls exposure of the image sensing apparatus, the exposure controller including an exposure amount controller, and a dynamic range controller which controls the photoelectric conversion characteristic of the image sensor, the exposure amount controller having an aperture controller and/or an exposure time controller which are configured to control the exposure amount to the image sensor independently of each other, an exposure evaluation value detector which detects an exposure evaluation value based on luminance information acquired from a subject in sensing an image of the subject; an exposure control parameter determiner which determines a subject luminance for exposure setting based on the exposure evaluation value detected by the exposure evaluation value detector, and determines an aperture control parameter by the aperture controller and/or an exposure time control parameter by the exposure time controller for exposure amount control and a dynamic range control parameter by the dynamic range controller for dynamic range control, and an output level judger which compares an output level of the image sensor corresponding to the subject luminance for exposure setting with a predetermined desired output level the exposure control parameter determiner determining an aperture control parameter and/or the exposure time control parameter, and the dynamic range control parameter by carrying out steps comprising: a first stage of controlling the aperture control parameter and/or the exposure time control parameter, and the dynamic range control parameter based on the subject luminance for exposure setting; comparing the output level of the image sensor with the predetermined desired output level by the output level judger after the first stage of controlling; and a second stage of controlling the aperture control parameter and/or the exposure time control parameter, or the dynamic range control parameter based on the comparison result, the exposure controller being so configured as to execute the exposure control based on the determined aperture control parameter and/or the exposure time control parameter, and the determined dynamic range control parameter.

In the arrangement (37), the actual exposure control operation is carried out based on the exposure amount control parameter and the dynamic range control parameter by performing the steps comprising the first stage of controlling the exposure amount control parameter, namely, the aperture control parameter and/or the exposure time control parameter, and the dynamic range control parameter, and the second stage of controlling the exposure amount control parameter, namely, the aperture control parameter and/or the exposure time control parameter, or the dynamic range control parameter based on the computation result on the exposure amount control parameter and the dynamic range control parameter in the first stage of controlling, without performing exposure control operations such as setting of the aperture value or the exposure time, or setting of the photoelectric conversion characteristic each time the exposure amount control parameter and the dynamic range control parameter are calculated.

According to the arrangement (37), the user can re-execute the control of the target level or the dynamic range, which the user wishes to secure on a priority basis, namely, which the user wishes to securely control. In other words, this arrangement enables to perform exposure control of securing the output level of the image sensor corresponding to the target subject luminance, and yet securing an appropriate dynamic range, or conversely to perform exposure control of securing a desired target dynamic range of the image sensor, and yet securing an appropriate exposure amount. This arrangement is advantageous in allowing the user to perform a shooting operation with an optimal exposure amount commensurate with the amount of light from the subject and with the adequate dynamic range according to needs of the user.

(38) In the arrangement (37), preferably, the first stage of controlling is such that the control of the aperture control parameter and/or the exposure time control parameter, and the control of the dynamic range control parameter are executed in this order, and the second stage of controlling is such that the control of the aperture control parameter and/or the exposure time control parameter is executed.

In the arrangement (38), in the first stage of controlling, the aperture control parameter and/or the exposure time control parameter, as the exposure amount control parameter, and the dynamic range control parameter are controlled in this order according to the priority, and in the second stage of controlling, the aperture control parameter and/or the exposure time control parameter, as the exposure amount control parameter is controlled. This arrangement enables to efficiently perform the exposure control of securing a desired exposure amount in relation to the subject luminance for exposure amount setting, and yet securing an appropriate dynamic range with high latitude. According to this arrangement, even if the desired target level is not secured after the first stage of controlling, the second stage of controlling can correctively set the target level. This arrangement enables the user to perform exposure control prioritizing the target level, and to perform a shooting operation in a state that the required exposure amount is secured for the main subject, for instance.

(39) In the arrangement (37), preferably, the first stage of controlling is such that the control of the dynamic range control parameter, and the control of the aperture control parameter and/or the exposure time control parameter are executed in this order, and the second stage of controlling is such that the control of the dynamic range control parameter is executed.

In the arrangement (39), in the first stage of controlling, the dynamic range control parameter, and the aperture control parameter and/or the exposure time control parameter are controlled in this order according to the priority, and in the second stage of controlling, the dynamic range control parameter is controlled. This arrangement enables to efficiently perform the exposure control of securing the desired dynamic range in a sensing operation of the subject, and yet securing an appropriate exposure amount with high latitude. According to this arrangement, even if the desired dynamic range is not secured after the first stage of controlling, the second stage of controlling can correctively set the dynamic range. This arrangement enables the user to perform exposure control prioritizing the dynamic range, and to perform a shooting operation in a state that the required dynamic range is secured in a sensing operation of the subject.

First Embodiment

In the following, the first embodiment of the invention is described referring to FIGS. 1 through 29.

(Description on External Construction of Image Sensing Apparatus)

FIGS. 1A through 1C are diagrams showing external appearance of a compact digital camera 1 to which an image sensing apparatus as the first embodiment is applied, wherein FIG. 1A is a top plan view, FIG. 1B is a front view, and FIG. 1C is a rear view. The digital camera 1, as an example of image sensing apparatuses, has a power supply switch 101 and a release switch 102 on a top part of a camera body 10, a flash section 103 and a taking lens aperture 104 on a front part thereof, and various operation buttons such as a mode setting switch 105, and a LCD section 106 comprised of a liquid crystal display (LCD) monitor on a rear part thereof A retractable lens barrel 20 is provided inside the camera body 10, as well as various parts constituting the camera body 10.

The power supply switch 101 is a pressable type switch used to turn on and off the power source of the camera 1 to start and stop power supply of the camera 1. Every time the power supply switch 101 is pressed, the power source of the camera 1 is alternately and repeatedly turned on and off. The mode setting switch 105 is adapted to set a still image shooting mode of shooting a still image, and a moving image shooting mode of shooting a moving image, as well as various control modes such as an exposure amount control parameter calculation prioritizing mode, namely, a target level prioritizing mode, and a dynamic range control parameter calculation prioritizing mode, namely, a dynamic range prioritizing mode, which will be described later.

The release switch 102 is a pressable type switch, and is settable to a halfway pressed state where the release switch 102 is pressed halfway down, and to a fully pressed state where the release switch 102 is pressed fully down. When the release switch 102 is pressed halfway down in the still image shooting mode, for example, a preparatory operation of shooting a still image of a subject such as automatic exposure control and automatic focal adjustment, which will be described later, is executed. Subsequently, when the release switch 102 is pressed fully down, an image shooting operation, namely, a series of operations comprising exposing an image sensor, which will be described later, applying a predetermined image processing to an image signal acquired by the exposure, and recording the processed signal in a memory card or a like device, are executed. On the other hand, when the release switch 102 is pressed fully down in the moving image shooting mode, a predetermined moving image shooting operation is started. Subsequently, when the release switch 102 is pressed fully down again, the moving image shooting operation is terminated.

While the release switch 102 is pressed halfway down in the still image shooting mode, the flash section 103 flashes light to illuminate the subject if the subject image is dark. The taking lens aperture 104 is an opening for guiding the subject light image to the retractable lens barrel 20 provided inside the camera body 10. The LCD section 106 is adapted to playback or display an image recorded in a recording medium mounted in the camera body 10, or to display a through-image or a live-view image of the subject which has been video-shot in a shooting standby period or in the moving image shooting mode. The camera body 10 has a group of push switches such as a zoom switch, a menu selection switch, and a selection determination switch in addition to the mode setting switch 105.

The retractable lens barrel 20 constitutes a taking lens system which guides the subject image through the taking lens aperture 104 to the image sensor 30 arranged inside the camera body 10. The lens barrel 20 is a lens barrel whose length is not changed even in zooming or focusing driving. Namely, the lens barrel 20 does not protrude outside of the camera body 10. Inside the lens barrel 20, there are provided a lens group 21 (see FIG. 2) constituting a taking optical system comprised of a zoom lens block and a fixed lens block arrayed in series along an optical axis, and a diaphragm 22 arranged at an appropriate position of the lens group 21. A shutter 23 is arranged at an appropriate position of the lens group 21 to allow or block incidence of light along the optical path of the taking optical system by opening/closing the shutter 23. In other words, the exposure amount of the image sensor 30 is controlled based on the setting degree of the aperture area of the diaphragm 22, an opening/closing operation of the shutter 23, or other factor.

(Description on Entire Electrical Configuration of Image Sensing Apparatus)

FIG. 2 is a block diagram of an imaging process to be implemented by the digital camera 1 as the first embodiment. The digital camera 1 has an operating section 100, the retractable lens barrel 20, the image sensor 30, a signal processing section 40, a main controller 50, and a driving section 60. The operating section 100 is constituted of the power supply switch 101, the release switch 102, and the mode setting switch 105.

The image sensor 30 photo-electrically converts the subject light image formed through the lens group 21 in the lens barrel 20 into image signals of respective color components of red (R), green (G), and blue (B), namely, signals comprised of signal arrays representing pixel signals received on the respective pixels of the image sensor 30 according to the amount of light from the subject for outputting to the signal processing section 40. In this embodiment, a log conversion type solid-state image sensing device is used as the image sensor 30. The image sensor 30 is constructed such that output pixel signals, or output electrical signals generated by photoelectric conversion are outputted in relation to the amount of incident light, after being logarithmically converted. The image sensor 30 has such an output characteristic that output pixel signals are outputted after being linearly converted when the amount of incident light is lower than a predetermined level. The image sensor 30 comprises a linear characteristic area where its photoelectric conversion characteristic is linear while the subject image is dark, and a logarithmic characteristic area where its photoelectric conversion characteristic is logarithmic while the subject image is bright. In other words, the image sensor 30 has a first characteristic area, and a second characteristic area having a smaller output variation in relation to the amount of incident light than the first characteristic area. Further, the switching point, namely, the inflection point of the linear characteristic area and the logarithmic characteristic area is controllable by a specific control signal, namely, a dynamic range control signal to be described later. The construction, the operation and the like of the image sensor 30 will be described later in detail.

A timing generating circuit or a timing generator 31 controls an image sensing operation by the image sensor 30 such as electric charge accumulation based on exposure and read-out of the accumulated electric charge. The timing generating circuit 31 generates a predetermined timing pulse such as a pixel drive signal, a horizontal scanning signal, a vertical scanning signal, a horizontal scanning circuit drive signal, and a vertical scanning circuit drive signal based on a sensing control signal sent from the main controller 50, outputs the generated signals to the image sensor 30, reads out a frame image every 1/30 second, for example, in the moving image shooting mode, namely, in the through-image display mode, and outputs the signals successively to the signal processing section 40. Further, during exposure in the still image shooting mode, the timing generating circuit 31 accumulates electric charge in association with the exposure operation of the image sensor 30, namely, photoelectrically converts the subject light image into image signals, and outputs the accumulated electric charge to the signal processing section 40. Further, the timing generating circuit 31 generates a clock for analog-to-digital (A/D) conversion to be used in an A/D converter 402, which will be described later.

The signal processing section 40 applies a predetermined analog signal processing and a predetermined digital signal processing to the image signals outputted from the image sensor 30. The image signal processing is implemented with respect to each of the pixel signals constituting the image signals The signal processing section 40 includes an analog signal processor 401, the A/D converter 402, a black level corrector 403, a fixed pattern noise (FEN) corrector 404, an evaluation value detector 405, a white balance (WB) controller 406, a color interpolator 407, a 3×3 color corrector 408, a gradation converter 409, a noise canceller 410, and an image memory 411.

The analog signal processor 401 applies a predetermined analog signal processing to the image signals outputted from the image sensor 30, namely, an analog signal group representing light received on the respective pixels of the image sensor 30, and includes a correlation double sampling (CDS) circuit for reducing a reset noise included in each analog image signal, and an auto gain control (AGC) circuit for correcting the level of the analog image signal. The AGC circuit has an amplifying function of amplifying the analog image signal with an adequate amplification ratio to compensate for insufficiency in signal level of a captured image, in the case where adequate exposure was not obtained, so that the amplified analog signal level lies in the input voltage range of the A/D converter 402, which will be described later.

The A/D converter 402 has a function of converting the analog image signal outputted from the analog signal processor 401 into a digital image signal, namely, image data of 12 bits, for instance. The A/D converter 402 converts the analog image signal into a digital image signal based on the dock for A/D conversion sent from the timing generating circuit 31.

The black level corrector 403 implements computation: SD1-SD2 where SD1 represents the level of the image signal outputted from the A/D converter 402, and SD2 represents the level of the image signal at a dark time to correct the black level of the digital image signal outputted from the A/D converter 402, namely, the image signal level at the dark time, to a reference value e.g. 0 in terms of digital signal level after. A/D conversion. The black level correction is performed based on dynamic range information of the image sensor 30 commensurate with the photoelectric conversion characteristic of the image sensor 30 outputted from the main controller 50. This is for the following reason. In the digital camera 1 according to the embodiment of the invention, the photoelectric conversion characteristic of the image sensor 30 is controllable, and the level of the digital image signal outputted from the A/D converter 402 at the dark time is changed in response to change of the photoelectric conversion characteristic of the image sensor 30. Thereby, accurate black level correction in accordance with the change of the image signal level can be conducted.

The FPN corrector 404 removes a fixed pattern noise in the image signal outputted from the black level corrector 403. The fixed pattern noise is a noise due to a variation among threshold values of field effect transistors equipped in respective pixel circuits of the image sensor 30, and results from a variation among output values of the pixel signals generated by the respective pixels. The FPN corrector 404 implements computation: SD3-SD4 where SD3 represents the level of the image signal outputted from the black level corrector 403, and SD4 represents the fixed pattern component of the image signal outputted from the black level corrector 403.

The evaluation value detector 405 detects, based on the image signal actually acquired by the image sensing operation of the image sensor 30, evaluation values based on which automatic exposure (AE) control auto focusing (AF) control, white balance (WB) control, or a like control is to be implemented, namely, based on AE evaluation values, AF evaluation values, white balance evaluation values (hereinafter, called as "WB evaluation values"), or the like. In case of conducting AE control, generally, the following steps are implemented:

(1) measuring the luminance level and the luminance range of a subject as a target whose image is to be captured;
(2) calculating an exposure control amount necessary for securing an output from the image sensor commensurate with the luminance level and the luminance range; and
(3) controlling the exposure amount and the like based on the calculation result before actual shooting.

The evaluation value detector 405 calculates the luminance level and the luminance range of the subject based on the image signal actually acquired by the image sensor 30 to carry out the step (1), and outputs them as AE evaluation values to the main controller 50, so that they can be used for AE control, which will be described later.

In case of AF control, driving of the focus lens of the lens group 21 along an optical axis direction, and an image sensing operation by the image sensor 30 are alternately conducted to set the focus lens to such a position that makes it possible to maximize the contrast of the image acquired by the sensing operation, namely, a so-called hill-climbing search technique is adopted. The detected position of the focus lens is outputted to the main controller 50 as an AF evaluation value, which, in turn, is used for AF control, which will be described later. Further, white balance control is implemented to correct the colors of the output image to those conforming to a light source color of the subject. In this embodiment, the luminance ratios and the luminance differences of the respective color components R, G, and B are calculated by the evaluation value detector 405 based on the image signal outputted from the FPN corrector 404, and the calculated luminance ratios and the calculated luminance differences are outputted to the main controller 50 as WB evaluation values. Exemplified methods for acquiring the AE evaluation values, the AF evaluation values, and the WB evaluation values will be described later in detail.

The white balance controller 406 conducts level conversion of the pixel data of the respective color components R, G, and B, based on the dynamic range information and the WB evaluation values outputted from the main controller 50, so that the image signal has a predetermined color balance. In this embodiment, since the image sensor 30 comprises a linear characteristic area and a logarithmic characteristic area, it is preferable to conduct white balance correction suitable for each of the linear characteristic area and the logarithmic characteristic area by acquiring the WB evaluation values with respect to each of the linear characteristic area and the logarithmic characteristic area.

The color interpolator 407 interpolates pixel data at the pixel position where there is no color information in a frame image with respect to each of the color components R, G, and B of the image signal outputted from the white balance controller 406. Specifically, since a color filter format of the log conversion type image sensor 30 used in the embodiment adopts a so-called Bayer system in which green is arrayed in a checker pattern, and red and blue are each arrayed linearly, color information is not sufficient. In view of this, the color interpolator 407 interpolates pixel data at the pixel positions where there is no image data, using a plurality of existing pixel data.

More specifically, regarding a frame image of the color component G having pixels up to a high bandwidth, the color interpolator 407 masks image data constituting the frame image with a predetermined filter pattern, and calculates an average of pixel data by excluding pixel data having a maximum value and a minimum value out of the pixel data existing around the target pixel position to be interpolated, with use of a median filter, and interpolates this average value as the pixel data to be interpolated at the target pixel position. Regarding frame images of the color components R and B, the color interpolator 407 masks image data constituting each frame image with a predetermined filter pattern, calculates an average of pixel data existing in the vicinity of the pixel position, and implements interpolation by using the average as pixel data at the target pixel position.

FIG. 3 shows an example of the color filter format of the image sensor 30. Image signals of the respective color components R, G, and B in respective pixels are generated by the color interpolation with use of the color filter format, as shown below, for instance:

(i) Color Interpolation Equation for Address 11 (B11):

$R11=(R00+R20+R02+R22)/4$ $G11=(Gr10+Gb01+Gb21+Gr12)/4$ $B11=B11$ (ii) Color Interpolation Equation for Address 12 (Gr12):

$R12=(R01+R22)/2$ $G12=Gr12$ $B12=(B11+B13)/2$ (iii) Color Interpolation Equation for Address 21 (Gb21):

$R21=(R20+R22)/2$ $G21=Gb21$ $B21=(B11+B31)/2$ (iv) Color Interpolation Equation for Address 22 (R22):

$R22=R22$ $G22=(Gb21+Gr12+Gr32+Gb23)/4$ $B22=(B11+B31+B13+B33)/4$

The 3×3 color corrector 408 corrects the saturation or the tint of the image signals of the respective color components R, G, and B outputted from the color interpolator 407. The 3×3 color corrector 408 has three kinds of conversion coefficients with respect to each of the color components R, G, and B for converting the level ratio of image signals of the color components R, G, and B, and corrects the saturation of image data by converting the level ratio with use of a conversion coefficient conforming to a scene to be shot. For instance, the 3×3 color corrector 408 linearly converts the image signals with use of nine conversion coefficients, namely, a1, a2, a3, b1, b2, b3, c1, c2, and c3, as follows:

$$R'=a1 \cdot R+a2 \cdot G+a3 \cdot B$$

$$G'=b1 \cdot R+b2 \cdot G+b3 \cdot B$$

$$B'=c1 \cdot R+c2 \cdot G+c3 \cdot B$$

The gradation converter 409 non-linearly converts and offset-adjusts the level of the image signal with respect to each of the color components R, G, and B using a specified gamma characteristic, so that the image signals of the respective color components R, G, and B outputted from the 3×3 color corrector 408 attain appropriate output levels, respectively. Specifically, the gradation converter 409 corrects the gradation characteristic such as gamma curve and digital gain of the image signals after the white balance adjustment and the color correction to a gradation characteristic of the LCD section 106 or an externally connected television monitor or the like. The gradation converter 409 changes the gradation characteristic of the image signal based on the dynamic range information outputted from the main controller 50, and the AE evaluation values and the like detected by the evaluation value detector 405.

The noise canceller 410 removes a noise component in the image signal outputted from the gradation converter 409, and correctively acquires desired sharpness of the image by extracting/emphasizing an edge component. The noise canceller 410 performs adequate correction by changing a coring factor, which is a factor to be used in removing the noise component in the image signal, extracting and emphasizing the edge component based on the dynamic range information outputted from the main controller 50.

The image memory 411 includes a memory such as an ROM and an RAM, and temporarily stores image data after the signal processing in the signal processing section 40. The image memory 411 has a capacity capable of storing image data corresponding to one frame, for instance.

A memory card interface (I/F) 412 is an interface for recording image data that has been generated in the signal processing section 40 in a memory card 107 for output. The memory card 107 is a memory in which image data such as a still image and a moving image is to be recorded for storage. The memory card 107 is detachable from the digital camera 1 to allow exchange of image data with an external recording medium. An LCD display interface (I/F) 413 is an interface for converting the image data that has been generated in the signal processing section 40 for LCD display into an image signal in compliance with NTSC standards or PAL standards, for instance, for outputting to the LCD section 106.

The main controller 50 comprises a central processing unit (CPU) and is adapted to centrally control shooting operation of the digital camera 1. Specifically, the main controller 50 controls operations of the respective elements of the signal processing section 40 based on the information sent from the respective elements of the signal processing section 40 such as the AE evaluation values, the AF evaluation values, and the WB evaluation values, as well as on the operation mode of the digital camera 1, by calculating and outputting operation information such as parameters necessary for operating the respective elements of the signal processing section 40. Further, the main controller 50 controls the timing generating circuit 31 for shooting operation, controls the driving section 60 for zooming and focusing driving of the lens group 21, and for driving of the diaphragm 22 and the shutter 23, and controls image signal outputting operation.

Figure 4:
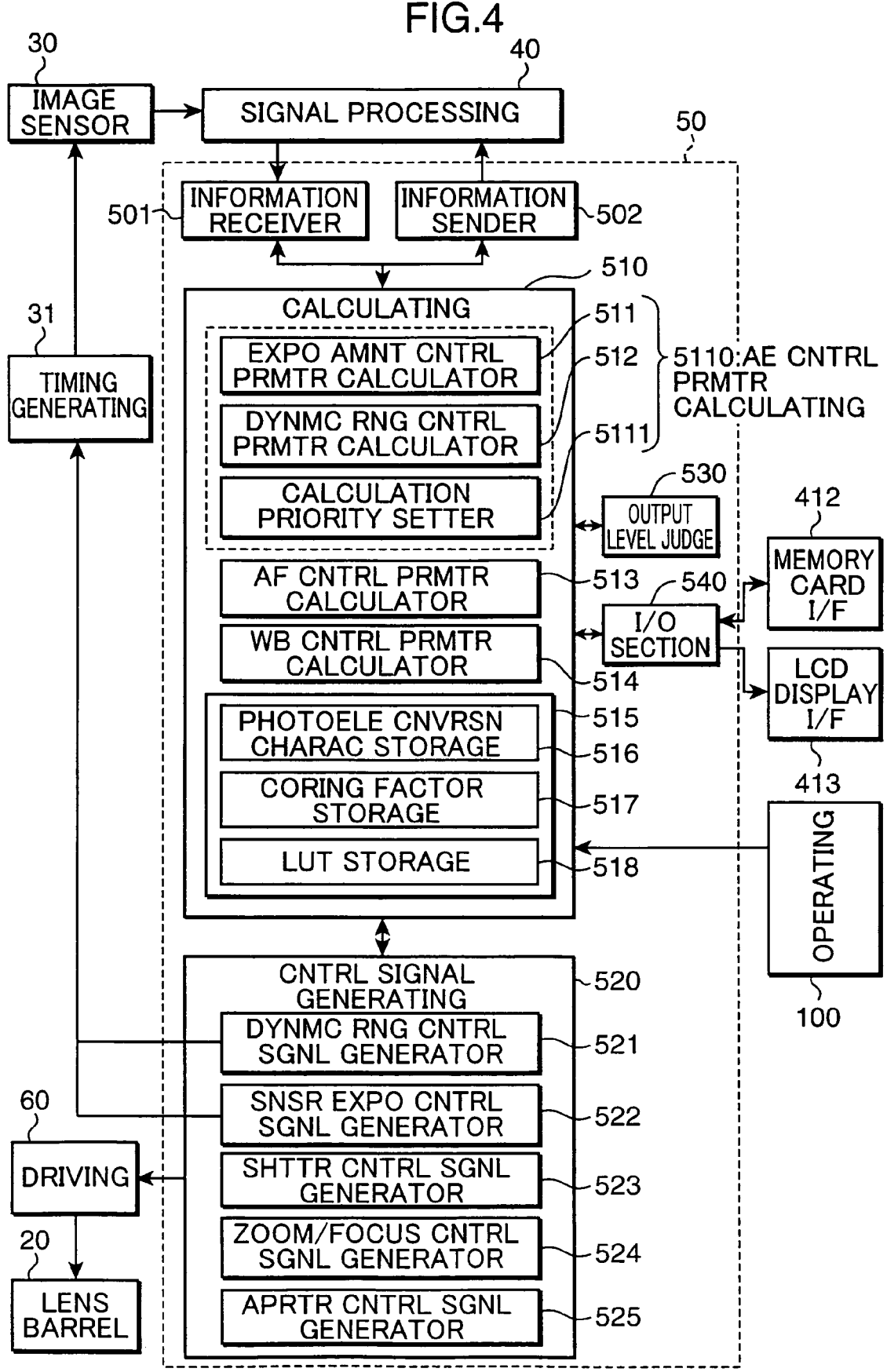
FIG. 4 is a functional block diagram for explaining functions of a main controller equipped in the digital camera.

FIG. 4 is a functional block diagram for explaining functions of the main controller 50. The main controller 50 includes an information receiver 501, an information sender 502, a calculating section 510 with a memory unit 515, a control signal generating section 520, an output level judging section 530, and an input/output section 540.

The information receiver 501 acquires the AE evaluation values, the AF evaluation values, and the WB evaluation values which are detected by the evaluation value detector 405 of the signal processing section 40, and distributes the respective evaluation values to corresponding parameter calculators provided in the calculating section 510. On the other hand, the information sender 502 reads out, from the memory unit 515, the information necessary for the signal processing section 40 such as the dynamic range information and the coring factor according to needs, and distributes the information to the respective elements in the signal processing section 40 according to needs.

The calculating section 510 calculates control parameters based on the evaluation values sent from the information receiver 501, and includes an AE control parameter calculating unit 5110 comprised of an exposure amount control parameter calculator 511, a dynamic range control parameter calculator 512, and a calculation priority setter 5111 as an example of a priority setter, an AF control parameter calculator 513, a white balance (WB) control parameter calculator 514, and the memory unit 515.

The memory unit 515 includes an ROM and an RAM, and is comprised of a photoelectric conversion characteristic storage 516 for storing information relating to the photoelectric conversion characteristic of the image sensor 30, namely, information for obtaining a desired photoelectric conversion characteristic in a photographing operation, specifically, an exposure time setting value, an aperture setting value, or a photoelectric conversion characteristic setting value, namely, dynamic range information corresponding to the photoelectric conversion characteristic, which will be described later, a coring factor storage 517 for storing a setting position of the coring factor to be used in the noise canceller 410, and an LUT storage 518 for storing information relating to conversion, namely, a lookup table (LUT) or the like, with which the data acquired from the linear characteristic area and the logarithmic characteristic area of the image sensor 30 are interchangeably converted.

Figure 10:
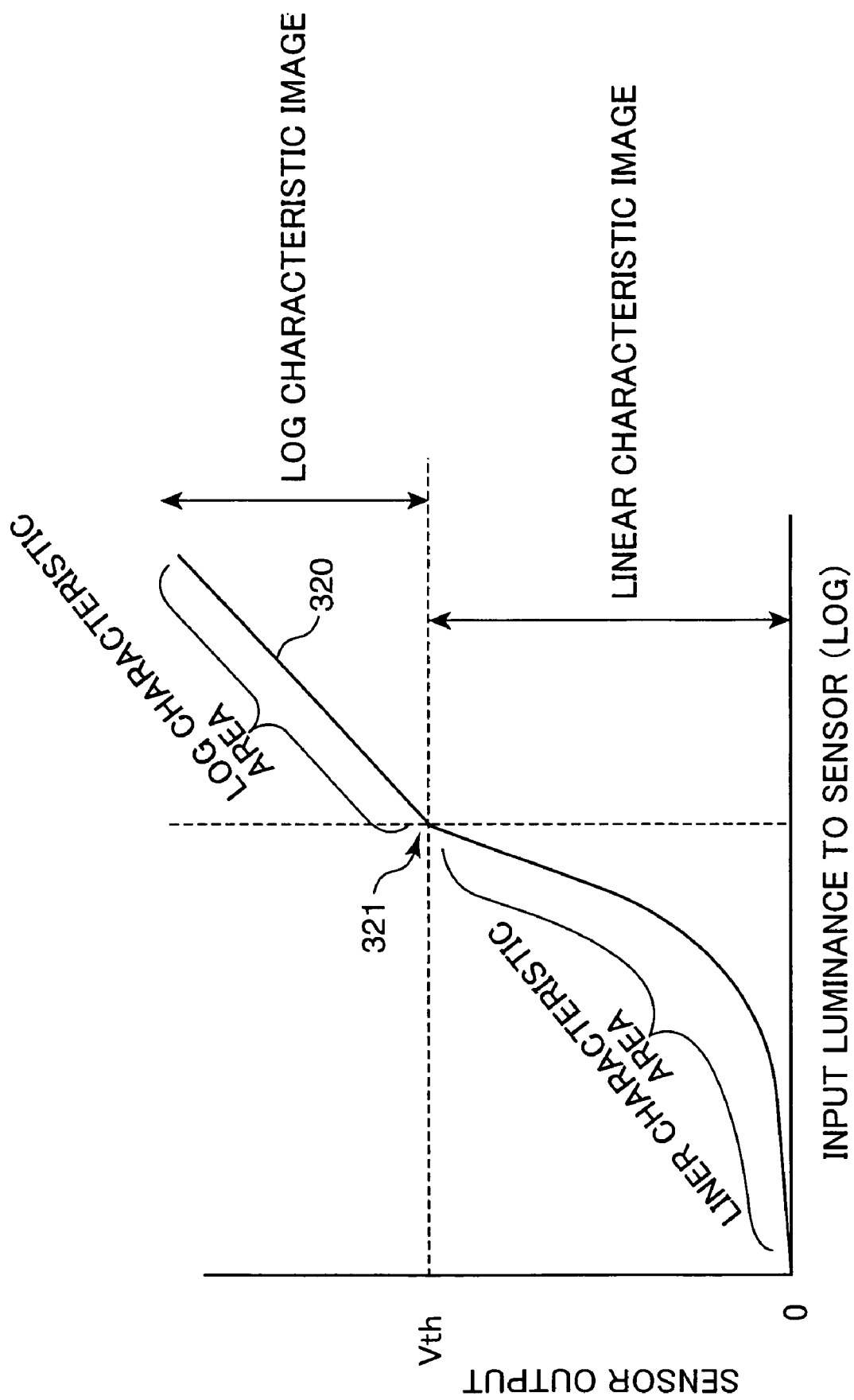
FIG. 10 is a graph showing a photoelectric conversion characteristic of the image sensor.

The photoelectric conversion characteristic information storage 516 may store a photoelectric conversion characteristic itself, namely, a photoelectric conversion characteristic curve as shown in FIG. 10, which will be described later. Further, the LUT storage 518 stores therein, other than the above lookup table, various lookup tables for data conversion such as a lookup table with which data is converted between an exposure time T1 and an aperture area S2 of the diaphragm, and the exposure time setting value and the aperture setting value, a lookup table with which data is converted between the inflection point of the photoelectric conversion characteristic, namely, the output level of the image sensor 30, and the photoelectric conversion characteristic setting value, a lookup table with which the photoelectric conversion characteristic setting value is outputted based on the output level corresponding to the maximum luminance, a lookup table with which a changed amount of the photoelectric conversion characteristic setting value is outputted based on a changed amount of the output level corresponding to the maximum luminance, and a lookup table with which data is converted between the number of saturated pixels, and a changed amount ΔVth of the inflection point. Further, as described above, the data stored in the photoelectric conversion information storage 516, the coring factor storage 517, and the LUT storage 518 are sent to an appropriate processor in the signal processing section 40 from the information sender 502 according to needs.

The AE control parameter calculating unit 5110 calculates a control parameter for setting an optimal exposure amount for shooting and the photoelectric conversion characteristic of the image sensor 30 to execute exposure control or AE control commensurate with a subject luminance. Specifically, the exposure amount control parameter calculator 511 of the AE control parameter calculating unit 5110 calculates a control parameter for optimizing the exposure time and the aperture value, and calculates the exposure time setting value and the aperture setting value commensurate with the subject luminance based on the AE evaluation values detected by the evaluation value detector 405, and the information relating to the photoelectric conversion characteristic of the image sensor 30, namely, the dynamic range information obtained at the time when the AE evaluation values stored in the photoelectric conversion characteristic information storage 516 were obtained.

The dynamic range control parameter calculator 512 calculates a control parameter for optimizing the photoelectric conversion characteristic of the image sensor 30 commensurate with the subject luminance. The dynamic range control parameter calculator 512 calculates the photoelectric conversion characteristic setting value which makes it possible for the subject luminance used in setting the dynamic range of the image sensor 30 to attain a desired saturation output level in the image sensor 30. In such a calculation, the information relating to the photoelectric conversion characteristic of the image sensor 30 acquired at the time when the AE evaluation values stored in the photoelectric conversion characteristic information storage 516 were obtained is referred to.

The calculation priority setter 5111 sets a priority concerning calculation of the control parameter between the exposure amount control parameter and the dynamic range control parameter in AE control. In other words, the calculation priority setter 5111 accepts setting of a priority concerning calculation of the control parameter between the exposure amount control parameter calculator 511 and the dynamic range control parameter calculator 512, and causes one of the calculators 511 and 512 to calculate the corresponding control parameter based on the setting. The priority used in the calculation priority setter 5111 is set in response to an input signal indicating entering of designation by the user with the mode setting switch 105 or the like on the operating section 100. The mode of prioritizing calculation of the exposure amount control parameter is called as "exposure amount control parameter calculation prioritizing mode", and the mode of prioritizing calculation of the dynamic range control parameter is called as "dynamic range control parameter calculation prioritizing mode". As will be described later in detail, in this embodiment, in performing AE control, the calculation priority setter 5111 of the AE control parameter calculating unit 5110 is operated to prioritize calculation of the exposure amount control parameter for exposure amount control or calculation of the dynamic range control parameter for dynamic range control.

The AF control parameter calculator 513 calculates a control parameter for setting the optimal focal length in shooting a subject image, based on the AF evaluation values detected by the evaluation value detector 405. In calculating the control parameter, it is preferable to acquire the AF evaluation values for reference from each of the logarithmic characteristic area and the linear characteristic area of the image sensor 30 and to calculate a control parameter for rough metering, namely, for the AF evaluation values acquired from the logarithmic characteristic area, and a control parameter for precise metering, namely, for the AF evaluation value acquired from the linear characteristic area, respectively, by utilizing the features of the respective characteristic areas.

The WB control parameter calculator 514 calculates a control parameter for setting the color balance of the image signal to a desired color balance based on the WB evaluation values detected by the evaluation value detector 405. In calculating the control parameter, it is preferable to acquire the WB evaluation values for reference from each of the logarithmic characteristic area and the linear characteristic area of the image sensor 30 and to calculate control parameters suitable for the respective characteristic areas.

The control signal generating section 520 generates control signals for driving the respective controllable elements based on the various control parameters calculated in the calculating section 510, and includes a dynamic range control signal generator 521, a sensor exposure time control signal generator 522, a shutter control signal generator 523, a zoom/focus control signal generator 524, and an aperture control signal generator 525.

The dynamic range control signal generator 521 generates a drive signal for the image sensor 30 for controlling the output level point or the inflection point at which the photoelectric conversion characteristic is switched from the linear characteristic area to the logarithmic characteristic area based on the photoelectric conversion characteristic setting value of the image sensor 30 which has been calculated in the dynamic range control parameter calculator 512, and sends the drive signal to the timing generating circuit 31. The timing generating circuit 31 generates a timing signal for controlling the dynamic range of the image sensor 30 m response to the inputted drive signal, and drives the image sensor 30. Specifically, as will be described later, the photoelectric conversion characteristic of the image sensor 30 has a feature that the inflection point is changed by controlling a signal φVPS to the image sensor 30, namely, the intensity of the voltage VPH or the duration of the time ΔT of the signal φVPS. In view of this, the dynamic range control signal generator 521 controls the dynamic range of the image sensor 30 in relation to the subject luminance by controlling the drive signal inputted to the timing generating circuit 31 for controlling the signal φVPS.

The sensor exposure time control signal generator 522 generates a control signal for controlling the exposure time, namely, the integration time of the image sensor 30 by controlling operations of the electronic circuitry, not by mechanical manipulation of the diaphragm 22, the shutter 23, or a like device. The sensor exposure time control signal generator 522 generates a drive signal for the image sensor 30, specifically, a signal for controlling a time ΔS, which makes it possible for the signal φVPS to the image sensor 30 to attain a middle potential M, to secure a predetermined exposure time, based on the optimal exposure amount calculated in the exposure amount control parameter calculator 511, and sends the drive signal to the timing generating circuit 31. The timing generating circuit 31 generates a timing signal for controlling the exposure time of the image sensor 30 in response to the inputted drive signal, and drives the image sensor 30.

Similarly, the shutter control signal generator 523 generates a drive signal for setting the shutter speed or the shutter opening time of the shutter 23 in accordance with the exposure time based on the optimal exposure amount calculated by the exposure amount control parameter calculator 511. The zoom/focus control signal generator 524 generates a control signal for driving the lens group 21 based on the optimal focal length calculated by the AF control parameter calculator 513. Further, the aperture control signal generator 525 generates a control signal for setting the aperture area of the diaphragm 22 based on the optimal exposure amount calculated by the exposure amount control parameter calculator 511. The control signals generated in the shutter control signal generator 523, the zoom/focus control signal generator 524, and the aperture control signal generator 525 are sent to the corresponding elements of the driving section 60, respectively.

The output level judging section 530 compares the output level of the image sensor 30 such as Vth2 and Vmax2, which will be described later, serving as a parameter in calculating the exposure amount control parameter and the dynamic range control parameter with a predetermined reference output level such as Vlimit and Vmax, which will be described later, for judging whether the former is larger or smaller than the latter. In other words, the output level judging section 530 restrains an excessive change of the photoelectric conversion characteristic in calculation of the exposure amount control parameter and the dynamic range control parameter, namely, regulates the photoelectric conversion characteristic, so that the photoelectric conversion characteristic may not be unduly changed to such an extent that securing a desired exposure amount or a dynamic range is difficult, by monitoring the output level.

The input/output section 540 is connected to the memory card I/F 412 and to the LCD display I/F 413, and executes input/output operations such as recording an image signal representing a captured image in the memory card 107, displaying the captured image on the LCD section 106, or reading out the image signal from the memory card 107 after implementing a predetermined image processing with respect to the captured image in response to a command signal or the like sent from the operating section 100.

Referring back to FIG. 2, the driving section 60 drives mechanical driving elements equipped in the digital camera 1, based on the control signals generated in the control signal generating section 520, and includes a shutter driver 61, a zoom/focus driver 62, and an aperture driver 63.

The shutter driver 61 drivingly opens and closes the shutter 23 to open the shutter 23 for a predetermined time in response to a control signal sent from the shutter control signal generator 523. The zoom/focus driver 62 drives a motor for operating the zoom lens block or a focus lens block of the lens group 21 in response to the control signal sent from the zoom/focus control signal generator 524 to move the lens block to a focal point. The aperture driver 63 drives the diaphragm 22 in response to a control signal sent from the aperture control signal generator 525 to set the aperture amount of the diaphragm 22 to a predetermined value.

(Description on Overall Flow of Operation)

Figure 5:
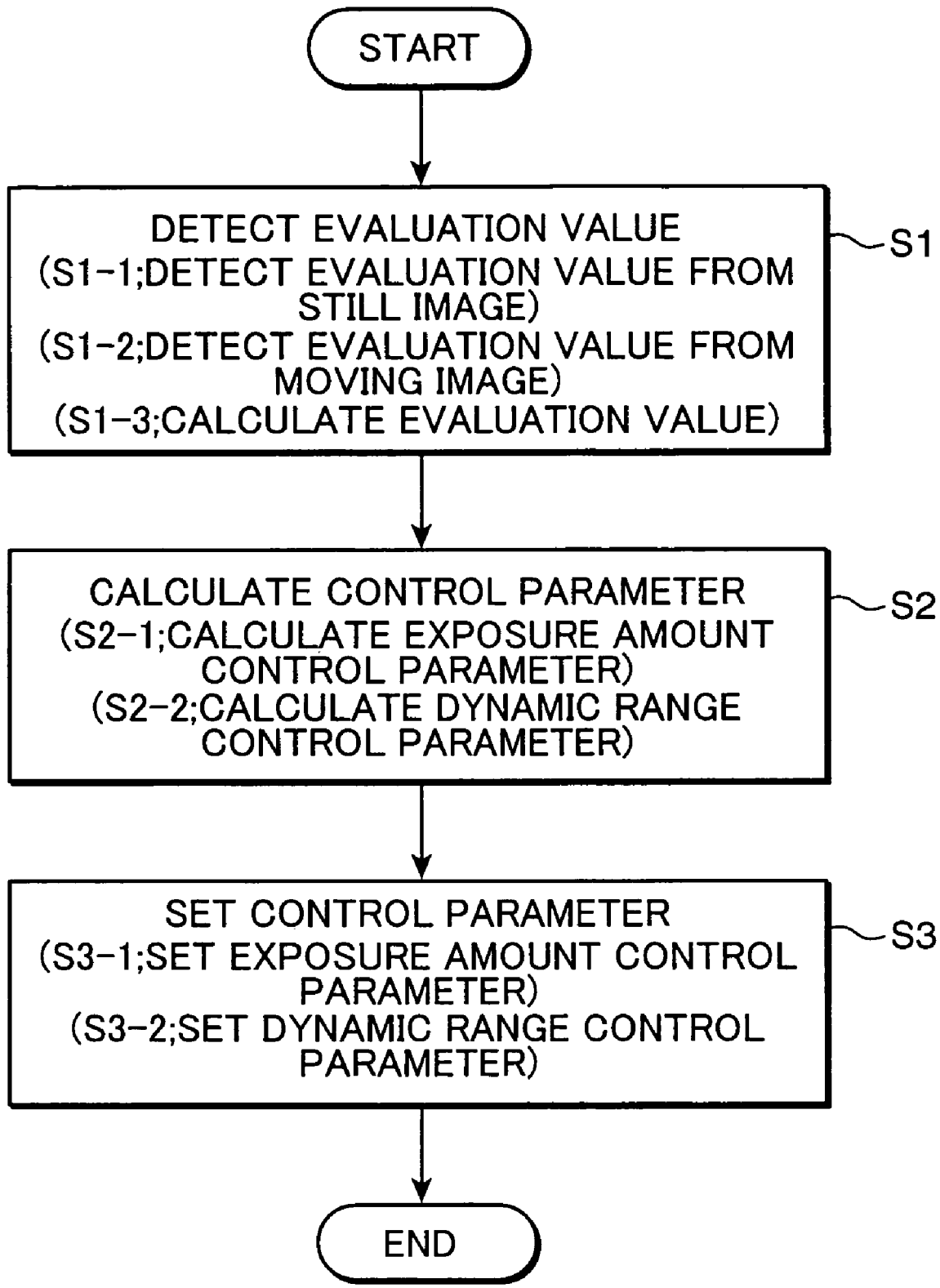
FIG. 5 is a flowchart showing an example of an overall operation of the digital camera.

An overall flow is described on the operation of the digital camera 1 having the above construction. FIG. 5 is a flowchart showing an example of the overall operation of the digital camera 1. As shown in FIG. 5, the operation of the digital camera 1 roughly comprises an evaluation value detecting step (step S1) of detecting evaluation values such as AE evaluation values, AF evaluation values, and WB evaluation values, a control parameter calculating step (step S2) of calculating various control parameters based on the evaluation values, and a control parameter setting step (step S3) of setting the control parameters for driving the respective elements of the digital camera 1, so that the digital camera 1 is brought to a photographable state corresponding to the control parameters.

In steps S1 through S3, the following processings are implemented.

First, in the evaluation value detecting step S1, information relating to evaluation values based on which various controls are implemented is acquired, and evaluation values are calculated based on the evaluation value information. In case of AE control, the luminance level of the subject whose image is to be captured is measured or detected, and AE evaluation values are calculated based on the measured luminance level. The luminance level and the luminance range are detected as follows since it is rational to detect the luminance level and the luminance range based on the subject image that has been actually captured by the image sensor 30, and the image sensor 30 can shoot both still images and moving images. In view of this, there are proposed two sub-steps S1-1 and S1-2 as a step of acquiring luminance information:

(Step S1-1) Detection Based on Still Image:

A still image captured by the image sensor 30 before actual shooting is used as the image for detecting the evaluation values to measure the luminance level and the luminance range; and (Step S1-2) Detection Based on Moving Image:

A moving image captured by the image sensor 30 before actual shooting is used as the image for detecting the evaluation values to measure the luminance level and the luminance range. Thereafter, the following sub-step S1-3 is carried out.

(Step S1-3) Calculation of Evaluation Value:

Various evaluation values including AE evaluation values are calculated by the evaluation value detector 405 based on the acquired luminance information.

Next, in step S2, various parameters are calculated based on the evaluation values. Since the exposure amount or the dynamic range is a parameter for AE control, these control parameters are calculated based on the AE evaluation values. Specifically, as the step S2, there are proposed two sub-steps S2-1 and S2-2 of calculating parameters:

(Step S2-1) Calculation of Exposure Amount Control Parameter:

An exposure amount control parameter is calculated by the main controller 50 based on the AE evaluation values; and (Step S2-2) Calculation of Dynamic Range Control Parameter:

A dynamic range control parameter is calculated by the main controller 50 based on the AE evaluation values.

Lastly, in step S3, the control parameters for driving the respective elements of the digital camera 1 are set. In case of AE control, the control parameter setting is conducted based on sub-step S2-1 or S2-2. Accordingly, the following two sub-steps S3-1 and S3-2 of setting parameters are combinedly or independently carried out:

(Step S3-1) Setting of Exposure Amount Control Parameter:

The parameters for the memory unit 515, the control signal generating section 520 and the like are set based on the calculated exposure amount control parameter to operate the timing generating circuit 31 and the driving section 60; and (Step S3-2) Setting of Dynamic Range Control Parameter:

The parameters for the memory unit 515, the control signal generating section 520 and the like are set based on the calculated dynamic range control parameter to operate the timing generating circuit 31.

(Basic Characteristics of Image Sensor to be Used in Embodiment)

In the following the steps are described one by one in detail. Firstly, an example of basic characteristics of the image sensor 30 to be used in the embodiment is described in detail, in light of a fact that the embodiment is described based on the premise that the image sensor 30 has a linear characteristic area where the electrical signal is linearly converted according to the amount of incident light, and a logarithmic characteristic area where the electrical signal is logarithmically converted according to the amount of incident light.

Figure 7:
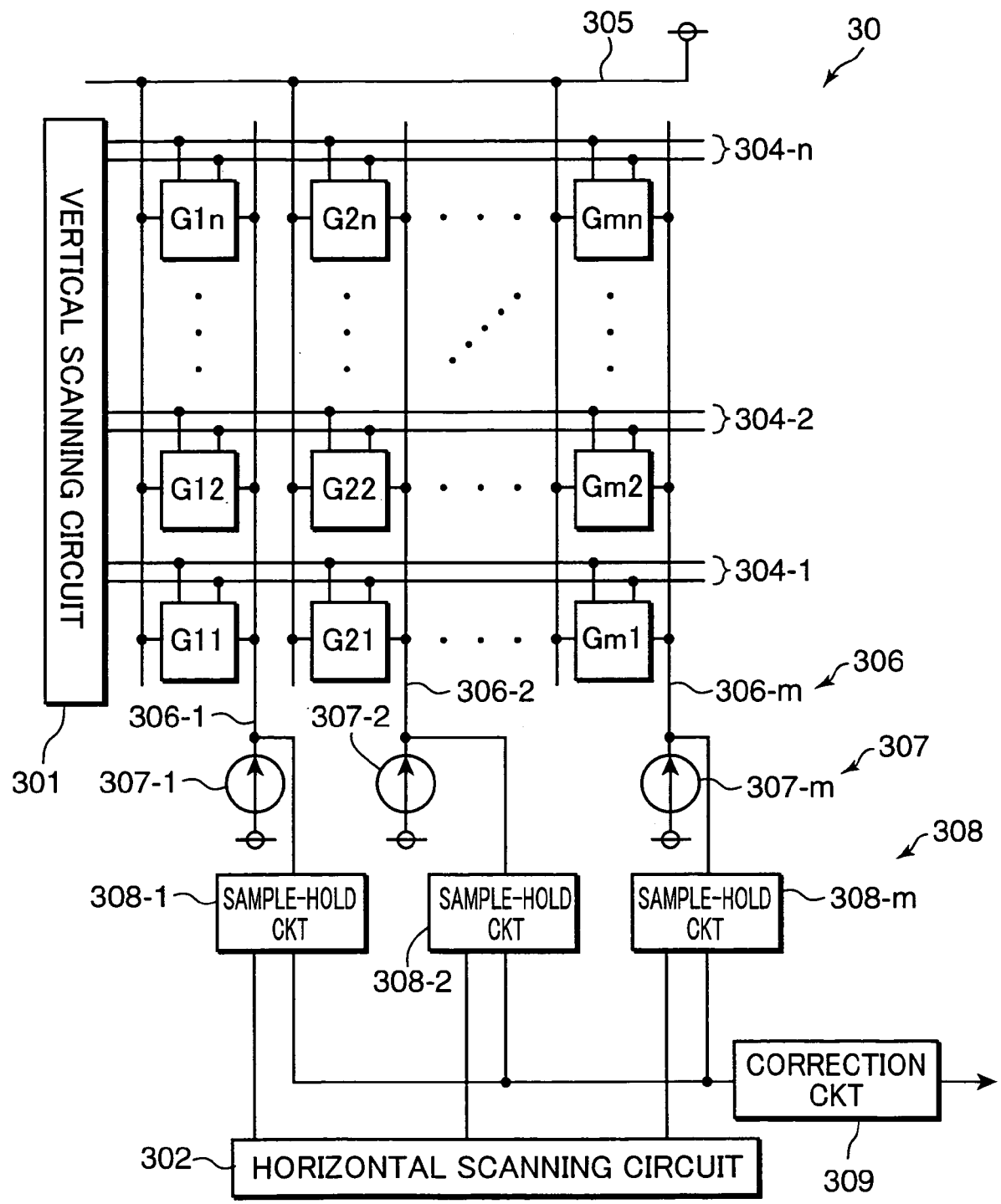
FIG. 7 is a schematic illustration of a two-dimensional MOS solid-state image sensing device, as an example of the image sensor in the digital camera.

FIG. 7 is an illustration schematically showing a two-dimensional MOS type solid-state image sensing device, as an example of the image sensor 30. In FIG. 7, elements G11 through Gmn are pixels arrayed in a matrix. A vertical scanning circuit 301 and a horizontal scanning circuit 302 are arranged in proximity to an outer perimeter of the pixel region comprised of the pixels G11 through Gmn. The vertical scanning circuit 301 successively scans signal lines 304-1, 304-2, ..., and 304-n arrayed in row direction. Hereinafter, the group of the signal lines 304-1, 304-2, ..., and 304-n is called as "row-direction signal line unit 304". The horizontal scanning circuit 302 successively reads out photoelectric conversion signals which have been outputted from the respective pixels to output signal lines 306-1, 306-2, ..., and 306-m pixel by pixel in horizontal direction. Hereinafter, the group of the output signal lines 306-1, 306-2, ..., and 306-m is called as "output signal line unit 306". A power is supplied to the respective pixels by a power source line 305. Although other lines such as a clock line are connected to the respective pixels, in addition to the row-direction signal line unit 304, the power source line 305, and the output signal line unit 306, illustration of these other lines is omitted in FIG. 7.

Constant current sources 307-1, 307-2, ..., and 307-m (hereinafter, called as "constant current source unit 307" as a group) are arranged in correspondence to the output signal lines 306-1, 306-2, ..., and 306-m, respectively. Each of the constant current sources 307-1, 307-2, ..., and 307-m, and a transistor T5, which will be described later, constitute an amplifying circuit. A resistor or a transistor such as a MOS transistor may constitute an amplifying circuit, in place of the constant current source. Image data outputted from the respective pixels in an image sensing operation by way of the output signal line unit 306, and correction data to be outputted in resetting are successively outputted to sample hold circuits 308-1, 308-2, ..., and 308-m (hereinafter, called as "selection circuit 308" as a group). The image data and the correction data are outputted row by row to the selection circuit 308 for sample-holding. The sample-held image data and the correction data are outputted to a correction circuit 309 column by column. The correction circuit 309 corrects the image data based on the correction data, so that a noise component arising from sensitivity variation is removed. After sensitivity variation of the respective pixels has been corrected, the correction circuit 309 serially outputs the image data pixel by pixel.

Figure 8:
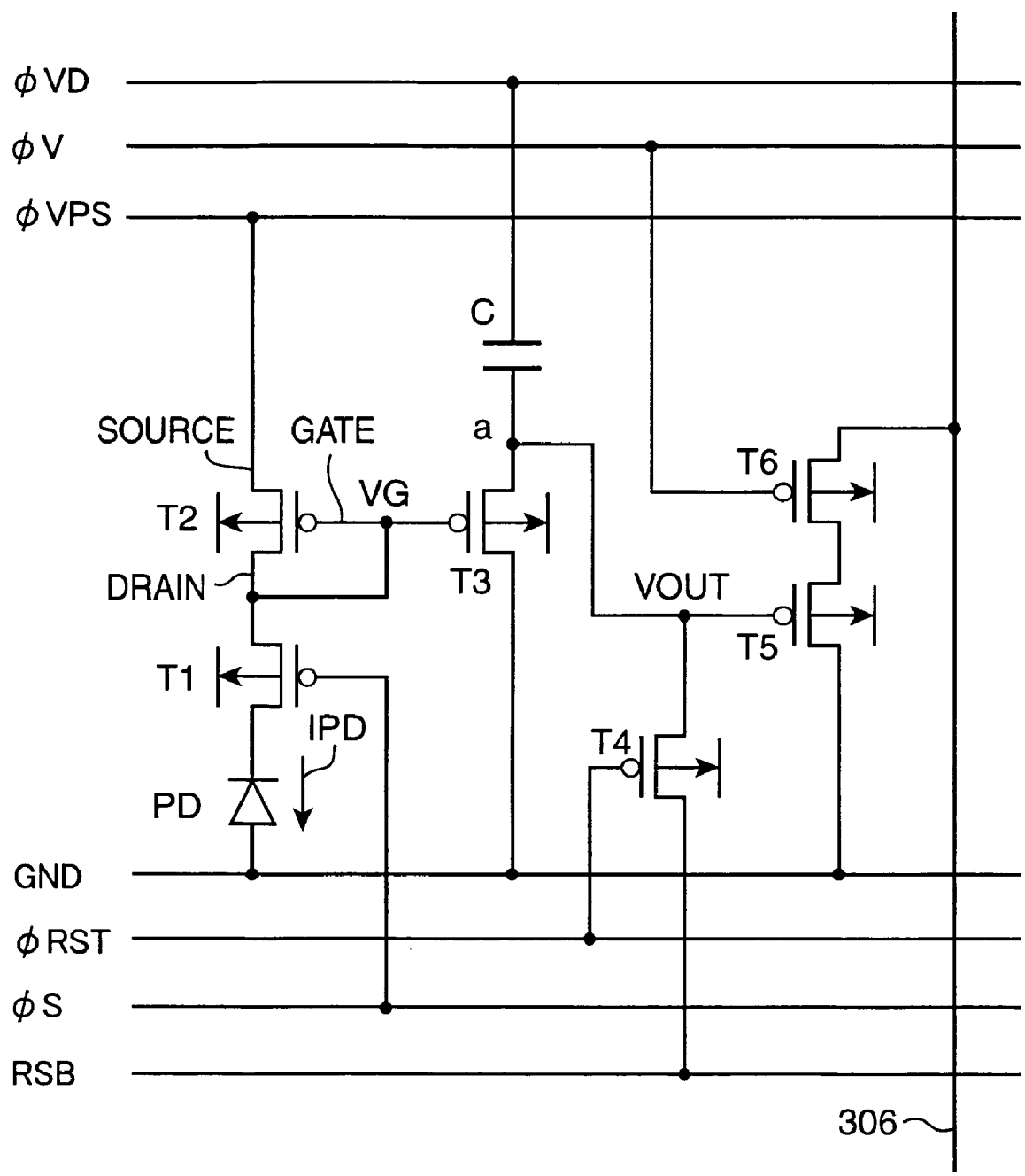
FIG. 8 is a circuitry diagram showing an exemplified arrangement of each pixel constituting the image sensor shown in FIG. 7.

FIG. 8 is an illustration showing an example of a circuit configuration of each of the pixels G11 through Gmn. As shown in FIG. 8, each pixel is comprised of a photodiode PD, transistors T1 through T6, each of which is a metal oxide semiconductor field effect transistor (MOSFET), and a capacitor C for integration. A p-channel MOSFET is adopted as the transistors T1 through T6. The symbols φVD, φV, φVPS, φRST, φS, and RSB represent signals or voltages to the respective transistors T1 through T6 and to the capacitor C, and GND represents the ground.

The photodiode PD is a light sensing section or a photoelectric conversion section, and outputs an electrical signal, namely, a photocurrent IPD commensurate with the amount of incident light from a subject. The transistor T5 and each of the constant current sources shown in FIG. 7 constitute an amplifying circuit, which is a source follower circuit or a source follower amplifier to amplify a voltage VOUT, which will be described later, namely, to conduct current amplification. The transistor T6 is a transistor for reading out a signal and serves as a switch which is turned on and off in response to a voltage applied to a gate thereof. Specifically, a source of the transistor T6 is connected to the output signal line unit 306 shown in FIG. 7, and the electric current which has been amplified by the transistor T5 is drawn to the output signal line unit 306, as an output current, when the transistor T6 is turned on.

The transistor T2 generates at a gate thereof a voltage obtained by linear conversion or log conversion of the photocurrent IPD. The MOSFET is designed in such a manner that a minute current called a subthreshold current flows when the gate voltage is not larger than a threshold value. The transistor T2 conducts the linear conversion or the log conversion by utilizing the subthreshold characteristic.

Specifically, if the subject luminance is low, or the subject is dark, namely, if the amount of light to be incident onto the photodiode PD is small the gate potential of the transistor T2 is higher than the source potential thereof. Accordingly, the transistor T2 is in a so-called "cutoff state", and a subthreshold current does not flow in the transistor T2, namely, the transistor T2 is not operated in the subthreshold region. As a result, the photocurrent generated in the photodiode PD flows to the parasitic capacitance of the photodiode PD to thereby accumulate electric charge therein, and a voltage corresponding to the accumulated electric charge is generated. At this time, since the transistor T1 is kept in an ON state, a voltage corresponding to the electric charge accumulated in the parasitic capacitance of the photodiode PD is generated at the gates of the transistors T2 and T3 as a voltage VG. Because of generation of the voltage VG, an electric current flows in the transistor T3, and electric charge proportional to the voltage VG is accumulated in the capacitor C. The transistor T3 and the capacitor C constitute an integration circuit. As a result, a voltage which is linearly proportional to the integration value of the photocurrent IPD is obtained at the connection node a of the transistor T3 and the capacitor C, namely at the output VOUT. At this time, the transistor T4 is in an OFF state. In response to turning on of the transistor T6, the electric charge accumulated in the capacitor C is drawn to the output signal line unit 306 as an output current via the transistor T5. The output current is a value obtained by linear conversion of the integration value of the photocurrent IPD. This is how the image sensor 30 is operated in the linear characteristic area.

On the other hand, if the subject luminance is high or the subject is bright, namely, if the amount of light to be incident onto the photodiode PD is large, the gate potential of the transistor T2 is not larger than the source potential thereof, and a subthreshold current flows in the transistor T2, namely, the transistor T2 is operated in the subthreshold region. As a result, a voltage VG obtained by natural-logarithmic conversion of the photocurrent IPD is generated at the gates of the transistors T2 and T3. Because of generation of the voltage VG, an electric current flows in the transistor T3, and electric charge equivalent to the value obtained by natural-logarithmic conversion of the integration value of the photocurrent IPD is accumulated in the capacitor C. As a result, a voltage which is proportional to the value obtained by natural-logarithmic conversion of the integration value of the photocurrent IPD is generated at the connection node a or at the output VOUT of the capacitor C and the transistor T3. At this time, the transistor T4 is in an OFF state. Then, in response to turning on of the transistor T6, the electric charge accumulated in the capacitor C is drawn to the output signal line unit 306 as an output current via the transistor T5. The output current is the value obtained by natural-logarithmic conversion of the integration value of the photocurrent IPD. This is how the image sensor 30 is operated in the logarithmic characteristic area. As mentioned above, a voltage linearly or natural-logarithmically proportional to the amount of incident light, namely, the subject luminance is outputted with respect to each of the pixels.

The transistor T1 is a switch to be used in extracting noise data or a noise signal arising from a variation in production of transistors T2 at the time of resetting. The transistor T1 is kept in an ON state except for a reset time, and is designed to flow the photocurrent IPD between the drain of the transistor T2 and the photodiode PD. At the time of resetting, the transistor T2 is brought to an OFF state to shut off flow of the photocurrent IPD through the photodiode PD. Thereby, merely the noise data resulting from the production variation is extracted. The extracted variation component or a noise signal is subtracted from a video signal, which will be described later.

The transistor T4 is a transistor for resetting the capacitor C, and serves as a switch which is turned on and off in response to a voltage applied to the gate of the transistor T4. In response to turning on of the transistor T4, a reset voltage or a voltage of the signal RSB is applied to the transistor T4 to thereby return the capacitor C to an initial state before accumulation of electric charge, namely, to a state before start of integration.

Figure 9:
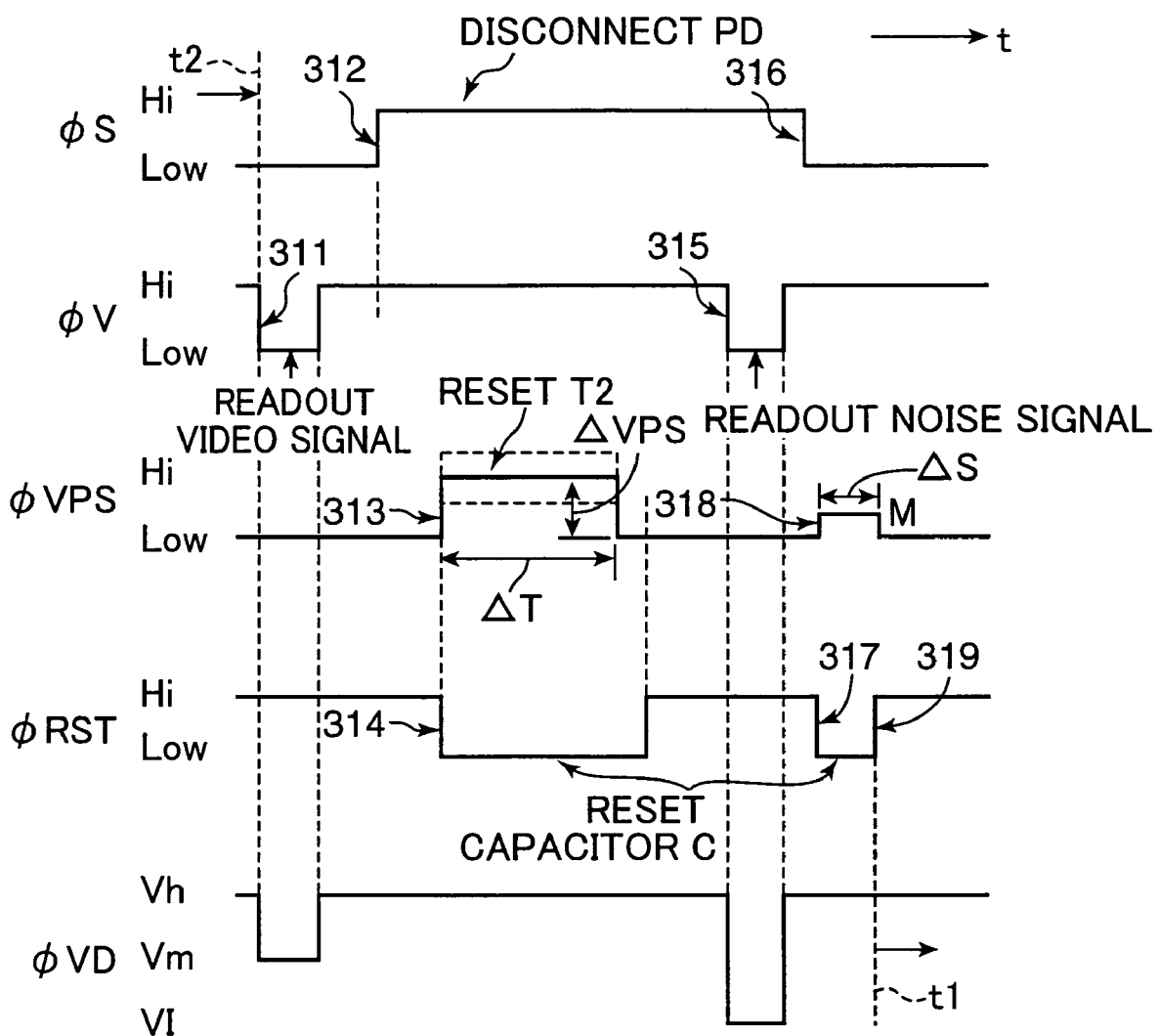
FIG. 9 is an exemplified timing chart concerning a sensing operation of the image sensor.

FIG. 9 is an in illustration showing a timing chart on an image sensing operation of the image sensor 30, namely, a pixel. In this embodiment, in light of polarities of the p-channel MOSFET, the transistor is turned off when the respective signals are set high (Hi), and turned on when the respective signals are set low (Low). First, when the signal φV is set Low at the timing indicated by the arrow 311, the transistor T6 is turned on to read out a video signal. Specifically, the electric charge accumulated in the capacitor C is drawn to the output signal line unit 306 as an output current or a video signal. Then, when the signal φS is set Hi at the timing indicated by the arrow 312, the transistor T1 is turned off to disconnect the photodiode PD. Subsequently, when the signal φVPS is set Hi at the timing indicated by the arrow 313, the transistor T2 is reset. Further, concurrently with the resetting of the transistor T2, the signal φRST is set Low at the timing indicated by the arrow 314, and the transistor T4 is turned on. Thereby, a reset voltage is applied to the capacitor C at the connection node a by the signal RSB, namely, the potential at the connection node a becomes the potential VRSB of the signal RSB to thereby reset charge accumulation of the capacitor C. Thus, after resetting of the transistor T2 and the capacitor C, when the signal φV is set Low at the timing indicated by the arrow 315, the transistor T6 is turned on to thereby draw the noise signal to the output signal line unit 306.

Next, when the signal φS is set Low at the timing indicated by the arrow 316, the transistor T1 is turned on to thereby release disconnection of the photodiode PD. Then, when the signal φVPS is set to the middle potential M at the timing indicated by the arrow 318, the parasitic capacitance of the photodiode PD is reset for reducing signal residue. Then, when the signal φRST is set Low at the timing indicated by the arrow 317 to make a voltage for integration start in a next frame constant, the transistor T4 is turned on to reset charge accumulation of the capacitor C.

Thereafter, when the signal φVPS is set Low at the timing indicated by the arrow 319, resetting of the parasitic capacitance of the photodiode PD is terminated. Concurrently, the signal φRST is changed from Low to Hi to terminate the resetting operation of the capacitor C. The integration time of the capacitor C is started at the timing t1, and continued for a duration up to the timing of the signal φV indicated by the arrow 311 when the signal φV is changed from Hi to Low, namely, up to the timing t2 when readout of a video signal in the next frame is started. The time duration from the timing t1 to the timing t2 corresponds to an integration time of the capacitor C, namely, an exposure time for an image sensing. The exposure time is controlled by controlling the time ΔS which makes it possible for the signal φVPS to attain the middle potential M. The time duration ΔS is controlled by the sensor exposure time control signal generator 522 by way of the timing generating circuit 31.

The signal φVD is used to control the potential in such a manner that the potential lies in an operation range of the amplifying circuit, namely, the source follower amplifier, or to perform offset adjustment with respect to a video signal or a noise signal. Vh, Vm, and Vl of the signal φVD respectively represent high potential, middle potential, and low potential of the signal φVD.

As mentioned above, the image sensor 30 is capable of acquiring an output signal obtained by linear conversion or log conversion according to the subject luminance, and has a photoelectric conversion characteristic 320 as shown in FIG. 10. As shown in FIG. 10, the photoelectric conversion characteristic 320 is divided into a linear characteristic area and a logarithmic characteristic area, with an inflection point 321 serving as a boundary. The inflection point 321 is a switching point from the linear characteristic area to the logarithmic characteristic area, and the output value of the image sensor 30 at the inflection point 321 is represented by Vth. Generally, in the linear characteristic area, high gradation performance can be secured with respect to the entirety of an image, namely, high contrast is obtained, although sensing of a subject in a wide luminance range is impossible, namely, the dynamic range is narrow. Accordingly, an image with high gradation performance and high quality can be obtained even from a dark subject, e.g., in a condition that a subject is captured in a cloudy weather or in a shadow. On the other hand, in the logarithmic characteristic area, sensing of a subject image in a wide luminance range is possible, namely, the dynamic range is wide, although the gradation is poor at a high luminance. Accordingly, a high-quality image with a large depth of field including a dark area can be obtained even if a subject is bright, e.g., in a condition that a subject is illuminated with direct sunlight, or direct sunlight is right behind the subject.

Figure 11:
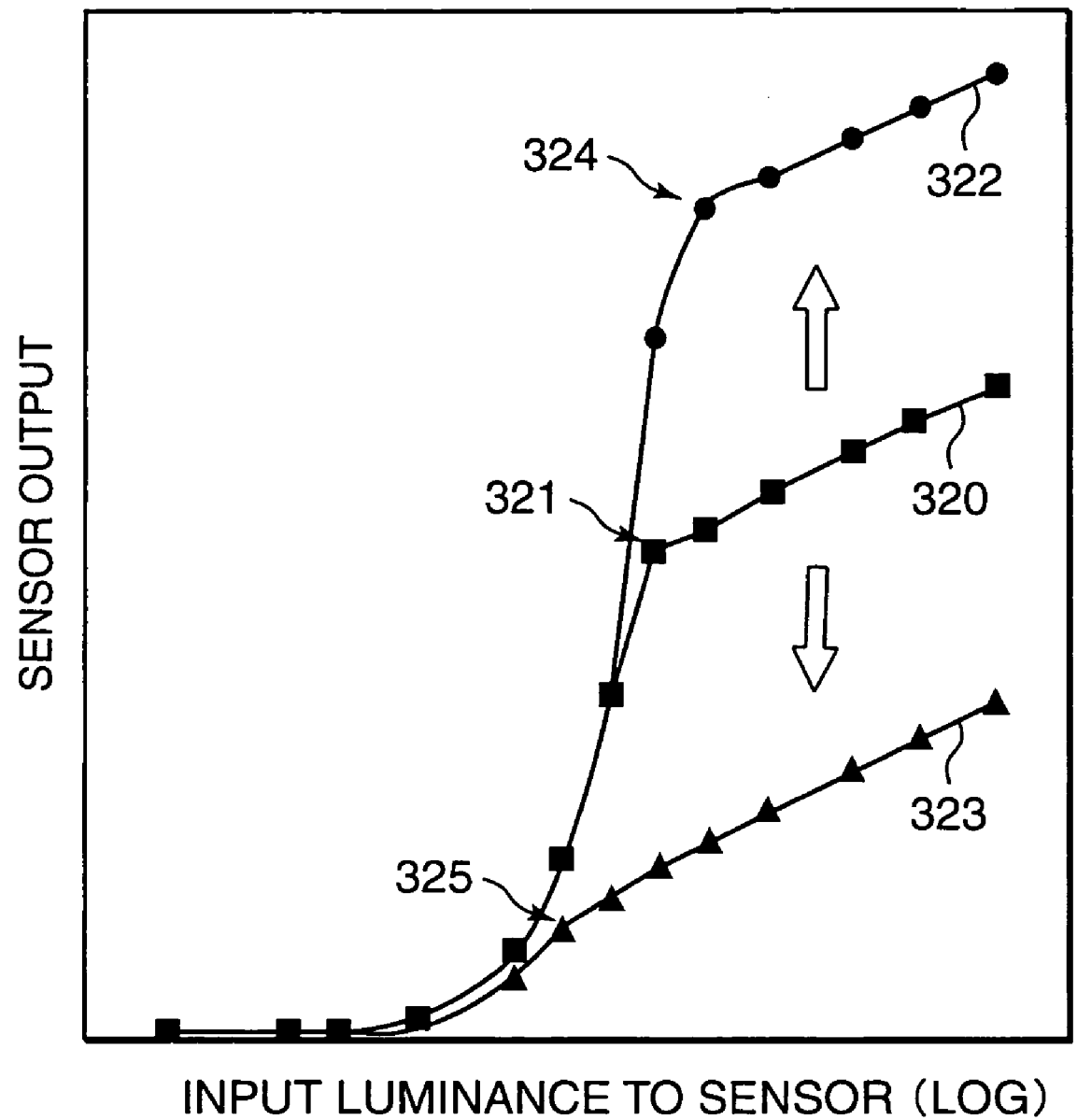
FIG. 11 is a graph for explaining how the photoelectric conversion characteristic of the image sensor is changed.

The photoelectric conversion characteristic 320, namely, the inflection point 321 can be changed or moved by changing a voltage difference of the signal φVPS inputted to the source of the transistor T2 between Hi and Low. Specifically, assuming that the Hi voltage of the signal φVPS is VPH, and the Low voltage thereof is VPL, then, as shown in FIG. 11, the photoelectric conversion characteristic 320, namely, the inflection point 321 can be desirably shifted to a photoelectric conversion characteristic 322, namely, to an inflection point 324 or to a photoelectric conversion characteristic 323, namely, to an inflection point 325 by changing the voltage difference ΔVPS (=VPH−VPL) (see FIG. 9). Thus, by changing the photoelectric conversion characteristic, the ratio of the linear characteristic area to the logarithmic characteristic area can be changed, whereby the photoelectric conversion characteristic having a relatively large ratio of the linear characteristic area, as exemplified by the photoelectric conversion characteristic 322, or the photoelectric conversion characteristic having a relatively large ratio of the logarithmic characteristic area, as exemplified by the photoelectric conversion characteristic 323 can be obtained. The photoelectric conversion characteristic may be changed in such a manner that the linear characteristic area or the logarithmic characteristic area occupies the entirety of the photoelectric conversion characteristic.

In this embodiment, the photoelectric conversion characteristic of the image sensor 30 is changed by changing the voltage difference ΔVPS, namely, by changing the voltage VPH. In FIG. 11, as the voltage VPH is increased, namely, the voltage difference ΔVPS is increased, the ratio of the linear characteristic area is increased, and consequently, the photoelectric conversion characteristic of the image sensor 30 approaches the photoelectric conversion characteristic 322. On the other hand, as the voltage VPH is decreased, namely, the voltage difference ΔVPS is decreased, the ratio of the logarithmic characteristic area is increased, and consequently, the photoelectric conversion characteristic of the image sensor 30 approaches the photoelectric conversion characteristic 323. The voltage VPH is controlled by the dynamic range control signal generator 521 by way of the timing generating circuit 31.

Alternatively, the time ΔT during which the signal φVPS corresponding to the voltage VPH is applied may be changed to change the photoelectric conversion characteristic as mentioned above. In such an altered arrangement, as the time ΔT is increased, the photoelectric conversion characteristic is changed in such a manner that the ratio of the linear characteristic area is increased, and conversely, as the time ΔT is decreased, the photoelectric conversion characteristic is changed in such a manner that the ratio of the logarithmic characteristic area is increased. In FIG. 11, the state that the time ΔT is relatively long corresponds to the photoelectric conversion characteristic 322, and the state that the time ΔT is relatively short corresponds to the photoelectric conversion characteristic 323.

(Evaluation Value Detecting Step S1)

Next, an exemplified process for acquiring evaluation values such as AE evaluation values by the evaluation value detector 405 of the signal processing section 40 is described.

Figure 12:
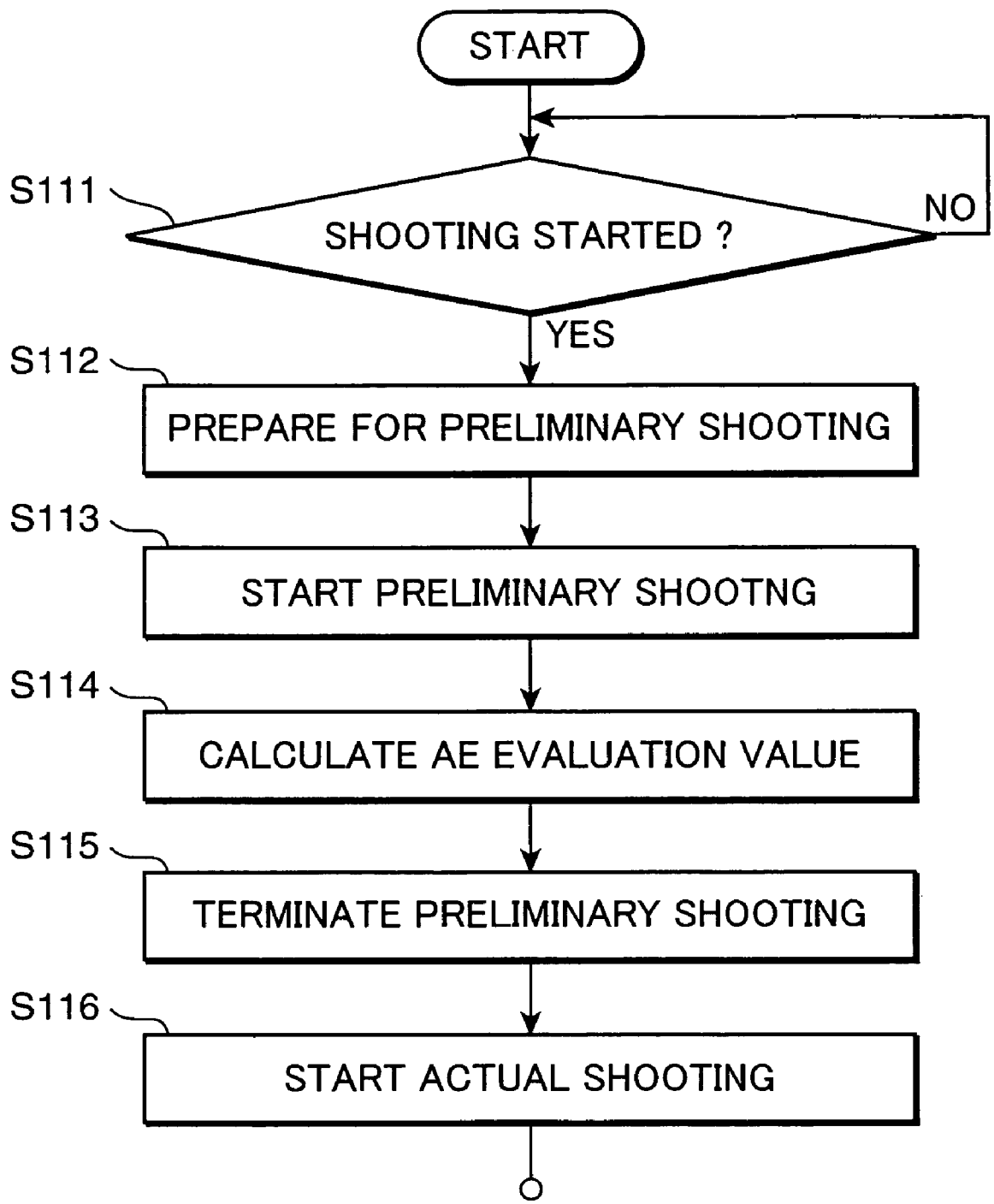
FIG. 12 is a flowchart showing an operation example of detecting evaluation values concerning a subject image such as AE evaluation values based on a still image actually captured by the image sensor.

(Step S1-1) Example of Detecting Evaluation Value Based on Still Image:

FIG. 12 is a flowchart illustrating an operation example of the digital camera 1 in the case where evaluation values such as AE evaluation values of a subject are detected based on a still image actually captured by the image sensor 30. Specifically, FIG. 12 shows a flow of preliminary shooting of capturing a still image for acquiring AE evaluation values, and calculating the AE evaluation values based on the image captured by the preliminary shooting before actual shooting of capturing a still image by the digital camera 1 according to the embodiment of the invention. The evaluation value detecting process is a process suitable for an image sensing apparatus such as a digital single lens reflex camera constructed such that a subject light image is incident onto an optical viewfinder without incident onto the image sensor 30 in preliminary shooting.

Referring to FIG. 12, first, it is confirmed whether shooting start has been designated in a state that the power supply switch 101 of the digital camera 1 is pressed, and the power of the digital camera 1 is turned on (Step S111). In response to manipulation of the release switch 102 e.g., halfway down pressing (YES in Step S111), an operation of preliminary shooting is initiated (Step S112).

In Step S112, dynamic range control for the preliminary shooting is conducted in conducting the preliminary shooting to calculate the AE evaluation values. The dynamic range control is conducted, so that the image sensor 30 has a possible maximum dynamic range to sense the subject luminance in a wide range. Specifically, since the preliminary shooting is conducted only one time before actual shooting in the digital single lens reflex camera or a like apparatus, the digital camera 1 is constructed in such a manner that a wide dynamic range is set to securely detect the subject luminance in whatsoever condition the subject may be.

In view of the above, the operation state of the image sensor 30 is controlled, so that the image sensor 30 implements a log conversion output operation in the entirety of the photoelectric conversion characteristic. Specifically, in response to halfway down pressing of the release switch 102, the main controller 50 outputs commands to the relevant elements to shift the digital camera 1 to the preliminary shooting mode. Upon receiving the command signal from the main controller 50, for example, the dynamic range control signal generator 521 generates a signal for varying the voltage difference ΔVPS of the signal φVPS inputted to the source of the transistor T2 as shown in FIG. 8. In this case, the signal is adapted for reducing the voltage difference ΔVPS (see FIG. 9). Thereby, the image sensor 30 is controlled in such a manner that the ratio of the logarithmic characteristic area is increased. Preferably, a logarithmic characteristic area occupies the entirety of the photoelectric conversion characteristic in the aspect of securing a wide dynamic range. However, it is possible to leave a linear characteristic area in the photoelectric conversion characteristic in place of allowing a logarithmic characteristic area to occupy the entirety of the photoelectric conversion characteristic.

Next, exposure control for preliminary shooting is conducted to execute the preliminary shooting (Step S113). For instance, the sensor exposure time control signal generator 522 generates a drive signal for setting the duration of the time ΔS, which makes it possible for the signal φVPS to attain a middle potential M, to a predetermined exposure time, and sends the drive signal to the timing generating circuit 31 to conduct exposure control or exposure amount control for preliminary shooting. Exposure control may be performed by causing the shutter driver 61 to control the shutter speed of the shutter 23 based on a control signal generated in the shutter control signal generator 523, and by causing the aperture driver 63 to control the diaphragm 22 based on a control signal generated in the aperture control signal generator 525. After the exposure control, the preliminary shooting of a still image is conducted. Then, the evaluation value detector 405 calculates AE evaluation values based on the image captured by the preliminary shooting (Step S114). The AE evaluation value calculating step will be described later in detail After the calculation of the AE evaluation values, the preliminary shooting is terminated (Step S115). After the exposure control based on the AE evaluation values, actual shooting is started (Step S116). The above is what is to be implemented in acquiring the AE evaluation values. Similar steps are implemented to acquire the AF evaluation values and the WB evaluation values.

Figure 13:
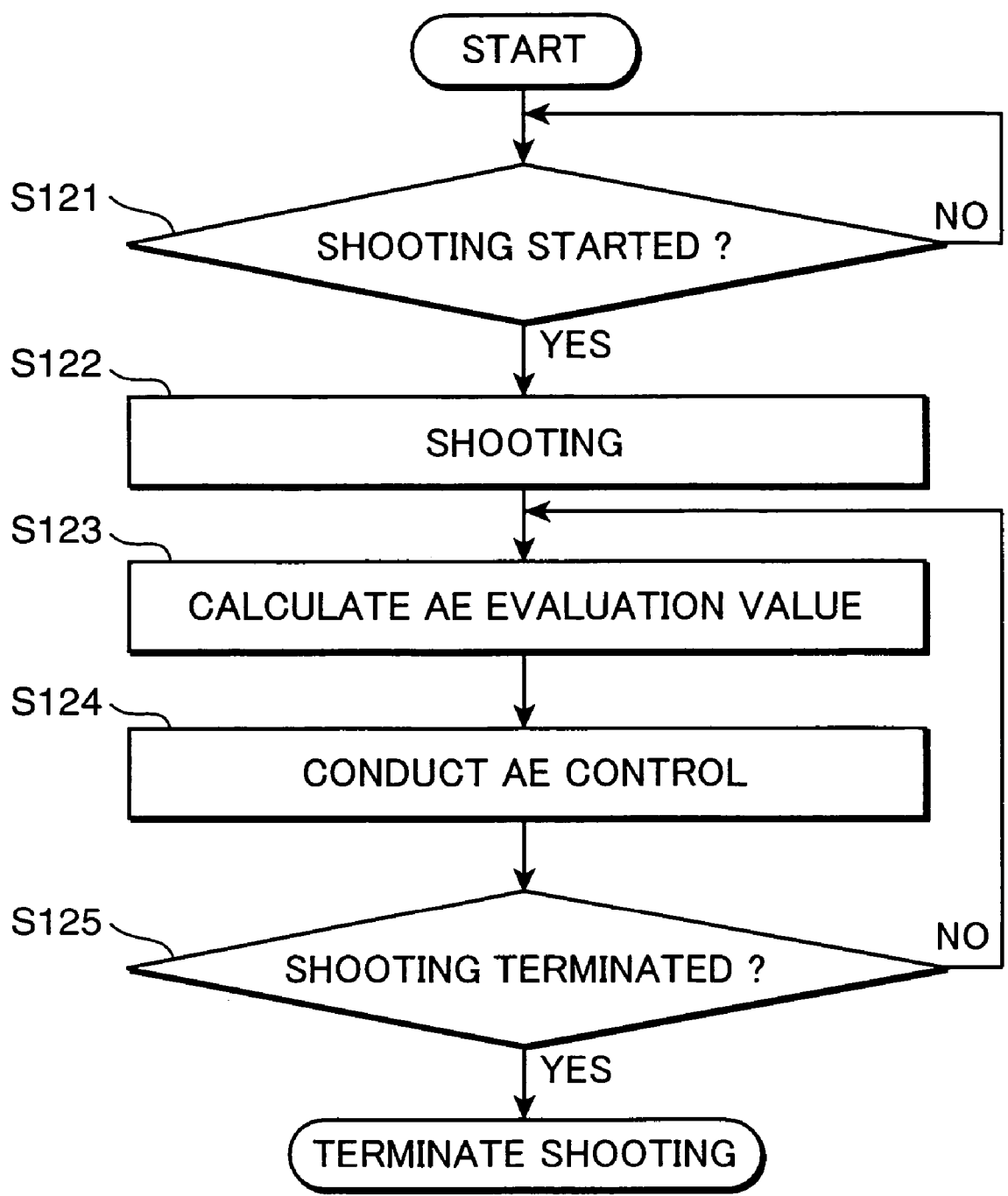
FIG. 13 is a flowchart showing an operation example of detecting evaluation values concerning the subject image such as AE evaluation values based on a moving image continuously captured by the image sensor.

(Step S1-2) Example of Detecting Evaluation Values Based on Moving Images:

FIG. 13 is a flowchart illustrating an operation example of the digital camera 1 in detecting evaluation values such as AE evaluation values of a subject based on a moving image that is continuously captured by the image sensor 30. Specifically, FIG. 13 shows a flow of calculating the AE evaluation values with use of all the frame images captured by the image sensor 30 in the case where the digital camera 1 is in a shooting standby state, or in the moving image shooting mode, or in the case where the image sensing apparatus according to the embodiment of the invention is applied to a digital movie camera.

Referring to FIG. 13, it is confirmed whether shooting start has been designated (Step S121). For instance, if the mode setting switch 105 is pressed to shift the digital camera 1 to the moving image shooting mode, and shooting start is confirmed (YES in Step S121), shooting of a moving image is initiated (Step S122). Respective control values on the image sensing dynamic range, the exposure time, and the aperture value at the time of shooting the moving image are set to initial values.

Subsequently, the evaluation value detector 405 calculates the AE evaluation values based on the image captured in Step S122 (Step S123). Then, based on the detected AE evaluation values, the dynamic range control signal generator 521 changes the setting of the signal φVPS to control the dynamic range, and the shutter 23 and the diaphragm 22 are controlled by control signals generated by the shutter drive signal generator 523 and the aperture control signal generator 525, whereby a specified AE control is carried out (Step S124)

Then, it is confirmed whether the shooting has been terminated (Step S125). If there is no command signal indicative of shooting termination (NO in Step S125), the routine returns to Step S123 to repeat the AE evaluation value calculation, and the AE control in Step S124. Specifically, in the moving image shooting, the steps of utilizing all the captured images as evaluation images for detecting the AE evaluation values, and conducting the AE control for next shooting based on the detected AE evaluation values are cyclically repeated. Alternatively, part of the captured images, e.g., one frame image per several frame images corresponding to the captured images, may be used as an evaluation image, in place of using all the captured images as evaluation images, and AE evaluation values may be acquired based on the evaluation image.

Figure 14:
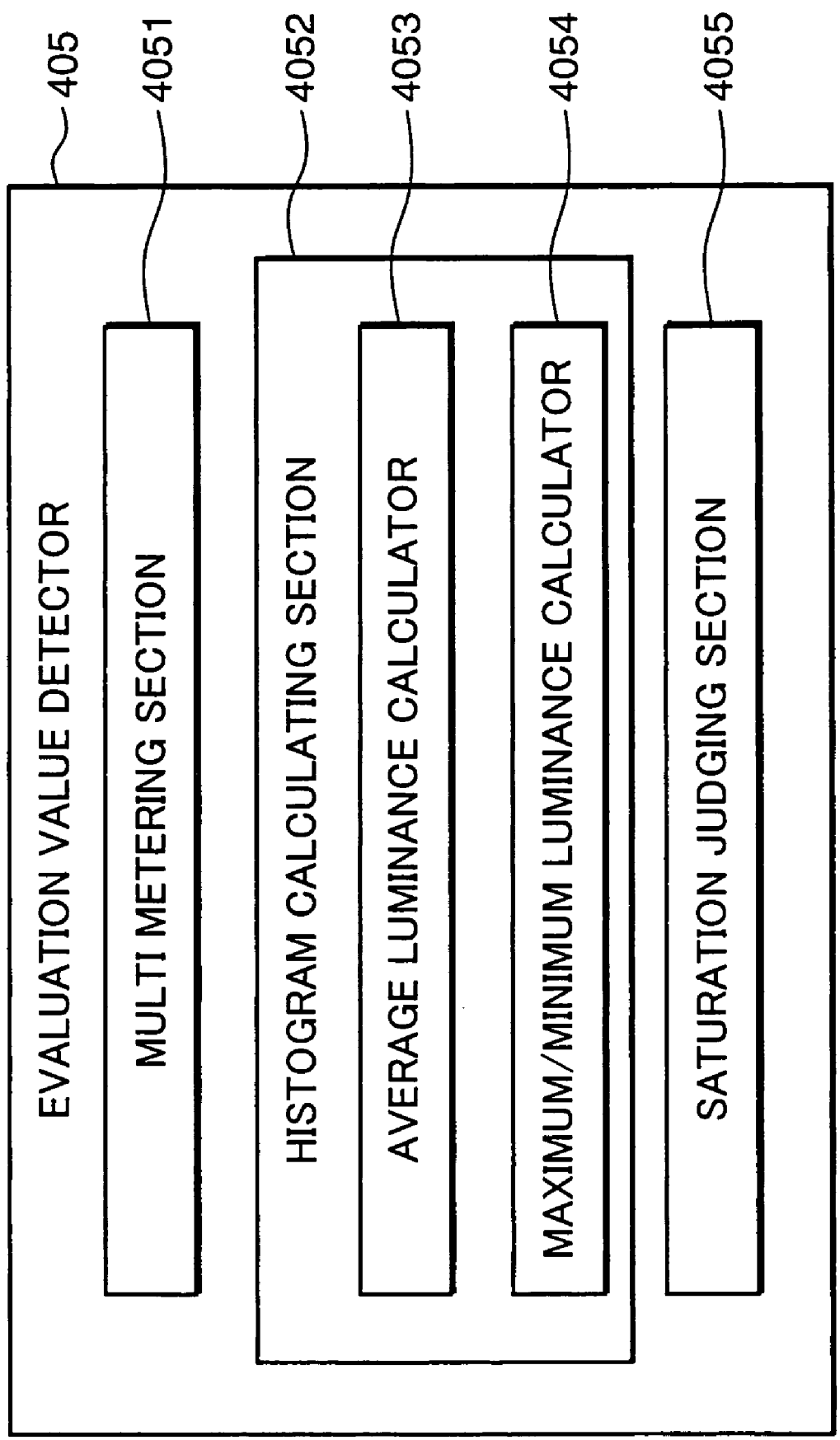
FIG. 14 is a functional block diagram for explaining functions of an evaluation value detector.

(Step S1-3) Calculation of Evaluation Values:

Next, the evaluation value calculating step in the above flow, namely, Steps S113 and S123, are described in detail. FIG. 14 is a functional block diagram for explaining the functions of the evaluation value detector 405. The evaluation value detector 405 includes a multi-pattern metering section 4051, a histogram calculating section 4052, and a saturation judging section 4055.

The multi-pattern metering section 4051 conducts metering of a subject according to a multi-pattern metering system. Specifically, the multi-pattern metering section 4051 divides an image captured by the image sensor 30 into areas and blocks of a predetermined number, and detects the luminance of the captured image in the respective areas and blocks, based on image signals or image data.

FIG. 15 is an illustration showing a state as to how the image sensing area of the image sensor 30 to be metered is divided by multi-pattern metering. Denoted by the reference numeral 330 is an image sensing area obtained by an image sensing operation by the image sensor 30. A subject image is captured or sensed within the image sensing area 330. The image sensing area 330 carries a multitude of pixel information concerning pixels constituting the image sensor 30, namely, luminance information concerning a subject image. The image sensing area 330 is divided into a central area, which is a central part of the image sensing area 330, and a peripheral area, which is a peripheral part around the central part. Further, the central area and the peripheral area are each divided into detection blocks of a predetermined number. For instance, the central area is divided into thirty-six detection blocks comprised of A, B, C, . . . Z, AA, AB . . . , and AJ, namely, detection blocks A through AJ, and the peripheral area is divided into sixteen detection blocks comprised of first through sixteenth detection blocks. In this embodiment, a subject image captured in the central area is called as "main subject image", a subject image captured in the peripheral area is called as "peripheral subject image", the central area is called as "main subject image area 331", and the peripheral area is called as "peripheral subject image area 332". The area defined by the detection blocks O, P, U, and V in the central part of the main subject image area 331 is called as "AF detecting area 333" where AF evaluation values are detected for focusing control. Further, the luminance of the captured image in the main subject image area 331 is called as "main subject luminance", and the luminance of the captured image in the peripheral subject image area 332 is called as "peripheral subject luminance".

Figure 16A:
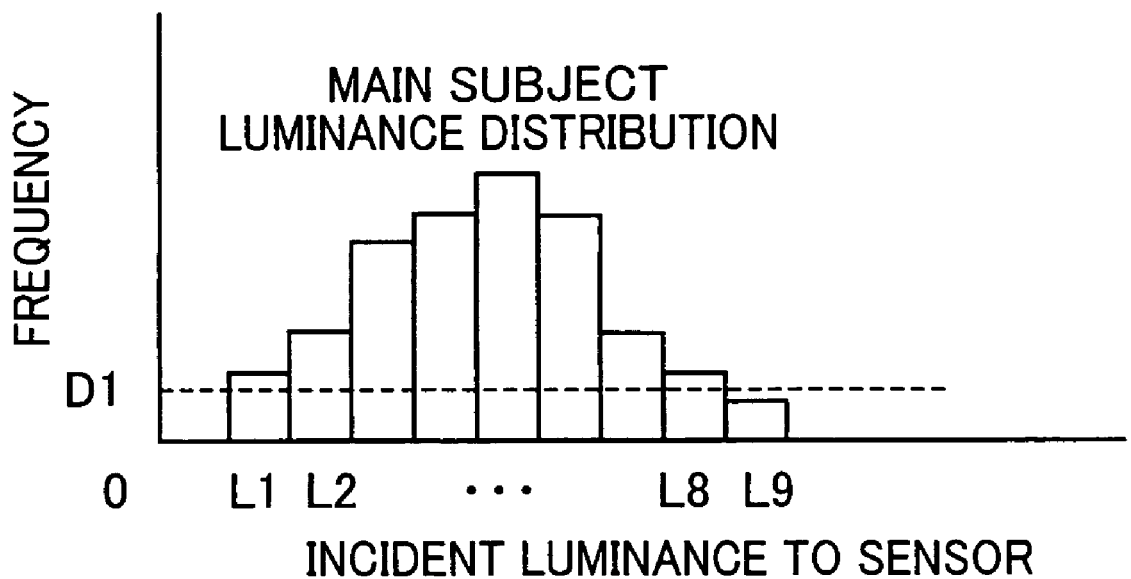
Figure 16B:
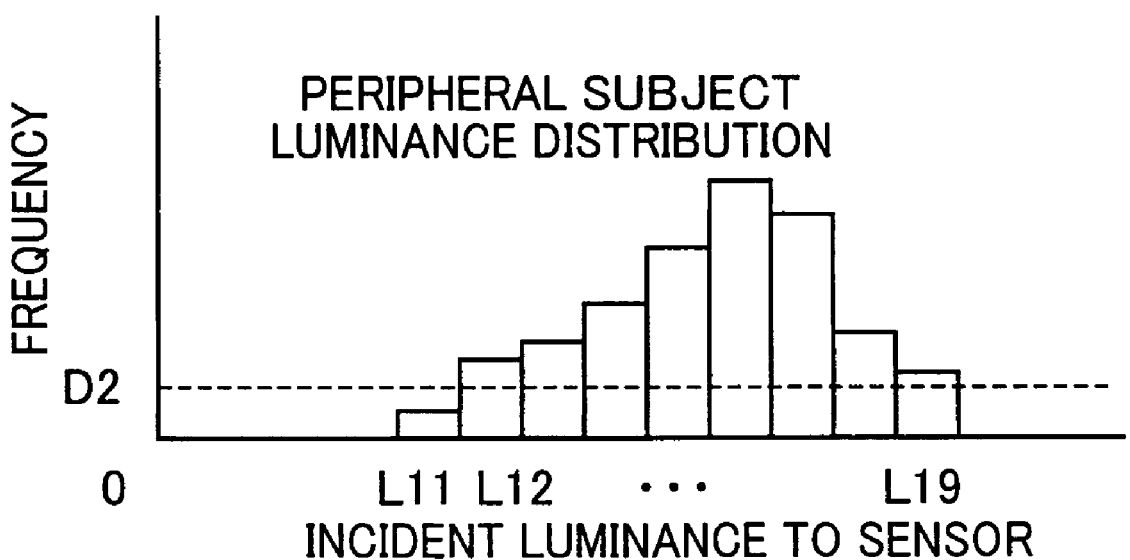

The histogram calculating section 4052 calculates a histogram, namely, distribution of a main subject luminance with respect to each of the detection blocks A through AJ, and calculates a histogram of the main subject luminance in the entirety of the main subject image area 331, namely, a main subject entire luminance histogram, as shown in FIG. 16A, with use of the main subject luminance histograms with respect to the detection blocks A through AJ. Further, the histogram calculating section 4052 calculates a histogram of a peripheral subject luminance with respect to each of the first through sixteenth detection blocks, and calculates a histogram of the peripheral subject luminance in the entirety of the peripheral subject image area 332, namely, a peripheral subject entire luminance histogram, as shown in FIG. 16B, with use of the peripheral subject luminance histograms with respect to the first through sixteenth detection blocks.

Further, the histogram calculating section 4052 calculates the luminance range of the entirety of the main subject image and the luminance range of the entirety of the peripheral subject image with use of the main subject entire luminance histogram and the peripheral subject entire luminance histogram, respectively. In calculating, a so-called "Gaussian pruning" is applied using a specified threshold value. Namely, luminance data having frequencies smaller than the specified threshold value are not used. For the main subject, the luminance data is cut back at a threshold value D1 as shown in FIG. 16A, and a range defined by a minimum L1 and a maximum value L8 of luminances having frequencies equal to or above D1 is set as a main subject entire luminance range. Similarly, for the peripheral subject, the luminance data is cut back at a threshold value D2 as shown in FIG. 16B, and a range defined by a minimum value L12 and a maximum value L19 of luminances having frequencies equal to or above D2 is set as a peripheral subject entire luminance range. This Gaussian pruning using the threshold values is applied for reducing errors caused by noise or the like. Although the luminances of the respective luminance histograms shown in FIGS. 16A and 16B are identified by L1 to L19 here for the sake of convenience, they are actually expressed in 256 stages or gradations and can be identified by L1 to L256, for example, in the case of handling image data of eight bits.

The histogram calculating section 4052 has an average luminance calculator 4053 and a maximum/minimum luminance calculator 4054. The average luminance calculator 4053 calculates an average luminance of the main subject image with respect to each of the detection blocks A through AJ, and an average luminance of the peripheral subject image with respect to each of the first through sixteenth detection blocks. The average luminance is calculated with respect to each of the color components R, G, and B. In calculating the average luminances, a histogram of the main subject luminance with respect to each of the detection blocks A through AJ, and a histogram of the peripheral subject luminance with respect to each of the first through sixteenth detection blocks are calculated, and the Gaussian pruning with use of specified threshold values is applied in a similar manner as calculating the main subject entire luminance range and the peripheral subject entire luminance range. The average luminance of the main subject image with respect to each of the detection blocks A through AJ, and the average luminance of the peripheral subject image with respect to each of the first through sixteenth detection blocks are obtained by averaging the luminances after the Gaussian pruning.

The maximum/minimum luminance calculator 4054 calculates a maximum/minimum luminance of the main subject image with respect to each of the detection blocks A through AJ, and a maximum/minimum luminance of the peripheral subject image with respect to each of the first through sixteenth detection blocks. Similarly to the above, the Gaussian pruning with use of predetermined threshold values is applied with respect to the main subject luminance histograms and the peripheral subject luminance histograms which have been calculated with respect to the detection blocks A through AJ, and the first through sixteenth detection blocks, and the maximum/minimum luminance of the main subject image with respect to each of the detection blocks A through AJ, and the maximum/minimum luminance of the peripheral subject image with respect to each of the first through sixteenth detection blocks are calculated based on the luminances or luminance ranges after the Gaussian pruning.

The histogram calculating section 4052 calculates a histogram of a subject image luminance in the entire image sensing area, namely, a subject image entire luminance histogram in the image sensing area 330 consisting of the main subject image area 331 and the peripheral subject image area 332, so that saturation is judged based on the subject image entire luminance histogram by the saturation judging section 4055, which will be described later. The subject image entire luminance histogram may be calculated by combining the main subject entire luminance histogram and the peripheral subject entire luminance histogram.

The saturation judging section 4055 judges whether output of the image sensor 30 has been saturated at the time of detecting the AE evaluation values, or the AF evaluation values, or the WB evaluation values based on the subject image entire luminance histogram calculated by the histogram calculating section 4052.

Figure 17:
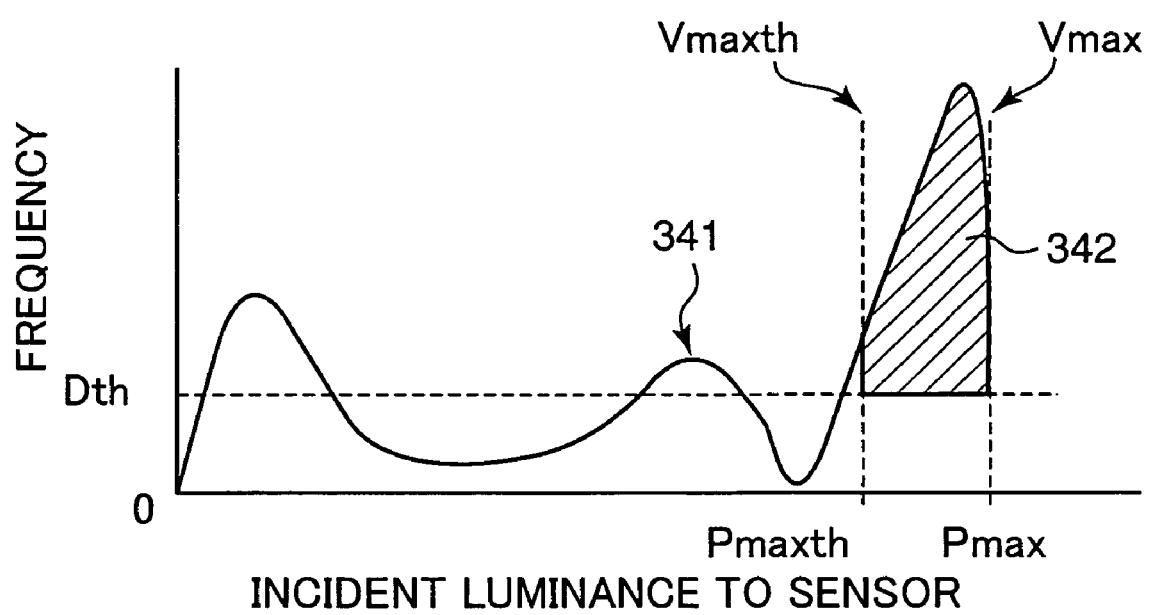
FIG. 17 is a graph showing an example of a subject image entire luminance histogram when the output of the image sensor is saturated.

FIG. 17 is an illustration showing an example of the subject image entire luminance histogram at the time when the output of the image sensor 30 is saturated. In FIG. 17, Pmax represents an incident luminance or a saturated luminance of the image sensor 30 when the image sensor 30 reaches the saturated output level Vmax, which is a maximum value in output level of the image sensor 30, and Pmaxth represents an incident luminance or a luminance threshold of the image sensor 30 relative to sensor output Vmaxth, which is set as a threshold value for judging whether the output of the image sensor 30 is saturated or not. Dth represents a frequency or a frequency threshold which has been set as a threshold value for judging whether the output of the image sensor 30 is saturated or not. Alternatively, the saturated output level Vmax may be an actually obtained maximum output level, or may be an arbitrarily set level, which is set slightly lower than the actually obtained maximum output level, for instance.

The saturation judging section 4055 calculates the total frequency in a hatched area (hereinafter, called as "saturated area 342") indicated by the reference numeral 342 in FIG. 17, wherein the luminance is not smaller than the luminance threshold Pmaxth and not smaller than the frequency threshold Dth, namely, the total number of pixels in the saturated area 342, which is called as "saturated pixel number". The saturation judging section 4055 judges that the output level of the image sensor 30 is saturated if the saturated pixel number is not smaller than a predetermined value. On the other hand, the saturation judging section 4055 judges that the output level of the image sensor 30 is not saturated if the saturated pixel number is smaller than the predetermined value. Alternatively, judgment as to whether the output level of the image sensor 30 is saturated may be made based solely on the frequency of the saturated luminance Pmax, namely, based on the pixel number having the saturated luminance Pmax.

As mentioned above, the evaluation value detector 405 performs the multi-pattern metering, and detects information relating to the average luminances, the maximum/minimum luminances, the luminance histograms, the luminance ranges, or a like parameter, as the AE evaluation values or the AF evaluation values, or the WB evaluation values based on the luminance information or image data in each of the detection blocks of the main subject image area 331 and the peripheral subject image area 332. The data concerning the evaluation values are outputted to the relevant parameter calculators of the calculating section 510. For instance, if the evaluation values are AE evaluation values, the AE evaluation values are outputted to the AE control parameter calculating unit 5110. If the evaluation values are AF evaluation values, the AF evaluation values are outputted to the AF control parameter calculator 513. If the evaluation values are WB evaluation values, the WB evaluation values are outputted to the WB control parameter calculator 514. Upon receiving the respective evaluation values, the respective calculators calculate the control parameters based on the evaluation values.

(AE Control Parameter Calculating Step S2)

Figure 18A:
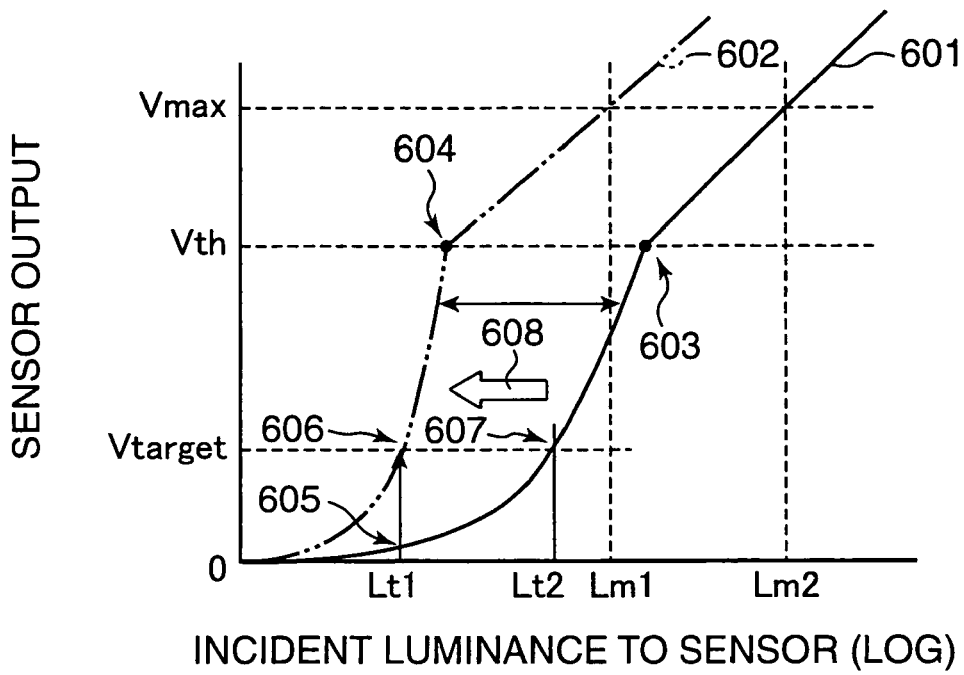
Figure 18B:
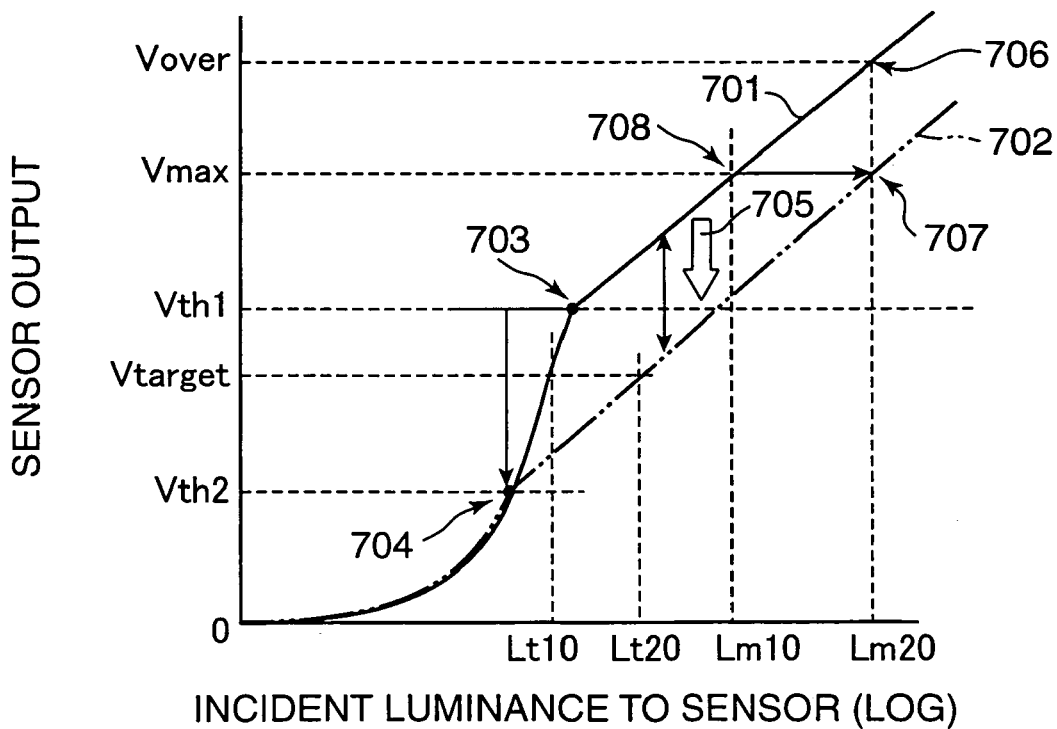

In the following, the AE control by the exposure amount control and the dynamic range control based on the photoelectric conversion characteristic of the image sensor 30 according to the embodiment is described in detail. FIGS. 18A and 18B are graphs showing how the photoelectric conversion characteristic of the image sensor 30 is changed in performing the AE control. FIG. 18A shows change of the photoelectric conversion characteristic in performing exposure amount control, and FIG. 18B shows change of the photoelectric conversion characteristic in performing dynamic range control. In FIGS. 18A and 18B, the axis of abscissas represents an incident luminance to the image sensor 30, and the axis of ordinate represents an output level of the image sensor 30, wherein the axis of abscissas is represented in terms of log coordinates, namely, log values of incident luminances to the image sensor 30. Throughout the specification and the claims, the incident luminance to the image sensor 30 means a subject luminance that has been incident onto the image sensor 30, and hereinafter, simply called as "luminance".

The exposure amount control (A) and the dynamic range control (B) are as mentioned below.

(A) Exposure amount control based on control of the exposure time of the shutter 23 and/or the image sensor 30, namely, the opening time of the shutter 23 and/or the integration time of the image sensor 30, and/or the aperture area of the diaphragm 22.

(B) Dynamic range control based on control of the photoelectric conversion characteristic of the image sensor 30, specifically, control of the position of the inflection point of the photoelectric conversion characteristic (see FIG. 22).

In performing the AE control in this embodiment, a priority is set between calculation of the exposure amount control parameter relating to the exposure amount control (A), and calculation of the dynamic range control parameter relating to the dynamic range control (B). First, the exposure amount control (A), and the dynamic range control (B) are respectively described, followed by detailed description as to how the priority is set between calculation of the exposure amount control parameter and calculation of the dynamic range control parameter.

(Step S2-1) Calculation of Exposure Amount Control Parameter:

First, the exposure amount control (A) is described referring to FIG. 18A. Referring to FIG. 18A, a photoelectric conversion characteristic 601 is a photoelectric conversion characteristic of the image sensor 30 at the time of acquiring the AE evaluation values stored in the photoelectric conversion characteristic information storage 516. The photoelectric conversion characteristic 601 is divided into a linear characteristic area and a logarithmic characteristic area, with the inflection point 603, namely, the sensor output Vth, serving as a boundary. The exposure amount control parameter calculator 511 calculates an exposure amount control parameter, namely, an exposure amount setting value for obtaining an exposure amount that makes it possible to change the photoelectric conversion characteristic 601 to a photoelectric conversion characteristic 602 capable of obtaining a predetermined sensor output corresponding to the subject luminance for exposure setting. Namely, the exposure amount control parameter calculator 511 calculates an exposure time setting value for controlling the exposure time, and an aperture setting value for controlling the aperture area of the diaphragm 22.

Here is calculated the photoelectric conversion characteristic 602 in such a manner that the sensor output at the point 605 corresponding to a specified luminance Lt1 for exposure amount setting in the linear characteristic area of the photoelectric conversion characteristic 601 becomes a sensor output Vtarget at the point 606. In other words, the photoelectric conversion characteristic 601 is shifted or moved to the photoelectric conversion characteristic 602 passing the point 606 in a direction shown by the arrow 608. At this time, the inflection point 603 is shifted in parallel to the inflection point 604, with the sensor output Vth being unchanged. Namely, the new photoelectric conversion characteristic 602 is obtained, so that the sensor output, namely, the point 605 corresponding to the luminance Lt1 in a relatively low output level of the linear characteristic area of the photoelectric conversion characteristic 601 coincides with the point 606 in a relatively high output level of the linear characteristic area in terms of graphical expression. The sensor output Vtarget is a target output, and is set to a predetermined value. The sensor output Vtarget is stored in the exposure amount control parameter calculator 511 or a like device.

More specifically, the exposure time setting value or the aperture setting value capable of increasing the exposure amount is calculated in such a manner that the sensor output corresponding to the luminance Lt1 is increased from the output level at the point 605 in the photoelectric conversion characteristic 601 to the target output level Vtarget at the point 606 in the photoelectric conversion characteristic 602, namely, the sensor output is increased relative to the same magnitude of luminance. In other words, the exposure amount control parameter calculator 511 calculates the exposure time setting value or the aperture setting value capable of increasing the exposure amount in such a manner that the luminance corresponding to the target output Vtarget is changed from Lt2 at the point 607 to Lt1, namely, the luminance for obtaining the target output Vtarget is as small as Lt1(<Lt2). At this time, the opening time of the shutter 23 or the integration time of the image sensor 30 is increased, and the aperture area of the diaphragm 22 is increased based on the exposure time setting value or the aperture setting value.

In shifting the photoelectric conversion characteristic from the photoelectric conversion characteristic 601 to the photoelectric conversion characteristic 602, the luminance corresponding to Vmax is decreased from Lm2 to Lm1, and consequently, the dynamic range is decreased. Vmax is a maximum output value of the image sensor 30, namely, a saturated output level of the image sensor 30. Alternatively, the saturated output level Vmax may be a physical maximum output level, or may be an arbitrarily set level, which is set slightly lower than the physical maximum output level, for instance.

In FIG. 18A, the photoelectric conversion characteristic is shifted in the direction shown by the arrow 608 in order to obtain the target output Vtarget corresponding to the luminance Lt1 for exposure amount setting. Alternatively, the photoelectric conversion characteristic may be shifted or moved in the rightward direction opposite to the direction shown by the arrow 608. Further, the photoelectric conversion characteristic is not changed or shifted as far as the target output Vtarget can be already obtained in relation to the luminance for exposure amount setting as described above in the photoelectric conversion characteristic at the time of obtaining the AE evaluation values. However, in such a case, even if the exposure time setting value and the aperture setting value take the same values as those when the AE evaluation values were obtained last time, the exposure time setting value and the aperture setting value may be calculated this time.

(Step S2-2) Calculation of Dynamic Range Control Parameter:

Next, the dynamic range control (B) is described referring to FIG. 18B. Referring to FIG. 18B, a photoelectric conversion characteristic 701 is a photoelectric conversion characteristic of the image sensor 30 at the time of acquiring the AE evaluation values stored in the photoelectric conversion characteristic information storage 516. The photoelectric conversion characteristic 701 is divided into a linear characteristic area and a logarithmic characteristic area, with the inflection point 703, namely, the sensor output Vth1, serving as a boundary. The dynamic range control parameter, namely, the photoelectric conversion characteristic setting value is a value for controlling the photoelectric conversion characteristic that makes it possible to shift the photoelectric conversion characteristic 701 to a photoelectric conversion characteristic 702, so that a predetermined sensor output is obtained in relation to a predetermined luminance for dynamic range setting, namely, the subject luminance for dynamic range setting, in other words, a value for determining the position of the inflection point 704 i.e. the output level corresponding to the inflection point 704 in the photoelectric conversion characteristic 702 after the shifting. The photoelectric conversion characteristic setting value is calculated by the dynamic range control parameter calculator 512.

Here, the photoelectric conversion characteristic curve 702 is calculated in such a manner that the output level of the image sensor 30 corresponding to a luminance Lm20 coincides with a saturated output level Vmax of the image sensor 30, which is the same as Vmax shown in FIG. 18A, wherein the luminance Lm20 is set as a maximum luminance in the dynamic range. In other words, calculation is performed to shift the photoelectric conversion characteristic 701 to the photoelectric conversion characteristic 702 in the direction shown by the arrow 705. By performing the calculation, the inflection point 703 is shifted to the inflection point 704, and likewise, the sensor output corresponding to the inflection point is changed from Vth1 to Vth2.

In the above operation, the photoelectric conversion characteristic setting value that makes it possible to reduce the sensor output corresponding to the luminance Lm20 from the sensor output Vover at the inflection point 706 to the sensor output Vmax at the point 707 is calculated, wherein Vover is a sensor output value larger than the saturated output value Vmax. In other words, the dynamic range control parameter calculator 512 calculates the photoelectric conversion characteristic setting value that makes it possible to increase the maximum luminance for obtaining the saturated output Vmax from Lm10 at the point 708 to Lm20, namely, to widen the dynamic range.

As the photoelectric conversion characteristic 701 is shifted to the photoelectric conversion characteristic 702, the luminance corresponding to the target output Vtarget is increased from Lt10 to Lt20, thereby decreasing the exposure amount necessary for obtaining the target output Vtarget. The target output Vtarget shown in FIG. 18B is set for explaining change of the exposure amount, and may be different from the value of the target output Vtarget shown in FIG. 18A.

In case of the control (B) as shown in FIG. 18B, the photoelectric conversion characteristic is shifted in the direction shown by the arrow 705 to obtain the saturated output Vmax corresponding to the luminance Lm20 for dynamic range setting. Alternatively, the photoelectric conversion characteristic may be shifted upward opposite to the direction shown by the arrow 705. Further, the photoelectric conversion characteristic is not changed as far as the saturated output level Vmax can be already obtained in relation to the luminance for dynamic range setting as mentioned above at the time of acquiring the AE evaluation values. However, in such a case, even if the photoelectric conversion characteristic setting value takes the same value as that when the AE evaluation values were obtained last time, the photoelectric conversion characteristic setting value may be calculated this time.

In this way, by AE control by the exposure amount control (A) and the dynamic range control (B), it is possible to perform a sensing operation with the luminance for exposure amount setting in the linear characteristic area of the photoelectric conversion characteristic, and yet to secure a required output level of the image sensor 30, and also to keep the luminance for dynamic range setting, specifically, the maximum subject luminance or the maximum luminance in the dynamic range equal to or lower than the saturated output level of the image sensor 30.

(Detailed Description on Exposure Amount Control Parameter Calculating Process)

In this section, calculation of an exposure amount control parameter, namely, an exposure time setting value and an aperture setting value to be implemented by the exposure amount control parameter calculator 511 based on the AE evaluation values detected by the evaluation value detector 405 is described in detail in the case where the exposure amount control shown in FIG. 18A is conducted.

FIG. 19 is an illustration showing an example of a calculation process for matching the sensor output corresponding to the luminance Lt1 in FIG. 18A, namely, the luminance for exposure amount setting, with the target output Vtarget. Referring to FIG. 19, the curve denoted by the reference numeral α1 represents a photoelectric conversion characteristic at the time of acquiring the AE evaluation values. The photoelectric conversion characteristic α1 is divided into a linear characteristic area 612 and a logarithmic characteristic area 613, with an inflection point 611, namely, the sensor output Vth, serving as a boundary. The curve denoted by the reference numeral β1 represents a photoelectric conversion characteristic comprised of a linear characteristic area in its entirety, which is obtained by converting the logarithmic characteristic area 613 in the photoelectric conversion characteristic α1 to a linear characteristic area 614.

In FIG. 19, the luminance LtLin at the point A is an average luminance in the linear characteristic area 612 of the photoelectric conversion characteristic α1, with its sensor output VtLin corresponding to the luminance LtLin. The luminance LtLog at the point B is an average luminance in the logarithmic characteristic area 613 of the photoelectric conversion characteristic α1, with its sensor output VtLog corresponding to the luminance LtLog. First, data conversion is conducted, so that the point B corresponding to the luminance LtLog in the logarithmic characteristic area 613 of the photoelectric conversion characteristic α1 is shifted to the point C in the linear characteristic area 614, namely, the sensor output VtLog corresponding to the luminance LtLog in the logarithmic characteristic area 613 coincides with the sensor output VtLogLin in the linear characteristic area 614. By implementing this data conversion, all the data in the photoelectric conversion characteristic α1 can be handled as data in the linear characteristic area 614. The data conversion from the logarithmic characteristic area 613 of the photoelectric conversion characteristic α1 to the linear characteristic area 614 of the photoelectric conversion characteristic β1 is performed with use of a lookup table stored in the LUT storage 518. Then, the sensor output VtAve at the point D is calculated by implementing the following equation, with use of the sensor output VtLin at the point A and the sensor output VtLogLin at the point C. The luminance LtAve corresponding to the sensor output VtAve corresponds to the luminance Lt1 for exposure amount setting in FIG. 18A.

$$VtAve = (VtLin \cdot k1) + (VtLogLin \cdot (1-k1))$$

where $k1 = m/(m+n)$, m: total number of pixels used in calculation of luminance LtLin at point A, and n: total number of pixels used in calculation of luminance LtLog at point B.

In this way, the sensor outputs VtLin and VtlogLin are calculated based on the luminances LtLin and LtLog, and the sensor output VtAve is calculated based on the sensor outputs VtLin and VtLogLin.

Next, the following computation is implemented to obtain a gain (Gain) of the exposure amount for making the sensor output VtAve coincident with the target output Vtarget shown in FIG. 18A, a gain Gt of the exposure time and a gain Gs of the aperture value based on the exposure amount gain (Gain), an exposure time T2 based on the exposure time gain Gt, and an aperture area S2 based on the aperture gain Gs.

$$Gain = Vtarget/VtAve$$

$$Gt \cdot Gs = Gain$$

Figure 21:
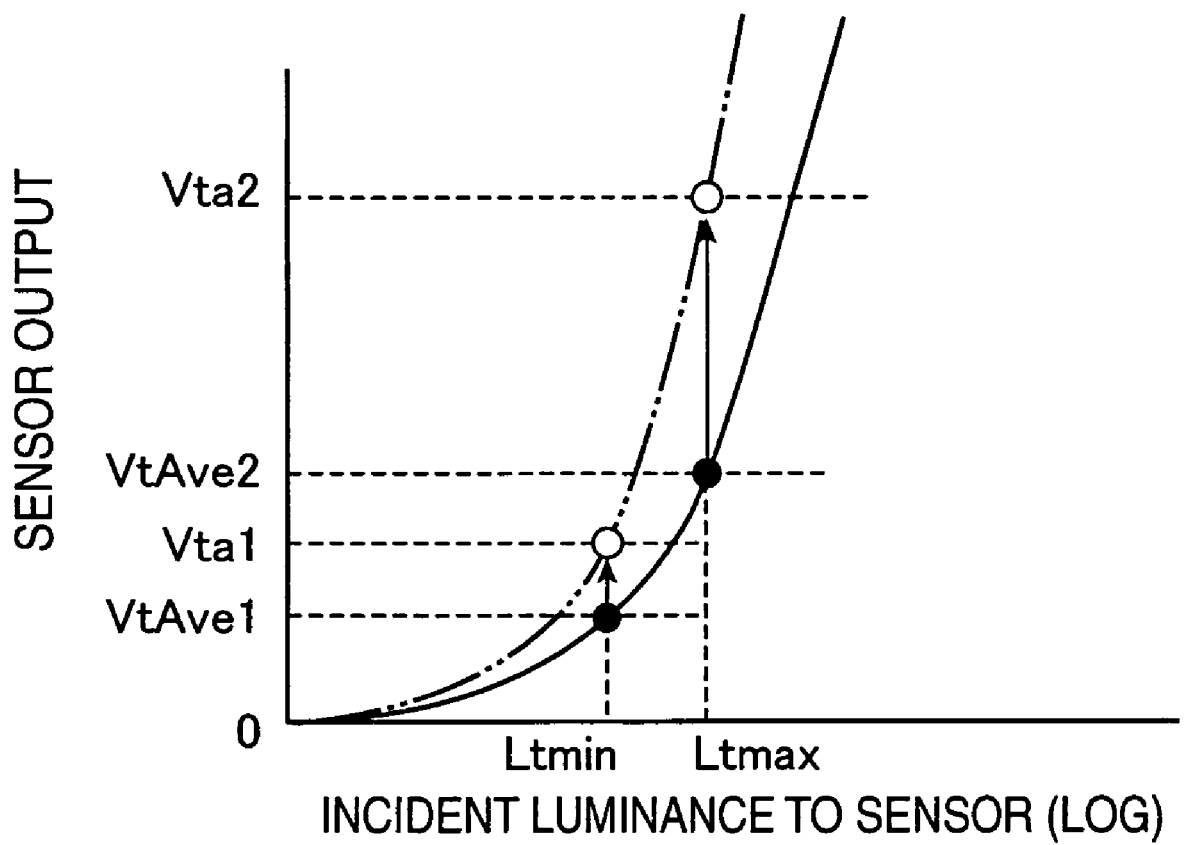
FIG. 21 is a graph for explaining a process in calculating the exposure amount control parameter.

Calculation of the gains Gt and Gs with use of the respective equations is performed according to the flowchart shown in FIG. 21.

<Equations for Calculating the Exposure Time Gain>

$$Tmax/T1 = Gtmax \text{ (maximum gain of the exposure time)}$$

$$Tmin/T1 = Gtmin \text{ (minimum gain of the exposure time)}$$

Gain/$Gt$max=$GGt$max (gain for compensating for insufficiency at the maximum gain)

Gain/$Gt$min=$GGt$min (gain for compensating for insufficiency at the minimum gain)

$T2=T1 \cdot Gt$ where T1: exposure time at the time of detecting the AE evaluation values,
T2: exposure time after the AE correction,
Tmax: maximum exposure time of the image sensor 30, and
Tmin: minimum exposure time of the image sensor 30.

<Equations for Calculating the Aperture Gain>

$S$max/$S1$=$Gs$max (maximum gain of the aperture value)

$S$min/$S1$=$Gs$min (minimum gain of the aperture value)

Gain/$Gs$max=$GGs$max (gain for compensating for insufficiency at the maximum gain)

Gain/$Gs$min=$GGs$min (gain for compensating for insufficiency at the minimum gain)

$S2=S1 \cdot Gs$ where S1: aperture area at the time of detecting the AE evaluation values,
S2: aperture area after the AE correction,
Smax: maximum aperture ratio of the diaphragm 22, and
Smin: minimum aperture ratio of the diaphragm 22.

Figure 20:
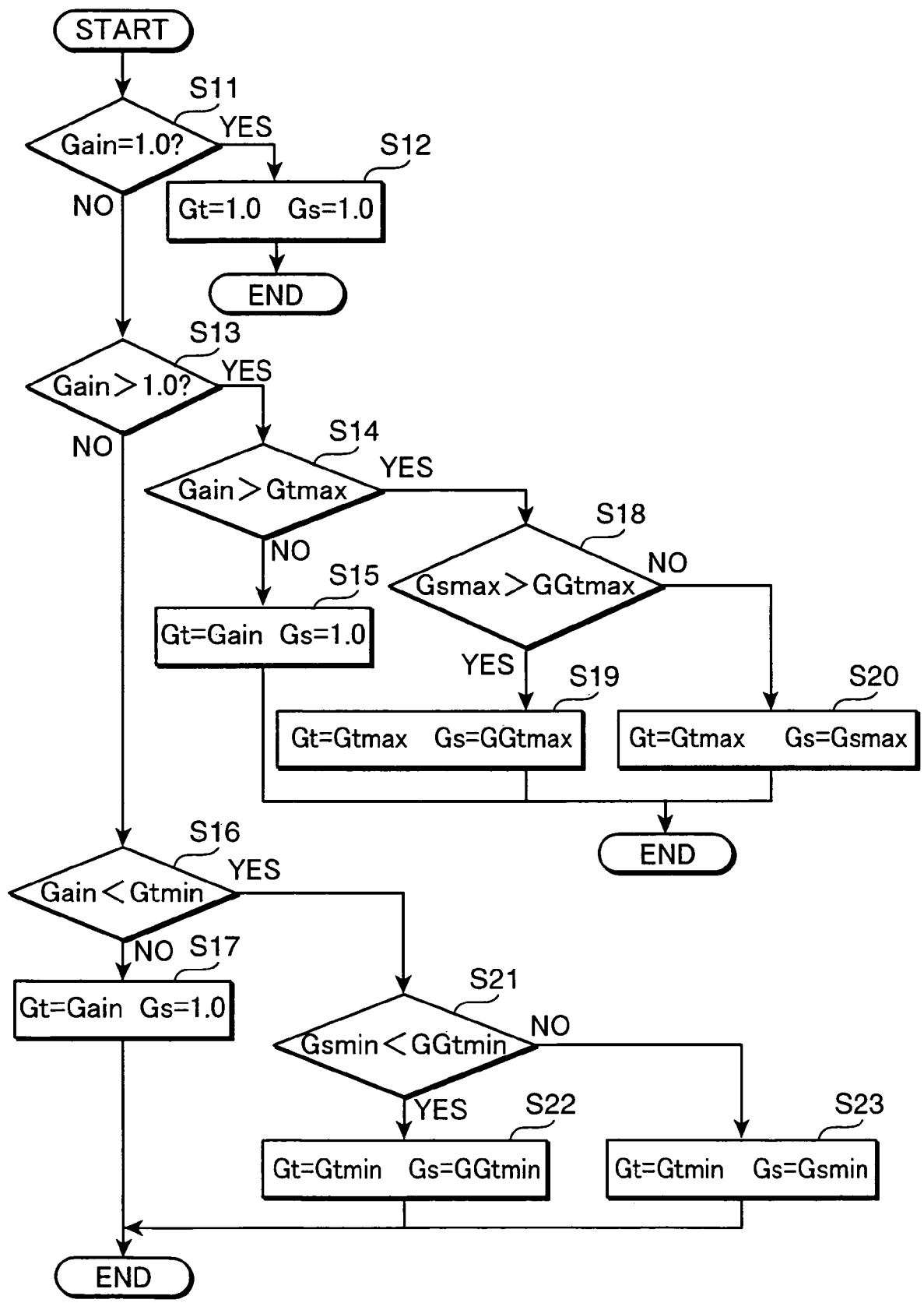
FIG. 20 is a flowchart showing an example of a flow of calculating the exposure amount control parameter.

As shown in FIG. 20, if VtAve is equal to Vtarget, namely, if the exposure amount gain (Gain)=1.0, and there is no need of exposure amount control, namely, no change of the exposure amount control parameter (YES in Step S11), the exposure time gain Gt=1.0, and the aperture gain Gs=1.0 (Step 12). Accordingly, the exposure time and the aperture area are not changed. On the other hand, if Gain≠1.0 (NO in Step S11), and Gain>1.0 (YES in Step S13), and Gain≦Gtmax (NO in Step S14), namely, if the exposure amount gain (Gain) is larger than 1.0, exposure amount control is necessary, and the exposure amount gain (Gain) can be handled by the exposure time gain Gt, namely, Gt≦Gtmax, then, Gt=Gain, and Gs=1.0 (Step S15).

If Gain≦1.0 (NO in Step S13), and Gain≧Gtmin (NO in Step S16), similarly to Step S15, the exposure amount gain (Gain) is smaller than 1.0, exposure amount control is necessary, and the exposure amount gain (Gain) can be handled by the exposure time gain Gt, namely, Gt≧Gtmin, then, Gt=Gain, and Gs=1.0 (Step S17).

If Gain>Gtmax (YES in Step S14), and Gsmax>GGtmax (YES in Step S18), then Gt=Gtmax, and Gs=GGtmax (Step S19). In Step S19, the exposure amount gain (Gain) is larger than the maximum exposure time gain Gtmax, and it is impossible to handle the exposure amount gain (Gain) by the exposure time gain Gt without changing the aperture gain Gs (=1.0). Accordingly, insufficiency of the exposure time gain Gt with respect to the exposure amount gain (Gain) is handled, namely, compensated for by changing the aperture gain Gs. The gain GGtmax for compensating for insufficiency at the maximum exposure time gain Gtmax is used as the aperture gain Gs. The gain GGtmax is used in the above control because the maximum exposure time gain GGtmax is smaller than the maximum aperture gain Gsmax, namely, there is no need of using the maximum aperture gain Gsmax. Thus, there is no need of calculating a gain for controlling the diaphragm 22 by implementing the equation relating to the aperture value.

If Gain<Gtmin (YES in Step S16), and Gsmin<GGtmin (YES in Step S21), then, Gt=Gtmin, and Gs=GGtmin (Step S22). In this case, similarly to Step S19, the exposure amount gain (Gain) is smaller than the minimum exposure time gain Gtmin, and accordingly, it is impossible to handle the exposure amount gain (Gain) by the exposure time gain Gt without changing the aperture gain Gs (=1.0). Accordingly, insufficiency of the exposure time gain Gt with respect to the exposure amount gain (Gain) is handled, namely, compensated for by changing the aperture gain Gs. The gam GGtmin for compensating for insufficiency at the minimum exposure time gain Gtmin is used as the aperture gain Gs. The gain GGtmin is used in the above control because the gain Gamin is smaller than the minimum aperture gain Gsmin, namely, there is no need of using the minimum aperture gain Gsmin. In this arrangement, similar to the above case, there is no need of calculating a gain for controlling the diaphragm 22 by implementing the equation relating to the aperture value.

If Gsmax≦GGtmax (NO in Step S18), Gt=Gtmax, and Gs=Gsmax (Step S20). Further, if Gsmin≧GGtmin (NO in Step S21), Gt=Gtmin, and Gs=Gsmin (Step S23). If GGtmax≧Gsmax in Step S20, the maximum aperture gain Gsmax is used as the aperture gain Gs. Similarly, if GGtmin≦Gsmin in Step S23, the minimum aperture gain Gsmin is used as the aperture gain Gs.

In this embodiment, as shown in the flowchart of FIG. 20, the exposure time gain Gt is prioritized in selecting a control parameter for obtaining the exposure amount gain (Gain), namely, exposure time control is prioritized. Alternatively, the aperture gain Gs may be prioritized, namely, aperture control may be prioritized. Further, in this embodiment, the exposure time gain Gt and the aperture gain Gs are calculated by using a single luminance Lt1 for exposure amount setting. Alternatively, two or more luminances for exposure amount setting may be used for the calculation. In such an altered arrangement, the average value of the exposure time gains Gt, and the average value of the aperture gains Gs, or the maximum/minimum value of the exposure time gains Gt, and the maximum/minimum value of the aperture gains Gs may be used.

Thus, the exposure time gain Gt and the aperture gain Gs are calculated, and the exposure time T2 after the AE correction, and the aperture area S2 after the AE correction are calculated based on the exposure time gain Gt and the aperture gain Gs, respectively. Then, the exposure time setting value for the image sensor 30 or for the shutter 23, and the aperture setting value for the diaphragm 22 are calculated based on the exposure time T2, and the aperture area S2, respectively, by data conversion with use of the corresponding lookup tables. The exposure time setting value and the aperture setting value obtained by the data conversion are stored in the photoelectric conversion information storage 516. Alternatively, the exposure time setting value and the aperture setting value obtained when the AE evaluation values were acquired last time may be renewed by the newly obtained corresponding setting values. The same idea is applicable to the photoelectric conversion characteristic setting value, which will be described in the following.

The shutter control signal generator 523 and the aperture control signal generator 525 generate control signals to the shutter driver 61 and the aperture driver 63, which make it possible to set the exposure time, namely, the integration time of the image sensor 30 or the shutter 23 to the exposure time T2, and to set the aperture area of the diaphragm 22 to the aperture area S2, based on the exposure time setting value and the aperture setting value calculated in the exposure amount control parameter calculator 511, respectively.

Next, described is an exemplified process for calculating the sensor output VtLin corresponding to the linear characteristic area average luminance LtLin, and the sensor output VtLog corresponding to the logarithmic characteristic area average luminance LtLog shown in FIG. 19. First, a process for calculating the sensor output level VtLin corresponding to the linear characteristic area average luminance LtLin is described. An average luminance (called as "block linear average luminance") in the linear characteristic area with respect to each of the detection blocks A through AJ in the main subject image area 331 shown in FIG. 15 is calculated based on the subject luminance information detected from each of the detection blocks A through AJ. The block linear average luminance is calculated with use of an average (called as "color linear average") in the linear characteristic area with respect to each of the color components R, G, and B. Specifically, color linear averages of the color component R which have been obtained from the blocks A through AJ are calculated as AveRA, AveRB, . . . , and AveRAJ, respectively. Similarly, color linear averages of the color component G which have been obtained from the blocks A through AJ are calculated as AveGA, AveGB, . . . , and AveGAJ, respectively, and color linear averages of the color component B which have been obtained from the blocks A through AJ are calculated as AveBA, AveBB, . . . , and AveBAJ, respectively. Then, a block linear average luminance with respect to each of the blocks A through AJ is calculated in accordance with the following color space conversion equation, with use of the color linear averages of the respective color components R, G, and B. For instance, a block linear average luminance AveYA is obtained by implementing the following equation where AveYA represents a block linear average luminance in the detection block A.

$$AveYA = AveRA \cdot K1 + AveGA \cdot K2 + AveBA \cdot K3$$

where K1, K2, and K3 are coefficients used in color space conversion from RGB to YCbCr, and K1=0.2989, K2=0.5866, and K3=0.1145, respectively.

Calculation is implemented with respect to the detections blocks B through AJ in a similar manner as the calculation is implemented with respect to the detection block A. Thus, block linear average luminances AveYA, AveYB, . . . , and AveYAJ are calculated in the respective blocks A through AJ. Then, an average luminance with respect to the entirety of the block linear average luminances AveYA, AveYB, . . . , and AveYAJ is calculated, and set as MainY. The average luminance MainY is the sensor output VtLin corresponding to the linear characteristic area average luminance LtLin.

On the other hand, the sensor output VtLog corresponding to the logarithmic characteristic area average luminance LtLog is calculated in a similar manner as calculating the sensor output VtLin corresponding to the linear characteristic area average luminance LtLin. Specifically, an average luminance (called as "block log average luminance") in the logarithmic characteristic area with respect to each of the detection blocks A through AJ in the main subject image area 331 shown in FIG. 15 is calculated based on the subject luminance information detected from each of the detection blocks A through AJ. The block log average luminance is calculated with use of an average (called as "color log average") in the logarithmic characteristic area with respect to each of the color components R, G, and B. Specifically, color log averages of the color component R which have been obtained from the blocks A through AJ are calculated as AveRLogA, AveRLogB, . . . , and AveRLogAJ, respectively. Similarly, color log averages of the color component G which have been obtained from the blocks A through AJ are calculated as AveGLogA, AveGLogB, . . . , and AveGLogAJ, respectively, and color log averages of the color component B which have been obtained from the blocks A through AJ are calculated as AveBLogA, AveBLogB, . . . , and AveBLogAJ, respectively.

The color log averages in the logarithmic characteristic area with respect to the respective color components R, G, and B are temporarily converted to linear data by data conversion to corresponding values in the linear characteristic area with use of a lookup table stored in the LUT storage 518. Similarly to the above, the block log average luminances AveYLogA, AveYLogB, . . . , and AveLogAJ in the respective detection blocks A through AJ are calculated in accordance with the color space conversion equation in a similar manner as mentioned above, with use of the linear data. Then, an average luminance with respect to the entirety of the block log average luminances AveYlogA, AveYLogB, . . . , and AveYLogAJ is calculated, and set as MainYLog. The average luminance MainYLog is the sensor output VtLogLin corresponding to the logarithmic characteristic area average luminance LtLog. Alternatively, the color linear averages or the color log averages in the respective detection blocks A through AJ with respect to the respective color components R, G, and B may be obtained by calculating a luminance histogram in the linear characteristic area or in the logarithmic characteristic area with respect to each of the detection blocks A through AJ, applying the Gaussian pruning to the luminance histograms, and averaging the respective luminances after the Gaussian pruning.

The following is a modified process for calculating the Gain as the exposure amount control parameter, which has been described referring to FIGS. 19 and 20. First, a maximum luminance (called as "color maximum value") in each of the detection blocks A through AJ in the main subject image area 331 is calculated with respect to each of the color components R, G, and B. Specifically, the color maximum values of the color component R in the detection blocks A through AJ are calculated as MaxRA, MaxRB, . . . , and MaxRAJ, respectively. Similarly, the color maximum values of the color component G in the detection blocks A through AJ are calculated as MaxGA, MaxGB, . . . , and MaxGAJ, respectively, and the color maximum values of the color component B in the detection blocks A through AJ are calculated as MaxBA, MaxBB, . . . , and MaxBAJ, respectively. Then, a maximum block luminance in each of the detection blocks A through AJ is calculated in accordance with the following color space conversion equation with use of the maximum luminance with respect to each of the color components R, G, and B. For instance, a maximum block luminance MaxYA is obtained by implementing the following equation where MaxYA represents a maximum block luminance in the detection block A.

$$MaxYA = MaxRA \cdot K1 + MaxGA \cdot K2 + MaxBA \cdot K3$$

where K1=0.2989, K2=0.5866, and K3=0.1145, respectively, which is the same as in obtaining the block linear average luminance.

Calculation is implemented with respect to the detections blocks B through AJ in a similar manner as the calculation is implemented with respect to the detection block A. Thus, maximum block luminances MaxYA, MaxYB, . . . , and MaxYAJ are calculated in the respective blocks A through AJ. Then, a maximum luminance with respect to the entirety of the maximum block luminances MaxYA, MaxYB, . . . , and MaxYAJ is calculated, and set as MaxY. The maximum luminance MaxY is a maximum luminance in the main subject image area 331. The maximum luminance MaxY is the sensor output VtAve2 corresponding to the luminance Ltmax shown in FIG. 21.

Similarly, a minimum luminance (called as "color minimum value") in each of the detection blocks A through AJ is calculated with respect to each of the color components R, G, and B, and the calculated color minimum values are set as MinRA, MinRB, . . . , and MinRAJ case of the color component R; MinGA, MinGB, and MinGAJ in case of the color component G; and MinBA, MinBB, . . . , and MinBAJ in case of the color component B. Then, minimum block luminances MinYA, MinYB, . . . , and MinYAJ are calculated with respect to the respective detection blocks A through AJ in accordance with the color space conversion equations in a similar manner as mentioned above, with use of the minimum luminances with respect to the color components R, G, and B. Subsequently, a minimum value (called as "minimum luminance in the main subject image area 331") with respect to the entirety of the minimum block luminances MinYA, MinYB, . . . , and MinYAJ is calculated, and set as MinY. The minimum luminance MinY is the sensor output VtAve1 corresponding to the luminance Ltmin shown in FIG. 21.

A color space conversion is conducted after the color maximum values and the color minimum values located in the logarithmic characteristic area are similarly converted into values in the linear characteristic area using a lookup table. Alternatively, the color maximum values or the color minimum values in the respective detection blocks A through AJ with respect to the respective color components R, G, and B may be obtained by calculating a luminance histogram with respect to each of the detection blocks A through AJ, applying the Gaussian pruning to the luminance histograms, and performing a predetermined computation with use of the luminances after the Gaussian pruning.

Alternatively, as shown in FIG. 21, it is possible to calculate a gain, namely, Vta1/VtAve1 (called as "first gain"), which makes it possible to match the sensor output VtAve1 corresponding to the luminance Ltmin with a predetermined target output Vta1, to calculate a gain, namely, Vta2/VtAve2 (called as "second gain"), which makes it possible to match the sensor output VtAve2 corresponding to the luminance Ltmax with a predetermined target output Vta2, to select a smaller gain between the first gain and the second gain, and to execute the flowchart in FIG. 20 for calculating the exposure time gain Gt and the aperture gain Gs.

Further alternatively, it is possible to select a larger gain between the first gain and the second gain, or to perform computation with use of the first gain or the second gain exclusively, in place of comparing the first gain with the second gain for selection. Further alternatively, it is possible to use an average of the first gain and the second gain. The values of Vta1 and Vta2 are stored in the exposure amount control parameter calculator 511 or the output level judging section 530, or the like.

Alternatively, it is possible to calculate the minimum luminance MinY and the maximum luminance MaxY based on the entire luminance histogram with respect to the entirety of the detection blocks A through AJ, which is obtained by integrating the luminance histograms with respect to the detection blocks A through AJ. In such an altered arrangement, the luminance range in the entire luminance histogram is calculated by applying the Gaussian pruning in a similar manner as mentioned above, and the minimum luminance MinY and the maximum luminance MaxY are calculated based on the luminance range. Alternatively, it is possible to obtain one of the maximum and minimum luminances based on the luminance and the luminance range of the other one of the maximum and minimum luminances. For instance, the minimum luminance MinY=maximum luminance MaxY−luminance range, and the maximum luminance MaxY=minimum luminance MinY+luminance range.

(Detailed Description on Dynamic Range Control Parameter Calculating Process)

Next, a process for calculating a dynamic range control parameter, namely, a photoelectric conversion characteristic setting value by the dynamic range control parameter calculator 512 based on the AE evaluation values detected by the evaluation value detector 405 in the dynamic range control as shown in FIG. 18B is described in detail.

Figure 22A:
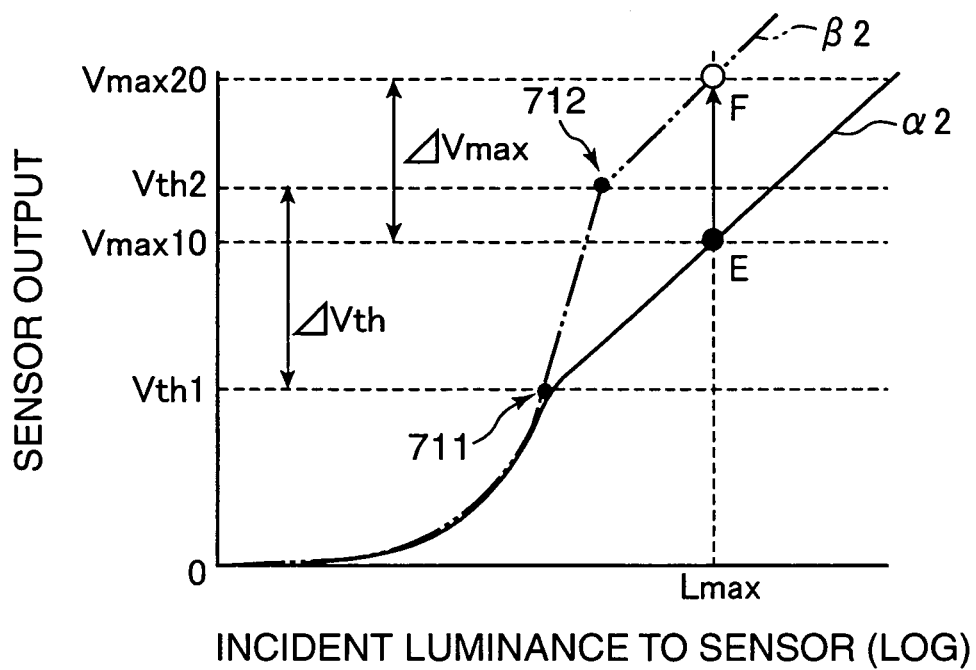
Figure 22B:
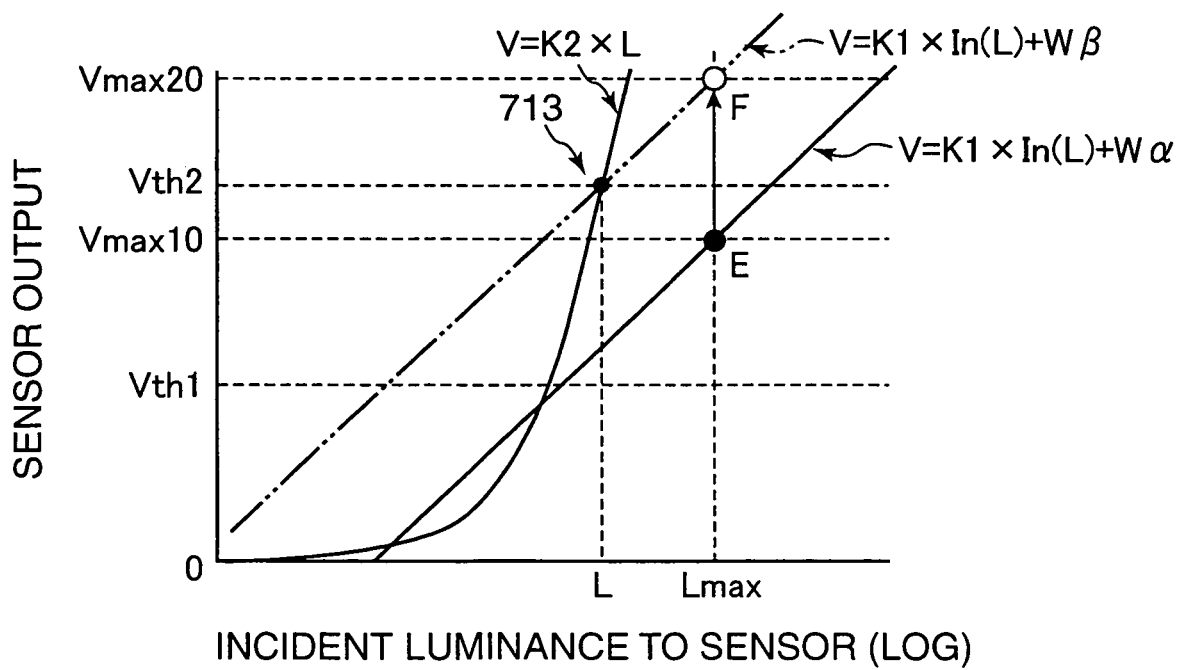

FIGS. 22A and 22B are graphs each for explaining a process for calculating the position of an inflection point of a photoelectric conversion characteristic in calculating the dynamic range control parameter, wherein FIG. 22A shows a case that the photoelectric conversion characteristic is changed to attain a predetermined sensor output corresponding to the luminance Lmax, and FIG. 22B shows a case that the photoelectric conversion characteristic is modeled.

Referring to FIG. 22A, the luminance Lmax denotes a luminance for dynamic range setting, and, for instance, corresponds to the luminance Lm20 shown in FIG. 18B, the reference numeral $\alpha 2$ denotes a photoelectric conversion characteristic having an inflection point 711 before shifting, and the reference numeral $\beta 2$ denotes a photoelectric conversion characteristic having an inflection point 712 after shifting. Vmax20 represents a saturated output level or a maximum output level of the image sensor 30. The photoelectric conversion characteristic is changed in such a manner that the sensor output corresponding to the luminance Lmax is shifted from Vmax10 at the point E on the photoelectric conversion characteristic $\alpha 2$ to Vmax20 at the point F on the photoelectric conversion characteristic $\beta 2$. In this case, the photoelectric conversion characteristic $\alpha 2$ is shifted to the photoelectric conversion characteristic $\beta 2$ by a changed amount $\Delta Vth$ of the inflection point which makes it possible to match the sensor output Vth1 at the inflection point 711 with the sensor output Vth2 at the inflection point 712.

The sensor output Vth2 is obtained by implementing the equation: $\Delta Vmax = Vmax20 - Vmax1$ where $\Delta Vmax$ represents a sensor output difference between the points E and F. A process for calculating the sensor output Vth2 is described. As shown in FIG. 22B, a linear characteristic area and a logarithmic characteristic area in each of the photoelectric conversion characteristics $\alpha 2$ and $\beta 2$ are expressed in graph-based modeling in terms of the following functions, namely, mathematical equations.

Function by Modeling the Linear Characteristic Area:

$V = K2 \cdot L$ (common for the photoelectric conversion characteristics $\alpha 2$ and $\beta 2$)

Function by Modeling the Logarithmic Characteristic Area:

$V = K1 \cdot ln(L) + W\alpha$ (in case of the photoelectric conversion characteristic $\alpha 2$)

$V = K1 \cdot ln(L) + W\beta$ (in case of the photoelectric conversion characteristic $\beta 2$)

where K1 and K2 each represents a constant, L represents an incident luminance to the image sensor 30 along the axis of abscissas in FIGS. 22A and 22B, and $W\alpha$ and $W\beta$ each represents an intercept.

Since the sensor output difference ΔVmax is represented by ΔVmax=Wβ−Wα, the equation: V=K1·ln(L)+Wβ is expressed by the following equation:

$$V = K1 \cdot ln(L) + W\alpha + \Delta Vmax$$

Vth2 is a sensor output at an intersection 713 of the above equation and the equation: V=K2·L. Accordingly, the sensor output Vth2 corresponding to the luminance L is calculated by obtaining the value "L" that satisfies the following simultaneous equation of these two equations for calculating the intersection 713 or coordinates, namely, by obtaining the luminance L shown in FIG. 22B.

$$K1 \cdot ln(L) + W\alpha + \Delta Vtarget = K2 \cdot L$$

If, however, the calculated output level Vth2 exceeds the saturated output level Vmax20, the photoelectric conversion characteristic of the image sensor 30 consists of a linear characteristic area without inclusion of a logarithmic characteristic area.

A setting value for the image sensor 30 corresponding to the calculated sensor output Vth2, namely, a photoelectric conversion characteristic setting value for changing the photoelectric conversion characteristic that makes it possible to shift the inflection point of the photoelectric conversion characteristic to the point corresponding to the sensor output Vth2 is calculated by data conversion for making the sensor output Vth1 coincident with the sensor output Vth2 with use of a lookup table. The photoelectric conversion characteristic setting value calculated by the data conversion is stored in the photoelectric conversion characteristic information storage 516. The dynamic range control signal generator 521 generates a control signal to the timing generating circuit 31 to change the position of the inflection point of the photoelectric conversion characteristic of the image sensor 30 in a manner as mentioned above based on the photoelectric conversion characteristic setting value calculated by the dynamic range control parameter calculator 512.

The following is an example of a process for calculating the sensor output level Vmax10 corresponding to the luminance Lmax for dynamic range setting shown in FIGS. 22A and 22B. First, similarly to the calculation of the sensor output level VtLog corresponding to the logarithmic characteristic area average luminance LtLog shown in FIG. 19, a logarithmic characteristic area average luminance in the main subject image area 331 constituted of the detection blocks A through AJ shown in FIG. 15 is calculated, and a logarithmic characteristic area average luminance in the peripheral subject image area 332 constituted of the first through sixteenth detection blocks is calculated, as in the case of calculating the logarithmic characteristic area average luminance in the main subject image area 331. Then, a larger logarithmic characteristic area average luminance is selected between the logarithmic characteristic area average luminances in the main subject image area 331 and in the peripheral subject image area 332, and the sensor output level corresponding to the selected logarithmic characteristic area average luminance is set to Vmax10.

Alternatively, the following arrangement is proposed. A sensor output corresponding to the linear characteristic area average luminance, which is obtained in a similar manner as obtaining the linear characteristic area average luminance LtLin shown in FIG. 19, is calculated in the main subject image area 331 and in the peripheral subject image area 332, as well as the logarithmic characteristic area average luminances. An entire characteristic area average luminance is calculated with respect to each of the main subject image area 331 and the peripheral subject image area 332 by averaging the linear characteristic area average luminance and the logarithmic characteristic area average luminance in each of the main subject image area 331 and the peripheral subject image area 332. Then, a sensor output corresponding to a larger entire characteristic area average luminance between the entire characteristic area average luminances in the main subject image area 331 and in the peripheral subject image area 332 may be set as a sensor output corresponding to the luminance Lmax. If the entire characteristic area average luminances are identical to each other in the main subject image area 331 and in the peripheral subject image area 332, a sensor output corresponding to any of the entire characteristic area average luminances may be set as a sensor output corresponding to the luminance Lmax. The same idea is applicable to the control mentioned in the following sections.

Alternatively, the sensor output corresponding to the luminance Lmax may be obtained from the logarithmic characteristic area average luminance in the main subject image area 331, or from the entire characteristic area average luminance comprised of the logarithmic characteristic area average luminance and the linear characteristic area average luminance in the main subject image area 331, or may be obtained from the logarithmic characteristic area average luminance in the peripheral subject image area 332, or from the entire characteristic area average luminance comprised of the logarithmic characteristic area average luminance and the linear characteristic area average luminance in the peripheral subject image area 332.

The following is a modified process for calculating the sensor output corresponding to the luminance Lmax. First, similarly to the calculation of the sensor output corresponding to the maximum luminance Ltmax or MaxY as shown in FIG. 21, the maximum luminance in the main subject image area 331 is calculated. Likewise, the maximum luminance in the peripheral subject image area 332 is calculated in a similar manner as calculating the maximum luminance in the main subject image area 331. Then, a larger maximum luminance is selected between the maximum luminances in the main subject image area 331 and in the peripheral subject image area 332, and the sensor output level corresponding to the selected maximum luminance is obtained, and the luminance corresponding to the sensor output level is set as the luminance Lmax. Alternatively, it is possible to obtain the sensor output corresponding to the luminance Lmax based on the maximum luminance in the main subject image area 331, or to obtain the sensor output corresponding to the luminance Lmax based on the maximum luminance in the peripheral subject image area 332.

Figure 23A:
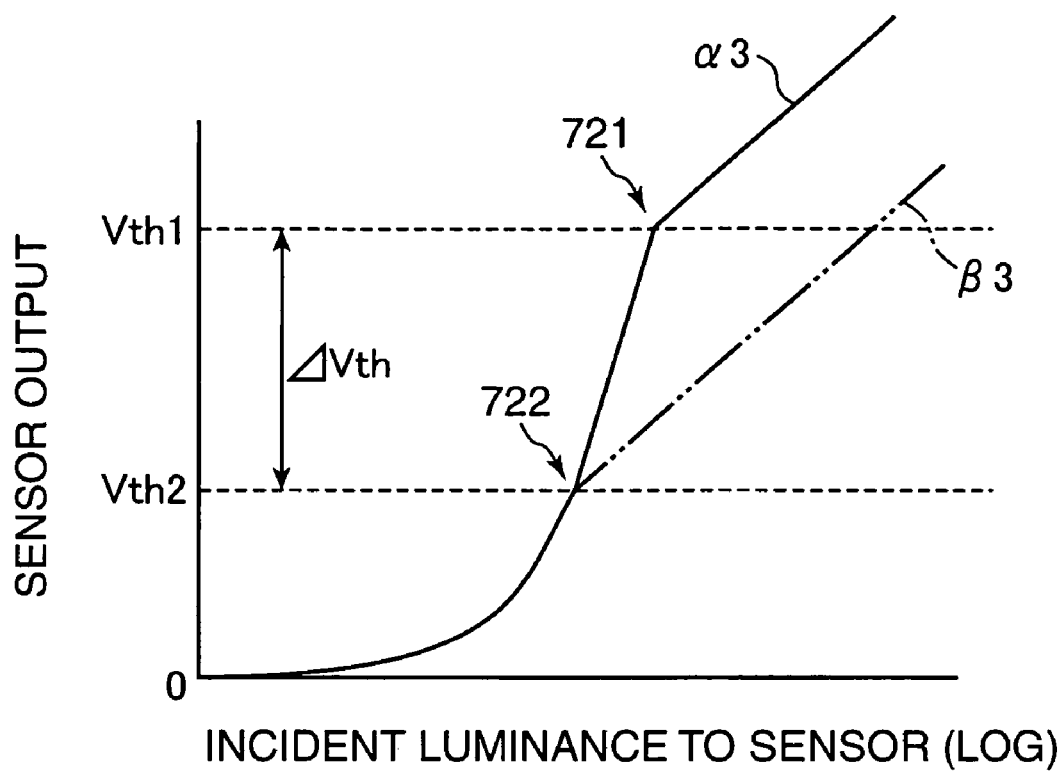
Figure 23B:
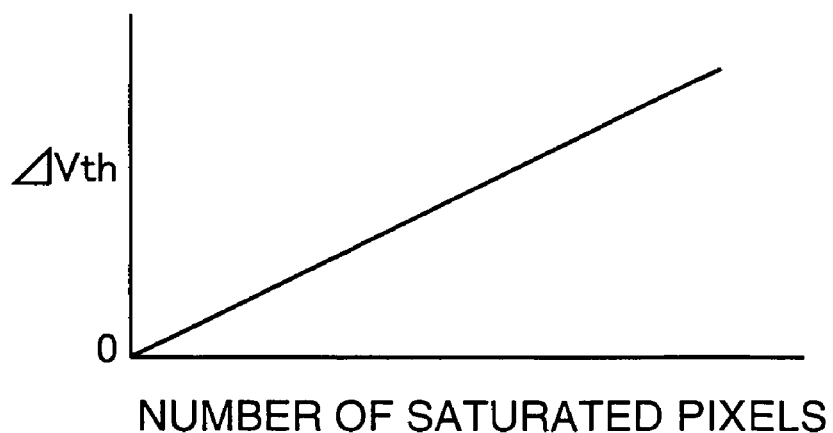

As shown in FIGS. 22A and 22B, control of the photoelectric conversion characteristic based on the photoelectric conversion characteristic setting value, namely, control of the position of the inflection point is performed, as described in FIG. 15, based on a judgment result of the saturation judging section 4055 (see FIG. 14) that the output level of the image sensor 30 is not saturated. If the saturation judging section 4055 judges that the output level of the image sensor 30 is saturated, as shown in FIG. 23A, the photoelectric conversion characteristic is changed in such a manner that the output level of the image sensor 30 at the inflection point is lowered by the changed amount ΔVth depending on the number of saturated pixels, namely, the dynamic range is widened to allow the image sensor 30 to perform a sensing operation at a higher luminance side. Here, a photoelectric conversion characteristic α3 is changed to a photoelectric conversion characteristic β3. As shown in FIG. 23B, the changed amount ΔVth is set in such a manner that the changed amount ΔVth is increased as the number of the saturated pixels is increased, and calculation of the changed amount ΔVth corresponding to the number of the saturated pixels is carried out by data conversion using a lookup table. By subtracting the calculated changed amount ΔVth from the output level Vth1 at the inflection point 721 of the photoelectric conversion characteristic α3 at the time of acquiring the AE evaluation values, the output level Vth2 at the inflection point 722 of the photoelectric conversion characteristic β3 after the shifting is obtained, so that the dynamic range is widened as compared with the photoelectric conversion characteristic α3. Further, the setting value of the photoelectric conversion characteristic of the image sensor 30 in relation to the sensor output Vth2 is calculated by data conversion using a lookup table. The photoelectric conversion characteristic setting value in relation to the sensor output Vth2 obtained by data conversion is stored in the photoelectric conversion characteristic information storage 516.

As described above, the AE control is performed by the exposure amount control (A) and the dynamic range control (B). In the following, a process for prioritizing calculation of the exposure amount control parameter or calculation of the dynamic range control parameter, namely, the exposure amount control or the dynamic range control is described in detail.

The following two modes (1) and (2) are conceived as the priority order concerning calculation of the exposure amount control parameter and the dynamic range control parameter in performing the AE control by the exposure amount control and the dynamic range control, namely, calculation of the control parameters:

(1) Exposure Amount Control Parameter Calculation Prioritizing Mode:

In this mode, calculation of the exposure amount control parameter is prioritized, followed by calculation of the dynamic range control parameter.

(2) Dynamic Range Control Parameter Calculation Prioritizing Mode:

In this mode, calculation of the dynamic range control parameter is prioritized, followed by calculation of the exposure amount control parameter.

Figure 24A:
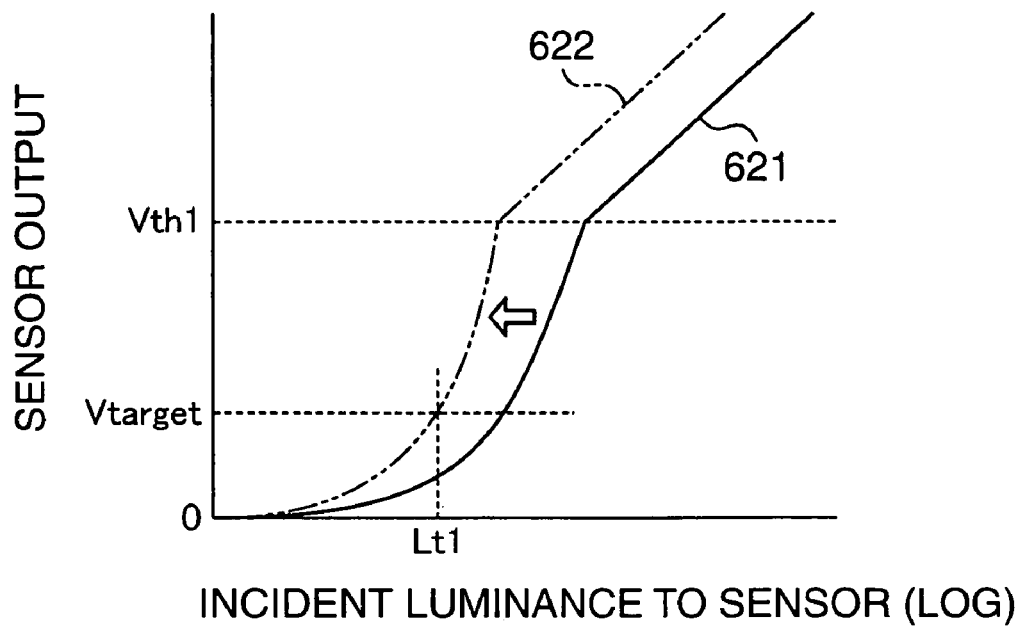
Figure 24B:
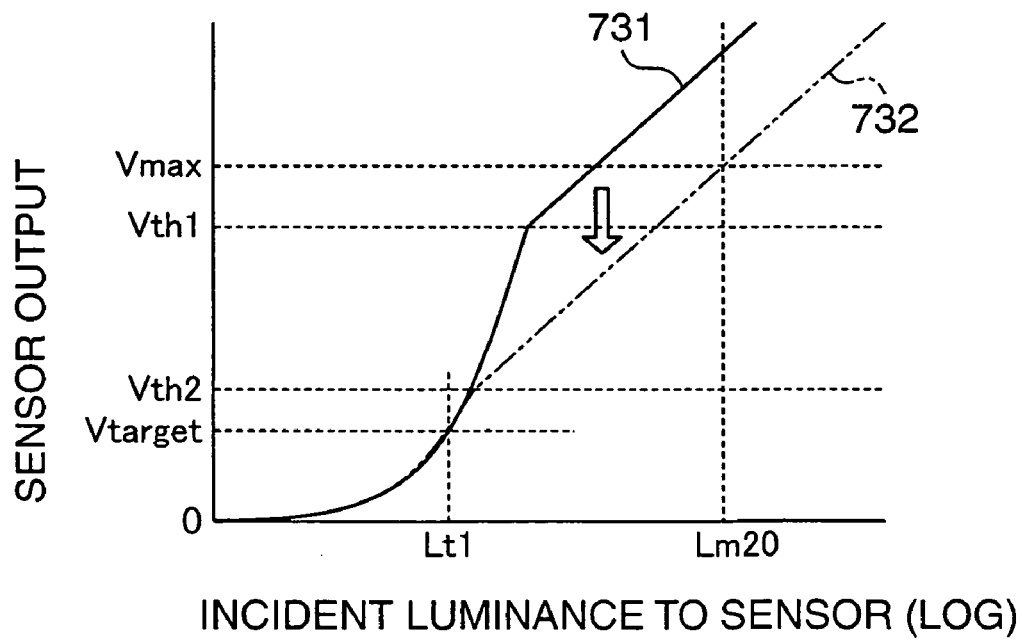

First, description is made on the exposure amount control parameter calculation prioritizing mode (1). FIGS. 24A and 24B are graphs each showing how the photoelectric conversion characteristic of the image sensor 30 is changed in performing AE control in the exposure amount control parameter calculation prioritizing mode, wherein FIG. 24A shows a case that the exposure amount control parameter is calculated, and FIG. 24B shows a case that the dynamic range control parameter is calculated. In this mode, calculation of the exposure amount control parameter shown in FIG. 24A is prioritized, followed by calculation of the dynamic range control parameter shown in FIG. 24B.

Referring to FIG. 24A, the exposure amount control parameter calculator 511 calculates an exposure amount control parameter i.e. an exposure amount setting value such as an exposure time setting value and an aperture setting value by using the AE evaluation values detected by the evaluation value detector 405, so that a photoelectric conversion characteristic capable of matching the sensor output of the image sensor 30 corresponding to the subject luminance Lt1 for exposure amount setting with a predetermined target output level Vtarget is obtained in the linear characteristic area. Since the process for calculating the exposure amount control parameter is the same as the process described in FIG. 18A, description thereof is omitted herein. In calculation of the exposure amount control parameter shown in FIG. 24A, the exposure amount control parameter for increasing the exposure amount such as the exposure time and the aperture area is calculated in such a manner that the photoelectric conversion characteristic 621 obtained at the time of acquiring the AE evaluation values is shifted to the photoelectric conversion characteristic 622 so as to match the sensor output corresponding to the luminance Lt1 with the target output level Vtarget. The photoelectric conversion characteristic 621 may be a predetermined fixed photoelectric conversion characteristic stored in the photoelectric conversion characteristic information storage 516, or may be a photoelectric conversion characteristic which has been set at the time of acquiring the AE evaluation values last time.

After the calculation of the exposure amount control parameter shown in FIG. 24A, calculation of the dynamic range control parameter as shown in FIG. 24B is performed. At this time, the dynamic range control parameter calculator 512 calculates a dynamic range control parameter i.e. a photoelectric conversion characteristic setting value by using the AE evaluation values detected by the evaluation value detector 405, so that a photoelectric conversion characteristic capable of matching the sensor output of the image sensor 30 corresponding to a subject luminance for dynamic range setting i.e. a maximum subject luminance Lm20 with a predetermined saturated output level Vmax of the image sensor 30 is obtained. Since the process for calculating the dynamic range control parameter is the same as the process described in FIG. 18B, description thereof is omitted herein. In calculating the dynamic range control parameter shown in FIG. 24B, the dynamic range control parameter is lowered, so that a photoelectric conversion characteristic 731 is shifted to a photoelectric conversion characteristic 732, namely, the output level at the inflection point is decreased from Vth1 to Vth2 so as to match the sensor output corresponding to the luminance Lm20 with the saturated output level Vmax. The photoelectric conversion characteristic 731 corresponds to the photoelectric conversion characteristic 622 after the calculation of the exposure amount control parameter in FIG. 24

In case of calculating the dynamic range control parameter in FIG. 24B, namely, shifting the photoelectric conversion characteristic 731 to the photoelectric conversion characteristic 732, the sensor output Vth2 at the inflection point of the photoelectric conversion characteristic 732 after the shifting is calculated. If the sensor output Vth2 is lower than a certain output level Vlimit, which is a reference lower limit, calculation is performed to correctively raise the output level Vth2 by a certain output level value, so that the output level Vth2 is equal to or larger than the reference lower limit Vlimit. The reference lower limit Vlimit is set in advance by setting the target output level Vtarget shown in FIG. 24A as a reference value and by implementing the following equation.

$$Vlimit = Vtarget + \Delta V$$

where ΔV represents a predetermined output level value. The value ΔV is a value capable of securing the exposure amount which has been secured on the priority basis in the exposure amount control shown in FIG. 24A, specifically, an exposure amount that makes it possible to match the output level corresponding to the subject luminance Lt1 with the target output level Vtarget.

In this way, under the exposure control in the exposure amount control parameter calculation prioritizing mode, there is provided a limit or a constraint regarding calculation of the parameter for controlling the photoelectric conversion characteristic such as the output level Vth2 and the dynamic range control parameter.

The raising of the output level Vth2 for correction may be performed one time by calculating the difference between the output level Vth2 and the reference lower limit Vlimit, or may be performed a certain number of times by raising the output level Vth2 by a predetermined value stepwise. As far as the output level Vth2 can be raised to or above the reference lower limit Vlimit by one time operation, the raising operation is performed one time. Further alternatively, corrective calculation may be performed in such a manner that the output level Vth2 after the corrective calculation is not lower than the reference lower limit Vlimit, in place of calculating the output level Vth2 for correction, and comparing the calculated output level Vth2 with the reference lower limit Vlimit. Further alternatively, it is possible to obtain a photoelectric conversion characteristic having an inflection point serving as a reference level in advance, to store the control parameter for obtaining the photoelectric conversion characteristic, to compare the stored control parameter with a control parameter obtained by computation, and to replace the computed control parameter with the stored control parameter if the output level Vth2 is lower than the reference lower limit Vlimit, in place of directly calculating the output level Vth2 at the inflection point, and comparing the calculated output level Vth2 with the reference lower limit Vlimit.

Figure 25A:
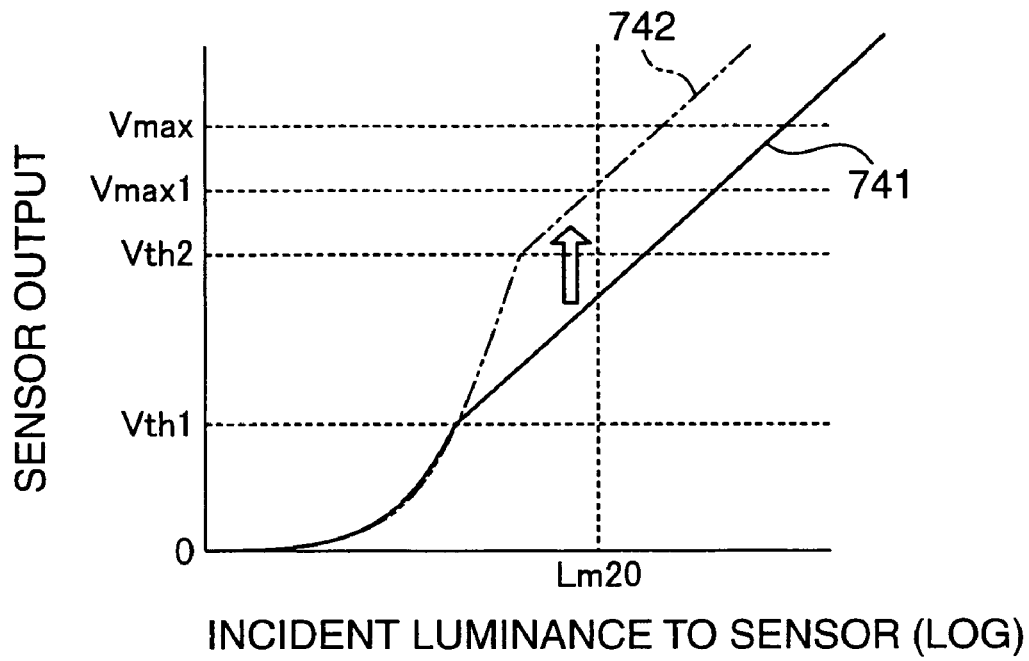
Figure 25B:
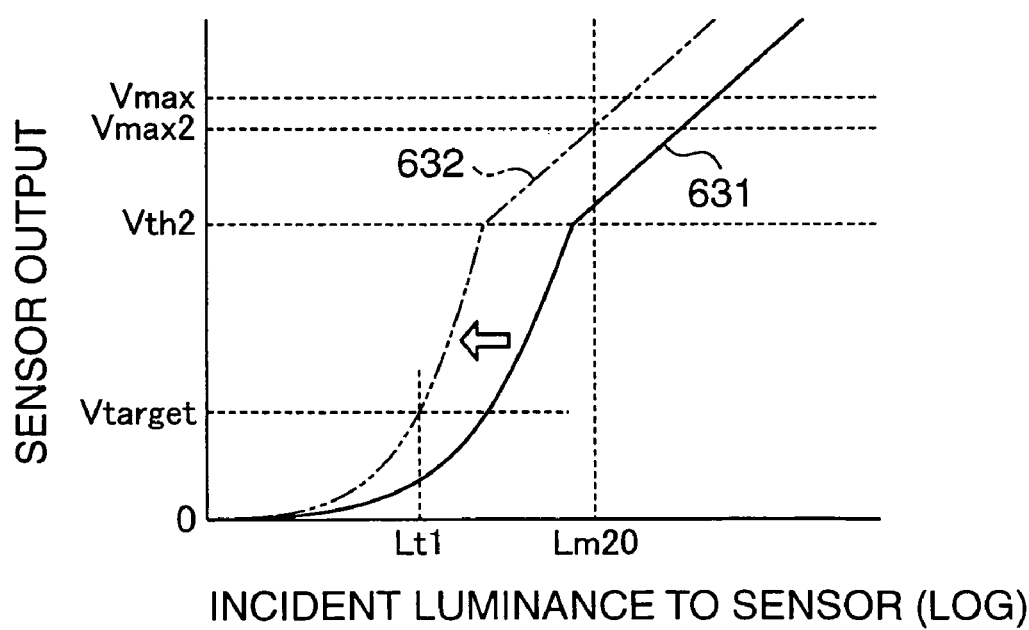

Next, the mode (2) of prioritizing calculation of the dynamic range control parameter is described. FIGS. 25A and 25B are graphs each showing how the photoelectric conversion characteristic of the image sensor 30 is changed in performing AE control in the dynamic range control parameter calculation prioritizing mode, wherein FIG. 25A shows a case that the dynamic range control parameter is calculated, and FIG. 25B shows a case that the exposure amount control parameter is calculated. In this mode, calculation of the dynamic range control parameter shown in FIG. 25A is prioritized, followed by calculation of the exposure amount control parameter shown in FIG. 25B.

Referring to FIG. 25A, the dynamic range control parameter calculator 512 calculates a dynamic range control parameter by using the AE evaluation values detected by the evaluation value detector 405, so that a photoelectric conversion characteristic capable of matching the sensor output of the image sensor 30 corresponding to the subject luminance for dynamic range setting i.e. the maximum subject luminance Lm20 with a predetermined provisional saturated output level Vmax1 which has been provisionally set for the dynamic range setting (hereinafter, called as "provisional saturated output level Vmax1") is obtained. Since the process for calculating the dynamic range control parameter is the same as the process described in FIG. 18B, description thereof is omitted herein. The provisional saturated output level Vmax1 is a provisionally set value based on an assumption that the entirety of the photoelectric conversion characteristic will be shifted or moved in the direction shown by the arrow in FIG. 25B by performing the exposure amount control shown in FIG. 25B following the dynamic range control, and that the output level i.e. the provisional saturated output level Vmax1 corresponding to the luminance Lm20 after the dynamic range control will be changed accordingly. Alternatively, the value of the provisional saturated output level Vmax1 may be set as the saturated output level Vmax.

In calculation of the dynamic range control parameter shown in FIG. 25A, the dynamic range control parameter for increasing the output level of the image sensor 30 at the inflection point from Vth1 to Vth2 is calculated, so that a photoelectric conversion characteristic 741 obtained at the time of acquiring the AE evaluation values is shifted to a photoelectric conversion characteristic 742 to match the sensor output corresponding to the luminance Lm20 with the provisional saturated output level Vmax1. The photoelectric conversion characteristic 741 may be a predetermined fixed photoelectric conversion characteristic stored in the photoelectric conversion characteristic information storage 516, or may be a photoelectric conversion characteristic which has been set at the time of acquiring the AE evaluation values last time.

After the calculation of the dynamic range control parameter shown in FIG. 25A, calculation of the exposure amount control parameter as shown in FIG. 25B is performed. At this time, the exposure amount control parameter calculator 511 calculates an exposure amount control parameter, by using the AE evaluation values detected by the evaluation value detector 405, so that a photoelectric conversion characteristic capable of matching the sensor output of the image sensor 30 corresponding to a subject luminance Lt1 for exposure amount setting with a predetermined target output level Vtarget is obtained in the linear characteristic area. Since the process for calculating the exposure amount control parameter is the same as the process described in FIG. 18A, description thereof is omitted herein. In calculating the exposure amount control parameter shown in FIG. 25B, the exposure amount control parameter for increasing the exposure amount such as the exposure time and the aperture area is calculated, so that a photoelectric conversion characteristic 631 is shifted to a photoelectric conversion characteristic 632 so as to match the sensor output corresponding to the luminance Lt1 with the target output level Vtarget. The photoelectric conversion characteristic 631 corresponds to the photoelectric conversion characteristic 742 after the calculation of the dynamic range control parameter in FIG. 25A.

In case of calculating the exposure amount control parameter in FIG. 25B, namely, shifting the photoelectric conversion characteristic 631 to the photoelectric conversion characteristic 632, the sensor output Vmax2 corresponding to the subject luminance Lm20 in the photoelectric conversion characteristic 632 after the shifting is calculated. If the sensor output Vmax2 is larger than the saturated output level Vmax of the image sensor 30, calculation is performed to correctively lower the output level Vmax2 by a certain output level value, so that the output level Vmax2 is equal to or lower than the saturated output level Vmax.

Calculation of lowering the output level Vmax2 by the predetermined output level value may be a calculation of lowering an exposure amount gain (Gain), which makes it possible to match the sensor output corresponding to the luminance Lt1 with the target level Vtarget, namely, to match the sensor output corresponding to the luminance Lm20 with the sensor output Vmax2 by a predetermined gain value, or may be a calculation of lowering the exposure time gain Gt or the aperture gain Gs. The exposure amount gain (Gain) is expressed by: Gain=Vtarget/VtAve (see the description relating to FIG. 18A).

In this way, under the exposure control in the dynamic range control parameter calculation prioritizing mode, there is provided a limit or a constraint regarding calculation of the parameters for controlling the exposure amount such as the gains and the exposure amount control parameter.

The lowering of the gain or the like for correction may be performed one time by calculating the difference between the exposure amount gain (Gain) and a gain VmGain where the gain VmGain represents a gain for matching the sensor output corresponding to the luminance Lm20 with the saturated output level Vmax, or may be performed a certain number of times by lowering the gain by a predetermined value stepwise. As far as the exposure amount gain (Gain) is equal to or lower than the gain VmGain by one time lowering operation, the lowering operation is performed one time. Further alternatively, corrective calculation may be performed in such a manner that the output level Vth2 after the corrective calculation is not larger than the saturated output level Vmax, in place of calculating the output level Vmax2 corresponding to the subject luminance Lm20, and comparing the calculated output level Vmax2 with the saturated output level Vmax. Further alternatively, as in the case of the exposure amount control parameter calculation prioritizing mode (1), it is possible to compare a computed control parameter with a stored control parameter, in place of calculating the output level Vmax2 itself and comparing the output level Vmax2 with the saturated output level Vmax.

Figure 26:
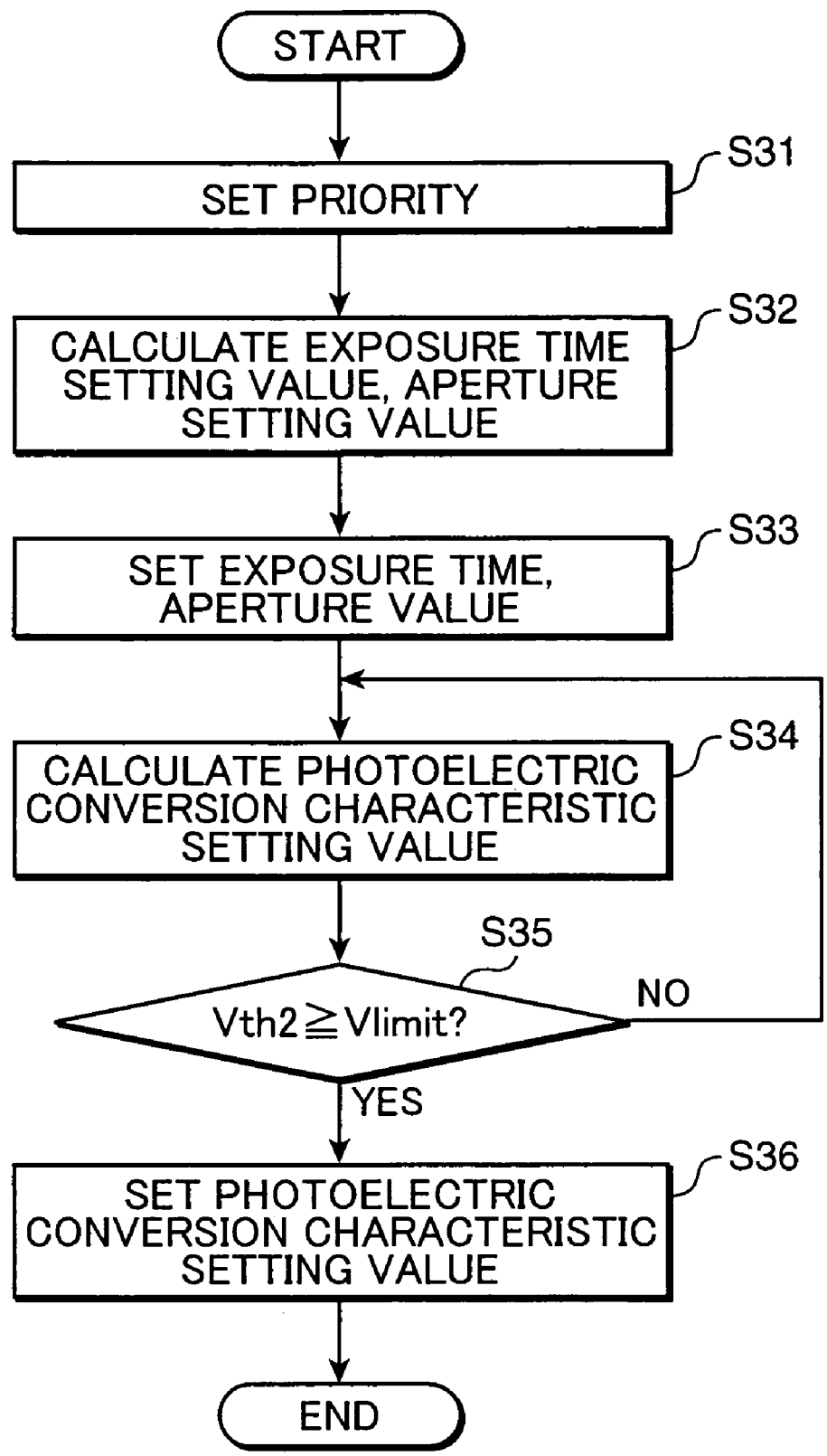
FIG. 26 is a flowchart showing an example of a flow of calculating the respective control parameters in the exposure amount control parameter calculation prioritizing mode shown in FIGS. 24A and 24B.
Figure 27:
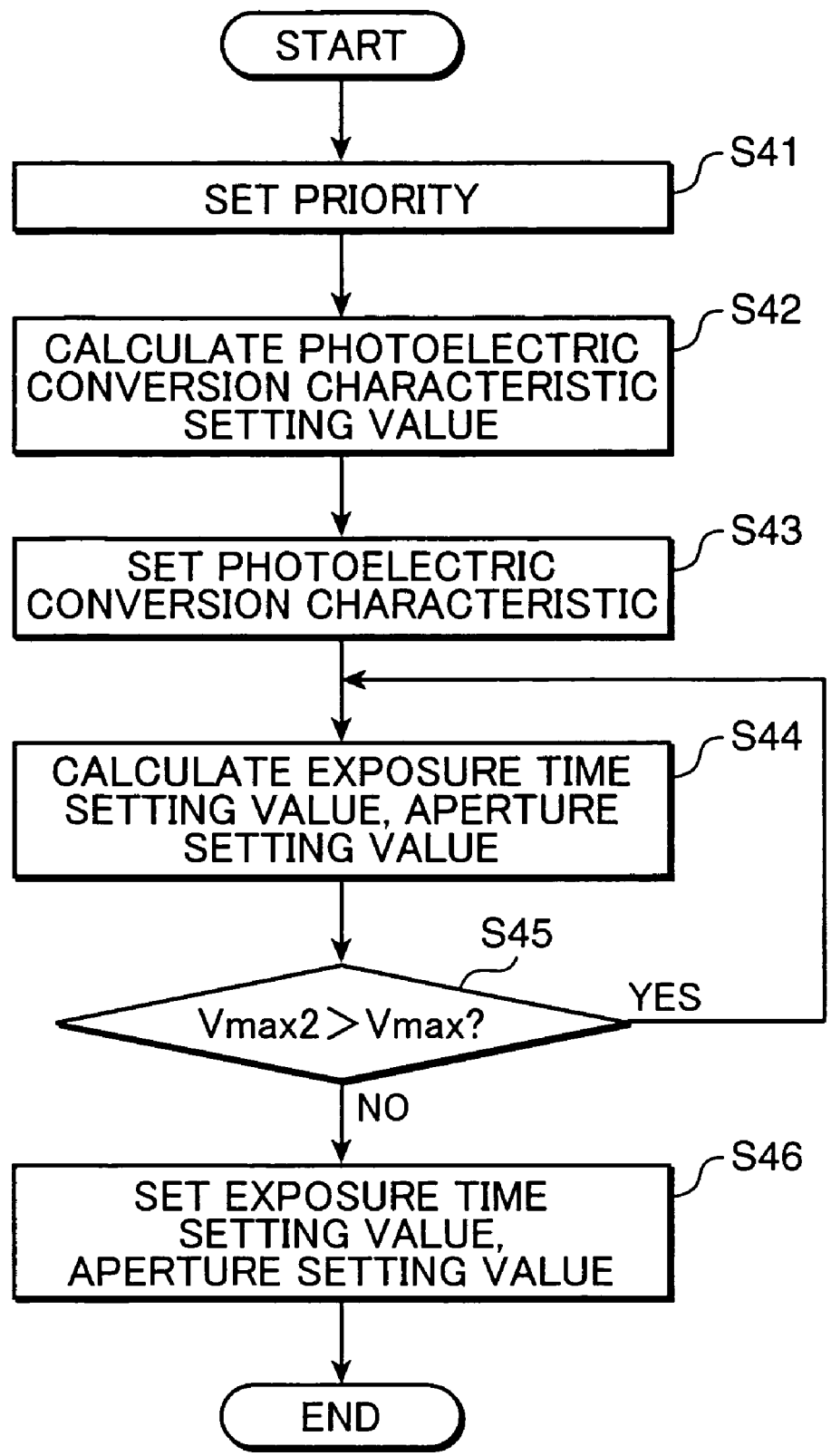
FIG. 27 is a flowchart showing an example of a flow of calculating the respective control parameters in the dynamic range control parameter calculation prioritizing mode shown in FIGS. 25A and 25B.

Next, flows of calculating the respective control parameters in the exposure amount control parameter calculation prioritizing mode (1) and in the dynamic range control parameter calculation prioritizing mode (2) are described referring to FIGS. 26 and 27, respectively.

FIG. 26 is a flowchart showing an example of calculating the respective control parameters in the exposure amount control parameter calculation prioritizing mode (1) shown in FIGS. 24A and 24B. First, the calculation priority setter 5111 sets the priority concerning calculation of the control parameters, specifically, sets the exposure amount control parameter calculation prioritizing mode of prioritizing calculation of the exposure amount control parameter in response to entering of designation by the user with the mode setting switch 105 or the like on the operating section 100 (Step S31). Next, an exposure amount control parameter i.e. an exposure amount setting value such as an exposure time setting value and an aperture setting value is calculated, so that the sensor output of the image sensor 30 corresponding to the subject luminance Lt1 for exposure amount setting coincides with the target output level Vtarget (Step S32). Then, the calculated exposure time setting value and the calculated aperture setting value are stored in the photoelectric conversion characteristic information storage 516 for setting the exposure time setting value and the aperture setting value for the digital camera 1 (Step S33). Subsequently, a dynamic range control parameter i.e. a photoelectric conversion characteristic setting value is calculated, so that the sensor output of the image sensor 30 corresponding to the subject luminance for dynamic range setting i.e. the maximum subject luminance Lm20 coincides with the predetermined saturated output level Vmax (Step S34). Then, the output level judging section 530 judges whether the output level Vth2 at the inflection point of the photoelectric conversion characteristic after the shifting is equal to or larger than the reference lower limit Vlimit (Step S35). If it is judged that Vth2<Vlimit (NO in Step S35), the routine returns to Step S34, and calculation of correctively raising the output level Vth2 by the predetermined output level value is performed, as well as calculation of the photoelectric conversion characteristic setting value in relation to the corrected Vth2. On the other hand, if it is judged that Vth2≧Vlimit (YES in Step S35), the calculated photoelectric conversion characteristic is stored in the photoelectric conversion characteristic storage 516 for setting the photoelectric conversion characteristic setting value for the digital camera 1 (Step S36).

FIG. 27 is a flowchart showing an example of calculating the respective control parameters in the dynamic range control parameter calculation prioritizing mode shown in FIGS. 25A and 25B. First, the calculation priority setter 5111 sets the priority concerning calculation of the control parameters, specifically, sets the dynamic range control parameter calculation prioritizing mode of prioritizing calculation of the dynamic range control parameter in response to entering of designation by the user with the mode setting switch 105 or the like on the operating section 100 (Step S41). Next, a dynamic range control parameter i.e. a photoelectric conversion characteristic setting value is calculated, so that the sensor output of the image sensor 30 corresponding to the subject luminance for dynamic range setting i.e. the maximum subject luminance Lm20 coincides with the predetermined saturated output level Vmax (Step S42). Then, the calculated photoelectric conversion characteristic setting value is stored in the photoelectric conversion characteristic information storage 516 for setting the photoelectric conversion characteristic setting value for the digital camera 1 (Step S43). Subsequently, an exposure amount control parameter i.e. an exposure amount setting value such as an exposure time setting value and an aperture setting value is calculated, so that the sensor output of the image sensor 30 corresponding to the subject luminance Lt1 for exposure amount setting coincides with the predetermined target output level Vtarget (Step S44). Then, the output level judging section 530 judges whether the output level Vmax2 corresponding to the luminance Lm20 in the photoelectric conversion characteristic after the shifting is equal to or larger than the saturated output level Vmax (Step S45). If it is judged that Vmax2>Vmax (YES in Step S45), the routine returns to Step S44, and calculation of correctively lowering the output level Vmax2 by the predetermined output level value e.g. correction for lowering the exposure amount gain (Gain) is performed, as well as calculation of the exposure time setting value and the aperture setting value in relation to the corrected exposure amount gain (Gain). On the other hand, if it is judged that Vmax2≦Vmax (NO in Step S45), the calculated exposure time setting value and the calculated aperture setting value are stored in the photoelectric conversion characteristic storage 516 for setting the exposure time setting value and the aperture setting value for the digital camera 1 (Step S46).

Figure 28:
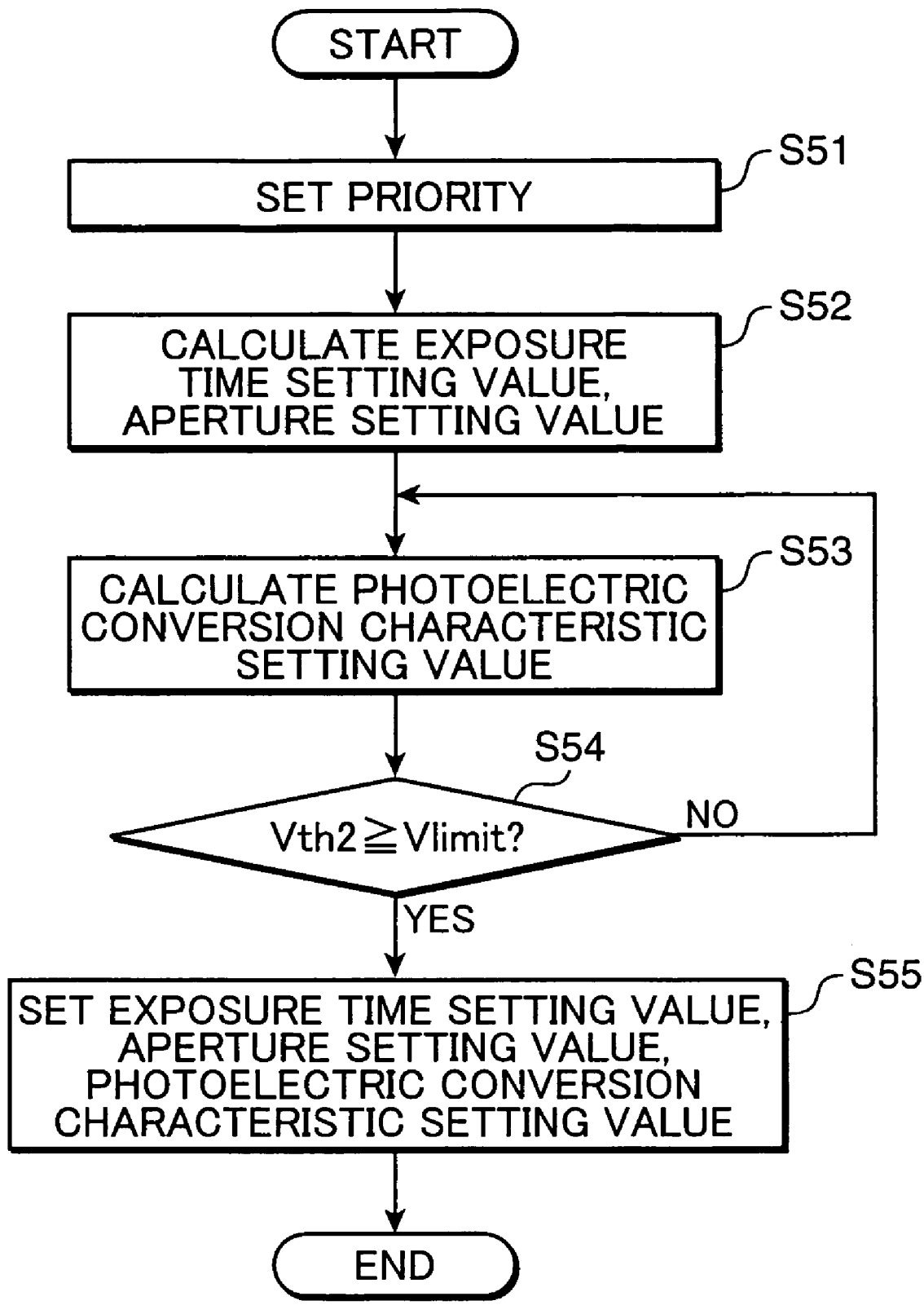
FIG. 28 is a flowchart showing a modification of the flow shown in FIG. 26.
Figure 29:
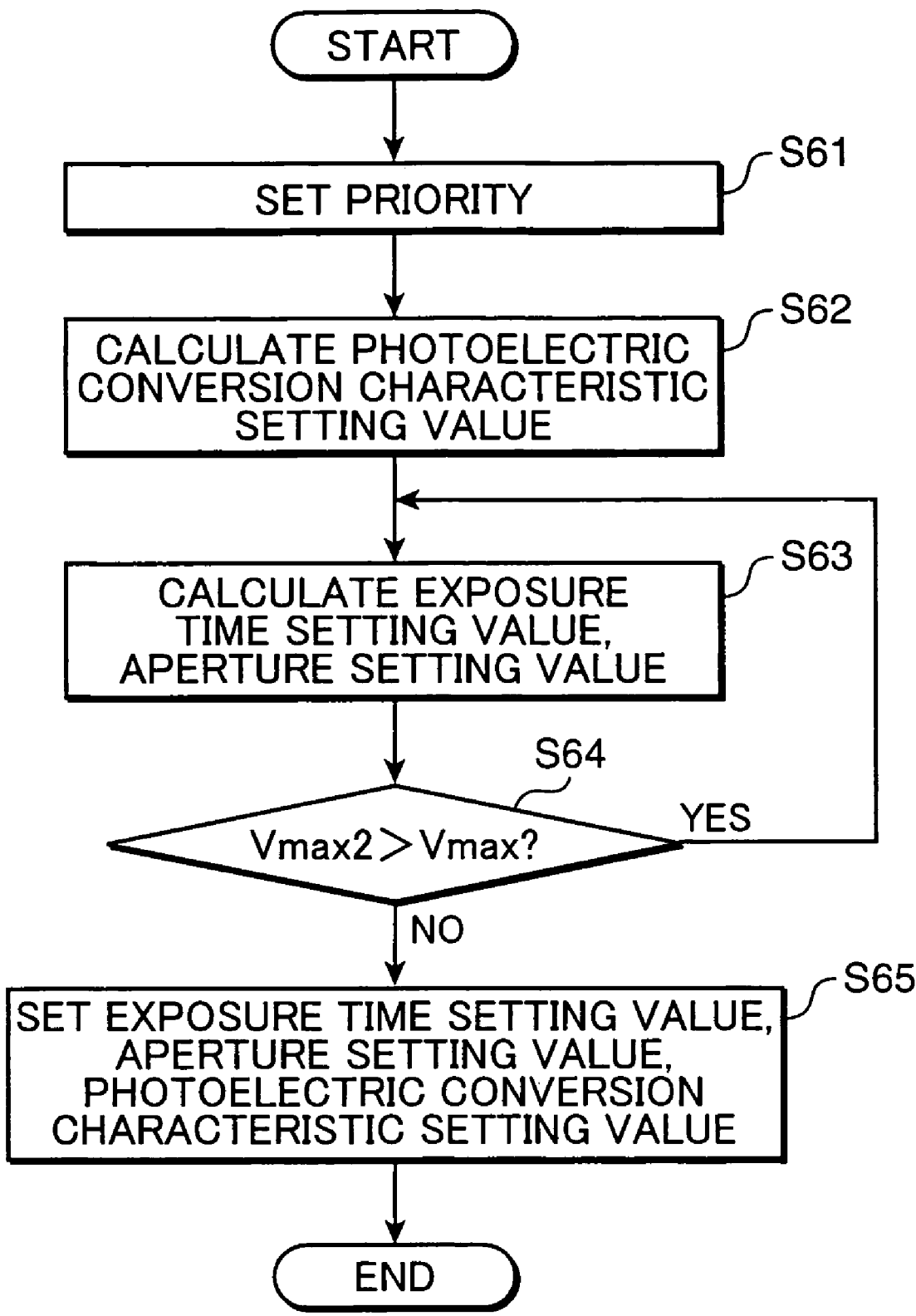
FIG. 29 is a flowchart showing a modification of the flow shown in FIG. 27.

In FIGS. 26 and 27, the respective control parameters are calculated for setting the respective control parameters with respect to each of the exposure amount control parameter calculation and the dynamic range control parameter calculation. Alternatively, as shown in FIGS. 28 and 29, the respective control parameters may be set after all the control parameters are calculated. Specifically, referring to FIG. 28, the calculation priority setter 5111 sets the exposure amount control parameter calculation prioritizing mode as the priority (Step S51). As in the case of Step S32 shown in FIG. 26, an exposure amount control parameter such as an exposure time setting value and an aperture setting value is calculated (Step S52). Subsequently, as in the case of Steps S34 and S35, a dynamic range control parameter i.e. a photoelectric conversion characteristic setting value is calculated (Step S53). Then, the output level judging section 530 judges whether the output level Vth2 is equal to or larger than the reference lower limit Vlimit (Step S54). If it is judged that Vth2<Vlimit (NO in Step S54), the routine returns to Step S53, and calculation of correctively raising the output level Vth2 by the predetermined output level value is performed, as well as calculation of the photoelectric conversion characteristic setting value in relation to the corrected Vth2. On the other hand, if it is judged that Vth2≧Vlimit (YES in Step S54), the exposure time setting value and the aperture setting value calculated in Step S52, and the photoelectric conversion characteristic setting value calculated in Step S53 (NO in Step S54) are stored in the photoelectric conversion characteristic storage 516 for setting the exposure time setting value, the aperture setting value, and the photoelectric conversion characteristic setting value for the digital camera 1 (Step S55).

On the other hand, referring to FIG. 29, the calculation priority setter 5111 sets the dynamic range control parameter calculation prioritizing mode as the priority (Step S61). Next, a dynamic range control parameter i.e. a photoelectric conversion characteristic setting value is calculated as in the case of Step S42 shown in FIG. 27 (Step S62). Then, similar to Steps S44 and S45, an exposure amount control parameter such as an exposure time setting value and an aperture setting value is calculated (Step S63). The output level judging section 530 judges whether the output level Vmax2 is equal to or larger than the saturated output level Vmax (Step S64). If it is judged that Vmax2>Vmax (YES in Step S64), the routine returns to Step S63, and calculation of correctively lowering the output level Vmax2 by the predetermined output level value is performed, as well as calculation of the exposure time setting value and the aperture setting value in relation to the corrected exposure amount gain (Gain). On the other hand, if it is judged that Vmax2≦Vmax (NO in Step S64), the photoelectric conversion characteristic setting value calculated in Step S62, and the exposure time setting value and the aperture setting value calculated in Step S63 (YES in Step S64) are stored in the photoelectric conversion characteristic storage 516 for setting the photoelectric conversion characteristic setting value, the exposure time setting value, and the aperture setting value for the digital camera 1 (Step S65).

In this embodiment, in both of the exposure amount control parameter calculation prioritizing mode (1) and the dynamic range control parameter calculation prioritizing mode (2), the photoelectric conversion characteristic to be used in a sensing operation is determined by two-step calculation consisting of the exposure amount control parameter calculation, and the dynamic range control parameter calculation. Thereby, a process for determining the photoelectric conversion characteristic can be carried out easily and promptly. In this embodiment, the control whose execution has been prioritized is executed prior to the non-prioritized control. Alternatively, the non-prioritized control may be executed prior to the prioritized control by applying the following modifications, for instance.

(Modification 1)

In this modification, the AE control is carried out in the order of the exposure amount control, followed by the dynamic range control. The dynamic range control can be prioritized by eliminating a constraint on the inflection point in the dynamic range control.

(Modification 2)

In this modification, the AE control is carried out in the order of the dynamic range control, followed by the exposure amount control. The exposure amount control can be prioritized by eliminating a constraint on the saturated output level in the exposure amount control.

(Step S3-1) Setting of Exposure Amount Control Parameter:

After calculation of the exposure amount control parameter for AE control according to the process described in Step S2-1, AE control is executed based on the exposure amount control parameter to perform actual shooting. In case of shooting a still image, actual shooting is performed after performing AE control based on the AE evaluation values acquired from an image captured by preliminary shooting. In case of shooting a moving image, the image sensing is performed successively after performing the AE control based on the AE evaluation value acquired from an image captured immediately before.

Specifically, the exposure amount control parameter calculated by the exposure amount control parameter calculator 511 of the main controller 50 is outputted to the control signal generating section 520. Upon receiving the exposure amount control parameter, the respective elements in the control signal generating section 520 generate control signals for operating the timing generating circuit 31 and the driving section 60, which in turn, generate drive signals for causing the respective elements to perform actual exposure amount control operation. More specifically, the sensor exposure time control signal generator 522 of the control signal generating section 520 generates a control signal to the image sensor 30, so that a predetermined exposure time can be secured in accordance with the exposure amount control parameter, and sends the control signal to the timing generating circuit 31. The control signal is, for instance, a signal that makes it possible to set the time ΔS, which causes the signal φVPS for the image sensor 30 to attain a middle potential M in the timing chart shown in FIG. 9, to an appropriate value in accordance with the exposure amount control parameter, namely, a signal that makes it possible to optimize the integration time from the timing t1 when the resetting of the parasitic capacitance of the photodiode PD is ended to the timing t2 when the readout of the video signal of the next frame image is started. The timing generating circuit 31 generates a timing signal for controlling the exposure time of the image sensor 30 in accordance with the inputted control signal to drive the image sensor 30.

Similarly to the sensor exposure time control signal generator 522, the shutter control signal generator 523 generates a control signal for controlling a shutter speed or a shutter opening time of the shutter 23 according to the exposure time based on the exposure amount control parameter. The control signal is sent to the shutter driver 61 of the driving section 60. Upon receiving the control signal, the shutter driver 61 generates a drive signal for driving the shutter 23 based on the control signal to cause the shutter 23 to perform a shutter opening operation according to the exposure amount control parameter.

Similarly to the shutter control signal generator 523, the aperture control signal generator 525 generates a control signal for setting the aperture area of the diaphragm 22 based on the exposure amount control parameter. The control signal is sent to the aperture driver 63. Upon receiving the control signal, the aperture driver 63 generates a drive signal for driving the diaphragm 22 based on the control signal to cause the diaphragm 22 to perform an aperture area setting operation according to the exposure amount control parameter.

As mentioned above, there are three kinds of controls as the exposure amount control, i.e., the integration time control, specifically, driving control of the image sensor 30 by the timing generating circuit 31, shutter speed control, and aperture control. All the three controls may be performed altogether. However, it is desirable to prioritize the electronic-circuitry-based exposure amount control by the timing generating circuit 31, as described referring to the flowchart shown in FIG. 21, in the point of achieving the control in a short time.

(Step S3-2) Setting of Dynamic Range Control Parameter:

If, on the other hand, the dynamic range control parameter for AE control as described in Step S2-2 is calculated, the dynamic range control based on the calculated dynamic range control parameter is carried out. Specifically, the dynamic range control parameter calculated in the dynamic range control parameter calculator 512 of the main controller 50 is outputted to the control signal generating section 520. In response to receiving the dynamic range control parameter, the control signal generator 521 generates a control signal for causing the relevant elements to perform actual dynamic range control operation.

Specifically, the dynamic range control signal generator 521 generates a control signal to the image sensor 30 to control the switching point of the output level, namely, the inflection point, for switching the photoelectric conversion characteristic from a linear characteristic area to a logarithmic characteristic area depending on the photoelectric conversion characteristic setting value of the image sensor 30 which has been calculated in the dynamic range control parameter calculator 512, and sends the control signal to the timing generating circuit 31. The control signal is, for instance, a control signal which makes it possible to desirably set the signal φVPS to the image sensor 30 in the timing chart shown in FIG. 9 in accordance with the calculated dynamic range control parameter.

More specifically, in view of the fact that the inflection point is changed by controlling the intensity of the voltage VPH or the duration of the time ΔT in the signal φVPS, the dynamic range control signal generator 521 generates a control signal for controlling the signal φVPS based on the dynamic range control parameter, and sends the control signal to the timing generating circuit 31. Upon receiving the control signal, the timing generating circuit 31 generates a timing signal to control the dynamic range of the image sensor 30 to drive the image sensor 30 in a predetermined photoelectric conversion characteristic state.

As mentioned above, the operation of the digital camera 1 has been described by primarily focusing on AE control. In the actual digital camera 1, AF control and WB control are performed as well as AE control. Similarly to AE control, AF control can be performed based on the AF evaluation values acquired from the image captured by the image sensor 30. For instance, it is possible to calculate the AF evaluation value by a so-called "hill-climbing search technique", wherein luminance histograms obtained from the detection blocks O, P, U, and V of the main subject image area 331 shown in FIG. 14 are utilized, and a peak point at which the contrast to the luminance at an adjacent point is maximum is detected by the evaluation value detector 405. In this case, it is desirable to detect the AF evaluation value from each of the linear characteristic area and the logarithmic characteristic area of the image sensor 30 so as to utilize the features of the respective characteristic areas. For instance, it is desirable to use the AF evaluation value obtained from the logarithmic characteristic area for rough metering in AF control and to use the AF evaluation value obtained from the linear characteristic area for precise metering.

The AF evaluation values detected by the evaluation value detector 405 are sent to the AF control parameter calculator 513 of the main controller 50. The AF control parameter calculator 513 calculates an AF control parameter corresponding to the AF evaluation value, and sends the AF control parameter to the zoom/focus control signal generator 524. Upon receiving the AF control parameter, the zoom/focus control signal generator 524 generates a control signal corresponding to the inputted AF control parameter, and sends the control signal to the zoom/focus driver 62. Upon receiving the control signal, the zoom/focus driver 62 generates a drive signal corresponding to the control signal to drive the lens group 21 in the lens barrel 20 for focusing based on the drive signal.

Similarly to AF control, WB control can be performed based on the WB evaluation values acquired from the image captured by the image sensor 30. In this case, it is desirable to detect the WB evaluation values from each of the linear characteristic area and the logarithmic characteristic area of the image sensor 30, as in the case of the AF evaluation values. Specifically, the WB evaluation values are detected from neutral images based on the captured image. It is desirable to prepare two kinds of images as the neutral images, wherein one is obtained from the linear characteristic area, and the other is obtained from the logarithmic characteristic area, and to detect R, G, B levels, namely, R-log, G-Log, B-Log, R-Lin, G-Lin, and B-Lin based on the two images. The evaluation value detector 405 detects the WB evaluation values, and sends the WB evaluation values to the white balance controller 406, which, in turn, performs WB correction to achieve optimal color balance.

Second Embodiment

Next, the second embodiment is described referring to FIGS. 30 through 36.

In the first embodiment, described is the AE control of prioritizing the exposure amount control parameter calculation or the dynamic range control parameter calculation, namely, the exposure amount control or the dynamic range control. In the second embodiment, AE control of securing a predetermined sensor output corresponding to a target subject luminance on a priority basis (hereinafter, this is called as "target level prioritizing system" or "target level prioritizing mode", which corresponds to the exposure amount control parameter calculation prioritizing mode in the first embodiment), or AE control of securing a dynamic range on a priority basis (hereinafter, this is called as "dynamic range prioritizing system" or "dynamic range prioritizing mode", which corresponds to the dynamic range control parameter calculation prioritizing mode in the first embodiment) is carried out by performing a first exposure control or first AE control of combining the exposure amount control and the dynamic range control, and by performing, after the first exposure control, a second exposure control or second AE control of performing the exposure amount control or the dynamic range control according to needs.

The first exposure control and the second exposure control are executed as a step corresponding to the control parameter calculating step S2 in the overall operation flow shown in FIG. 5. After an AE control parameter calculating unit 5110 calculates a control parameter for the first exposure control of combining the exposure amount control and the dynamic range control, an output level judging section 530 (see FIG. 4) compares the output level of an image sensor 30 corresponding to a subject luminance for exposure setting with a predetermined desired output level, and then, the AE control parameter calculating unit 5110 calculates a control parameter for the second exposure control of performing the exposure amount control or the dynamic range control, based on the comparison result by the output level judging section 530. In this embodiment, in the first exposure control, Steps S2-1 and S2-2 are combinedly executed, and in the second exposure control, Step S2-1 or Step S2-2 is executed depending on the priority between the target level prioritizing mode and the dynamic range prioritizing mode.

Prior to describing the respective prioritizing systems or modes in detail functions relating to the level judging section 530 in the second embodiment are described. FIG. 30 is a functional block diagram showing the functions of the output level judging section 530 in the second embodiment. The output level judging section 530 includes an output level information acquirer 5301, an output level storage 5302, a judger 5302, and a second exposure control signal generator 5304.

After the first exposure control in other words, after calculation of control parameters for the first exposure control by an exposure amount control parameter calculator 511 and a dynamic range control parameter 512, the output level information acquirer 5301 acquires, from the AE control parameter calculating unit 5110, information relating to the output level of the image sensor 30 corresponding to a predetermined subject luminance for exposure setting, based on a photoelectric conversion characteristic obtained by the calculation. Specifically, in case of performing the exposure control in the target level prioritizing mode, an output level Vtarget2 (hereinafter, also called as "provisional target level Vtarget2") corresponding to a subject luminance for exposure amount setting, which has been set based on a provisionally set photoelectric conversion characteristic by calculation in the first exposure control is acquired. Further, in case of performing the exposure control in the dynamic range prioritizing mode, an output level Vmax2 (hereinafter, also called as "provisional saturated output level Vmax2") corresponding to a subject luminance for dynamic range setting, which has been set based on the provisionally set photoelectric conversion characteristic by calculation in the first exposure control, is acquired. The information relating to the output levels Vtarget 2 and Vmax2 acquired by the output level information acquirer 5301 is sent to the judger 5303.

The output level storage 5302 stores a setting value for an output level corresponding to a predetermined target subject luminance for exposure control. Specifically, the output level storage 5302 stores therein a setting value for a target output level or a target level Vtarget corresponding to a subject luminance for exposure amount setting to execute the target level prioritizing mode of prioritizing the target level, and a setting value for a desired output level or a saturated output level Vmax corresponding to a subject luminance for dynamic range setting to execute the dynamic range prioritizing mode of prioritizing the dynamic range.

The judger 5303 compares the information relating to the output level corresponding to the subject luminance for exposure setting acquired by the output level information acquirer 5301 with the information relating to the output level setting value stored in the output level storage 5302 to judge whether the second exposure control is necessary. Specifically, in the target level prioritizing mode, the judger 5303 compares the provisional target level Vtarget 2 acquired by the output level information acquirer 5301 with the target level Vtarget stored in the output level storage 5302. If it is judged that the provisional target level Vtarget2 coincides with the target level Vtarget, the judger 5303 outputs, to the second exposure control signal generator 5304, a judgment signal indicating that the second exposure control is not necessary because there is no need of performing the second exposure control. On the other hand, if it is judged that the provisional target level Vtarget2 is lower than the target level Vtarget, namely, an expected exposure amount is less than an intended exposure amount, the judger 5303 outputs, to the second exposure control signal generator 5304, a judgment signal indicating that the second exposure control is necessary.

In the dynamic range prioritizing mode, the judger 5303 compares the provisional saturated output level Vmax2 acquired by the output level acquirer 5301 with the saturated output level Vmax stored in the output level storage 5302. If it is judged that the provisional saturated output level Vmax 2 coincides with the saturated output level Vmax, the judger 5303 outputs, to the second exposure control signal generator 5304, a judgment signal indicating that the second exposure control is not necessary, because there is no need of performing the second exposure control. On the other hand, if it is judged that the provisional saturated output level Vmax2 is higher than the saturated output level Vmax, namely, an expected dynamic range is narrower than an intended dynamic range, the judger 5303 outputs, to the second exposure control signal generator 5304, a judgment signal indicating that the second exposure control is necessary.

The second exposure control signal generator 5304 generates, to the AE control parameter calculating unit 5110, a control signal relating to the second exposure control in response to receiving the judgment signal from the judger 5303 indicating that the second exposure control is not necessary or necessary. If the judgment signal indicates that the second exposure control is not necessary, this means that the provisional target level Vtarget2 satisfies the range of the target level Vtarget, or the provisional saturated output level Vmax2 satisfies the range of the saturated output level Vmax. Therefore, the second exposure control signal generator 5304 sends, to the AE control parameter calculating unit 5110, a control signal indicating the exposure control be terminated.

On the other hand, if the judgment signal indicates that the second exposure control is necessary, the second exposure control signal generator 5304 generates and sends, to the AE control parameter calculating unit 5110, a control signal indicating that the second exposure control be executed to cause the provisional target level Vtarget to satisfy the range of the target level Vtarget or to cause the provisional saturated output level Vmax2 to satisfy the range of the saturated output level Vmax. At this time, information relating to the target level Vtarget or the saturated output level Vmax stored in the output level storage 5302 is sent to the AE control parameter calculating unit 5110 as well as the control signal. Upon receiving the control signal, the AE control parameter calculating unit 5110 executes the second exposure control.

Specifically, in the target level prioritizing mode, for instance, the exposure amount control parameter calculator 511 calculates a control parameter for matching the provisional target level Vtarget2 with the target level Vtarget. Further, in the dynamic range prioritizing mode, the dynamic range control parameter calculator 512 calculates a control parameter for matching the provisional saturated output level Vmax2 with the saturated output level Vmax.

(AE Control in Target Level Prioritizing Mode)

Figure 32A:
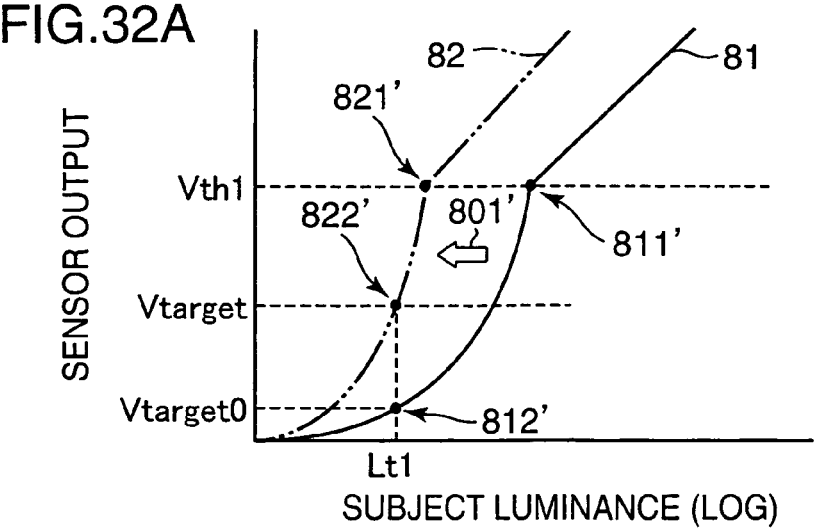
FIGS. 32A through 32C are graphs each showing how a photoelectric conversion characteristic of an image sensor is changed in the AE control conforming to the flow of FIG. 31.
Figure 32B:
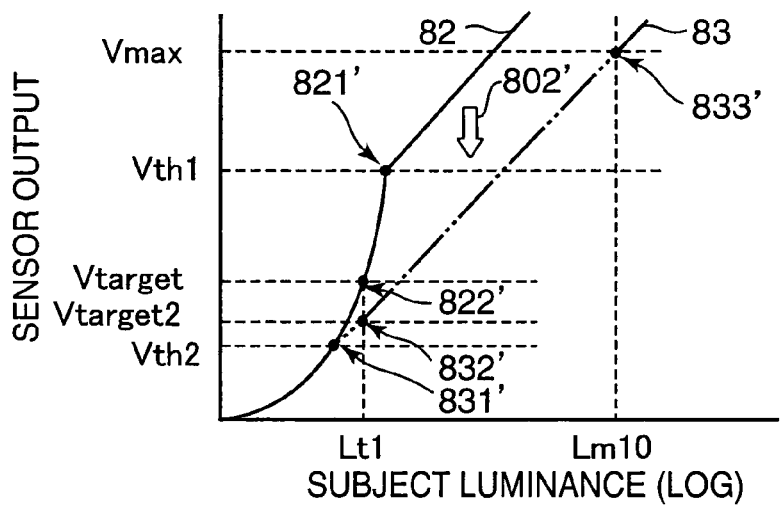
Figure 32C:
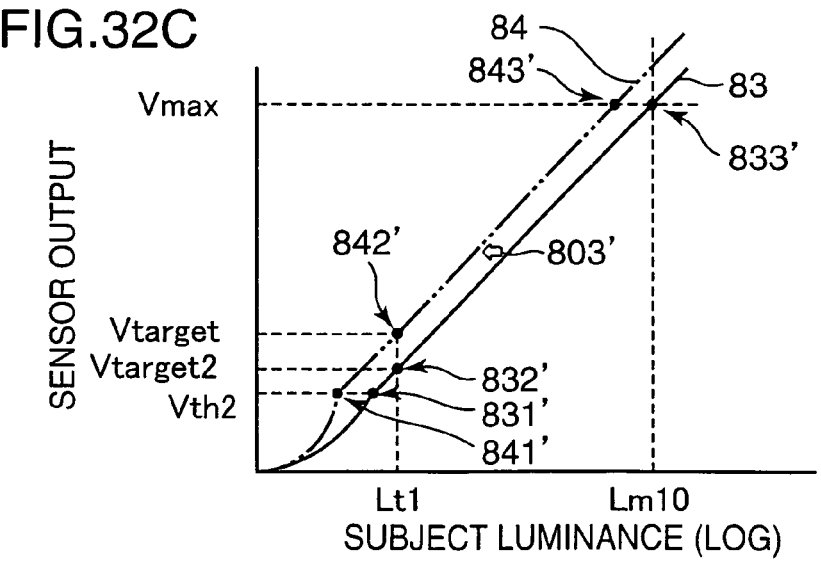

In the following, AE control in the target level prioritizing system or in the target level prioritizing mode is described in detail. FIG. 31 is a flowchart showing a flow of AE control according to the target level prioritizing system in the second embodiment, and FIGS. 32A through 32C are graphs each showing how a photoelectric conversion characteristic of the image sensor 30 is changed in the AE control. In this control a calculation priority setter 5111 (see FIG. 4) of the AE control parameter calculating unit 5110 is configured in such a manner that a parameter calculating operation by the exposure amount control parameter calculator 511 is prioritized. Exposure amount control parameter calculation by the exposure amount control parameter calculator 511, dynamic range control parameter calculation by the dynamic range control parameter calculator 512 are carried out in this order sequentially as the first exposure control, and exposure amount control parameter calculation by the exposure amount control parameter 511 is carried out as the second exposure control.

First, in the former part of the first exposure control upon detecting the AE evaluation values by an evaluation value detector 405, the exposure amount control parameter calculator 511 calculates, based on the detected AE evaluation values, a control parameter, so that a subject luminance Lt1 for exposure amount setting, preferably, an average luminance of a main subject obtained by an average luminance calculator 4053 (see FIG. 14) of a histogram calculating section 4052, is obtained at a desired output level i.e. a target level Vtarget in a linear characteristic area, for instance. Specifically, an exposure time setting value, an aperture setting value, and the like are calculated as the control parameter (Step S211). As the target level Vtarget, the setting value stored in the output level storage 5302 is referred to, and as the current photoelectric conversion characteristic of the image sensor 30 based on which the calculation is performed, the initial setting value or the setting value stored in a photoelectric conversion characteristic information storage 516 at the time of acquiring the AE evaluation values last time is referred to.

FIG. 32A is a graph schematically showing how the control parameter is calculated in Step S211. Referring to FIG. 32A, a photoelectric conversion characteristic 81 is a photoelectric conversion characteristic of the image sensor 30 stored in the photoelectric conversion characteristic information storage 516 at the time of acquiring the AE evaluation values, for instance. The photoelectric conversion characteristic 81 is divided into a linear characteristic area and a logarithmic characteristic area, with an inflection point 811' serving as a boundary. The output level of the image sensor 30 at the inflection point 811' is Vth1. According to the photoelectric conversion characteristic 81, a sensor output at a point 812' corresponding to a subject luminance Lt1 for exposure amount setting is Vtarget0, which is a relatively low output level.

Here, the exposure amount control parameter calculator 511 calculates an exposure amount control parameter i.e. an exposure amount setting value for obtaining an exposure amount that makes it possible to change the photoelectric conversion characteristic 81 to a photoelectric conversion characteristic 82, so that the output level Vtarget0 coincides with a desired relatively high output level, namely, the target level Vtarget corresponding to the subject luminance Lt1 for exposure amount setting. Specifically, the photoelectric conversion characteristic 81 is shifted or moved to the photoelectric conversion characteristic 82 passing a point 822' in the direction shown by the arrow 801'. At this time, the inflection point 811' is shifted in parallel to an inflection point 821', with the sensor output Vth1 being unchanged. Thereby, the new photoelectric conversion characteristic 82 is obtained, so that the sensor output at the point 812' corresponding to the luminance Lt1 in a relatively low output level of the linear characteristic area of the photoelectric conversion characteristic 81 coincides with the target level Vtarget at the point 822' in a relatively high output level of the linear characteristic area in terms of graphical expression.

The calculated control parameters such as the exposure time setting value and the aperture setting value are outputted to a control signal generating section 520. Upon receiving the control parameters, respective parts in the control signal generating section 520 generate control signals for operating a timing generating circuit 31 and a driving section 60 for setting an exposure time, an aperture value, and the like (Step S212). The timing generating circuit 31 and the driving section 60 generate drive signals for causing the relevant elements to perform actual exposure amount control operations.

Subsequently, in the latter part of the first exposure control, the dynamic range control parameter calculator 512 calculates, based on the AE evaluation values detected by the evaluation value detector 405, a control parameter, so that a subject luminance Lm10 for dynamic range setting, preferably, the upper limit of the luminance range of the main subject and the peripheral subject obtained by a maximum/minimum luminance calculator 4054 of the histogram calculating section 4052 reaches a saturated output level Vmax. Specifically, a photoelectric conversion characteristic setting value is calculated as the control parameter (Step S213). As the saturated output level Vmax, the setting value stored in the output level storage 5302 is referred to.

FIG. 32B is a graph schematically showing how the control parameter is calculated in Step S213. Referring to FIG. 32B, a photoelectric conversion characteristic 82 is a photoelectric conversion characteristic of the image sensor 30 based on the calculation result by the exposure amount control parameter calculator 511. According to the photoelectric conversion characteristic 82, a sensor output corresponding to the subject luminance Lm10 for dynamic range setting exceeds the saturated output level Vmax.

Here, the dynamic range control parameter calculator 512 calculates a dynamic range control parameter i.e. a photoelectric conversion characteristic setting value for changing the photoelectric conversion characteristic 82 to a photoelectric conversion characteristic 83, so that the output level corresponding to the subject luminance Lm10 for dynamic range setting coincides with the saturated output level Vmax. Specifically, the photoelectric conversion characteristic 82 is shifted to the photoelectric conversion characteristic 83 passing a point 833' in the direction shown by the arrow 802'. Thereby, the inflection point 821' is shifted to an inflection point 831', and the sensor output corresponding to the inflection point is changed from Vth1 to Vth2.

Further, the sensor output corresponding to the subject luminance Lt1 for exposure setting is lowered to the provisional target level Vtarget2, which is lower than the target level Vtarget by the amount corresponding to the shifting of the inflection point, by shifting of the inflection point in the dynamic range control. Specifically, the sensor output at the point 822' corresponding to the luminance Lt1, which coincides with the target level Vtarget in the photoelectric conversion characteristic 82, is lowered to the provisional target level Vtarget2 at a point 832' corresponding to the luminance Lt1, which is lower than the target level Vtarget, by the dynamic range control.

The calculated control parameter i.e. the photoelectric conversion characteristic setting value is outputted to a dynamic range control signal generator 521 of the control signal generating section 520. The dynamic range control signal generator 521 generates a control signal for controlling a signal φVPS based on the control parameter, namely, a control signal relating to the photoelectric conversion characteristic setting value, and sends the control signal to the timing generating circuit 31 (Step S214). The first exposure control is completed by executing the above operations.

Next, the output level judging section 530 compares the provisional target level Vtarget2, which is a sensor output corresponding to the subject luminance Lt1 for exposure setting, with the target level Vtarget, based on the photoelectric conversion characteristic 83 after the first exposure control is completed (Step S215). Specifically, the judger 5303 compares the provisional target level Vtarget2 acquired by the output level information acquirer 5301 of the output level judging section 530 with the target level Vtarget stored in the output level storage 5302. If it is judged that the provisional target level Vtarget2 coincides with the target level Vtarget (YES in Step S215), the exposure control is terminated because the second exposure control is not necessary. Specifically, the judger 5303 outputs, to the second exposure control signal generator 5304, a judgment signal indicating that the second exposure control is not necessary. Upon receiving the judgment signal, the second exposure control signal generator 5304 sends, to the AE control parameter calculating unit 5110, a control signal indicating the exposure control be terminated.

On the other hand, as shown in FIG. 32B, if it is judged that the provisional target level Vtarget2 is lower than the target level Vtarget (NO in Step S215), the exposure amount control is executed as the second exposure control. The exposure amount control in the second exposure control is a control for matching the provisional target level Vtarget2 with the target level Vtarget. The exposure amount control parameter calculator 511 calculates a control parameter for realizing the matching operation (Step S216). Specifically, the judger 5303 outputs, to the second exposure control signal generator 5304, a judgment signal indicating that the second exposure control is necessary. Upon receiving the judgment signal the second exposure control signal generator 5304 sends to, the AE control parameter calculating unit 5110, a control signal indicating that the second exposure control be executed, as well as the information relating to the target level Vtarget stored in the output level storage 5302.

FIG. 32C is a graph schematically showing how the control parameter is calculated in Step S216. Referring to FIG. 32C, a photoelectric conversion characteristic 83 is a photoelectric conversion characteristic of the image sensor 30 after the first exposure control is completed, namely, based on the calculation result by the dynamic range control parameter calculator 512. According to the photoelectric conversion characteristic 83, since the sensor output at the point 832' corresponding to the luminance Lt1 is lower than the provisional target level Vtarget2, the exposure amount control parameter calculator 511 calculates an exposure amount control parameter i.e. an exposure amount setting value for obtaining an exposure amount that makes it possible to change the photoelectric conversion characteristic 83 to a photoelectric conversion characteristic 84 to raise the sensor output corresponding to the luminance Lt1 to the target level Vtarget. Specifically, the photoelectric conversion characteristic 83 is moved or shifted to the photoelectric conversion characteristic 84 passing a point 842' in the direction shown by the arrow 803'. At this time, the inflection point 831' is shifted in parallel to an inflection point 841', with the sensor output Vth2 being unchanged. Thereby, the new photoelectric conversion characteristic 84 is obtained, so that the sensor output at the point 832' corresponding to the current luminance Lt1 coincides with the target level Vtarget at the point 842'.

By performing the exposure amount control as the second exposure control, the dynamic range is narrowed to a certain degree. Specifically, the dynamic range is reduced by the amount corresponding to shifting of a point 843' on the photoelectric conversion characteristic 84 corresponding to the saturated output level Vmax toward the left side relative to a point 833' of the photoelectric conversion characteristic 83. Since this arrangement securely enables to match the sensor output corresponding to the luminance Lt1 with the target level Vtarget, exposure control in the target level prioritizing mode of securing an exposure amount for the main subject, for instance, can be executed. In the example shown in FIG. 32C, the target level Vtarget is consequently obtained from the logarithmic characteristic area of the photoelectric conversion characteristic 84. However, since a sensing operation using the linear characteristic area occupies a significantly large part of the entire sensing operation, contrast performance is not degraded so much.

As in the case of the first exposure control, the calculated control parameters such as the exposure time setting value and the aperture setting value are outputted to the control signal generating section 520. Upon receiving the control signal generating parameters, respective parts in the control signal generating section 520 generate control signals for operating the timing generating circuit 31 and the driving section 60 for setting an exposure time, an aperture value, and the like (Step S217). The timing generating circuit 31 and the driving section 60 generate drive signals for causing the relevant elements to perform actual exposure amount control operations.

(AE Control in Dynamic Range Prioritizing Mode)

Figure 33:
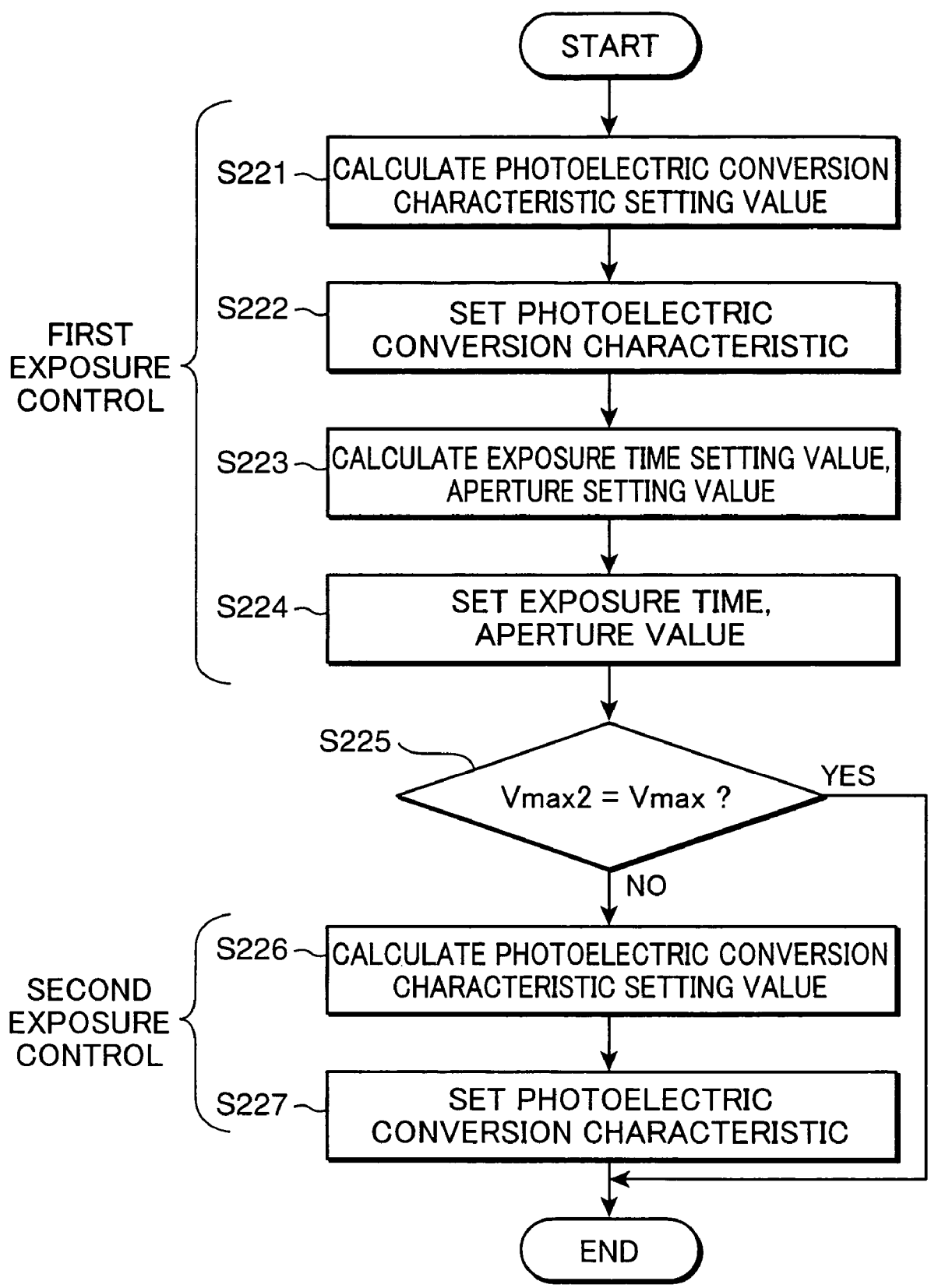
FIG. 33 is a flowchart showing a flow of AE control according to the dynamic range prioritizing system in the second embodiment.
Figure 34A:
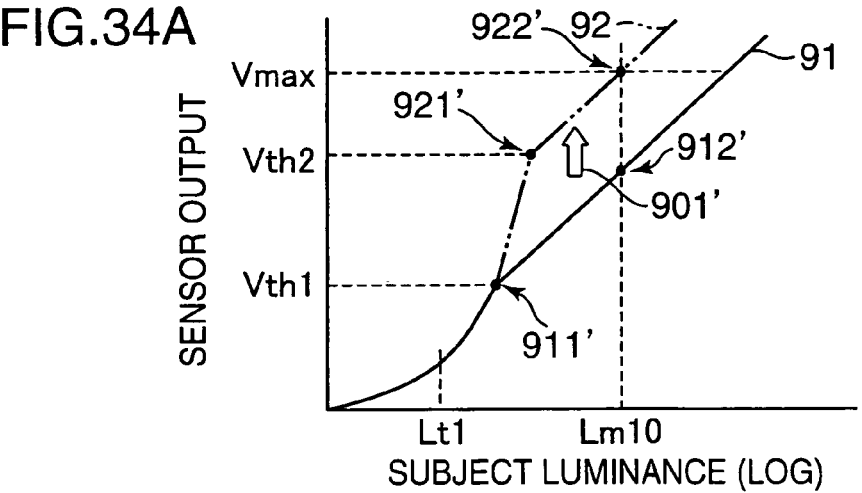
FIGS. 34A through 34C are graphs each showing how the photoelectric conversion characteristic of an image sensor is changed in the AE control conforming to the flow of FIG. 33.
Figure 34B:
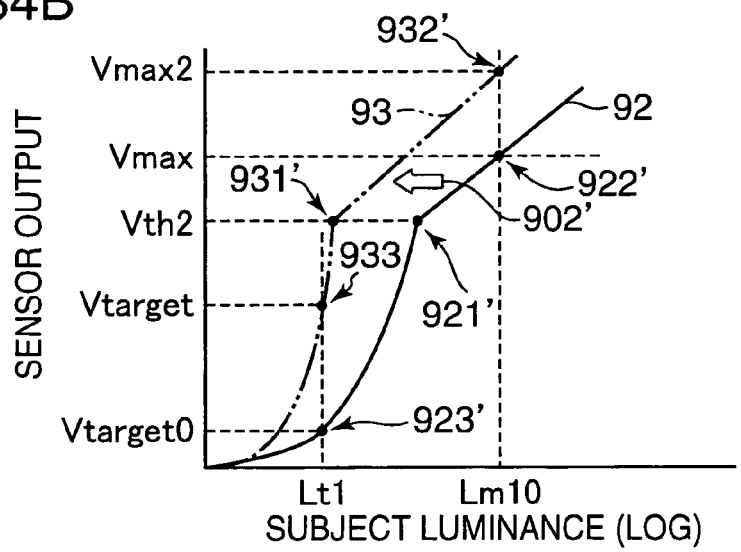
Figure 34C:
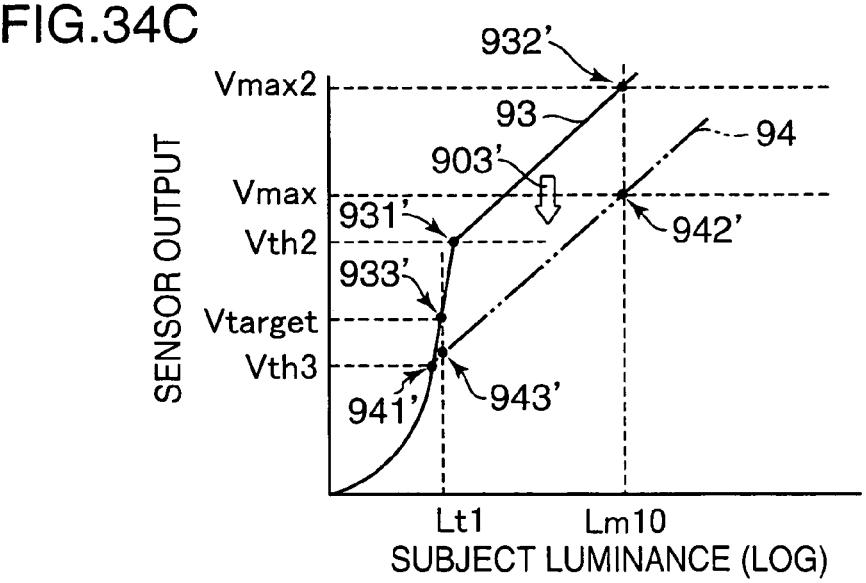

FIG. 33 is a flowchart showing a flow of AE control according to the dynamic range prioritizing system in the second embodiment, and FIGS. 34A through 34C are graphs each showing how a photoelectric conversion characteristic of the image sensor 30 is changed in the AE control. In this mode, the calculation priority setter 5111 of the AE control parameter calculating unit 5110 is configured in such a manner that a parameter calculating operation by the dynamic range control parameter calculator 512 is prioritized. Dynamic range control parameter calculation by the dynamic range control parameter calculator 512, exposure amount control parameter calculation by the exposure amount control parameter calculator 511 are carried out in this order sequentially as the first exposure control, and dynamic range control parameter calculation by the dynamic range control parameter 512 is carried out as the second exposure control.

First, in the former part of the first exposure control upon detecting the AE evaluation values by the evaluation value detector 405, the dynamic range control parameter 512 calculates, based on the detected AE evaluation values, a control parameter, so that a subject luminance Lt1 for exposure amount setting, preferably, the upper limit of the luminance range of the main subject and the peripheral subject obtained by the maximum/minimum luminance calculator 4054 of the histogram calculating section 4052 reaches a desired saturated output level Vmax. Specifically, a photoelectric conversion characteristic setting value is calculated as the control parameter (Step S221). As the saturated output level Vmax, the setting value stored in the output level storage 5302 is referred to, and as the current photoelectric conversion characteristic of the image sensor 30 based on which the calculation is performed, the initial setting value or the setting value stored in the photoelectric conversion characteristic information storage 516 at the time of acquiring the AE evaluation values last time is referred to.

FIG. 34A is a graph schematically showing how the control parameter is calculated in Step S221. Referring to FIG. 34A, a photoelectric conversion characteristic 91 is a photoelectric conversion characteristic of the image sensor 30 stored in the photoelectric conversion characteristic information storage 516 at the time of acquiring the AE evaluation values, for instance. The photoelectric conversion characteristic 91 is divided into a linear characteristic area and a logarithmic characteristic area, with an inflection point 911' serving as a boundary. The output level of the image sensor 30 at the inflection point 911' is Vth1. According to the photoelectric conversion characteristic 91, a sensor output at a point 912' corresponding to a subject luminance Lm10 for dynamic range setting is lower than the saturated output level Vmax.

Here, the dynamic range control parameter calculator 512 calculates a dynamic range control parameter i.e. a photoelectric conversion characteristic setting value for changing the photoelectric conversion characteristic 91 to a photoelectric conversion characteristic 92, so that the output level corresponding to the subject luminance Lm10 for dynamic range setting coincides with the saturated output level Vmax. Specifically, the new photoelectric conversion characteristic 92 is calculated, so that the photoelectric conversion characteristic 91 is shifted to the photoelectric conversion characteristic 92 passing a point 922' in the direction shown by the arrow 901'.

Thereby, the inflection point 911' is shifted to a point 921', and the sensor output corresponding to the inflection point is changed from Vth1 to Vth2.

The calculated control parameter i.e. the photoelectric conversion characteristic setting value is outputted to the dynamic range control signal generator 521 of the control signal generating section 520. The dynamic range control signal generator 521 generates a control signal for controlling a signal φVPS, namely, a control signal relating to the photoelectric conversion characteristic setting value, based on the control parameter, and sends the control signal to the timing generating circuit 31 (Step S222).

Subsequently, in the latter part of the first exposure control, the exposure amount control parameter calculator 511 calculates, based on the AE evaluation values detected by the evaluation value detector 405, a control parameter, so that a subject luminance Lt1 for exposure amount setting, preferably, an average luminance of a main subject obtained by the average luminance calculator 4053 of the histogram calculating section 4052, is obtained at a desired output level i.e. a target level Vtarget in the linear characteristic area. Specifically, an exposure time setting value, an aperture setting value, and the like are calculated as the control parameter (Step S223). As the target level Vtarget, the setting value stored in the output level storage 5302 or the like is referred to.

FIG. 34B is a graph schematically showing how the control parameter is calculated in Step S223. Referring to FIG. 34B, a photoelectric conversion characteristic 92 is a photoelectric conversion characteristic of the image sensor 30 based on the calculation result by the dynamic range control parameter calculator 512. According to the photoelectric conversion characteristic 92, a sensor output at a point 923' corresponding to the subject luminance Lt1 for exposure amount setting is Vtarget0, which is a relatively low output level.

Here, the exposure amount control parameter calculator 511 calculates an exposure amount control parameter i.e. an exposure amount setting value for obtaining an exposure amount that makes it possible to change the photoelectric conversion characteristic 92 to a photoelectric conversion characteristic 93, so that the output level Vtarget0 coincides with a relatively high output level, namely, the target level Vtarget corresponding to the subject luminance Lt1 for exposure amount setting. Specifically, the photoelectric conversion characteristic 92 is shifted to the photoelectric conversion characteristic 93 passing a point 933' in the direction shown by the arrow 902'. At this time, the inflection point 921' is shifted in parallel to an inflection point 931', with the sensor output Vth2 being unchanged. Thereby, the new photoelectric conversion characteristic 93 is obtained, so that the sensor output at the point 923' corresponding to the luminance Lt1 in a relatively low output level of the linear characteristic area of the photoelectric conversion characteristic 92 coincides with the target level Vtarget at the point 933' in a relatively high output level of the linear characteristic area in terms of graphical expression.

By shifting of the inflection point by the exposure amount control, the sensor output corresponding to the subject luminance Lm10 for dynamic range setting is raised to the provisional saturated output level Vmax higher than the saturated output level Vmax by the amount corresponding to the shifting of the inflection point. Consequently, a dynamic range for the luminance Lm10 is not secured. In other words, the sensor output at the point 922' corresponding to the luminance Lm10, which coincides with the saturated output level Vmax in the photoelectric conversion characteristic 92, is raised to the provisional saturated output level Vmax2 at a point 932' corresponding to the luminance Lm10, which is higher than the saturated output level Vmax, by the exposure amount control.

The calculated control parameters such as the exposure time setting value and the aperture setting value are outputted to the control signal generating section 520. Upon receiving the control parameters, the respective parts in the control signal generating section 520 generate control signals for operating the timing generating circuit 31 and the driving section 60 for setting an exposure time, an aperture value, and the like (Step S224). The timing generating circuit 31 and the driving section 60 generate drive signals for causing the relevant elements to perform actual exposure amount control operations.

Next, the output level judging section 530 compares the provisional saturated output level Vmax2, which is a sensor output corresponding to the subject luminance Lm10 for dynamic range setting, with the saturated output level Vmax based on the photoelectric conversion characteristic 83 after the first exposure control is completed (Step S225). Specifically, the judger 5303 compares the provisional saturated output level Vmax2 acquired by the output level information acquirer 5301 of the output level judging section 530 with the saturated output level Vmax stored in the output level storage 5302. If it is judged that the provisional saturated output level Vmax2 coincides with the saturated level Vmax (YES in Step S225), the exposure control is terminated because the second exposure control is not necessary. Specifically, the judger 5303 outputs, to the second exposure control signal generator 5304, a judgment signal indicating that the second exposure control is not necessary. Upon receiving the judgment signal, the second exposure control signal generator 5304 sends, to the AE control parameter calculating unit 5110, a control signal indicating the exposure control be terminated.

On the other hand, as shown in FIG. 34B, if it is judged that the provisional saturated level Vmax2 is higher than the saturated output level Vmax (NO in Step S225), the dynamic range control is executed as the second exposure control. The dynamic range control in the second exposure control is a control for matching the provisional saturated output level Vmax2 with the saturated output level Vmax to secure a target dynamic range. The dynamic range control parameter calculator 512 calculates a control parameter for realizing this operation (Step S226). Specifically, the judger 5303 outputs, to the second exposure control signal generator 5304, a judgment signal indicating that the second exposure control is necessary. Upon receiving the judgment signal, the second exposure control signal generator 5304 sends to, the AE control parameter calculating unit 5110, a control signal indicating that the second exposure control be executed, as well as the information relating to the saturated output level Vmax stored in the output level storage 5302.

FIG. 34C is a graph schematically showing how the control parameter is calculated in Step S226. Referring to FIG. 34C, a photoelectric conversion characteristic 93 is a photoelectric conversion characteristic of the image sensor 30 after the first exposure control is completed, namely, based on the calculation result by the exposure amount control parameter calculator 511. According to the photoelectric conversion characteristic 93, since the sensor output at a point 932' corresponding to the luminance Lm10 is the provisional saturated output level Vmax2 higher than the saturated output level Vmax, the dynamic range control parameter calculator 512 calculates a dynamic range control parameter i.e. a photoelectric conversion characteristic setting value for obtaining a dynamic range that makes it possible to change the photoelectric conversion characteristic 93 to a photoelectric conversion characteristic 94 to lower the sensor output corresponding to the luminance Lm10 to the saturated output level Vmax. Specifically, the photoelectric conversion characteristic 93 is moved or shifted to the photoelectric conversion characteristic 94 passing a point 942' in the direction shown by the arrow 903'. At this time, the inflection point 931' is shifted in parallel to an inflection point 941', with the sensor output Vth2 being lowered from Vth2 to Vth3. Thereby, the new photoelectric conversion characteristic 94 is obtained, so that the sensor output at the point 932' corresponding to the current luminance Lm10 coincides with the saturated output level Vmax at the point 942'.

By performing the dynamic range control as the second exposure control the sensor output at a point 943' corresponding to the subject luminance Lt1 for exposure amount setting is lowered than the target level Vtarget. Since this arrangement securely enables to match the sensor output corresponding to the luminance Lm10 with the saturated output level Vmax, exposure control in the dynamic range prioritizing mode of securing a desired dynamic range can be executed. In the example shown in FIG. 34C, the sensor output corresponding to the luminance Lt1 is consequently obtained from the logarithmic characteristic area of the photoelectric conversion characteristic 94. However, since a sensing operation using the linear characteristic area occupies a significantly large part of the entire sensing operation, contrast performance is not degraded so much.

As in the case of the first exposure control, the calculated control parameter such as the photoelectric conversion setting value is outputted to the dynamic range control signal generator 521 of the control signal generating section 520, which, in turn, generates a control signal for controlling the signal φVPS based on the control parameter, namely, a control signal relating to the photoelectric conversion characteristic setting value, and sends the control signal to the timing generating circuit 31 (Step S227). The first exposure control is completed by executing the above operations.

In the second embodiment as described above, each time the former part and the latter part of the first exposure control, and the second exposure control is executed, namely, each time the exposure amount control parameter and the dynamic range control parameter are calculated, setting steps based on the respective calculated control parameters, namely, Steps S212, S214, and S217 in FIG. 31, and Steps S222, S224, and S227 in FIG. 33, are executed. Alternatively, it is possible to calculate all the parameters in advance, followed by various settings such as an exposure time, an aperture value, and a photoelectric conversion characteristic.

Figure 35:
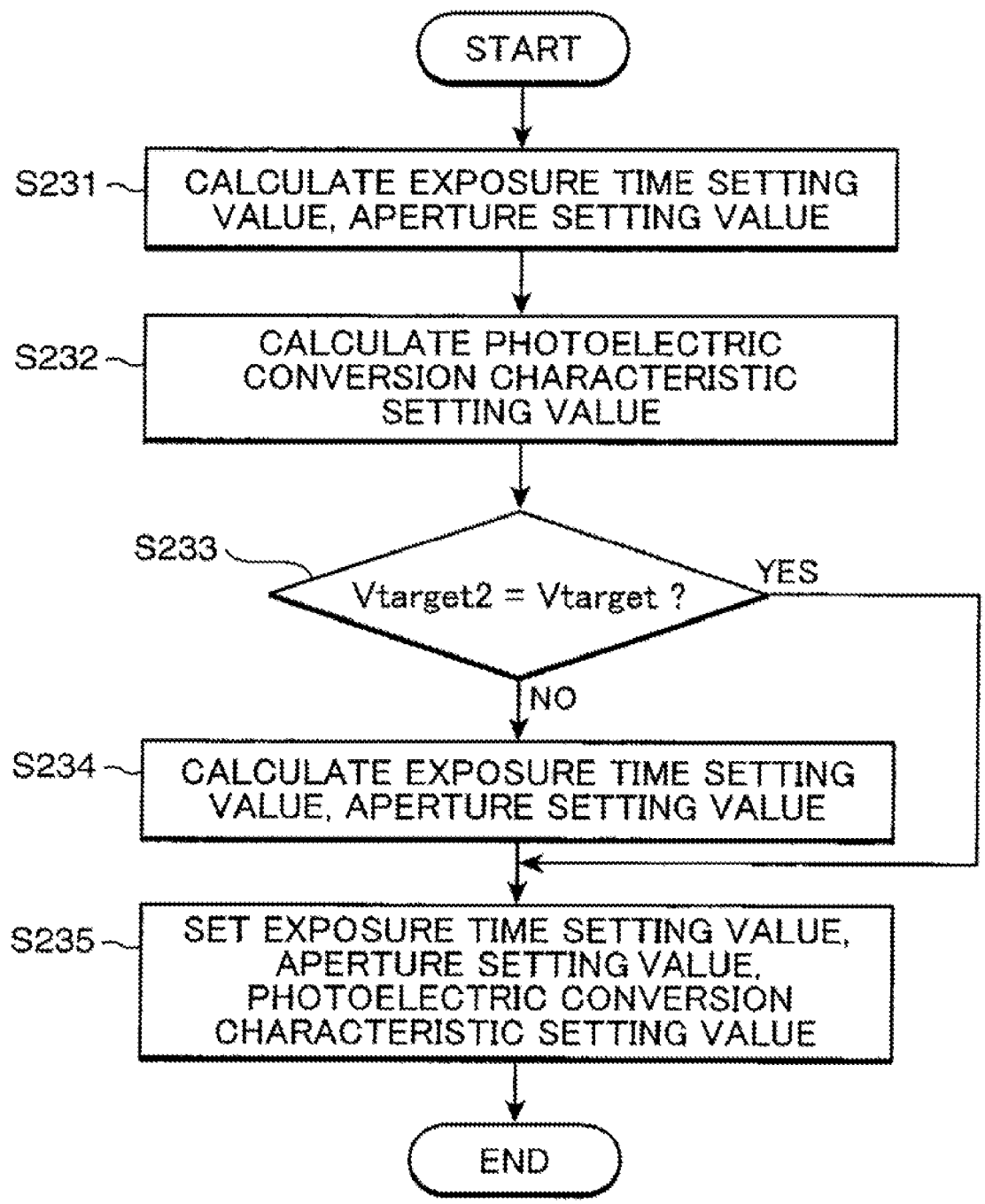
FIG. 35 is a flowchart showing an altered flow of the AE control according to the target level prioritizing system shown in FIG. 31.

FIG. 35 is a flowchart showing a flow of AE control according to the target level prioritizing system, wherein all the parameters are calculated in advance prior to various settings. This altered arrangement is different from the arrangement described referring to FIG. 31 in that exposure amount control parameter calculation by the exposure amount control parameter calculator 511 (Step S231), dynamic range control parameter calculation by the dynamic range control parameter calculator 512 (Step S232) are performed in this order sequentially as a first stage of controlling an exposure control value, and exposure amount control parameter calculation by the exposure amount control parameter calculator 511 (Step S234) is performed as a second stage of controlling. In other words, the flow shown in FIG. 35 is different from the flow shown in FIG. 31 in that various setting operations are performed (Step S235) after completion of the exposure amount control parameter calculation in the second stage of controlling (Step S234), in place of performing settings for an exposure time, an aperture value, and a photoelectric conversion characteristic each time the control parameters are calculated in Steps S231 and S232.

Specifically, in the former part of the first stage of controlling, the exposure amount control parameter calculator 511 calculates, based on the AE evaluation values detected by the evaluation value detector 405, a control parameter to obtain a provisional exposure time setting value, a provisional aperture setting value, and the like (Step S231). Then, in the latter part of the first stage of controlling, the dynamic range control parameter calculator 512 calculates a control parameter based on the detected AE evaluation values likewise to obtain a provisional photoelectric conversion characteristic setting value (Step S232). Subsequently, the output level judging section 530 compares a provisional target level Vtarget2, which is a sensor output corresponding to a subject luminance Lt1 for exposure setting, with a target level Vtarget, based on the provisional photoelectric conversion characteristic obtained after the calculation of the control parameters in the first stage of controlling (Step S233).

If it is judged that the provisional target level Vtarget2 coincides with the target level Vtarget (YES in Step S233), various settings are carried out based on the setting values obtained by calculation of the control parameters corresponding to the first stage of controlling, since calculation of the control parameter corresponding to the second stage of controlling is not necessary. On the other hand, if it is judged that the provisional target level Vtarget2 is lower than the target level Vtarget (NO in Step S233), calculation of the control parameter for exposure amount control is executed as the second stage of controlling. The exposure amount control in the second stage of controlling is a control for matching the provisional target level Vtarget2 with the target level Vtarget. The exposure amount control parameter calculator 511 calculates the control parameter for realizing this operation (Step S234). Then, various settings are executed with respect to the parameters calculated in Step S234, namely, the provisional exposure time setting value and the provisional aperture setting value obtained in Step S231, and the provisional photoelectric conversion characteristic setting value obtained in Step S232, based on the values to which correction has been applied to execute the target level prioritizing mode (Step S235).

Figure 36:
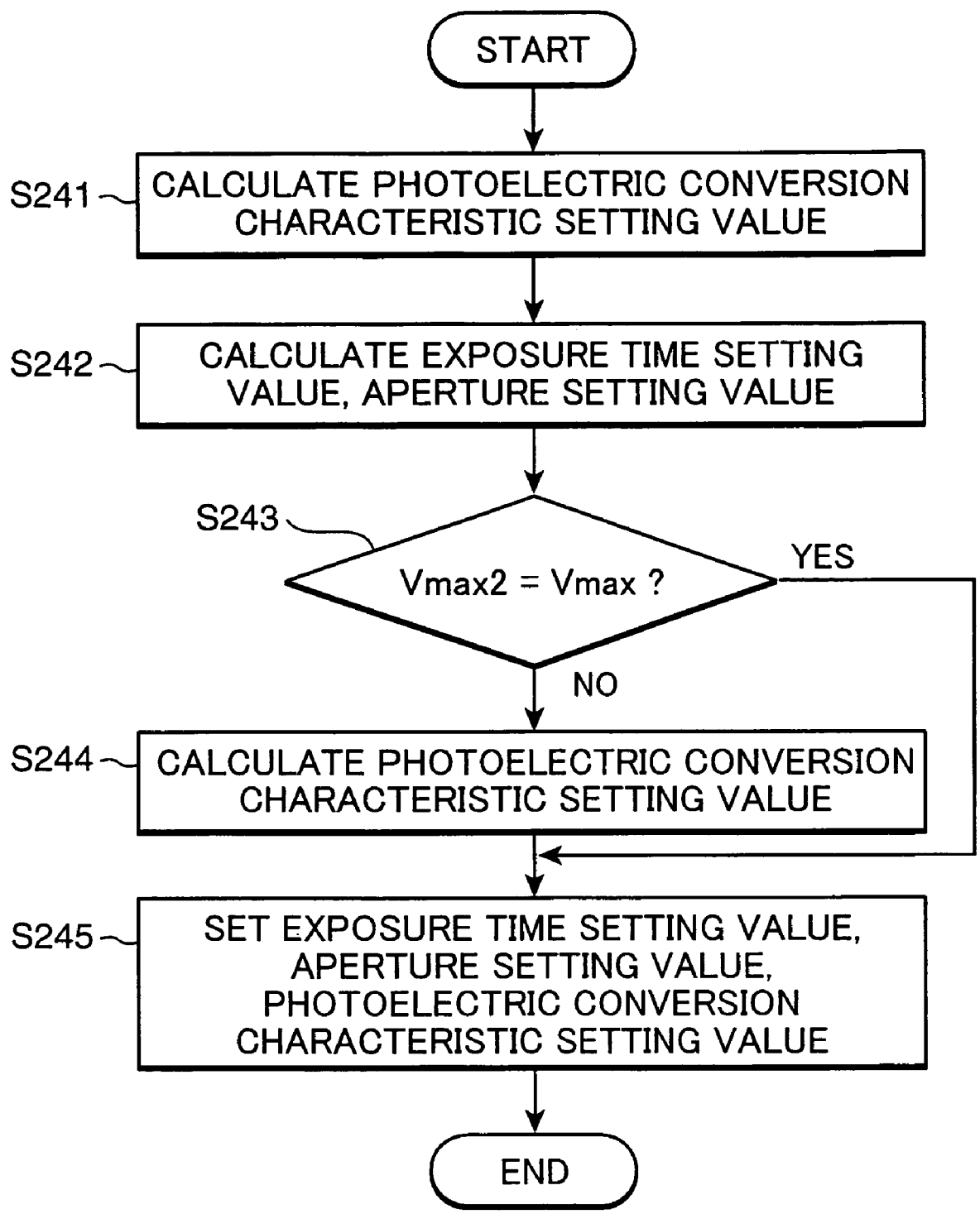
FIG. 36 is a flowchart showing an altered flow of the AE control according to the dynamic range prioritizing system shown in FIG. 33.

FIG. 36 is a flowchart showing a flow of AE control according to the dynamic range prioritizing system, wherein all the parameters are calculated prior to various settings. This altered arrangement is different from the arrangement described referring to FIG. 33 in that dynamic range control parameter calculation by the dynamic range control parameter calculator 512 (Step S241), exposure amount control parameter calculation by the exposure amount control parameter calculator 511 (Step S242) are performed in this order sequentially as a first stage of controlling, and dynamic range control parameter calculation by the dynamic range control parameter calculator 512 (Step S244) is performed as a second stage of controlling. In other words, the flow shown in FIG. 36 is different from the flow shown in FIG. 33 in that various setting operations are performed (Step S245) after completion of the dynamic range control parameter calculation in the second stage of controlling (Step S244), in place of performing settings for a photoelectric conversion characteristic, an exposure time, and an aperture value each time the control parameters are calculated in Steps S241 and S242.

Specifically, in the former part of the first stage of controlling, the dynamic range control parameter calculator 512 calculates, based on the AE evaluation values detected by the evaluation value detector 405, a control parameter to obtain a provisional photoelectric conversion setting value (Step S241). Then, in the latter part of the first stage of controlling, the exposure amount control parameter calculator 511 calculates an exposure amount control parameter based on the detected AE evaluation values likewise to obtain a provisional exposure time setting value, a provisional aperture setting value, and the like (Step S242). Subsequently, the output level judging section 530 compares a provisional saturated output level Vmax2, which is a sensor output corresponding to a subject luminance Lm10 for dynamic range setting, with a saturated output level Vmax based on the provisional photoelectric conversion characteristic obtained after the calculation of the control parameters in the first stage of controlling (Step S243).

If it is judged that the provisional saturated output level Vmax2 coincides with the saturated output level Vmax (YES in Step S243), various settings are carried out based on the setting values obtained by calculation of the control parameters corresponding to the first stage of controlling, since calculation of the control parameter corresponding to the second stage of controlling is not necessary. On the other hand, if it is judged that the provisional saturated output level Vmax2 exceeds the saturated output level Vmax (NO in Step S243), calculation of the control parameter for dynamic range control is executed as the second stage of controlling. The dynamic range control in the second stage of controlling is a control for matching the provisional saturated output level Vmax2 with the saturated output level Vmax to secure a target dynamic range. The dynamic range control parameter calculator 512 calculates the control parameter for realizing this operation (Step S244). Then, various settings are executed with respect to the parameters calculated in Step S244, namely, the provisional photoelectric conversion characteristic setting value obtained in Step S241, and the provisional exposure time setting value and the provisional aperture setting value obtained in Step S242, based on the values to which correction has been applied to execute the dynamic range prioritizing mode (Step S245).

According to the digital camera 1 for performing the AE control in accordance with the second embodiment, the exposure evaluation value detector detects the exposure evaluation values relating to control of the exposure in a sensing operation of a subject, based on the luminance information acquired from the subject. The exposure amount controller controls the exposure amount based on the photoelectric conversion characteristic of the image sensor by using the exposure evaluation values, and the dynamic range controller controls the dynamic range based on the photoelectric conversion characteristic of the image sensor by using the exposure evaluation values. In this way, the exposure of the image sensing apparatus is controlled by the exposure amount control by the exposure amount controller and the dynamic range control by the dynamic range controller in correlation with the photoelectric conversion characteristic of the image sensor equipped in the image sensing apparatus. This arrangement enables the user to capture the subject in an optimal exposure state in relation to the amount of light from the subject, with a certain dynamic range being secured. In addition, this arrangement enables to perform the exposure control of securing the target output level of the image sensor corresponding to the target subject luminance, and yet securing an appropriate dynamic range, or conversely, to perform the exposure control of securing the intended dynamic range of the image sensor, and yet securing an appropriate exposure amount.

Third Embodiment

In the following, the third embodiment of the invention is described referring to FIGS. 37 through 52.

The third embodiment is different from the first and the second embodiments in the AE controlling method. The AE control in the first embodiment is performed by the exposure amount control as shown in FIG. 18A, and by the dynamic range control as shown in FIG. 18B. The exposure amount control (A) is performed based on control of the exposure time, namely, the integration time of the image sensor 30, or the opening time of the shutter 23, and based on control of the aperture value, namely, the aperture area of the diaphragm 22, and the dynamic range control (B) is performed based on control of the photoelectric conversion characteristic, namely, the position of the inflection point, as summarized below.

(A) Exposure amount control based on exposure time control, i.e., control of the integration time or the shutter opening time, or based on aperture control, i.e., control of the aperture area of the diaphragm; and (B) Dynamic range control based on control of the photoelectric conversion characteristic, i.e., control of the position of the inflection point.

On the other hand, in AE control of the third embodiment, as summarized in [A] through [C], exposure amount control is performed in such a manner that exposure amount control based on aperture control, and exposure amount control based on control of the integration time or the shutter opening time are performed independently of each other, and dynamic range control is performed by controlling the photoelectric conversion characteristic, namely, the position of the inflection point, as in the case of the first embodiment.

[A] Exposure amount control based on aperture control, namely, control of the aperture area of the diaphragm;

[B] Dynamic range control based on control of the photoelectric conversion characteristic, namely, control of the position of the inflection point; and

[C] Exposure amount control based on exposure time control namely, control of the integration time or the shutter opening time.

Figure 37:
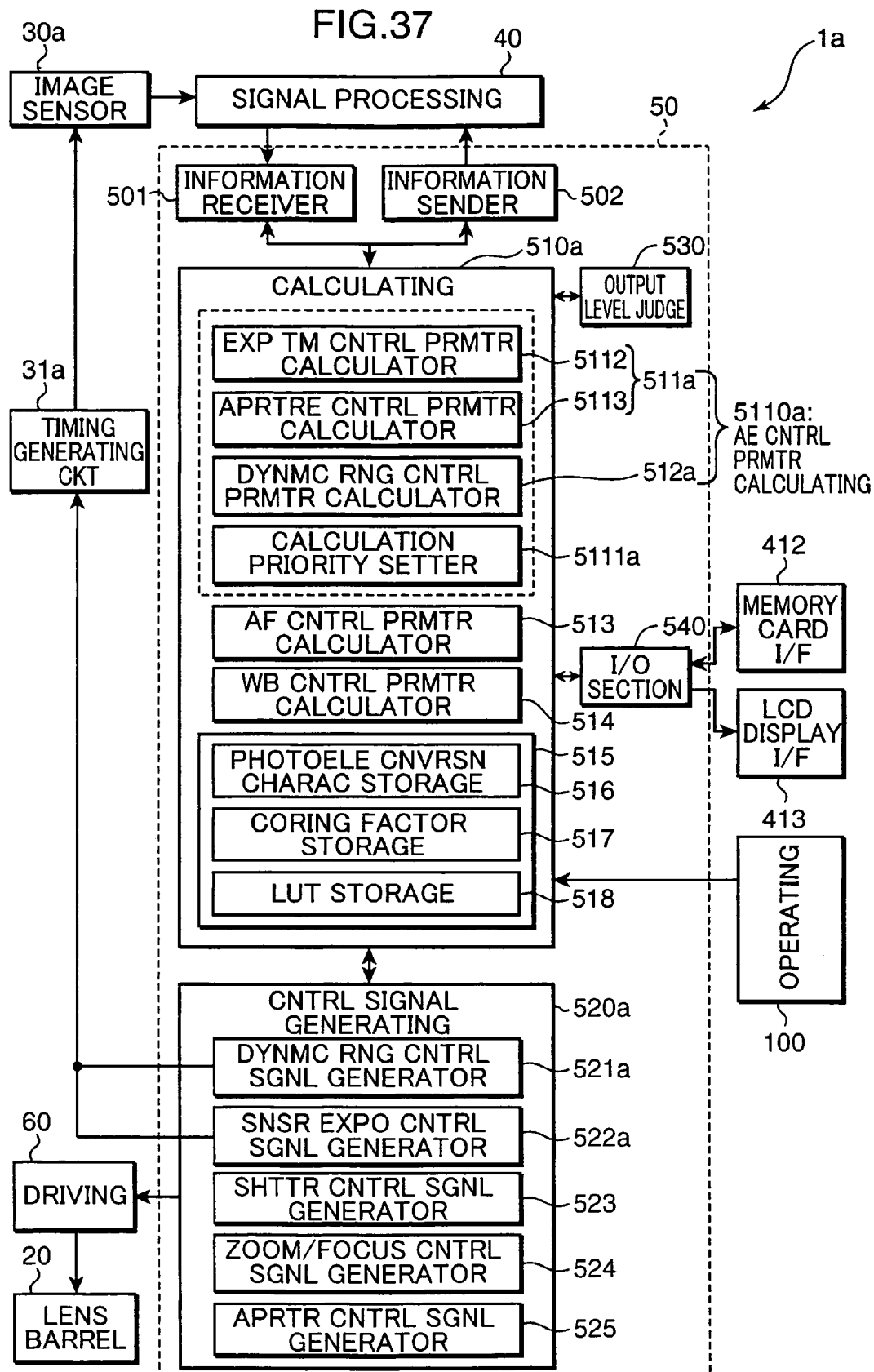
FIG. 37 is a functional block diagram for explaining functions of a main controller equipped in a digital camera as a third embodiment of the invention.

The third embodiment is different from the first and the second embodiments in the AE controlling method, specifically, as shown in FIG. 37, in that a digital camera 1a as the third embodiment has an image sensor 30a, a main controller 50a comprised of a calculating section 510a and a control signal generating section 520a, and a timing generating circuit 31a. Elements in the third embodiment that are equivalent or identical to those in the first and the second embodiments are denoted by the same reference numerals, and description thereof is omitted herein. It should be noted that the digital camera in accordance with the third embodiment is referred to as the digital camera 1a.

Figure 38:
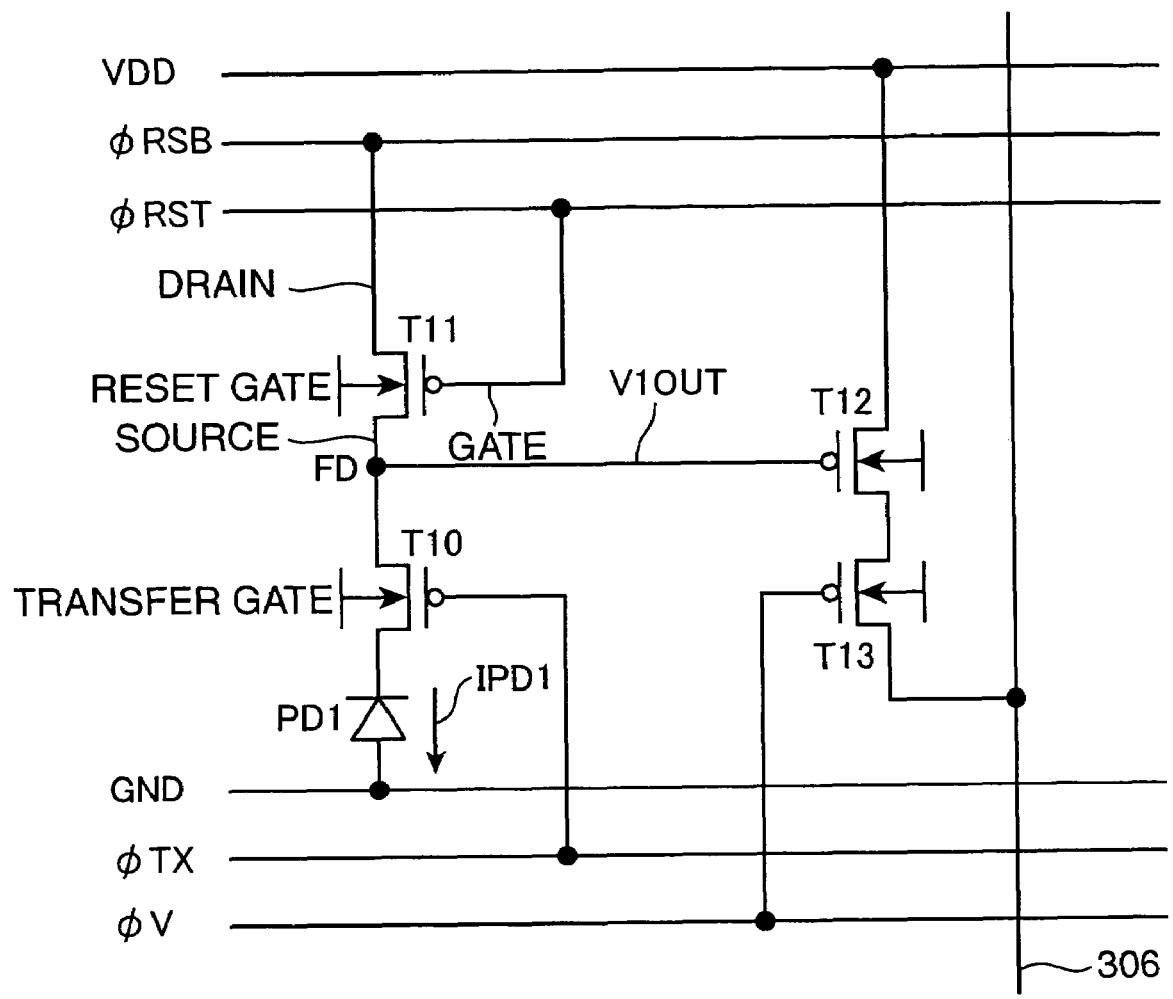
FIG. 38 is a circuitry diagram showing an exemplified arrangement of each pixel constituting an image sensor of the digital camera shown in FIG. 37.

First, the image sensor 30a is described in detail. FIG. 38 is an exemplified circuitry arrangement of each pixel in the image sensor 30a of the digital camera 1a as the third embodiment. The pixels in the image sensor 30a correspond to the pixels G11 through Gmn in the first and the second embodiments, as shown in FIG. 7. As shown in FIG. 38, each of the pixels G11 through Gmn of the image sensor 30a comprises a photodiode PD1, transistors T10 through T13 each comprised of a metal oxide semiconductor field effect transistor (MOSFET), and a floating diffusion (FD). An n-channel MOSFET is adopted as the transistors T10 through T13. The symbols VDD, φRSB, φRST, φTX, and φV represent signals or voltages to the respective transistors T10 through T13, and GND represents the ground.

The photodiode PD1 is a light sensing section or a photoelectric conversion section, and outputs an electrical signal or a photocurrent IPD1 commensurate with the amount of incident light from a subject. The transistor T12 and each of constant current sources corresponding to the constant current sources shown in FIG. 7 constitute an amplifying circuit, which is a source follower circuit i.e. a source follower amplifier to amplify a voltage V1OUT, which will be described later, namely, to conduct current amplification. The transistor T13 is a transistor for reading out a signal, and serves as a switch which is turned on and off in response to a voltage or a signal φV applied to the gate thereof. Specifically, the source of the transistor T13 is connected to an output signal line unit 306 corresponding to the output signal line unit 306 shown in FIG. 7, and the electric current which has been amplified by the transistor T12 is drawn to the output signal line unit 306, as an output current when the transistor T13 is turned on.

The transistor T10 is operated as a switch which is turned on and off in response to a voltage applied to the gate thereof, and functions as a so-called transfer gate, which performs switching of transferring/non-transferring the photocurrent IPD1 or the electric charge generated in the photodiode PD1 to the FD in response to turning on and off, namely, high and low of the gate potential of the transistor T10. The photocurrent PID1 generated in the photodiode PD1 flows to the parasitic capacitance of the photodiode PD1 for accumulating electric charge to thereby generate a voltage in accordance with the accumulated electric charge. If the transistor T10 is in an ON state at this time, the electric charge i.e. a negative charge accumulated in the parasitic capacitance is transferred to the FD. The FD is a charge holder which temporarily holds the electric charge i.e. a signal charge, and serves as a capacitor which converts the charge into a voltage, namely, performs charge-voltage conversion.

The transistor T11 i.e. a reset gate transistor performs switching of applying/non-applying a reset bias to the FD in response to turning on and off, namely, high and low of the gate voltage of the transistor T11. For instance, if the transistor T11 is in an ON state, the transistor T10 is also kept in an ON state, and accordingly, a reset bias is applied between φRSB and GND, with the transistor T11, the FD, the transistor T10, and the photodiode PD1 being interposed therebetween. Also, by setting the gate voltage to a middle potential (called as "Mid potential" or "Mid"), which will be described later, a linear conversion and a log conversion are implemented, respectively, by charge-voltage conversion by the FD and the transistor T11 of converting the charge which is transferred from the photodiode PD1 to the FD, namely, a current flowing in the FD, into a voltage.

Specifically, a reset current corresponding to the Mid potential flows in the transistor T11 to thereby cause the source of the transistor T11 to attain a potential corresponding to the reset current. If the potential attained by the charge transferred from the photodiode PD1 to the FD is smaller than the source potential of the transistor T11 corresponding to the Mid potential, namely, if the subject luminance for an image sensing is low, i.e., the subject image is dark, and the amount of light to be incident onto the photodiode PD1 is small, charge-voltage conversion as the linear conversion is performed by the FD. On the other hand, if the potential attained by the charge transferred from the photodiode PD1 to the FD exceeds the source potential of the transistor T11, namely, the subject luminance for the image sensing is high i.e. the subject image is bright, and the amount of light to be incident onto the photodiode PD1 is large, charge-voltage conversion as the log conversion is performed by the transistor T11.

By performing the above operations, a voltage as a linear output obtained by integration of the photocurrent IPD1 in the FD, or a voltage as a log output obtained by current-voltage conversion in accordance with the photocurrent IPD1 in the transistor T11 is generated at the connection node of the FD and the transistor T12, namely, at the output V1OUT. Specifically, the output value in the linear characteristic area of the photoelectric conversion characteristic is an integrated value of the photocurrent IPD1 in the FD. However, in a certain area of the logarithmic characteristic area where the potential by the charge accumulated in the FD exceeds the source current of the transistor T11 i.e. a reset gate, a current equivalent to the photocurrent IPD1 flows in the transistor T11, and a voltage obtained by current-voltage conversion of the photocurrent IPD1 in the transistor T11 is generated as the output value in the FD. The current-voltage conversion in the transistor T11 corresponds to the log conversion. Therefore, as will be described later, the output value in the linear characteristic area has an integration effect in the FD and in the parasitic capacitance, and the gradient of the linear characteristic area is changed in accordance with the exposure time of the image sensor 30a. On the other hand, the output value in the logarithmic characteristic area does not have an integration effect in the FD or in the parasitic capacitance. Therefore, the photoelectric conversion characteristic in the logarithmic characteristic area is fixed or unchanged independently of the exposure time of the image sensor 30a. In other words, there is no time factor in the logarithmic characteristic area.

Subsequently, in response to turning on of the transistor T13, an amplified current corresponding to the respective voltages is drawn from the transistor T12 to the output signal line unit 306 via the transistor T13, as an output current. Thus, in the third embodiment, the image sensor 30a i.e. each pixel has a circuitry arrangement provided with the FD, namely, a transfer gate and a reset gate to the FD, unlike the image sensor 30 which has the integration circuit comprised of the capacitor C and the transistor T3. This arrangement enables to obtain an output signal which is acquired by linear conversion or log conversion commensurate with the subject luminance or the incident luminance to the image sensor 30a.

As compared with the image sensor 30, the image sensor 30a has a simplified circuitry arrangement. For instance, the image sensor 30a has a circuitry arrangement excluding the integration circuit comprised of the capacitor C and the transistor T3. This arrangement enables to increase the aperture ratio to the image sensor 30a to thereby improve sensitivity or sensor output to the light incident onto the image sensing plane of the image sensor 30a.

Figure 39A:
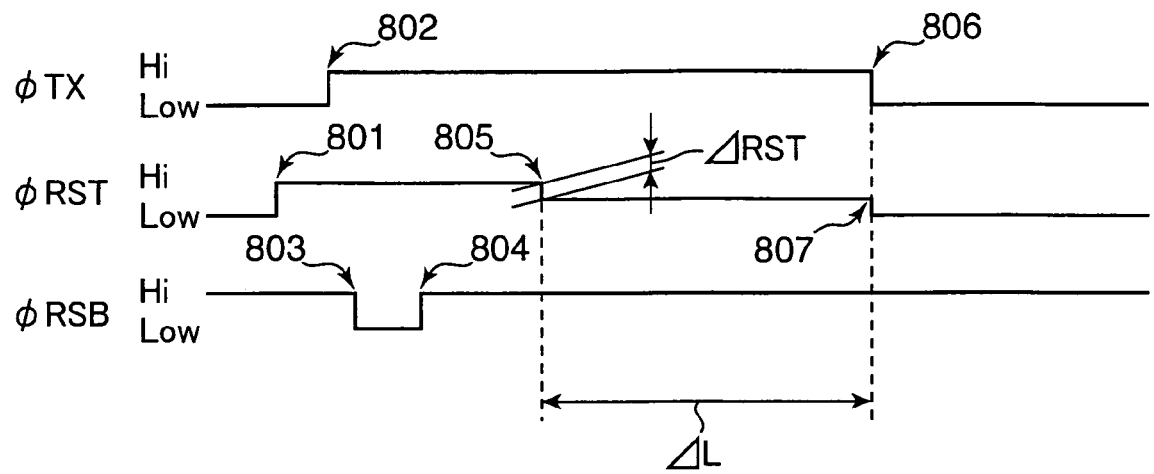
Figure 39B:
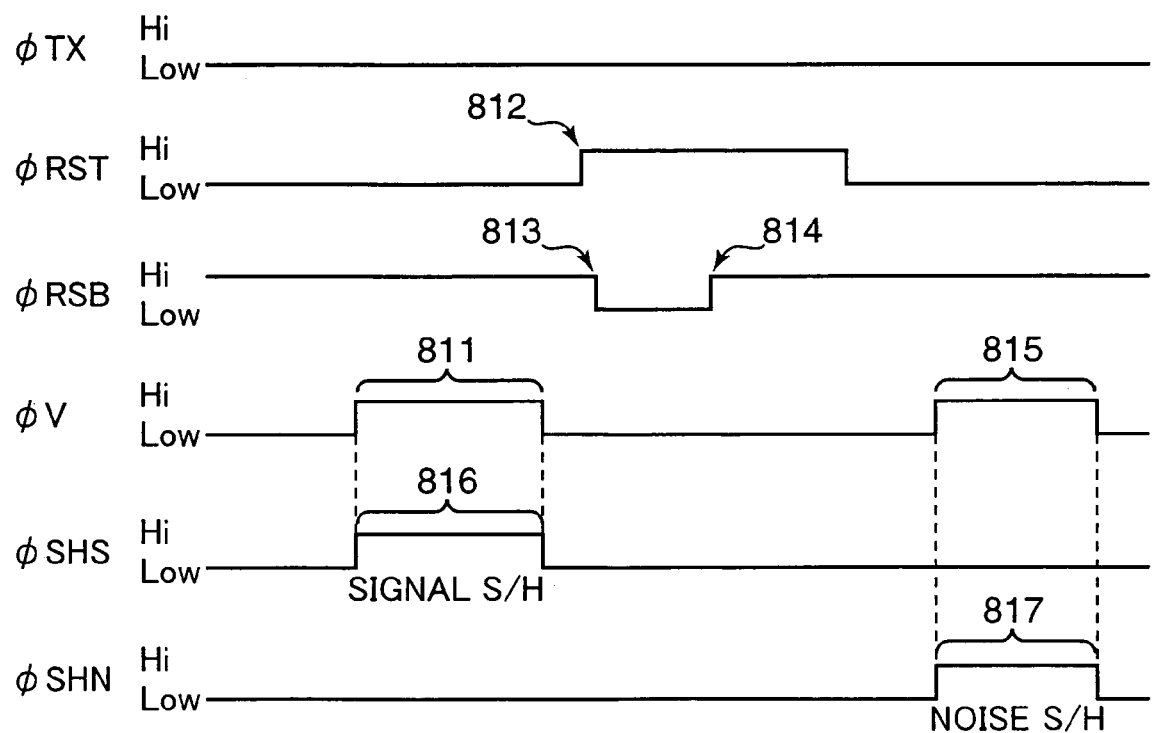

FIGS. 39A and 39B are examples of timing charts relating to an image sensing operation of each pixel in the image sensor 30a shown in FIG. 38. FIG. 39A is a timing chart relating to a charge accumulation or an exposing operation of all the pixels in a vertical blank period, and FIG. 39B is a timing chart relating to a charge sweeping operation of pixels in each row by vertical scanning in a horizontal blank period after termination of the charge accumulation. In this embodiment, in light of polarities of the n-channel MOSFET, the transistor is turned on when the respective signals are set high (Hi), and turned off when the respective signals are set low (Low).

First, referring to FIG. 39A, the signal φRST is set Hi at the timing indicated by the arrow 801, and the signal φTX is set Hi at the timing indicated by the arrow 802. Thereby, the reset bias is applied to the FD. Then, in response to temporary setting of the signal φRSB to Low at the timing indicated by the arrow 803 during a period when both of the signals φRST and φTX are set Hi, the potential of the FD is brought to a state where high luminance light is allowed to be incident, namely, a state where electric charge accumulation is started from 0. Then, a resetting operation or a refresh operation to the FD is performed by returning or setting the potential of the FD to Hi at the timing indicated by the arrow 804 with respect to all the pixels. By conducting the resetting operation to the FD, the electric charge in the FD is stabilized.

Thereafter, the signal φRST to the gate of the transistor T11 is changed from Hi to Mid with respect to all the pixels simultaneously at the timing indicated by the arrow 805 to perform electric charge accumulation in the FD, and voltage conversion of the accumulated charge by the linear conversion or the log conversion in the period when the signal φRST is set to Mid, namely, during a time period from the timing indicated by the arrow 805 to the timing indicated by the arrow 806. At this time, a ratio of the linear conversion or the log conversion is changed according to a difference ΔRST between Hi and Mid of the signal φRST.

Specifically, as the potential difference ΔRST is increased, the sensor output level Vth at the inflection point of the photoelectric conversion characteristic of the image sensor 30a is increased, namely, the ratio of the linear characteristic area in the photoelectric conversion characteristic is increased, in other words, the ratio of the logarithmic characteristic area is decreased. On the other hand, as the potential difference ΔRST is decreased, the sensor output level Vth at the inflection point of the photoelectric conversion characteristic of the image sensor 30a is decreased, namely, the ratio of the linear characteristic area in the photoelectric conversion characteristic is decreased, in other words, the ratio of the logarithmic characteristic area is increased. Thus, the output level at the inflection point of the photoelectric conversion characteristic of the image sensor 30a, namely, the position of the inflection point is controlled by controlling the potential difference ΔRST, as explained in the section referring to FIG. 11. This control corresponds to the control shown in FIG. 35, which will be described later.

The control of the potential difference ΔRST, namely, the Mid level, can be regarded as a control of changing the position of the inflection point, while keeping the gradients in the linear characteristic area and the logarithmic characteristic area unchanged, namely, a control of changing the switching point or offset from the linear characteristic to the log characteristic.

Referring back to FIG. 39A, in a state that the signal φTX is set Hi the period from the timing when the signal φRST is changed from Hi to Mid to the timing when the signal φTX is changed from Hi to Low, and the signal φRST is changed from Mid to Low, namely, a period during which the signal φRST is set Mid, is set as a time ΔL. The time ΔL corresponds to an exposure time or an integration time of each pixel in the image sensor 30a, namely, an electric charge accumulation time, i.e., an accumulation time ΔL. Control of the duration of the time ΔL is performed by a sensor exposure time control signal generator 522a via the timing generating circuit 31a, which will be described later. Control of the magnitude of the ΔRST, namely, control of the potential level of the signal φRST from Hi to Mid is performed by a dynamic range control signal generator 521a via the timing generating circuit 31a, which will be described later.

Subsequently, the charge which has been accumulated in the FD for the charge accumulation time ΔL is held, namely, the charge accumulation is terminated with respect to all the pixels simultaneously by setting the signal φTX from Hi to Low at the timing indicated by the arrow 806, and by setting the signal φRST from Mid to Low at the timing indicated by the arrow 807.

Next, referring to FIG. 39B, after the charge accumulation with respect to all the pixels is terminated in FIG. 39A, the transistor T13 is turned on in response to setting of the signal φV for a pixel in a certain row selected by vertical scanning of a vertical scanning circuit corresponding to the vertical scanning circuit 301 shown in FIG. 7 to Hi at the timing indicated by the arrow 811. Thereby, the charge accumulated in the FD of each pixel in the selected row is read out or swept to a corresponding vertical signal line corresponding to the output signal lines 306-1, 306-2, . . . , and 306-m shown in FIG. 7. The charge readout operation at the timing indicated by the arrow 811 is started in response to termination of the charge accumulation at the timing indicated by the arrow 806 or 807 shown in FIG. 39A The readout signal charge is transferred along the vertical signal line for temporary holding in each sample hold circuit of a selection circuit 308 corresponding to the selection circuit 308 shown in FIG. 7.

Thereafter, the signal φRST for each pixel in the selected row is changed from Low to Hi at the timing indicated by the arrow 812, and simultaneously, the signal φRSB for each pixel in the selected row is changed from Hi to Low at the timing indicated by the arrow 813 to set the potential of the FD to a state where high luminance light is allowed to be incident. Then, the signal φRSB is returned or set Hi at the timing indicated by the arrow 814 while keeping the signal φRST Hi, and the FD is reset to a value corresponding to the threshold value of the reset gate or the transistor T11. In response to setting the signal φV Hi at the timing indicated by the arrow 815 in this state, a noise signal is read out to the vertical signal line, and is held in a noise sample hold circuit provided in a correction circuit 309 corresponding to the correction circuit 309 shown in FIG. 7, which will be described later.

The signals φSHS and φSHN shown in FIG. 39B are sample hold control signals in a sample hold circuit for signal in the selection circuit 308, and in the sample hold circuit for noise in the correction circuit 309, respectively, which will be described later. As indicated by the reference numerals 816 and 817, during periods respectively indicated by the reference numerals 811 and 815 when the signal φV is set Hi, a signal i.e. an image signal, and a noise i.e. a noise signal are sample-held based on the sample hold control signals in the respective sample hold circuits of the selection circuit 308 and the correction circuit 309, as shown by "SIGNAL S/H" and "NOISE S/H" in FIG. 39B. Then, an image signal whose threshold variation of the reset gate has been removed is acquired with respect to each pixel in each row by calculating a difference between the image signal and the noise signal generated by the sample holding operations, namely, by subtracting the noise signal from the image signal. The signal φTX is constantly set Low during a horizontal blank period.

Referring back to FIG. 37, similarly to the first and the second embodiments, an AE control parameter calculating unit 5110a in the main controller 50a of the digital camera 1a calculates a control parameter for setting the optimal exposure amount and the photoelectric conversion characteristic or the dynamic range of the image sensor 30a for an image sensing operation so as to perform exposure control i.e. AE control commensurate with a subject luminance. In the third embodiment, control parameters regarding the respective controls [A], [B], and [C] are calculated. The AE control parameter calculating unit 5110a includes an exposure amount control parameter calculator 511a comprised of an exposure time control parameter calculator 5112 and an aperture control parameter calculator 5113, and a dynamic range control parameter calculator 512a.

The exposure time control parameter calculator 5112 calculates a control parameter for optimizing the exposure time, and calculates an exposure time setting value according to a subject luminance, based on the AE evaluation values detected by an evaluation value detector 405, and photoelectric conversion characteristic information of the image sensor 30a obtained at the time of acquiring the AE evaluation values stored in a photoelectric conversion characteristic information storage 516. The exposure time setting value is a value for controlling the exposure time or the integration time of the image sensor 30a, or the opening time of a shutter 23 to set an exposure amount, based on which the photoelectric conversion characteristic is changed to obtain a predetermined sensor output corresponding to a predetermined luminance for exposure amount setting.

The aperture control parameter calculator 5113 calculates a control parameter for optimizing the aperture value. Similarly to the exposure time setting value, the aperture control parameter calculator 5112 calculates an aperture setting value according to a subject luminance based on the AE evaluation values detected by the evaluation value detector 405, and the photoelectric conversion characteristic information of the image sensor 30a obtained at the time of acquiring the AE evaluation values stored in the photoelectric conversion characteristic information storage 516. The aperture setting value is a value for controlling the aperture value, namely, the aperture area of the diaphragm 22 to set an exposure amount based on which the photoelectric conversion characteristic is changed to obtain a predetermined sensor output corresponding to a predetermined luminance for exposure amount setting.

The dynamic range control parameter calculator 512a calculates a control parameter for optimizing the photoelectric conversion characteristic, namely, the dynamic range of the image sensor 30a according to the subject luminance. The dynamic range control parameter calculator 512a calculates a photoelectric conversion characteristic setting value for controlling the position of the inflection point of the photoelectric conversion characteristic, so that the image sensor 30a acquires the photoelectric conversion characteristic i.e. the dynamic range, based on which a saturated output level corresponding to the subject luminance for dynamic range setting is obtained. The photoelectric conversion characteristic information of the image sensor 30a obtained at the time of acquiring the AE evaluation values stored in the photoelectric conversion characteristic information storage 516 is referred to in calculating the photoelectric conversion characteristic setting value.

The exposure amount control parameter, namely, the exposure time control parameter and the aperture control parameter, and the dynamic range control parameter respectively calculated by the exposure amount control parameter calculator 511a and the dynamic range control parameter calculator 512a of the main controller 50a are outputted to a control signal generating section 520a. Upon receiving the control parameters, respective elements in the control signal generating section 520a generate control signals for operating the timing generating circuit 31a and a driving section 60, which, in turn, generate drive signals for causing the relevant elements to perform actual exposure amount control operation. The control signal generating section 520a in the third embodiment is different from the control signal generating section 520 in the first and the second embodiments in that a dynamic range control signal generator 521a and a sensor exposure time control signal generator 522a are operated to drive the image sensor 30a in the third embodiment.

Specifically, the dynamic range control signal generator 521a generates a drive signal to the timing generating circuit 31a, namely, to the image sensor 30a for controlling the output level at the inflection point at which the photoelectric conversion characteristic is switched from a linear characteristic area to a logarithmic characteristic area based on the photoelectric conversion characteristic setting value of the image sensor 30a calculated by the dynamic range control parameter calculator 512a, and sends the drive signal to the timing generating circuit 31a. As mentioned above, the inflection point is changed by controlling the photoelectric conversion characteristic of the image sensor 30a by the potential difference ΔRST of the signal φRST for the image sensor 30a between Hi and Mid. Thus, the dynamic range of the image sensor 30a is controlled in accordance with the subject luminance by controlling the drive signal to the timing generating circuit 31a so as to control the magnitude of the difference ΔRST or the Mid level of the signal φRST. The timing generating circuit 31a generates a timing signal for controlling the dynamic range of the image sensor 30a based on a drive signal corresponding to the inputted difference ΔRST to drive the image sensor 30a.

The sensor exposure time control signal generator 522a generates a drive signal to the timing generating circuit 31a for securing a necessary exposure time based on the exposure time setting value calculated by the exposure time control parameter calculator 5112, and sends the drive signal to the timing generating circuit 31a. As mentioned above, the drive signal is a control signal for optimizing the accumulation time ΔL, with which the signal φRST for the image sensor 30a is set to the middle potential Mid based on the exposure time setting value. The timing generating circuit 31a generates a timing signal for controlling the exposure time of the image sensor 30a based on the drive signal corresponding to the inputted accumulation time ΔL in a similar manner as mentioned above, and drives the image sensor 30a.

The aperture setting value calculated by the aperture control parameter calculator 5113 is outputted to the aperture control signal generator 525, which, in turn, generates a drive signal to the driving section 60 for setting the aperture area of the diaphragm 22 based on the aperture setting value, and sends the drive signal to the driving section 60. Similarly to the aperture control signal generator 525, the shutter control signal generator 523 generates a control signal for setting the shutter speed of the shutter 23 in accordance with the exposure time based on the exposure time setting value calculated by the exposure time control parameter calculator 5112, and sends the control signal to the driving section 60.

As in the case of the first and the second embodiments, the AE control parameter calculating unit 5110a has a calculation priority setter 5111a. The calculation priority setter 5111a sets a priority concerning calculation of control parameters under AE control among aperture control parameter calculation in the control [A], exposure time control parameter calculation in the control [C], and dynamic range control parameter calculation in the control [B], wherein in both of the controls [A] and [C], the exposure amount control parameter is calculated. Similarly to the first and the second embodiments, setting of the priority by the calculation priority setter 5111a is performed in response to entering of designation by the user with a mode setting switch 105 or the like on an operating section 100. Similarly to the first and the second embodiments, in this embodiment, the mode of prioritizing calculation of the exposure amount control parameter is called as "exposure amount control parameter calculation prioritizing mode", and the mode of prioritizing calculation of the dynamic range control parameter is called as "dynamic range control parameter calculation prioritizing mode". Since both of the aperture control parameter and the exposure time control parameter are examples of the exposure amount control parameter, a state of prioritizing calculation of the aperture control parameter or calculation of the exposure time control parameter over calculation of the dynamic range control parameter corresponds to the exposure amount control parameter calculation prioritizing mode. Operations as to how the controls [A], [B], and [C] in the AE control are performed according to the priority set by the calculation priority setter 511*a* will be described later in detail.

Figure 40:
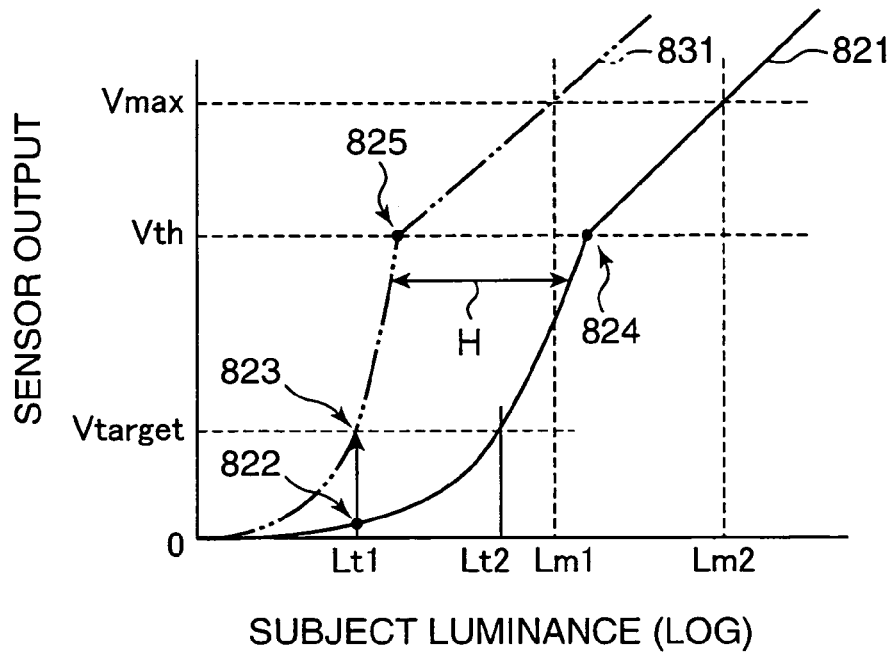
FIG. 40 is a graph showing how the photoelectric conversion characteristic of the image sensor is changed in performing aperture-control-based exposure amount control [A].
Figure 41:
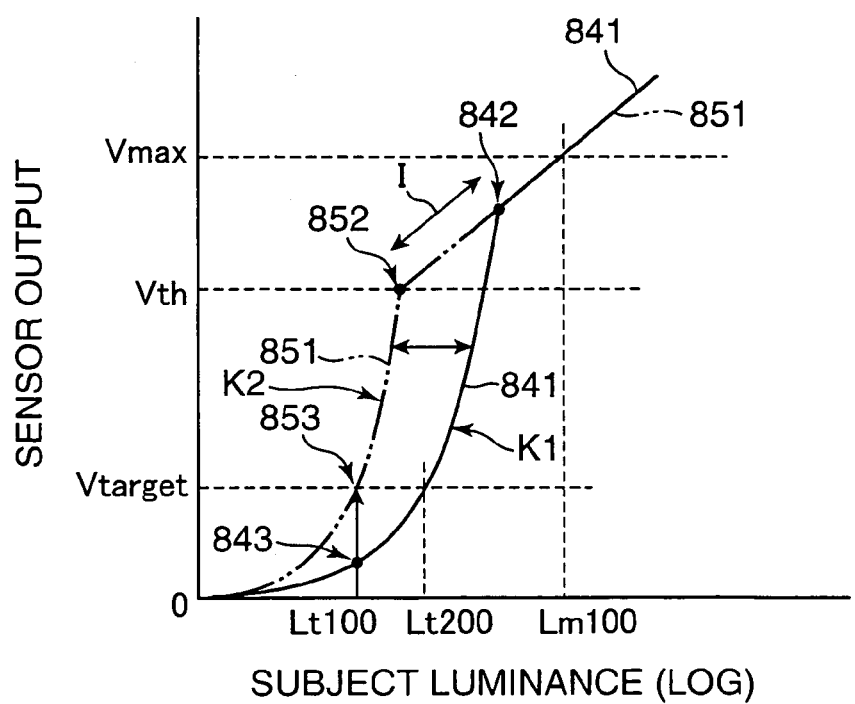
FIG. 41 is a graph showing how the photoelectric conversion characteristic of the image sensor is changed in performing exposure-time-control-based exposure amount control [C].
Figure 42:
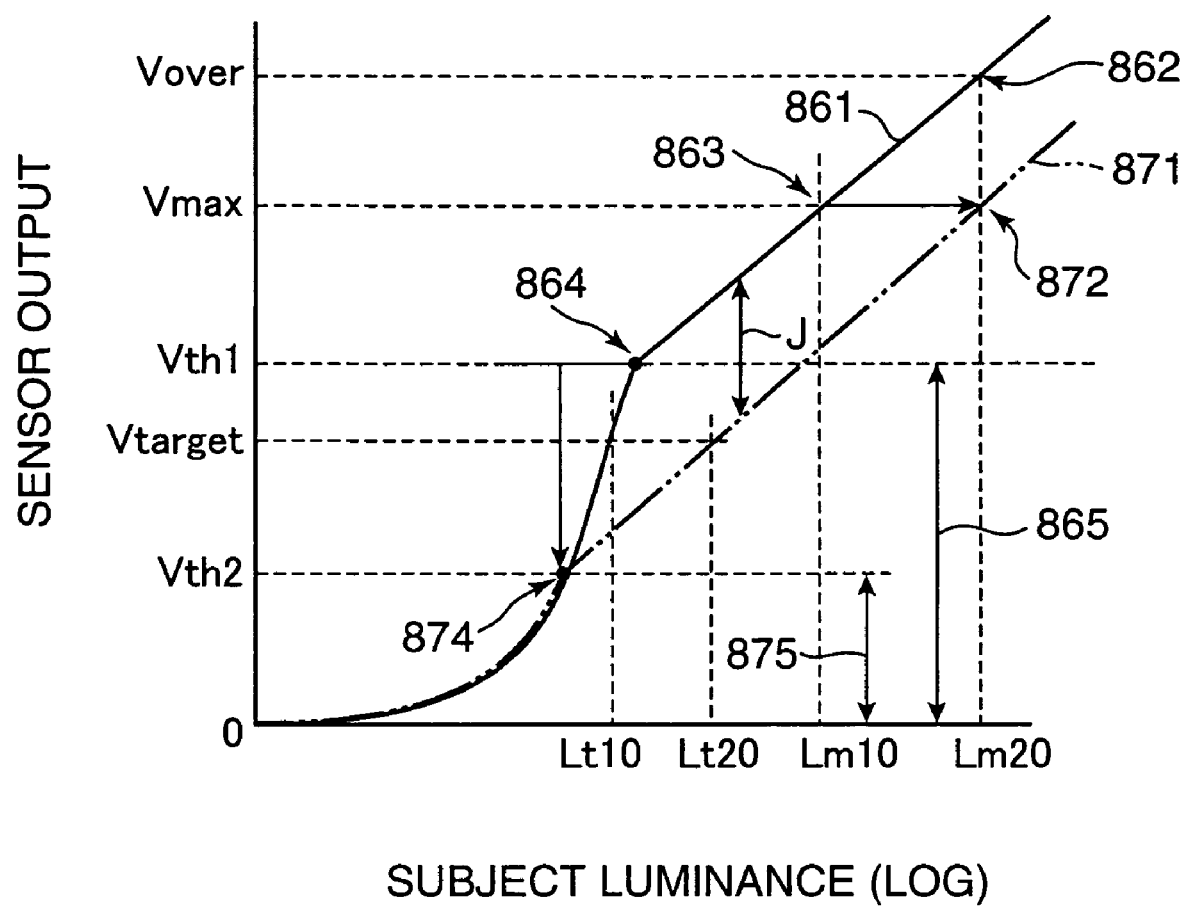
FIG. 42 is a graph showing how the photoelectric conversion characteristic of the image sensor is changed in performing photoelectric-conversion-characteristic-control-based dynamic range control [B].

Next, the aperture-control-based exposure amount control [A], the photoelectric-conversion-characteristic-based dynamic range control [B], and the exposure-time-control-based exposure amount control [C] in the AE control according to the third embodiment are described referring to FIGS. 40 through 42.

FIG. 40 is a graph showing how the photoelectric conversion characteristic of the image sensor 30*a* is changed in case of performing the control [A]. Unlike the first and the second embodiments in which the axes of abscissas in the photoelectric conversion characteristic graphs (see FIGS. 18A and 18B) represent "incident luminance to the image sensor", the axis of abscissas in FIG. 40 represents "subject luminance". This is the same for the graphs shown in FIGS. 41 and 42. In the third embodiment, the luminance in the axis of abscissas is a subject luminance itself, namely, an absolute luminance, in place of a sensor input luminance obtained as a result of exposure of the image sensor to a subject light image for a certain time, namely, an integration time or a shutter opening time, which includes a time factor. The axis of ordinate in the third embodiment represents a sensor output, as in the case of the first and the second embodiments.

As shown in FIG. 40, the entirety of the photoelectric conversion characteristic of the image sensor 30*a* is changed or shifted in one of the directions shown by the arrows H by controlling the aperture value, namely, the aperture area of the diaphragm 22. Specifically, similarly to the controls shown in FIG. 18A in the first and the second embodiments, for instance, calculated is the photoelectric conversion characteristic 831 in such a manner that the sensor output at the point 822 corresponding to a predetermined luminance Lt1 for exposure amount setting in the linear characteristic area of the photoelectric conversion characteristic 821 becomes a target output Vtarget at the point 823. Here, the sensor output corresponding to the luminance Lt1 is increased from the point 822 to the point 823. In this case, the inflection point 824 is shifted in parallel to the inflection point 825, with the sensor output Vth being unchanged. In other words, the photoelectric conversion characteristic is changed in such a manner that the subject luminance for obtaining the target output Vtarget is changed or lowered from Lt2 to Lt1. It is possible to change the sensor output obtained in relation to a subject luminance as an absolute luminance by changing the aperture area of the diaphragm 22 independently of the exposure time, i.e., free of the exposure time, by handling the subject luminance as mentioned above. Thus, the AE control can be performed in such a manner as to change the entirety of the photoelectric conversion characteristic, as shown in FIG. 40.

The aperture area of the diaphragm 22 necessary for changing the photoelectric conversion characteristic in such a manner that the sensor output corresponding to the luminance Lt1 for exposure amount setting becomes Vtarget is calculated as in the case of the first and the second embodiments. Specifically, as explained in the section referring to FIGS. 19 and 21, an exposure amount gain (Gain) is calculated by implementing the equation: Gain=Vtarget/VtAve, an exposure time gain Gt and an aperture gain Gs are calculated based on the Gain by implementing the equation: Gain=Gt·Gs according to the flowchart shown in FIG. 20, and an exposure time T2 and an aperture area S2 are calculated based on the exposure time gain Gt and the aperture gain Gs. The aperture area S2 obtained by the calculation corresponds to the aperture area used in the exposure amount control in FIG. 40, and the setting value for obtaining the aperture area corresponds to the aperture setting value.

The aperture control parameter calculator 5113 in the calculating section 510*a* calculates the aperture area of the diaphragm 22. The exposure time is automatically calculated in the course of calculating the aperture area. Alternatively, the exposure time control parameter calculator 5112 may perform interim computation, namely, calculation of the exposure time gain Gt and the aperture gain Gs in the course of calculating the aperture area, and then, the aperture control parameter calculator 5113 may calculate the aperture area based on the calculated aperture gain Gs.

Similarly to the first and the second embodiments, it is possible to obtain a main subject luminance and a peripheral subject luminance by implementing multi-pattern metering by a multi-pattern metering section 4051 to obtain information such as a luminance histogram, and a maximum/minimum luminance by a histogram calculator 4052 and a maximum/minimum luminance calculator 4054, respectively, and to calculate luminance information such as the luminance Lt1 to be used in the above calculation based on the information. The same operation is performed in the controls [B] and [C] as in the control [A].

FIG. 41 is a graph showing how the photoelectric conversion characteristic of the image sensor 30*a* is changed in case of performing the control [C]. In the first and the second embodiments, the linear characteristic area and the logarithmic characteristic area, namely, the entirety of the photoelectric conversion characteristic is changed by controlling the exposure time (see FIG. 18A). In this embodiment, the sensor output obtained by the log conversion with respect to the subject luminance does not change even if the exposure time or the integration time is changed in light of the features of the image sensor 30*a*. Namely, there is no time factor regarding the exposure time in the logarithmic characteristic area in the third embodiment. Accordingly, in this embodiment, the gradient of the linear characteristic area is changed without changing the logarithmic characteristic area, namely, without changing the position and the gradient of the logarithmic characteristic area, by changing the exposure time.

Referring to FIG. 41, the gradient K1 in the linear characteristic area of a photoelectric conversion characteristic 841 shown by the solid line is changed to the gradient K2 in the linear characteristic area of a photoelectric conversion characteristic 851 shown by the two-dotted-chain line by changing the exposure time, and vice versa. In this way, whereas the gradient of the linear characteristic area is changed, the logarithmic characteristic area is unchanged. Accordingly, the photoelectric conversion characteristic is shifted from the photoelectric conversion characteristic 841 to the photoelectric conversion characteristic 851 in such a manner that the position of the inflection point of the linear characteristic area and the logarithmic characteristic area is apparently shifted from the inflection point 842 to the inflection point 852, for instance, in the obliquely downward direction corresponding to one of the arrows I along the gradient of the logarithmic characteristic area. The ratio of the linear characteristic area to the logarithmic characteristic area in the photoelectric conversion characteristic is changed by changing the gradient of the linear characteristic area, namely, by apparently shifting the position of the inflection point.

Specifically, for instance, the sensor output corresponding to the luminance Lt100 is increased from the sensor output level at the point 843 in the photoelectric conversion characteristic 841 to the sensor output level Vtarget at the point 853 in the photoelectric conversion characteristic 851 by controlling the exposure time. The sensor output is increased according to increase of the exposure time, even if the subject luminance is the same. In other words, the photoelectric conversion characteristic is changed in such a manner that the subject luminance for obtaining the target output Vtarget is changed or lowered from the luminance Lt200 in the photoelectric conversion characteristic 841 to the luminance Lt100 in the photoelectric conversion characteristic 851.

The exposure time control is performed by control of the integration time, namely, the accumulation time $\Delta L$ of the image sensor 30a and/or the opening time i.e. the shutter speed of the shutter 23. The integration time of the image sensor 30a or the opening time of the shutter 23 necessary for changing the photoelectric conversion characteristic such that the sensor output corresponding to the luminance Lt100 for exposure amount setting becomes the target output Vtarget is calculated as in the case of the control [A]. Specifically, an exposure amount gain (Gain) is calculated by implementing the equation: Gain=Vtarget/VtAve, an exposure time gain Gt and an aperture gain Gs are calculated based on the Gain by implementing the equation: Gain=Gt·Gs, and an exposure time T2 and an aperture area S2 are calculated based on the exposure time gain Gt and the aperture gain Gs. The exposure time T2 obtained by the calculation corresponds to the exposure time to be used in the exposure amount control in FIG. 41, and the setting value for obtaining the exposure time corresponds to the exposure time setting value.

The exposure time control parameter calculator 5112 calculates the exposure time setting value. The aperture area is automatically calculated in the course of calculating the exposure time setting value. Alternatively, the aperture control parameter calculator 5113 may perform interim computation, namely, calculation of the exposure time gain Gt and the aperture gain Gs in the course of calculating the exposure time, and then, the exposure time control parameter calculator 5112 may calculate the exposure time based on the calculated exposure time gain Gt.

In this way, it is possible to change the linear characteristic area while keeping the dynamic range unchanged, namely, without changing the subject luminance Lm100 corresponding to the sensor output saturation level Vmax in FIG. 34, by performing exposure amount control based on which the linear characteristic area is changed while keeping the logarithmic characteristic area unchanged through control of the exposure time.

In other words, the control [C] makes it possible to implement the following control. For instance, if a user wishes to increase the exposure amount in the entirety of a subject image, namely, to obtain a bright image from an image captured in a dark place, the control [A] is performed (see FIG. 40), wherein the entirety of the photoelectric conversion characteristic is changed to increase the dynamic range. Further, for instance, if the user wishes to control the exposure amount such as contrast or brightness in an image area of a low luminance, although a satisfactory dynamic range is secured, the control [C] is executed. In this way, the arrangement provides high latitude in selecting the exposure amount controlling method, and consequently, enables to perform the AE control with high precision. Alternatively, the digital camera 1a may have an arrangement of performing the control [A], or an arrangement of performing the control [C], in other words, the exposure amount control may be performed by either one of the aperture control and the exposure time control.

FIG. 42 is a graph showing how the photoelectric conversion characteristic of the image sensor 30a is changed in case of performing the control [B]. In this control, the dynamic range is controlled by controlling the photoelectric conversion characteristic, namely, the sensor output Vth at the inflection point. Specifically, as in the case of the first and the second embodiments shown in FIG. 18B, the position of the inflection point is shifted, for example, from the inflection point 864 corresponding to the sensor output Vth1 to the inflection point corresponding to the sensor output Vth to decrease the sensor output corresponding to the subject luminance Lm20 for dynamic range setting from the sensor output Vover at the point 862 in a photoelectric conversion characteristic 861 to the sensor output Vmax i.e. the saturated output level of the image sensor 30a at the point 872 in a photoelectric conversion characteristic 871, in other words, to increase the maximum luminance capable of obtaining the sensor output Vmax from the luminance Lm10 at the point 863 to the luminance Lm20 at the point 872, namely, to increase the dynamic range. In this case, the logarithmic characteristic area is shifted in parallel to the area before the shifting in one of the directions indicated by the arrows J, namely, in the sensor output axis direction in a state that the gradient does not change by changing the inflection point.

In this way, the photoelectric conversion characteristic setting value regarding control of the position of the inflection point for dynamic range control is calculated by the dynamic range control parameter calculator 512a. A process for calculating the photoelectric conversion characteristic setting value is the same as described referring to FIG. 22 in the first and the second embodiments. Specifically, an inflection point e.g. the inflection point 874 in FIG. 42 corresponding to Vth2 of the photoelectric conversion characteristic after shifting is calculated to secure a necessary dynamic range by modeling the linear characteristic area and the logarithmic characteristic area of the photoelectric conversion characteristic, and a control value for changing the photoelectric conversion characteristic, based on which the inflection point e.g. the inflection point 864 corresponding to Vth1 of the photoelectric conversion characteristic before shifting becomes the inflection point after the shifting is calculated as the photoelectric conversion characteristic setting value.

The dynamic range control signal generator 521a generates a control signal for changing the output level Vth at the inflection point based on the calculated photoelectric conversion characteristic setting value, namely, a signal for controlling the difference $\Delta RST$ i.e. the Mid level of the signal $\phi RST$. The output level at the inflection point in the photoelectric conversion characteristic of the image sensor 30a is controlled by controlling the difference $\Delta RST$. Referring to FIG. 42, if the output level at the inflection point 864 in the photoelectric conversion characteristic 861 is shifted to the sensor output 865 by the difference $\Delta RST$, the sensor output is decreased from the sensor output 865 to the sensor output 875 by decreasing the difference $\Delta RST$, for instance. As a result, the position of the inflection point is shifted to the inflection point 874 in the photoelectric conversion characteristic 871. Conversely, the inflection point is shifted from the inflection point 874 to the inflection point 864 by increasing the difference $\Delta RST$. In this way, the control [B] is realized by control of the difference $\Delta RST$.

Similarly to the first and the second embodiments, in the third embodiment, it is possible to implement control of the photoelectric conversion characteristic i.e. the position of the inflection point based on the photoelectric conversion characteristic setting value if a saturation judging section 4055 (see FIG. 14) judges that the output level of the image sensor 30a is not saturated, and to lower the output level at the inflection point by the changed amount ΔVth based on the saturated pixel number if the saturation judging section 4055 judges that the output level of the image sensor 30a is saturated (see FIG. 23A). Specifically, it is possible to change the photoelectric conversion characteristic in such a manner as to increase the dynamic range, so that an image is captured at a higher luminance side.

As mentioned above, the AE control is performed by the aperture-control-based exposure amount control [A], the dynamic range control [B], and the exposure-time-control-based exposure amount control [C]. In the following, description is made as to calculation of an aperture control parameter, calculation of an exposure time control parameter, and calculation of a dynamic range control parameter based on a priority in detail.

In performing the AE control by the controls [A], [B], and [C], the following two modes <1> and <2> are conceived as the priority order concerning calculation of the respective control parameters in the controls A, [B], and [C].

<1> Exposure Amount Control Parameter Calculation Prioritizing Mode:

In this mode, calculation of the exposure amount control parameter, namely, the aperture control parameter and the exposure time control parameter, is performed followed by calculation of the dynamic range control parameter.

<2> Dynamic Range Control Parameter Calculation Prioritizing Mode:

In this mode, calculation of the dynamic range control parameter is performed, followed by calculation of the exposure amount control parameter, namely, the aperture control parameter and the exposure time control parameter.

Figure 43:
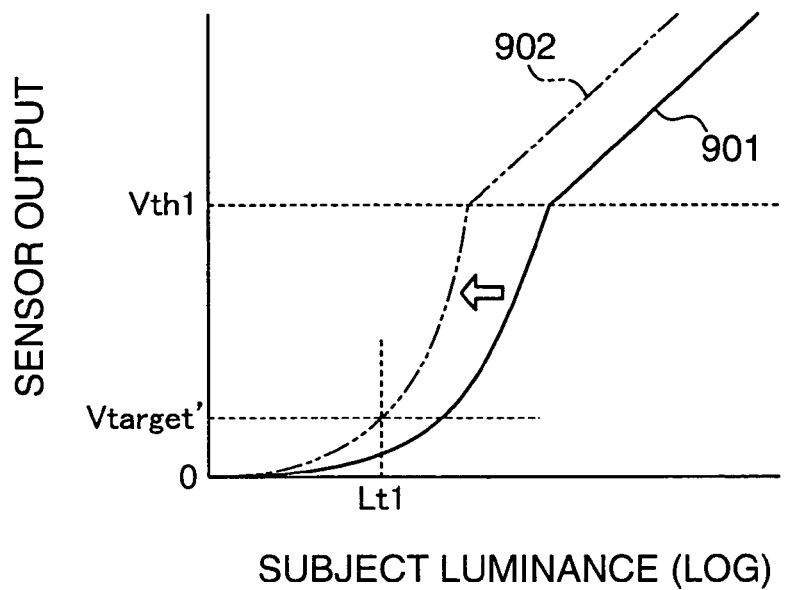
FIG. 43 is a graph showing how the photoelectric conversion characteristic of the image sensor is changed under AE control based on the control [A] in the exposure amount control parameter calculation prioritizing mode in the third embodiment.
Figure 44:
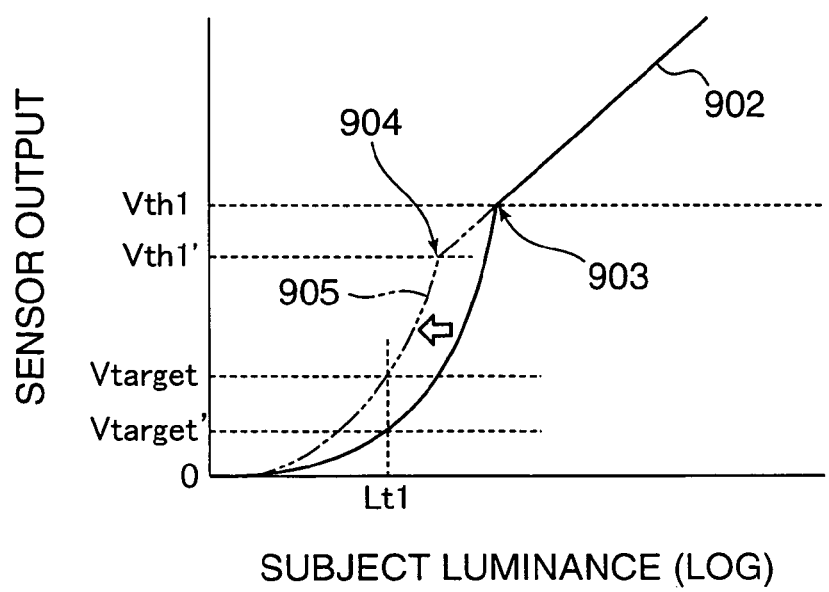
FIG. 44 is a graph showing how the photoelectric conversion characteristic of the image sensor is changed under AE control based on the control [C] in the exposure amount control parameter calculation prioritizing mode in the third embodiment.
Figure 45:
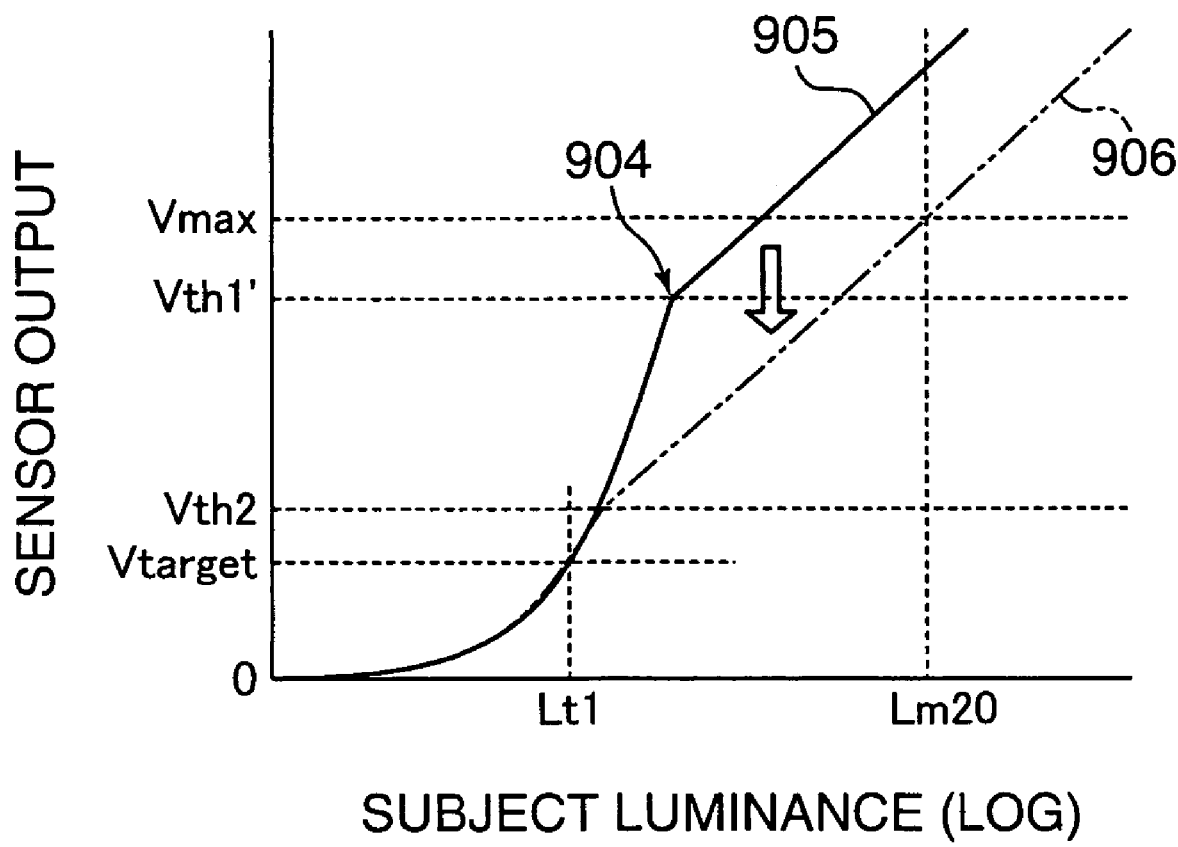
FIG. 45 is a graph showing how the photoelectric conversion characteristic of the image sensor is changed under AE control based on the control [B] in the exposure amount control parameter calculation prioritizing mode in the third embodiment.

First, description is made on the exposure amount control parameter calculation prioritizing mode <1>. FIGS. 43 through 45 are graphs each showing how the photoelectric conversion characteristic of the image sensor 30a is changed under the AE control in the exposure amount control parameter calculation prioritizing mode. FIG. 43 shows a case in performing the control [A] of calculating the aperture control parameter, FIG. 44 shows a case in performing the control [C] of calculating the exposure time control parameter, and FIG. 45 shows a case in performing the control [B] of calculating the dynamic range control parameter.

In the exposure amount control parameter calculation prioritizing mode, the following patterns are conceived as the order of prioritizing calculation of the control parameters.

(Priority Pattern 1.1)

The control parameters are calculated in the order of [A], [C], and [B].

(Priority Pattern 1.2)

The control parameters are calculated in the order of [C], [A], and [B].

In this section, an example of the priority pattern 1.1 is described in detail.

First, regarding the control [A] shown in FIG. 43, the aperture control parameter calculator 5113 calculates, by using the AE evaluation values detected by the evaluation value detector 405, an aperture setting value i.e. an aperture control parameter for obtaining a photoelectric conversion characteristic, which makes it possible to match the sensor output of the image sensor 30a corresponding to the subject luminance Lt1 for exposure amount setting with a predetermined provisional target level Vtarget' in the linear characteristic area. Since the process for calculating the aperture setting value is the same as the process described referring to FIG. 40, description thereof is omitted herein. In FIG. 43, the aperture setting value for increasing the exposure amount i.e. the aperture area is calculated in such a manner that a photoelectric conversion characteristic 901 obtained at the time of acquiring the AE evaluation values is shifted to a photoelectric conversion characteristic 902 so as to match the sensor output of the image sensor 30a corresponding to the luminance Lt1 with the provisional target output level Vtarget'. The photoelectric conversion characteristic 901 may be a predetermined fixed photoelectric conversion characteristic stored in the photoelectric conversion characteristic information storage 516, or may be a photoelectric conversion characteristic which has been set at the time of acquiring the AE evaluation values last time.

Next, after calculation of the aperture control parameter shown in FIG. 43 is completed, calculation of the exposure time control parameter in the control [C] is performed as shown in FIG. 44. As in the case of FIG. 43, the exposure time control parameter calculator 5112 calculates, by using the AE evaluation values detected by the evaluation value detector 405, an exposure time setting value i.e. an exposure time control parameter for obtaining a photoelectric conversion characteristic, which makes it possible to match the sensor output of the image sensor 30a corresponding to the subject luminance Lt1 for exposure amount setting with a new target level Vtarget in the linear characteristic area. It may be possible to obtain a photoelectric conversion characteristic after the shifting by keeping the value of the provisional target level Vtarget' in FIG. 43 unchanged, and by newly setting a value of the luminance Lt1 corresponding to the provisional target level Vtarget' for the control [C]. Since the process for calculating the exposure time setting value is the same as the process described referring to FIG. 41, description thereof is omitted herein. In the control [C] shown in FIG. 44, the gradient of the linear characteristic area is changed, with the gradient and the position of the logarithmic characteristic area being unchanged, and accordingly, a photoelectric conversion characteristic 905 corresponding to the photoelectric conversion characteristic 902 shown in FIG. 43 is obtained, wherein an inflection point 903 of the photoelectric conversion characteristic 902 corresponding to the sensor output Vth1 is apparently shifted to an inflection point 904 corresponding to the sensor output Vth1'.

After calculation of the exposure time control parameter shown in FIG. 44 is completed, calculation of the dynamic range control parameter in the control [B] is performed as shown in FIG. 45. In this control, the dynamic range control parameter calculator 512a calculates, by using the AE evaluation values detected by the evaluation value detector 405, a photoelectric conversion characteristic setting value i.e. a dynamic range control parameter for obtaining a photoelectric conversion characteristic, which makes it possible to match the sensor output of the image sensor 30a corresponding to the maximum subject luminance Lm20 for dynamic range setting with a saturated output level Vmax. Since the process for calculating the photoelectric conversion characteristic setting value is the same as the process described referring to FIG. 42, description thereof is omitted herein. In the control [B] of calculating the dynamic range control parameter as shown in FIG. 45, the photoelectric conversion characteristic setting value for changing the photoelectric conversion characteristic 905 shown in FIG. 44 to a photoelectric conversion characteristic 906, namely, for lowering the output level at the inflection point from Vth1' to Vth2 to match the sensor output of the image sensor 30a corresponding to the luminance Lm20 with the saturated output level Vmax, is calculated.

In shifting the photoelectric conversion characteristic 905 to the photoelectric conversion characteristic 906 in the control [B] of calculating the dynamic range control parameter as shown in FIG. 45, the output level Vth2 at the inflection point of the photoelectric conversion characteristic 906 after the shifting is calculated. If the output level Vth2 is lower than a predetermined reference lower limit Vlimit, calculation is performed to correctively raise the output level Vth2 by a certain output level value, so that the output level Vth2 is equal to or larger than the reference lower limit Vlimit. The reference lower limit Vlimit is set in advance by setting the target output level Vtarget shown in FIG. 44 as a reference value and by implementing the following equation.

$$Vlimit = Vtarget + \Delta V$$

where $\Delta V$ represents a predetermined output level value. The value $\Delta V$ is a sufficient output level value capable of securing the exposure amount which has been secured on the priority basis in the exposure amount control shown in FIG. 44, for instance, an exposure amount that makes it possible to match the output level corresponding to the subject luminance Lt1 with the target output level Vtarget.

In this way, under the exposure control in the exposure amount control parameter calculation prioritizing mode, there is provided a limit or a constraint regarding calculation of the parameter for controlling the photoelectric conversion characteristic such as the output level Vth2 and the dynamic range control parameter.

As in the case of the first and the second embodiments, the raising of the output level Vth2 for correction may be performed one time by calculating the difference in output level between the output level Vth2 and the reference lower limit Vlimit, or may be performed a certain number of times by raising the output level Vth2 by a predetermined value stepwise. Further alternatively, corrective calculation may be performed in such a manner that the output level Vth2 after the corrective calculation is not lower than the reference lower limit Vlimit, in place of calculating the output level Vth2 for correction and comparing the calculated output level Vth2 with the reference lower limit Vlimit. Further alternatively, it is possible to obtain a photoelectric conversion characteristic having an inflection point serving as a reference level in advance, to store the control parameter for obtaining the photoelectric conversion characteristic, to compare the stored control parameter with a control parameter obtained by computation, and to replace the computed control parameter with the stored control parameter if the output level Vth2 is lower than the reference lower limit Vlimit, in place of directly calculating the output level Vth2 at the inflection point, and comparing the calculated output level Vth2 with the reference lower limit Vlimit.

In case of the priority pattern 1.2, namely, in case of calculating the control parameters in the order of [C], [A], and [B], operations are the same as those in the priority pattern 1.1. Briefly describing the operations in the priority pattern 1.2, first, in FIG. 44, an exposure time control parameter is calculated, so that the photoelectric conversion characteristic 902 is changed to the photoelectric conversion characteristic 905, namely, the inflection point 903 is apparently shifted to the inflection point 904. Next, in FIG. 43, an aperture control parameter is calculated, so that the photoelectric conversion characteristic 901 corresponding to the photoelectric conversion characteristic 905 in FIG. 44 is changed to the photoelectric conversion characteristic 902. It may be possible to use a setting value different from a subject luminance for exposure amount setting, and a target output level corresponding to the subject luminance in calculating the aperture control parameter. Subsequently, in FIG. 45, a dynamic range control parameter is calculated, so that the photoelectric conversion characteristic 905 in FIG. 45 corresponding to the photoelectric conversion characteristic 902 in FIG. 43 is changed to the photoelectric conversion characteristic 906.

As in the case of the priority pattern 1.1, in the case of the priority pattern 1.2, calculation is performed to raise the output level Vth2 by a certain output level value, so that the sensor output Vth2 is equal to or larger than the reference lower limit Vlimit shown in FIG. 44, if the sensor output Vth2 at the inflection point of the photoelectric conversion characteristic 906 after the shifting is lower than the reference lower limit Vlimit in the control [B] of calculating the dynamic range control parameter as shown in FIG. 45. Since the calculating process for raising the sensor output Vth2 is the same as the process mentioned above, description thereof is omitted herein.

In the foregoing, the operations of the aperture-control-based exposure amount control [A] and the exposure-time-control-based exposure amount control [C] are executed in the order of priority. Alternatively, the control [A] and the control [C] of calculating the respective control parameters may be concurrently executed parallel to each other.

Figure 46:
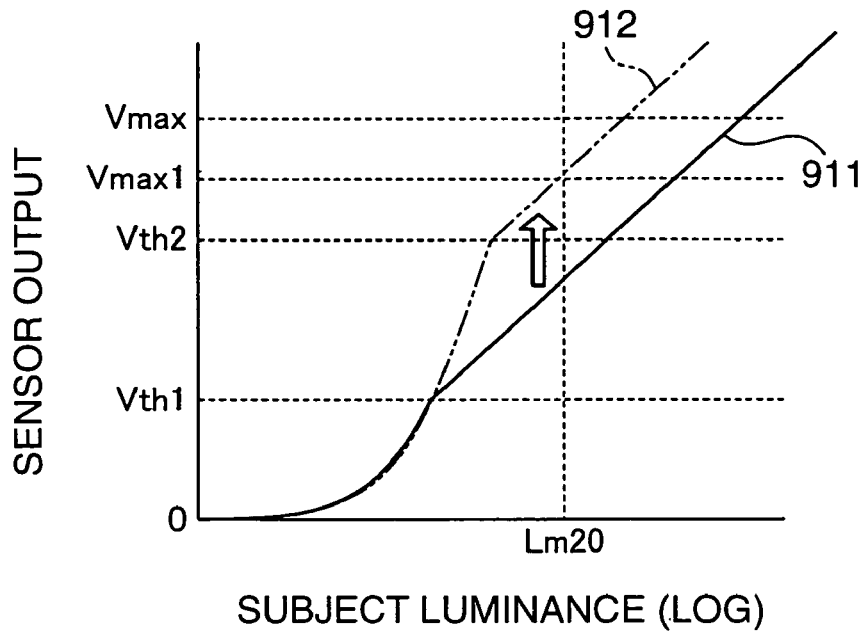
FIG. 46 is a graph showing how the photoelectric conversion characteristic of the image sensor is changed under AE control based on the control [B] in the dynamic range control parameter calculation prioritizing mode in the third embodiment.
Figure 47:
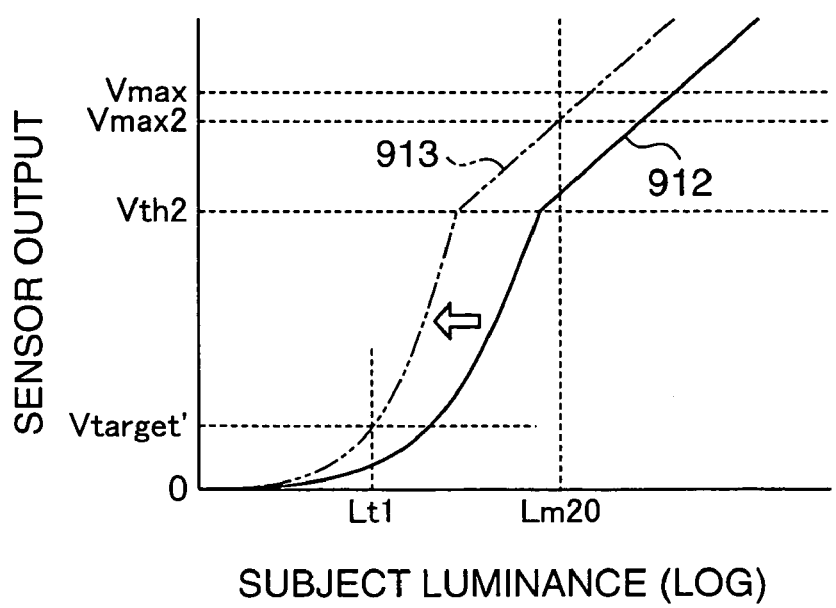
FIG. 47 is a graph showing how the photoelectric conversion characteristic of the image sensor is changed under AE control based on the control [A] in the dynamic range control parameter calculation prioritizing mode in the third embodiment.
Figure 48:
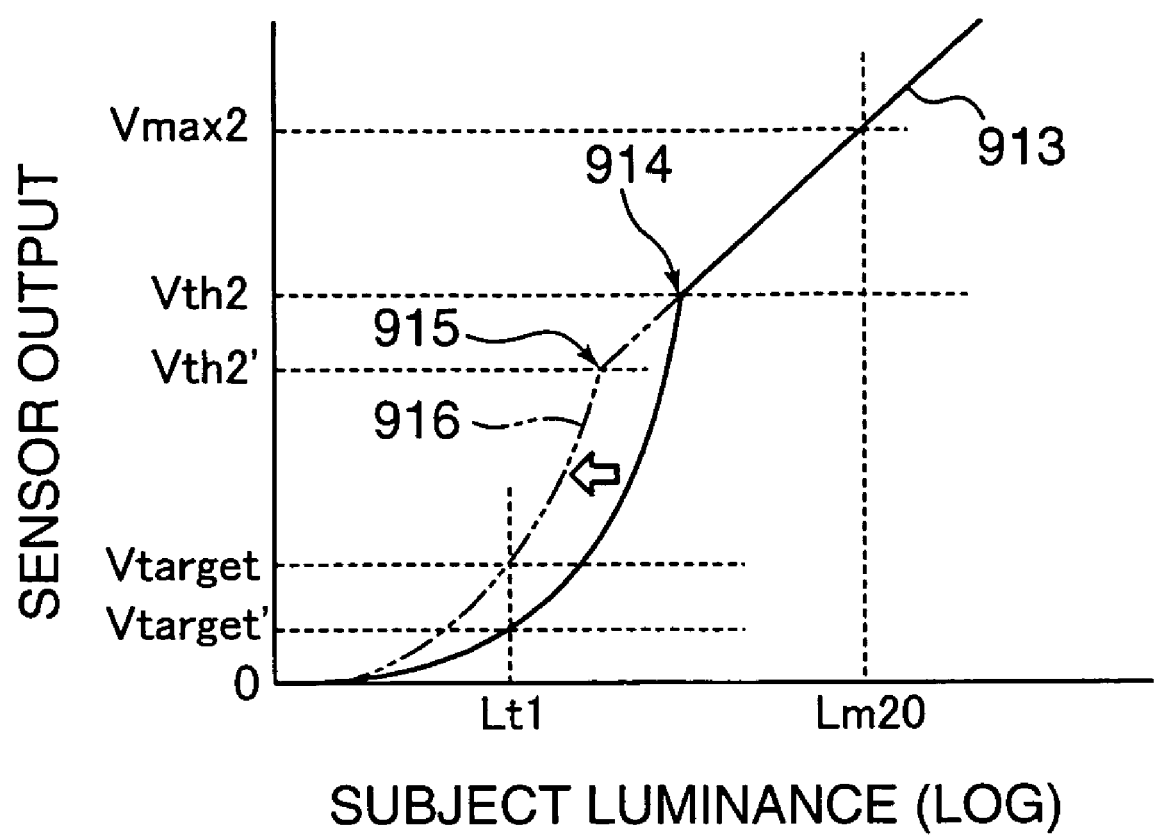
FIG. 48 is a graph showing how the photoelectric conversion characteristic of the image sensor is changed under AE control based on the control [C] in the dynamic range control parameter calculation prioritizing mode in the third embodiment.

Next, description is made on the dynamic range control parameter calculation prioritizing mode <2>. FIGS. 46 through 48 are graphs each showing how the photoelectric conversion characteristic of the image sensor 30a is changed under the AE control in the dynamic range control parameter calculation prioritizing mode. FIG. 46 shows a case in performing the control [B] of calculating the dynamic range control parameter, FIG. 47 shows a case in performing the control [A] of calculating the aperture control parameter, and FIG. 48 shows a case in performing the control [C] of calculating the exposure time control parameter.

In the dynamic range control parameter calculation prioritizing mode, the following patterns are conceived as the priority order concerning calculation of the respective control parameters.

(Priority Pattern 2.1)
The control parameters are calculated in the order of [B], [A], and [C].
(Priority Pattern 2.2)
The control parameters are calculated in the order of [B], [C], and [A].

In this section, an example of the priority pattern 2.1 is described in detail.

First, regarding the control [B] shown in FIG. 46, the dynamic range control parameter calculator 512a calculates, by using the AE evaluation values detected by the evaluation value detector 405, a photoelectric conversion characteristic setting value i.e. a dynamic range control parameter for obtaining a photoelectric conversion characteristic, which makes it possible to match the sensor output of the image sensor 30a corresponding to the maximum subject luminance Lm20 for dynamic range setting with a provisional saturated output level Vmax1, which is provisionally set for the dynamic range control. Since the process for calculating the photoelectric conversion characteristic setting value is the same as the process described referring to FIG. 42, description thereof is omitted herein. The provisional saturated output level Vmax1 is a provisionally set value based on an assumption that the entirety of the photoelectric conversion characteristic will be shifted or moved in the direction shown by the arrow in FIG. 46 by performing the exposure amount control shown in FIGS. 47 and 48 following the dynamic range control, and that the output level i.e. the provisional saturated output level Vmax1 corresponding to the luminance Lm20 after the dynamic range control will be changed accordingly. Alternatively, the value of the provisional saturated output level Vmax1 may be set as the saturated output level Vmax.

In the control [B] as shown in FIG. 46, the photoelectric conversion characteristic setting value for changing the photoelectric conversion characteristic 911 obtained at the time of acquiring the AE evaluation values to a photoelectric conversion characteristic 912, namely, for raising the output level at the inflection point from Vth1 to Vth2 is calculated to match the sensor output of the image sensor 30a corresponding to the luminance Lm20 with the provisional saturated output level Vmax1. The photoelectric conversion characteristic 911 may be a predetermined fixed photoelectric conversion characteristic stored in the photoelectric conversion characteristic information storage 516, or may be a photoelectric conversion characteristic which has been set at the time of acquiring the AE evaluation values last time.

Next, after calculation of the dynamic range control parameter shown in FIG. 46 is completed, calculation of the aperture control parameter in the control [A] is performed as shown in FIG. 47. In this control, the aperture control parameter calculator 5113 calculates, by using the AE evaluation values detected by the evaluation value detector 405, an aperture setting value i.e. an aperture control parameter for obtaining a photoelectric conversion characteristic, which makes it possible to match the sensor output of the image sensor 30a corresponding to the subject luminance Lt1 for exposure amount setting with a predetermined provisional target level Vtarget' in the linear characteristic area. Since the process for calculating the aperture setting value is the same as the process described referring to FIG. 40, description thereof is omitted herein. In FIG. 47, the aperture setting value for increasing the exposure amount i.e. the aperture area is calculated in such a manner that a photoelectric conversion characteristic 912 corresponding to the photoelectric conversion characteristic 912 in FIG. 46 is shifted to a photoelectric conversion characteristic 913 so as to match the sensor output of the image sensor 30a corresponding to the luminance Lt1 with the provisional target output level Vtarget'.

In shifting the photoelectric conversion characteristic 912 to the photoelectric conversion characteristic 913 in the control [A] of calculating the aperture control parameter as shown in FIG. 47, the output level Vmax2 corresponding to the subject luminance Lm20 in the photoelectric conversion characteristic 913 after the shifting is calculated. If the output level Vmax2 is higher than the saturated output level Vmax of the image sensor 30a, calculation is performed to correctively lower the output level Vmax2 by a certain output level value, so that the output level Vmax2 is equal to or lower than the saturated output level Vmax.

Calculation of lowering the output level Vmax2 by the predetermined output level value is performed by lowering an exposure amount gain (Gain) for matching the sensor output of the image sensor 30a corresponding to the luminance Lt1 with the target output Vtarget, namely, matching the sensor output corresponding to the luminance Lm20 with the sensor output Vmax2, by a predetermined gain value. The exposure amount gain (Gain) is obtained by implementing the equation: Gain=Vtarget/VtAve. The exposure amount gain (Gain) is lowered by lowering the aperture gain Gs while keeping the exposure time gain Gt unchanged.

In this way, under the exposure control in the dynamic range control parameter calculation prioritizing mode, there is provided a limit or a constraint regarding calculation of the exposure amount control parameter such as the exposure amount gain (Gain) and the aperture control parameter to keep the dynamic range from being affected by the exposure amount control following the dynamic range control.

As in the case of the first and the second embodiments, the lowering of the gain or the like for correction may be performed one time by calculating a gain difference between the exposure amount gain (Gain), and a gain (called as "VmGain") for matching the sensor output corresponding to the luminance Lm20 with the saturated output level Vmax, or may be performed a certain number of times by lowering the gain by a predetermined value stepwise. Further alternatively, corrective calculation may be performed in such a manner that the provisional saturated output level Vmax2 after the corrective calculation is not larger than the saturated output level Vmax, in place of calculating the output level Vmax2 corresponding to the subject luminance Lm20 for correction, and comparing the calculated output level Vmax2 with the saturated output level Vmax. Further alternatively, as in the case of the exposure amount control parameter calculation prioritizing mode <1>, it is possible to compare a computed control parameter with a stored control parameter, in place of calculating the output level Vmax2 itself and comparing the output level Vmax2 with the saturated output level Vmax.

Subsequently, after calculation of the aperture control parameter shown in FIG. 47 is completed, calculation of the exposure time control parameter in the control [C] is performed as shown in FIG. 48. As in the case of FIG. 47, the exposure time control parameter calculator 5112 calculates, by using the AE evaluation values detected by the evaluation value detector 405, an exposure time setting value i.e. an exposure time control parameter for obtaining a photoelectric conversion characteristic, which makes it possible to match the sensor output of the image sensor 30a corresponding to the subject luminance Lt1 for exposure amount setting with a new target level Vtarget in the linear characteristic area. It may be possible to obtain a photoelectric conversion characteristic after the shifting by keeping the value of the provisional target level Vtarget' in FIG. 43 unchanged, and by newly setting a value of the luminance Lt1 corresponding to the provisional target level Vtarget' for the control [C]. Since the process for calculating the exposure time setting value is the same as the process described referring to FIG. 41, description thereof is omitted herein. In the control [C] shown in FIG. 48, the gradient of the linear characteristic area is changed, with the gradient and the position of the logarithmic characteristic area being unchanged, namely, with the dynamic range of the photoelectric conversion characteristic in FIG. 47 unchanged. Thereby, a photoelectric conversion characteristic 916 in FIG. 48 is obtained, wherein the inflection point 914 of the photoelectric conversion characteristic 913 corresponding to the sensor output Vth2 is apparently shifted to the inflection point 915 corresponding to the sensor output Vth2'.

In case of the priority pattern 2.2, namely, in case of calculating the control parameters in the order of [B], [C], and [A], operations are the same as those in the priority pattern 2.1. Briefly describing the operations in the priority pattern 2.2, first, in FIG. 46, a dynamic range control parameter is calculated, so that the photoelectric conversion characteristic 911 is changed to the photoelectric conversion characteristic 912. Next, in FIG. 48, an exposure time control parameter is calculated, so that the photoelectric conversion characteristic 913 corresponding to the photoelectric conversion characteristic 912 in FIG. 46 is changed to the photoelectric conversion characteristic 916. Subsequently, in FIG. 47, an aperture control parameter is calculated, so that the photoelectric conversion characteristic 912 in FIG. 47 corresponding to the photoelectric conversion characteristic 916 in FIG. 48 is changed to the photoelectric conversion characteristic 913. It is possible to use a setting value different from the subject luminance for exposure amount setting, and the target output level corresponding to the subject luminance in FIG. 48 in calculating the aperture control parameter.

As in the case of the priority pattern 2.1, in the case of the priority pattern 2.2, calculation is performed to lower the output level Vmax2 corresponding to the subject luminance Lm20 in the photoelectric conversion characteristic 913 after the shifting by a certain output level value, so that the sensor output Vmax2 is equal to or lower than the saturated output level Vmax, if the sensor output Vmax2 is higher than the saturated output level Vmax in the control [A] of calculating the aperture control parameter as shown in FIG. 47. Since the calculating process for lowering the sensor output Vmax2 is the same as the process mentioned above, description thereof is omitted herein.

As in the case of the exposure amount control parameter calculation prioritizing mode, in the dynamic range control parameter calculation prioritizing mode, the control [A] and the control [C] of calculating the respective control parameters may be concurrently executed parallel to each other, in place of setting the priority between the control [A] and the control [C].

Figure 49:
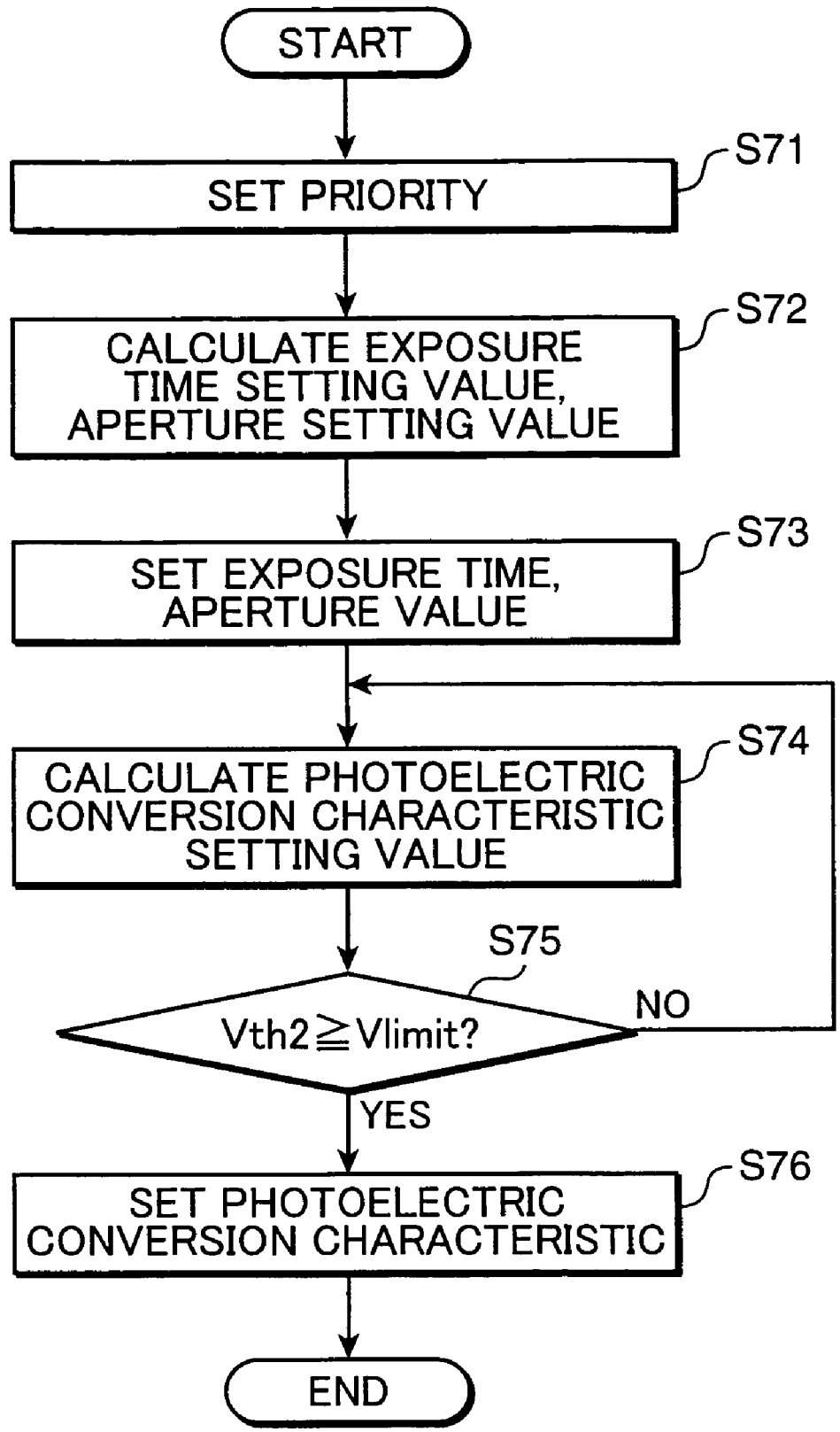
FIG. 49 is a flowchart showing a flow of AE control in the exposure amount control parameter calculation prioritizing mode in the third embodiment.
Figure 50:
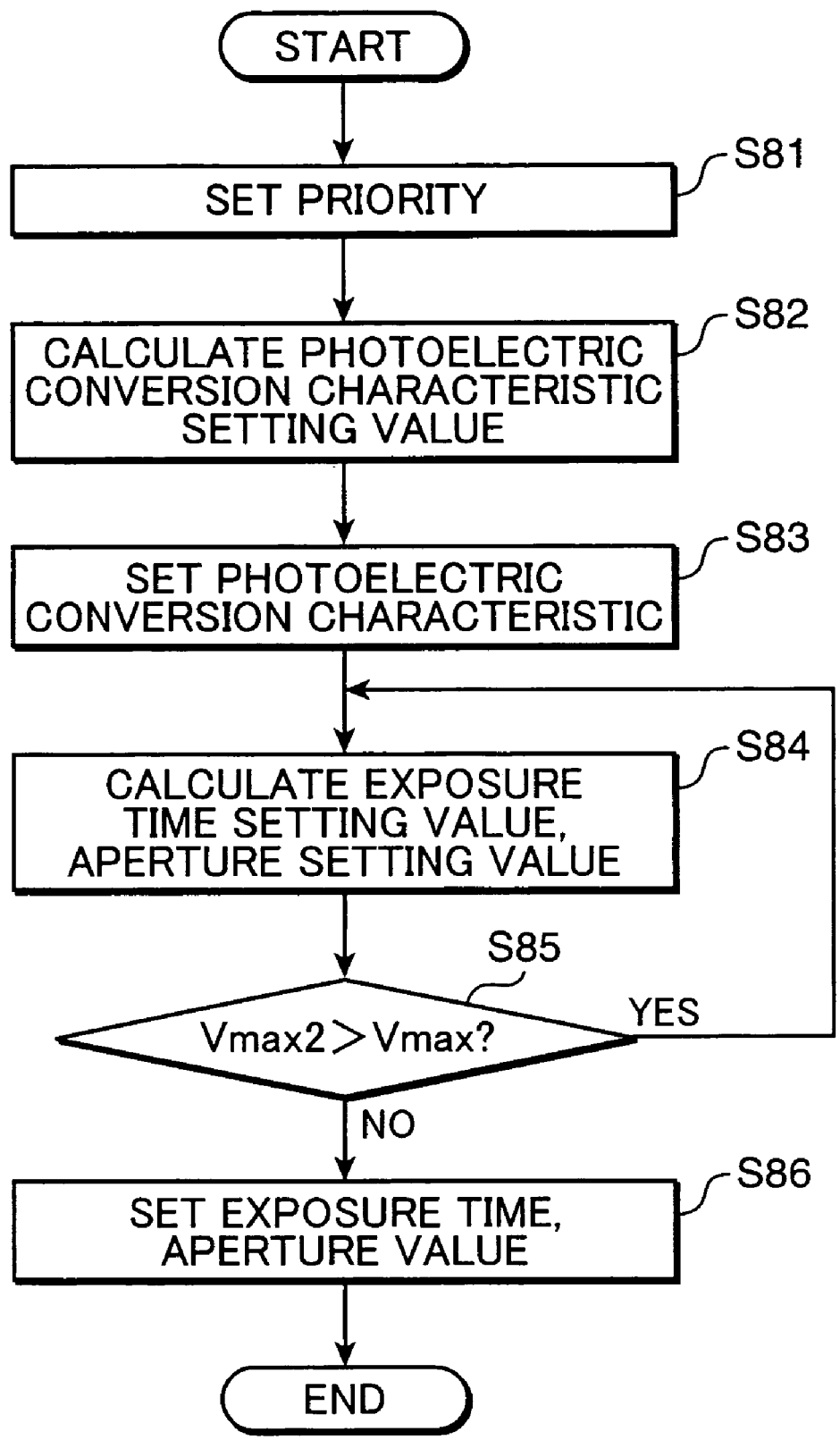
FIG. 50 is a flowchart showing a flow of AE control in the dynamic range control parameter calculation prioritizing mode in the third embodiment.

Next, description is made as to flows of calculating the respective control parameters in the exposure amount control parameter calculation prioritizing mode <1> and the dynamic range control parameter calculation prioritizing mode <2> referring to FIGS. 49 and 50 in the third embodiment.

FIG. 49 is a flowchart showing an example of a flow of calculating the respective control parameters in the exposure amount control parameter calculation prioritizing mode shown in FIGS. 43 through 45. First, the calculation priority setter 5111a sets a priority concerning calculation of the control parameters in response to entering of designation by the user with the mode setting switch 105 or the like on the operating section 100 (Step S71). In other words, the calculation priority setter 5111a sets the exposure amount control parameter calculation prioritizing mode of prioritizing the exposure amount control parameter calculation over the dynamic range control parameter calculation. In the exposure amount control parameter calculation, the exposure time control parameter and the aperture control parameter are calculated. Information as to which is to be calculated first between the exposure time control parameter and the aperture control parameter is stored in the calculation priority setter 5111a in advance, for example. The exposure time control parameter calculation or the aperture control parameter calculation is selected in response to the entering of designation by the user, and the priority on the control parameter calculation is set in accordance with the selection. For instance, the priority is set in the order of the aperture control parameter calculation, the exposure time control parameter calculation, and the dynamic range control parameter calculation, or in the order of the exposure time control parameter calculation, the aperture control parameter calculation, and the dynamic range control parameter calculation.

Next, calculation of an exposure amount setting value i.e. an exposure amount control parameter, in other words, an exposure time setting value i.e. an exposure time control parameter, and an aperture setting value i.e. an aperture control parameter is performed to match the sensor output of the image sensor 30a corresponding to the subject luminance Lt1 for exposure amount setting with a predetermined target level Vtarget (Step S72). Calculation of the target output level Vtarget corresponding to the subject luminance Lt1 is carried out by two steps depending on the priority concerning calculation of the respective setting values. For instance, in case of calculating the setting values in the order of the aperture setting value and the exposure time setting value as shown in FIGS. 43 and 44, first, an aperture setting value is calculated, so that a provisional target output level Vtarget' corresponding to the subject luminance Lt1 is obtained (see FIG. 43), and then, an exposure time setting value is calculated, so that a target output level Vtarget corresponding to the subject luminance Lt1 is obtained (see FIG. 44). In Step S72, the setting values are calculated in the order of the aperture setting value, and the exposure time setting value. Alternatively, the setting values may be calculated in the reverse order, or may be calculated simultaneously.

The calculated exposure time setting value and the calculated aperture setting value are stored in the photoelectric conversion characteristic information storage 516 for setting the exposure time setting value and the aperture setting value for the digital camera 1a (Step S73). Subsequently, a dynamic range control parameter i.e. a photoelectric conversion characteristic setting value is calculated, so that the sensor output of the image sensor 30a corresponding to the maximum subject luminance Lm20 for dynamic range setting coincides with a predetermined saturated output level Vmax (Step S74). Then, the output level judging section 530 judges whether the output level Vth2 at the inflection point of the photoelectric conversion characteristic after the shifting is equal to or larger than the reference lower limit Vlimit (Step S75). If it is judged that Vth2<Vlimit (NO in Step S75), the routine returns to Step S74, and calculation of correctively raising the output level Vth2 by the predetermined output level value is performed, as well as calculation of the photoelectric conversion characteristic setting value in relation to the corrected Vth2. On the other hand, if it is judged that Vth2≧Vlimit (YES in Step S75), the calculated photoelectric conversion characteristic setting value is stored in the photoelectric conversion characteristic storage 516 for setting the photoelectric conversion characteristic setting value for the digital camera 1a (Step S76).

FIG. 50 is a flowchart showing an example of calculating the respective control parameters in the dynamic range control parameter calculation prioritizing mode shown in FIGS. 46 through 48. First, the calculation priority setter 5111a sets the priority concerning calculation of the control parameters, specifically, sets the dynamic range control parameter calculation prioritizing mode of prioritizing calculation of the dynamic range control parameter over calculation of the exposure amount control parameter in response to entering of designation by the user with the mode setting switch 105 or the like on the operating section 100 (Step S81). As in the case of FIG. 49, in calculating the exposure amount control parameter in the dynamic range control parameter calculation prioritizing mode, the exposure time control parameter and the aperture control parameter are calculated. Information as to which is to be calculated first between the exposure time control parameter and the aperture control parameter is stored in the calculation priority setter 5111a in advance, for example. The exposure time control parameter calculation or the aperture control parameter calculation is selected in response to the entering of designation by the user, and the priority concerning calculation of the respective control parameters is set in accordance with the selection. For instance, the priority is set in the order of the dynamic range control parameter, the aperture control parameter calculation, and the exposure time control parameter calculation, or in the order of the dynamic range control parameter calculation, the exposure time control parameter calculation, and the aperture control parameter calculation.

Next, a dynamic range control parameter i.e. a photoelectric conversion characteristic setting value is calculated, so that the sensor output of the image sensor 30a corresponding to the maximum subject luminance Lm20 for dynamic range setting coincides with the predetermined provisional saturated output level Vmax1 (Step S82). Then, the calculated photoelectric conversion characteristic setting value is stored in the photoelectric conversion characteristic information storage 516 for setting the photoelectric conversion characteristic setting value for the digital camera 1a (Step S83).

Subsequently, calculation of an exposure amount control parameter i.e. an exposure amount setting value, namely, an exposure time setting value i.e. an exposure time control parameter, and an aperture setting value i.e. an aperture control parameter is performed, so that the sensor output of the image sensor 30a corresponding to the subject luminance Lt1 for exposure amount setting coincides with the predetermined target output level Vtarget (Step S84). Calculation of the target output level Vtarget corresponding to the subject luminance Lt1 is carried out by two steps depending on the priority concerning calculation of the respective setting values. For instance, in case of calculating the setting values in the order of the aperture setting value and the exposure time setting value as shown in FIGS. 47 and 48, first, an aperture setting value is calculated, so that a provisional target output level Vtarget' corresponding to the subject luminance Lt1 is obtained (see FIG. 47), and then, an exposure time setting value is calculated, so that a target output level Vtarget corresponding to the subject luminance Lt1 is obtained (see FIG. 48). In Step S84, the setting values are calculated in the order of the aperture setting value, and the exposure time setting value. Alternatively, the setting values may be calculated in the reverse order, or may be calculated simultaneously.

Then, the output level judging section 530 judges whether the output level Vmax2 corresponding to the luminance Lm20 in the photoelectric conversion characteristic after the calculation of the aperture setting value shown in FIG. 47 is equal to or larger than the saturated output level Vmax (Step S85). If it is judged that Vmax2>Vmax (YES in Step S85), the routine returns to Step S84, and calculation of correctively lowering the output level Vmax2 by the predetermined output level value e.g. lowering of an exposure amount gain (Gain) such as an aperture gain Gs is performed, as well as calculation of the aperture setting value in relation to the corrected exposure amount gain (Gain). On the other hand, if it is judged that Vmax2≦Vmax (NO in Step S85), the calculated exposure time setting value and the calculated aperture setting value are stored in the photoelectric conversion characteristic storage 516 for setting the exposure time setting value and the aperture setting value for the digital camera 1a (Step S86).

Figure 51:
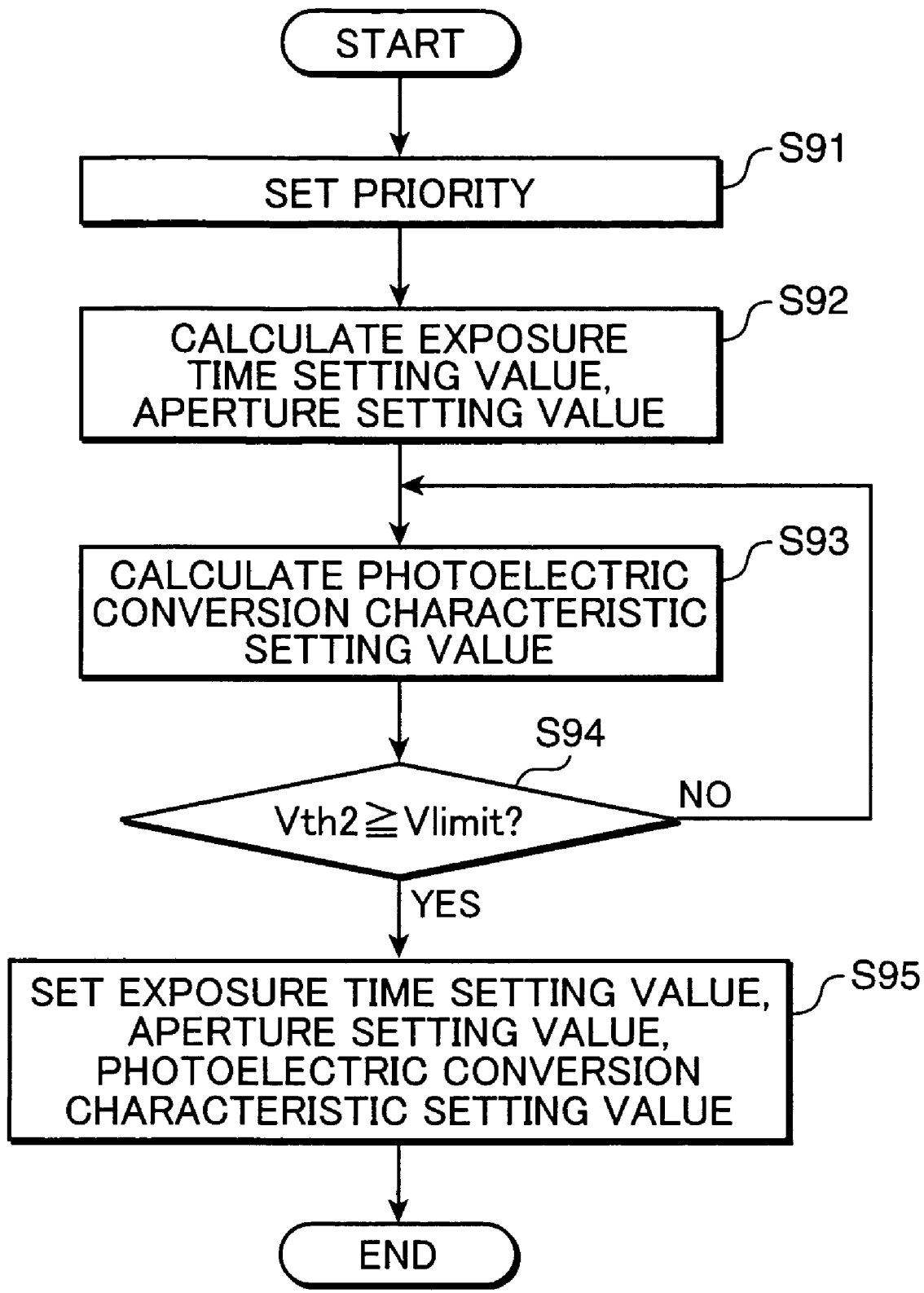
FIG. 51 is a flowchart showing a modification of the flow shown in FIG. 49.
Figure 52:
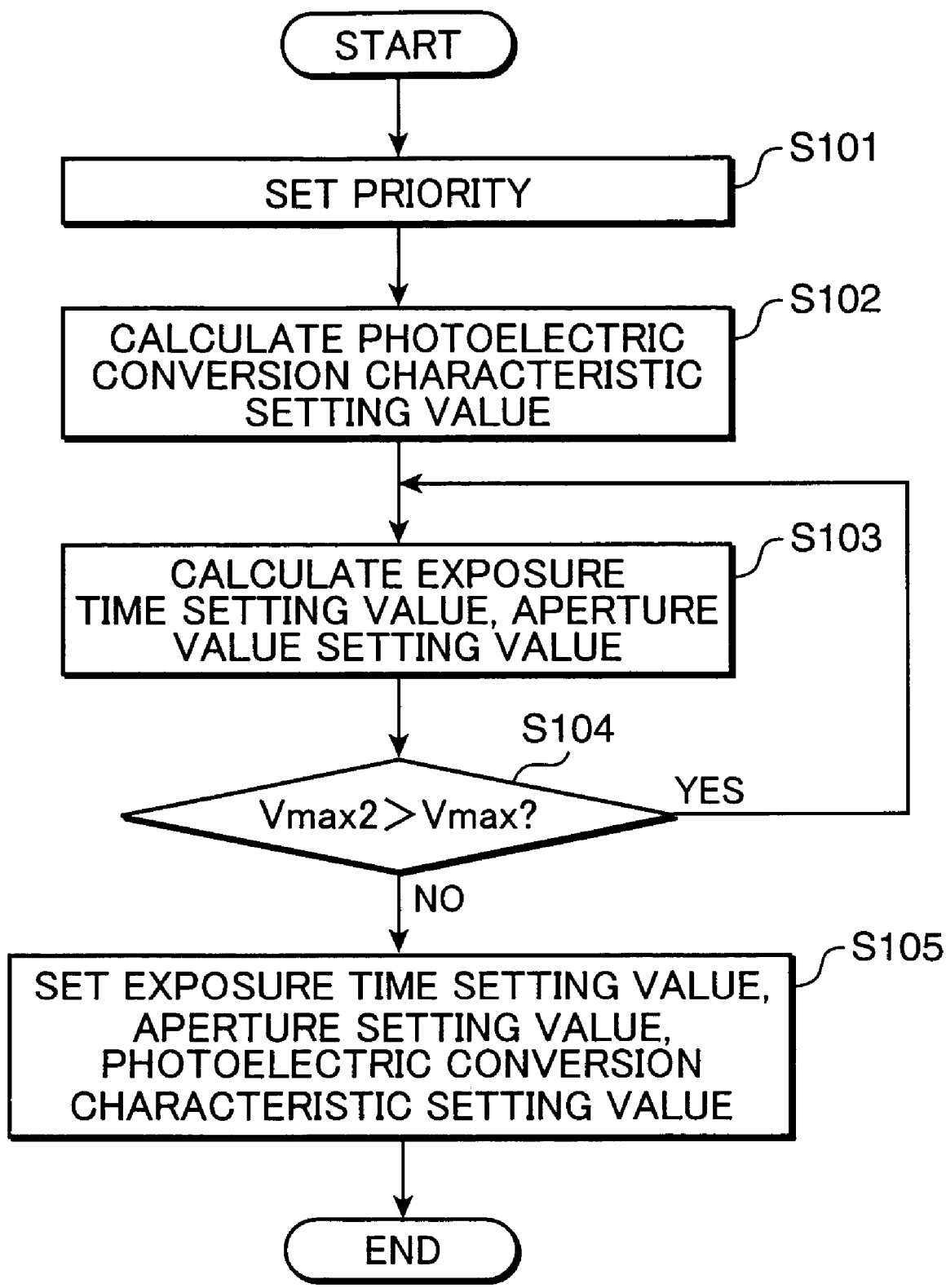
FIG. 52 is a flowchart showing a modification of the flow shown in FIG. 50.

In the flows shown in FIGS. 49 and 50, the respective control parameters are calculated for setting the respective control parameters each time the respective control parameters are calculated. Alternatively, as shown in the flows of FIGS. 51 and 52, the respective control parameters may be set after all the control parameters are calculated. Specifically, referring to FIG. 51, the calculation priority setter 5111a sets the exposure amount control parameter calculation prioritizing mode of prioritizing calculation in the order of the aperture control parameter, the exposure time control parameter, and the dynamic range control parameter (Step S91). As in the case of Step S72 shown in FIG. 49, an aperture setting value and an exposure time setting value are calculated (Step S92). Subsequently, as in the case of Steps S74 and S75, a photoelectric conversion characteristic setting value is calculated (Step S93). Then, the output level judging section 530 judges whether the output level Vth2 is equal to or larger than the reference lower limit Vlimit (Step S94). If it is judged that Vth2<Vlimit (NO in Step S94), the routine returns to Step S93, and calculation of correctively raising the output level Vth2 by the predetermined output level value is performed, as well as calculation of the photoelectric conversion characteristic setting value in relation to the corrected Vth2. On the other hand, if it is judged that Vth2≧Vlimit (YES in Step S94), the exposure time setting value and the aperture setting value calculated in Step S92, and the photoelectric conversion characteristic setting value calculated in Step S93 (NO in Step S94) are stored in the photoelectric conversion characteristic storage 516 for setting the exposure time setting value, the aperture setting value, and the photoelectric conversion characteristic setting value for the digital camera 1a (Step S95).

Next, referring to FIG. 52, the calculation priority setter 5111a sets the dynamic range control parameter calculation prioritizing mode of prioritizing calculation in the order of the dynamic range control parameter, the aperture control parameter, and the exposure time control parameter (Step S101). Subsequently, a photoelectric conversion characteristic setting value is calculated as in the case of Step S82 shown in FIG. 50 (Step S102). Then, similarly to Steps S84 and S85, an aperture setting value and an exposure time setting value are calculated (Step S103). The output level judging section 530 judges whether the output level Vmax2 is equal to or larger than the saturated output level Vmax (Step S104). If it is judged that Vmax2>Vmax (YES in Step S104), the routine returns to Step S103, and calculation of correctively lowering the output level Vmax2 by the predetermined output level value is performed, as well as calculation of the aperture setting value in relation to the corrected exposure amount gain (Gain) i.e. an aperture gain Gs. On the other hand, if it is judged that Vmax2≦Vmax (NO in Step S104), the photoelectric conversion characteristic setting value calculated in (Step S102), and the exposure time setting value and the aperture setting value calculated in Step S103 (YES in Step S104) are stored in the photoelectric conversion characteristic storage 516 for setting the photoelectric conversion characteristic setting value, the exposure time setting value, and the aperture setting value for the digital camera 1a (Step S105).

In the third embodiment, in both of the exposure amount control parameter calculation prioritizing mode <1> and the dynamic range control parameter calculation prioritizing mode <2>, the photoelectric conversion characteristic to be used in a sensing operation is determined by two-step calculation consisting of the exposure amount control parameter calculation comprised of the aperture control parameter calculation and the exposure time control parameter calculation, and the dynamic range control parameter calculation, or by three-step calculation consisting of the aperture control parameter calculation, the exposure time control parameter calculation, and the dynamic range control parameter calculation. Thereby, a process for determining the photoelectric conversion characteristic can be carried out easily and promptly. In this embodiment, the control whose execution has been prioritized is executed prior to the non-prioritized control. Alternatively, the non-prioritized control may be executed prior to the prioritized control by applying the following modifications, for instance.

(Modification 1')

In this modification, the AE control is carried out in the order of the exposure amount control comprised of the aperture control and the exposure time control, followed by the dynamic range control. The dynamic range control can be prioritized by eliminating a constraint on the inflection point in the dynamic range control.

(Modification 2')

In this modification, the AE control is carried out in the order of the dynamic range control, followed by the exposure amount control comprised of the aperture control and the exposure time control. The exposure amount control can be prioritized by eliminating a constraint on the saturated output level in the exposure amount control.

Fourth Embodiment

In the following, the fourth embodiment is described referring to FIGS. 53 through 65. In the third embodiment, the AE control is performed by the aperture-control-based exposure amount control [A], the dynamic range control [B], and the exposure-time-control-based exposure amount control [C], and calculations of the control parameters in the controls [A], [B], and [C] are performed according to the priority in the exposure amount control parameter calculation prioritizing mode <1> of performing the control parameter calculations in the order of [A], [C], and [B], or in the order of [C], [A], and [B], or in the dynamic range control parameter calculation prioritizing mode <2> of performing the control parameter calculations in the order of [B], [A], and [C], or in the order of [B], [C], and [A].

In the fourth embodiment, as in the case of the second embodiment, in setting a priority among the respective controls [A], [B], and [C] under AE control a first exposure control of combining the exposure amount control i.e. the control [A] and the control [C], with the dynamic range control [B], and a second exposure control of performing the exposure amount control i.e. the control [A] and the control [C], or the dynamic range control [B] according to needs, are executed in this order. In other words, the priority pattern in the fourth embodiment not only includes a pattern wherein the controls [A], [B], and [C] are performed one time each, but also includes a pattern wherein at least one of the controls [A], [B], and [C] is performed twice, e.g., a priority pattern in the order of [A], [C], [B], [A], and [C]. In this example, the controls [A] and [C] are each executed twice.

As in the case of the second embodiment, in performing the AE control by using the controls [A], [B], and [C] in the fourth embodiment, the priority pattern concerning the respective controls [A], [B], and [C] including the pattern that at least one of the controls [A], [B], and [C] is performed twice, namely, concerning calculations of the respective control parameters, is roughly categorized into the following two prioritizing systems {1} and {2} each constituted of the first exposure control and the second exposure control. The system {1}, and the system {2} respectively correspond to the target level prioritizing system or the target level prioritizing mode, and the dynamic range prioritizing system or the dynamic range prioritizing mode in the second embodiment. Accordingly, in the fourth embodiment, the systems {1} and {2} are also called as the target level prioritizing system {1} and the dynamic range prioritizing system {2}, respectively.

{1} Target Level Prioritizing System:

In this system, as the first exposure control, calculation of the exposure amount control parameter i.e. the aperture control parameter and the exposure time control parameter is carried out, followed by calculation of the dynamic range control parameter. Then, as the second exposure control, according to needs, calculation of the exposure amount control parameter i.e. the aperture control parameter and the exposure time control parameter is carried out to correct the dynamic range control.

{2} Dynamic Range Prioritizing System:

In this system, as the first exposure control, calculation of the dynamic range control parameter is carried out, followed by calculation of the exposure amount control parameter i.e. the aperture control parameter and the exposure time control parameter. Then, as the second exposure control, according to needs, calculation of the dynamic range control parameter is carried out to correct the exposure amount control.

(AE Control in Target Level Prioritizing System)

First, description is made on the case that the AE control is executed according to the target level prioritizing system {1}. The following priority pattern is described in detail, as an example of the priority set by the target level prioritizing system. Specifically, in the first exposure control, the exposure amount control parameters are calculated in the order of [A] and [C], followed by [B] of calculating the dynamic range control parameter. Then, according to needs, the exposure amount control parameters are calculated in the order of [A] and [C] in the second exposure control.

Figure 53:
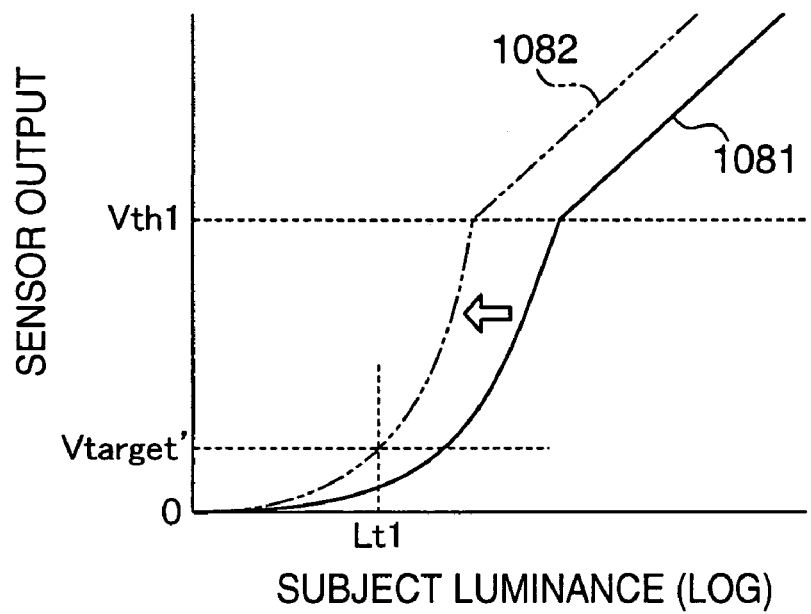
FIG. 53 is a graph showing how a photoelectric conversion characteristic of an image sensor is changed under AE control based on the control [A] in the target level prioritizing system in a fourth embodiment.
Figure 54:
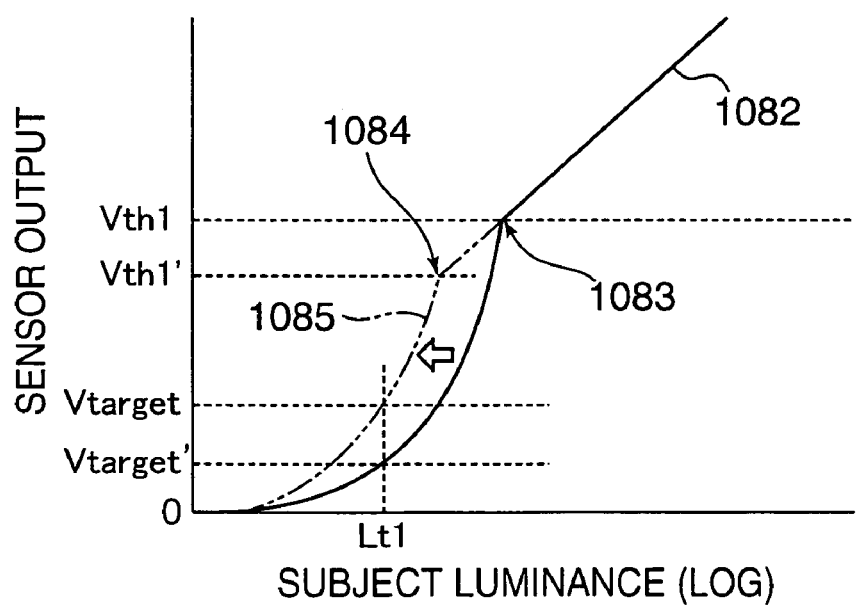
FIG. 54 is a graph showing how the photoelectric conversion characteristic of the image sensor is changed under AE control based on the control [C] in the target level prioritizing system in the fourth embodiment.
Figure 55:
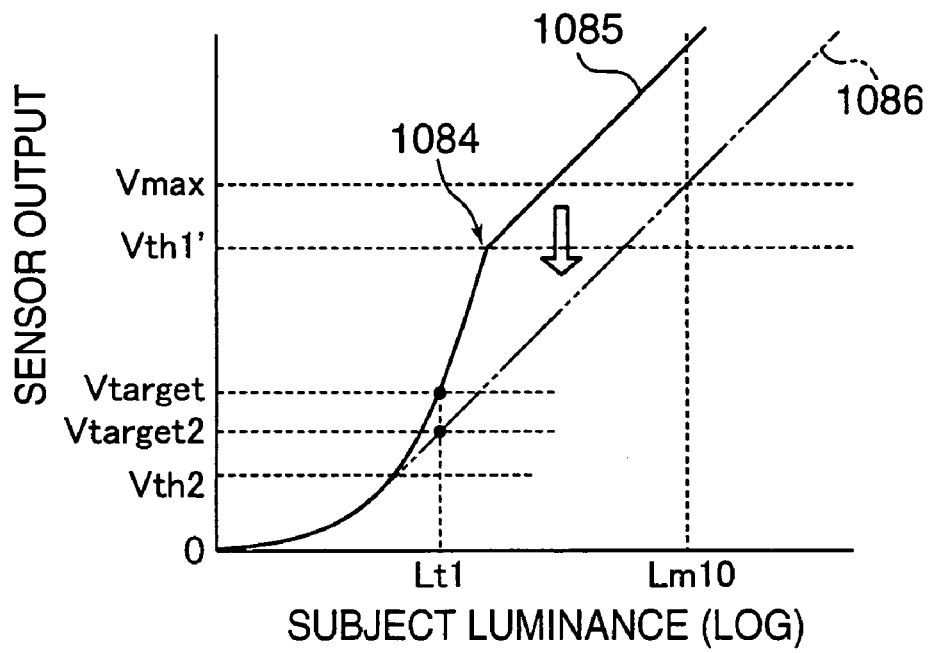
FIG. 55 is a graph showing how the photoelectric conversion characteristic of the image sensor is changed under AE control based on the control [B] in the target level prioritizing system in the fourth embodiment.
Figure 56:
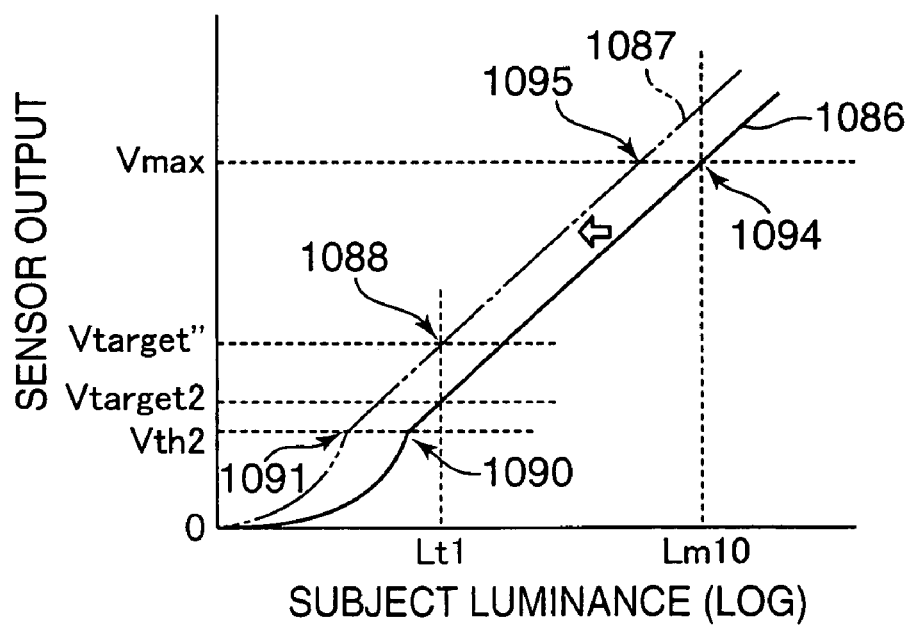
FIG. 56 is a graph showing how the photoelectric conversion characteristic of the image sensor is changed under AE control based on the control [A] in the target level prioritizing system in the fourth embodiment.
Figure 57:
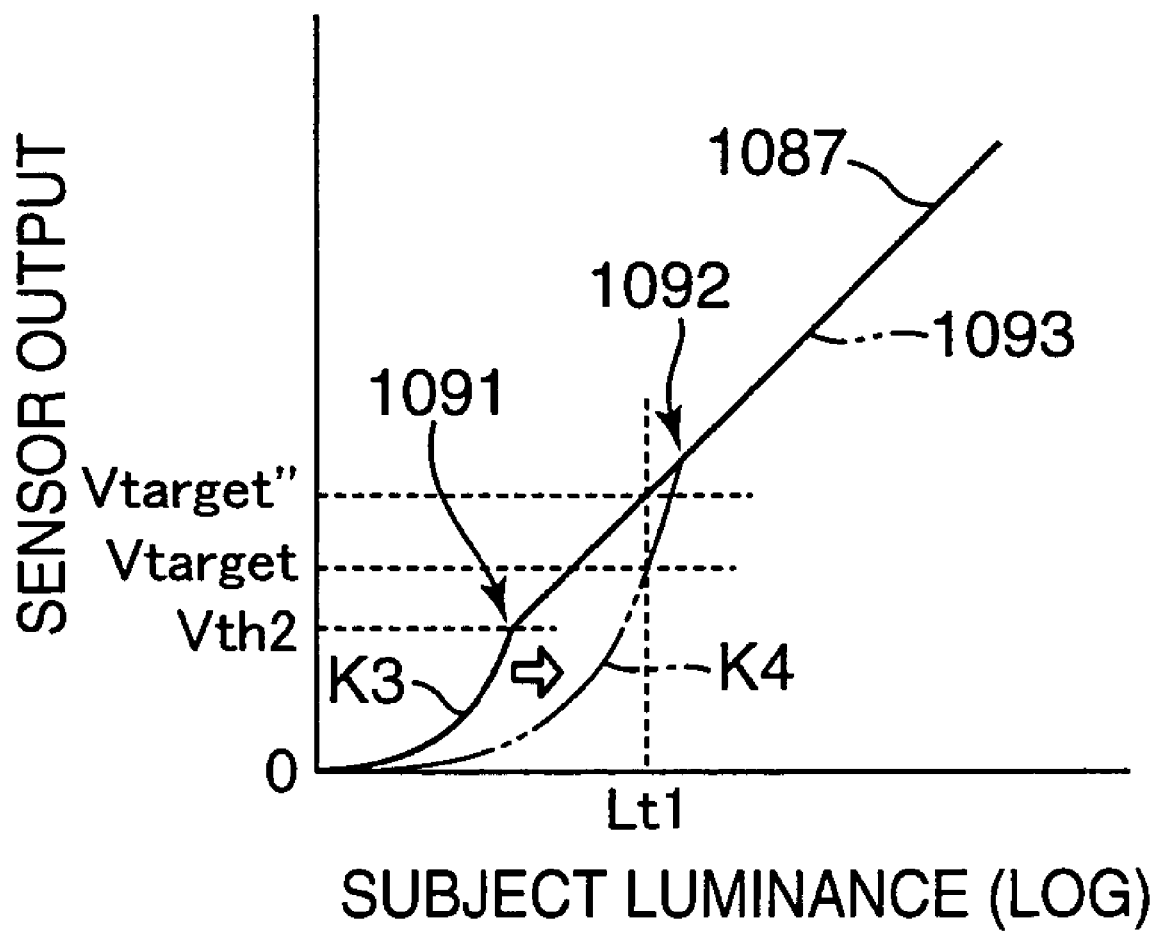
FIG. 57 is a graph showing how the photoelectric conversion characteristic of the image sensor is changed under AE control based on the control [C] in the target level prioritizing system in the fourth embodiment.

FIGS. 53 through 57 are graphs each showing how the photoelectric conversion characteristic of an image sensor 30a is changed according to the priority of the respective controls [A], [B], and [C] in the order of FIG. 53 through FIG. 57 in the case where the controls [A], [B], and [C] are performed based on the above example of the priority pattern in the target level prioritizing system. Specifically, FIGS. 53 and 56 each shows a case of performing the control [A] of calculating an aperture control parameter. FIGS. 54 and 57 each shows a case of performing the control [C] of calculating an exposure time control parameter. FIG. 55 shows a case of performing the control [B] of calculating a dynamic range control parameter.

First, in the control [A] as shown in FIG. 53, an aperture control parameter calculator 5113 calculates, by using AE evaluation values detected by an evaluation value detector 405, an aperture setting value i.e. an aperture control parameter for obtaining a photoelectric conversion characteristic, which makes it possible to match the sensor output of the image sensor 30a corresponding to a subject luminance Lt1 for exposure amount setting, preferably, an average luminance of a main subject obtained by an average luminance calculator 4053 (see FIG. 14) of a histogram calculating section 4052 with a desired provisional target level Vtarget' in the linear characteristic area. Since the process for calculating the aperture setting value is the same as the process described in FIG. 40, description thereof is omitted herein. In FIG. 53, an aperture setting value for increasing the exposure amount i.e. the aperture area is calculated in such a manner that a photoelectric conversion characteristic 1081 obtained at the time of acquiring the AE evaluation values is shifted to a photoelectric conversion characteristic 1082 so as to match the sensor output of the image sensor 30a corresponding to the luminance Lt1 with the provisional target output Vtarget'. The photoelectric conversion characteristic 1081 may be a predetermined fixed photoelectric conversion characteristic stored in a photoelectric conversion characteristic information storage 516, or may be a photoelectric conversion characteristic which has been set at the time of acquiring the AE evaluation values last time.

Next, after calculation of the aperture control parameter shown in FIG. 53 is completed, calculation of the exposure time control parameter in the control [C] is performed as shown in FIG. 54. As in the case of FIG. 53, the exposure time control parameter calculator 5112 calculates, by using the AE evaluation values detected by the evaluation value detector 405, an exposure time setting value i.e. an exposure time control parameter for obtaining a photoelectric conversion characteristic, which makes it possible to match the sensor output of the image sensor 30a corresponding to the subject luminance Lt1 for exposure amount setting with a new target level Vtarget in the linear characteristic area. It may be possible to obtain a photoelectric conversion characteristic after the shifting by keeping the value of the provisional target level Vtarget' in FIG. 53 unchanged, and by newly setting a value of the luminance Lt1 corresponding to the provisional target level Vtarget' for the control [C]. Since the process for calculating the exposure time setting value is the same as the process described referring to FIG. 41, description thereof is omitted herein. In the control [C] shown in FIG. 54, the gradient of the linear characteristic area is changed, with the gradient and the position of the logarithmic characteristic area being unchanged, and accordingly, a photoelectric conversion characteristic 1085 is obtained, wherein an inflection point 1083 at the sensor output Vth1 of the photoelectric conversion characteristic 1082 corresponding to the photoelectric conversion characteristic 1082 in FIG. 53 is apparently shifted to an inflection point 1084 corresponding to the sensor output Vth1'.

After calculation of the exposure time control parameter shown in FIG. 54 is completed, calculation of the dynamic range control parameter in the control [B] is performed as shown in FIG. 55. In this control a dynamic range control parameter calculator 512a calculates, by using the AE evaluation values detected by the evaluation value detector 405, a photoelectric conversion characteristic setting value i.e. a dynamic range control parameter for obtaining a photoelectric conversion characteristic, which makes it possible to match the sensor output of the image sensor 30a corresponding to the maximum subject luminance Lm10 for dynamic range setting with a saturated output level Vmax of the image sensor 30a. Since the process for calculating the photoelectric conversion characteristic setting value is the same as the process described referring to FIG. 42, description thereof is omitted herein. In the control [B] of calculating the dynamic range control parameter as shown in FIG. 55, a photoelectric conversion characteristic setting value for changing the photoelectric conversion characteristic 1085 shown in FIG. 54 to the photoelectric conversion characteristic 1086, namely, for lowering the output level at the inflection point from Vth1' to Vth2 is calculated to match the sensor output of the image sensor 30a corresponding to the luminance Lm10 with the saturated output level Vmax.

By shifting the photoelectric conversion characteristic 1085 to a new photoelectric conversion characteristic, in this example, to the photoelectric conversion characteristic 1086, so that the sensor output of the image sensor 30a corresponding to the subject luminance Lm10 for dynamic range setting coincides with the saturated output level Vmax in the dynamic range control [B], there is likelihood that the sensor output level corresponding to the luminance Lt1 may be lowered from the target level Vtarget shown in the control [C] of FIG. 54 to a provisional target level Vtarget2. If the sensor output Vtarget2 corresponding to the luminance Lt1 is not coincident with the target level Vtarget, then, as shown in the control [A] of FIG. 56, the aperture control parameter calculator 5113 calculates an aperture control parameter i.e. an aperture setting value for obtaining an exposure amount, which makes it possible to change the photoelectric conversion characteristic 1086 to a photoelectric conversion characteristic 1087, so that the sensor output corresponding to the luminance Lt1 is raised to a provisional target level Vtarget". The sensor output Vtarget" is set in a former part of the control [C] as shown in FIG. 57, which constitutes an exposure amount control with the control [A] as shown in FIG. 56, so that the target output level Vtarget is desirably obtained in relation to the luminance Lt1. Specifically, as shown in FIG. 56, the photoelectric conversion characteristic 1086 is changed or shifted to the photoelectric conversion characteristic 1087 passing a point 1088 by the control [A]. At this time, the inflection point 1090 is shifted in parallel to the inflection point 1091, with the sensor output Vth2 being unchanged. Similarly to the foregoing embodiments, a judger 5303 of an output level judging section 530 compares the provisional target output level Vtarget2 with the target level Vtarget. As the target level Vtarget, the value stored in an output level storage 5302 is referred to.

In the control [B] as shown in FIG. 55, if the sensor output level Vtarget2 corresponding to the luminance Lt1 for exposure amount setting coincides with the desired target level Vtarget at the time when the photoelectric conversion characteristic 1085 is changed to a photoelectric conversion characteristic, in this example, to the photoelectric conversion characteristic 1086 for obtaining the saturated sensor output Vmax corresponding to the subject luminance Lm10 for dynamic range setting, the AE control is terminated. Namely, the controls shown in FIGS. 56 and 57 are not implemented.

Next, following the control [A] as shown in FIG. 56, the control [C] as shown in FIG. 57 is carried out. In this control, the gradient of the linear characteristic area of the photoelectric conversion characteristic 1087 is changed from K3 to K4, so that the sensor output corresponding to the luminance Lt1 coincides with the desired target level Vtarget in the linear characteristic area from the provisional target level Vtarget" shown in FIG. 57. The output level Vtarget" is located in the logarithmic characteristic area of the photoelectric conversion characteristic 1087. As a result of the change of the gradient, the photoelectric conversion characteristic 1087 is shifted to a photoelectric conversion characteristic 1093, with the inflection point 1091 corresponding to the sensor output Vth2 being changed to the inflection point 1092.

In this way, a calculation error, namely, an error concerning the target output Vtarget corresponding to the luminance Lt1 in the linear characteristic area, which has been generated by the dynamic range control parameter calculation, which follows the exposure amount control parameter calculation in the first exposure control, can be corrected by the exposure amount control parameter calculation in the second exposure control.

By performing the exposure amount control as the second exposure control, the dynamic range may be narrowed to a certain degree. Specifically, in the control [C] as shown in FIG. 56, the dynamic range is reduced by the amount corresponding to shifting of a point 1095 on the photoelectric conversion characteristic 1087 corresponding to the saturated output level Vmax toward the left side relative to a point 1094 of the photoelectric conversion characteristic 1086. Since this arrangement securely enables to match the sensor output corresponding to the luminance Lt1 with the desired target level Vtarget by the control [A] shown in FIG. 56 and the control [C] shown in FIG. 57 following the control [A], exposure control in the target level prioritizing system of securing an exposure amount for the main subject, for instance, can be executed.

In the AE control according to the target level prioritizing system, the control [A] of calculating the aperture control parameter is carried out, followed by the control [C] of calculating the exposure time control parameter. Alternatively, the calculations of the control parameters may be in the reverse order, namely, in the order of [C], and [A]. In the embodiment, the priority is set with respect to the controls [A] and [C]. Alternatively, calculation of the control parameters in the controls [A] and [C] may be executed concurrently parallel to each other. In such a modification, the following modified priority patterns are conceived as examples of the priority pattern concerning the respective controls throughout the entire control comprised of the first exposure control and the second exposure control, including the dynamic range control [B]. In the modified priority patterns, the first three controls including the control [B] constitute the first exposure control, and the remaining two controls constitute the second exposure control. The priority pattern may be other than those described in the specification.

Modified priority pattern 1: calculations are executed in the order of [A], [C], [B], [C], and A.

Modified priority pattern 2: calculations are executed in the order of [C], [A], [B], [A], and [C].

Modified priority pattern 3: calculations are executed in the order of [C], [A], [B], [C], and [A].

Modified priority pattern 4*: calculations are executed in the order of [A], [C], [B], [A], and [C].

* In the modified priority pattern 4, the controls [A] and [C] are executed simultaneously.

In the AE control according to the target level prioritizing system, in the first exposure control, the aperture control and/or the exposure time control, and the dynamic range control are executed in this order, and in the second exposure control, the exposure amount control by the aperture control and/or the exposure time control is executed. This arrangement enables to efficiently perform the exposure control of securing an exposure amount corresponding to the subject luminance for exposure amount setting, and yet securing an appropriate dynamic range with high latitude.

In the AE control according to the target level prioritizing system, comparison is made between the output level e.g. Vtarget2 corresponding to the subject luminance e.g. Lt1 for exposure amount setting after the first exposure control, and the predetermined desired target output level e.g. Vtarget, which has been set in advance in relation to the subject luminance Lt1, and in the second exposure control, the output level Vtarget2 after the first exposure control is made coincident with the target output level Vtarget by the exposure amount control by the aperture control and/or the exposure time control. In other words, as compared with the second embodiment, in the fourth embodiment, the exposure amount control is divided into the aperture control and the exposure time control, which are executable independently of each other, and calculation of the control parameters for matching the output level after the first exposure control with the target level is executed by the combination of the various controls. This arrangement enables to efficiently execute the AE control of securing a desired target level with high latitude.

(AE Control in Dynamic Range Prioritizing System)

Next, description is made on the case that the AE control is executed according to the dynamic range prioritizing system {2}. The following priority pattern is described in detail, as an example of the priority set by the dynamic range prioritizing system. Specifically, in the first exposure control, the dynamic range control parameter is calculated in the control [B], followed by calculation of the aperture control parameter in the control [A] and calculation of the exposure time control parameter in the control [C], wherein the controls [A] and [C] are executed in combination with each other, as the exposure amount control. Then, according to needs, the dynamic range control parameter is calculated in the control [B] in the second exposure control.

Figure 58:
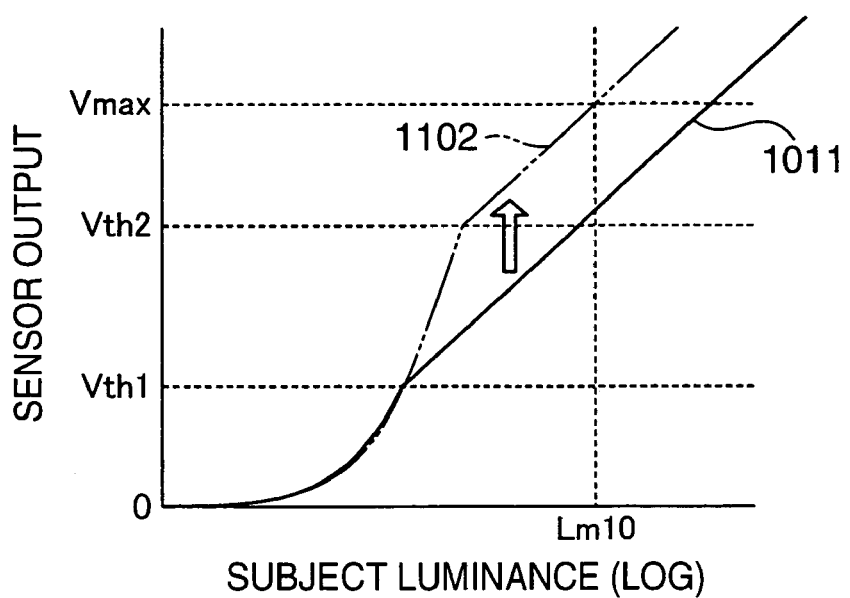
FIG. 58 is a graph showing how the photoelectric conversion characteristic of the image sensor is changed under AE control based on the control [B] in the dynamic range prioritizing system in the fourth embodiment.
Figure 59:
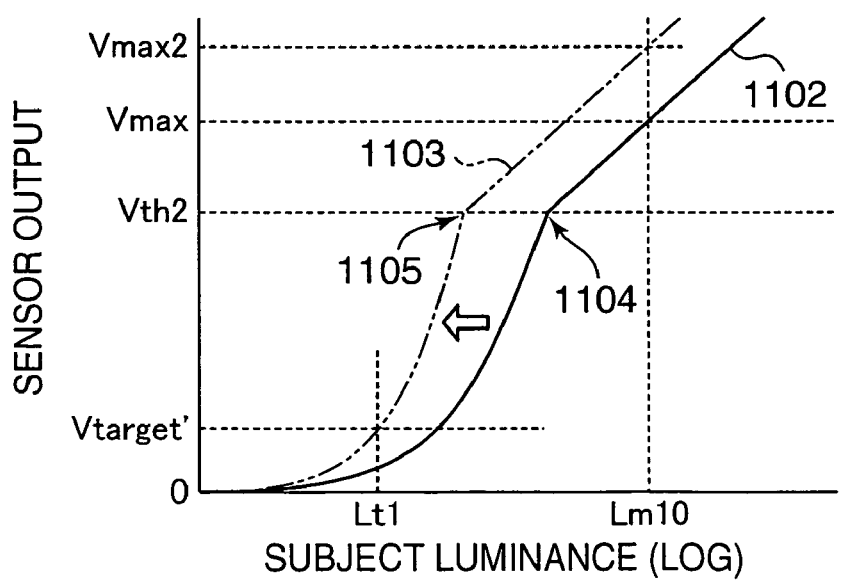
FIG. 59 is a graph showing how the photoelectric conversion characteristic of the image sensor is changed under AE control based on the control [A] in the dynamic range prioritizing system in the fourth embodiment.
Figure 60:
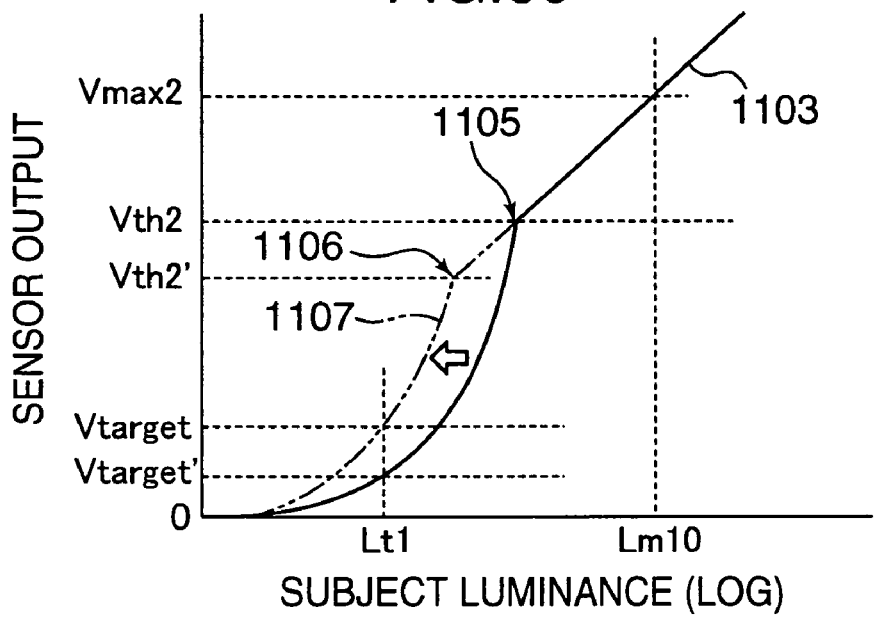
FIG. 60 is a graph showing how the photoelectric conversion characteristic of the image sensor is changed under AE control based on the control [C] in the dynamic range prioritizing system in the fourth embodiment.

FIGS. 58 through 61 are graphs each showing how the photoelectric conversion characteristic of the image sensor 30a is changed according to the priority of the respective controls [A], [B], and [C] in the order of FIG. 58 through FIG. 61 in the case where the controls [A], [B], and [C] are performed based on the above example of the priority pattern in the dynamic range prioritizing system. Specifically, FIGS. 58 and 61 each shows a case of performing the control [B] of calculating a dynamic range control parameter. FIG. 59 shows a case of performing the control [A] of calculating an aperture control parameter. FIG. 60 shows a case of performing the control [C] of calculating an exposure time control parameter.

First, in the control [B] as shown in FIG. 58, the dynamic range control parameter calculator 512a calculates, by using the AE evaluation values detected by the evaluation value detector 405, a photoelectric conversion characteristic setting value i.e. a dynamic range control parameter for obtaining a photoelectric conversion characteristic, which makes it possible to match the sensor output of the image sensor 30a corresponding to the maximum subject luminance Lm10 for dynamic range setting, preferably, the upper limit of the luminance range of the main subject and the peripheral subject obtained by a maximum/minimum luminance calculator 4054 of the histogram calculating section 4052 with a desired saturated output level Vmax. Since the process for calculating the photoelectric conversion characteristic setting value is the same as the process described referring to FIG. 42, description thereof is omitted herein. Alternatively, it is possible to match the sensor output of the image sensor 30a corresponding to the luminance Lm10 with a provisional saturated output level Vmax1, which is a provisionally set value based on an assumption that the entirety of the photoelectric conversion characteristic will be changed or shifted by the exposure amount control (see FIGS. 59 and 60) following the dynamic range control, and that the output level of the image sensor corresponding to the luminance Lm10 will be changed accordingly, in place of matching the sensor output of the image sensor 30a corresponding to the luminance Lm10 with the saturated output level Vmax.

In the control [B] as shown in FIG. 58, the photoelectric conversion characteristic setting value for changing a photoelectric conversion characteristic 1101 obtained at the time of acquiring the AE evaluation values to a photoelectric conversion characteristic 1102, namely, for raising the output level at the inflection point from Vth1 to Vth2 is calculated to match the sensor output corresponding to the luminance Lm10 with the saturated output level Vmax. The photoelectric conversion characteristic 1101 may be a predetermined fixed photoelectric conversion characteristic stored in the photoelectric conversion characteristic information storage 516, or may be a photoelectric conversion characteristic which has been set at the time of acquiring the AE evaluation values last time.

Next, after calculation of the dynamic range control parameter shown in FIG. 58 is completed, calculation of the aperture control parameter in the control [A] is performed as shown in FIG. 59. In this control, the aperture control parameter calculator 5113 calculates, by using the AE evaluation values detected by the evaluation value detector 405, an aperture setting value i.e. an aperture control parameter for obtaining a photoelectric conversion characteristic, which makes it possible to match the sensor output of the image sensor 30a corresponding to the subject luminance Lt1 for exposure amount setting with a predetermined provisional target level Vtarget' in the linear characteristic area. Since the process for calculating the aperture setting value is the same as the process described referring to FIG. 40, description thereof is omitted herein. In FIG. 59, an aperture setting value for increasing the exposure amount i.e. the aperture area is calculated in such a manner that a photoelectric conversion characteristic 1102 corresponding to the photoelectric conversion characteristic 1102 in FIG. 58 is shifted to a photoelectric conversion characteristic 1103 so as to match the sensor output corresponding to the luminance Lt1 with the provisional target output Vtarget'. At this time, the inflection point 1104 is shifted in parallel to the inflection point 1105, with the sensor output Vth2 being unchanged.

Figure 61:
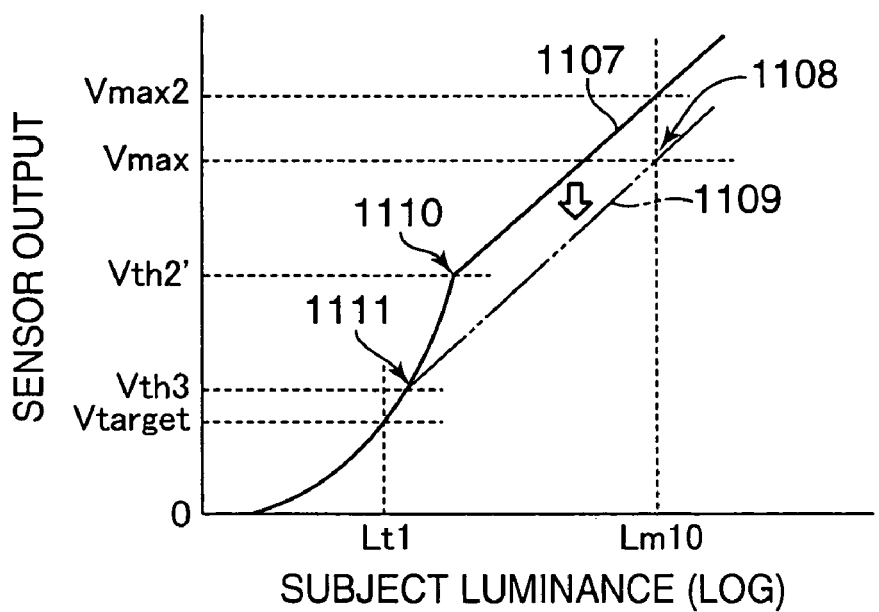
FIG. 61 is a graph showing how the photoelectric conversion characteristic of the image sensor is changed under AE control based on the control [B] in the dynamic range prioritizing system in the fourth embodiment.

By shifting of the inflection point by the exposure amount control, namely, the aperture control [A], the sensor output corresponding to the subject luminance Lm10 for dynamic range setting is raised to the provisional saturated output level Vmax2, which is higher than the saturated output level Vmax, by the amount corresponding to the shifting of the inflection point. The saturated output level Vmax represents that a required dynamic range is secured. Consequently, a proper dynamic range for the luminance Lm10 may not be secured. In other words, by the first exposure control, the dynamic range may contain a calculation error. The calculation error is corrected by the dynamic range control [B] as shown in FIG. 61, which will be described later, namely, by the second exposure control. If, however, the dynamic range does not contain a calculation error by the first exposure control, namely, if the provisional saturated output level Vmax2 and the saturated output level Vmax are identical to each other, the exposure control is terminated since there is no need of performing the second exposure control. Similarly to the above, the judger 5303 of the output level judging section 530 compares the provisional saturated output level Vmax2 with the saturated output level Vmax. As the saturated output level Vmax, the value stored in the output level storage 5302 is referred to.

Subsequently, after calculation of the aperture control parameter shown in FIG. 59 is completed, calculation of the exposure time control parameter in the control [C] is performed as shown in FIG. 60. As in the case of FIG. 54, the exposure time control parameter calculator 5112 calculates, by using the AE evaluation values detected by the evaluation value detector 405, an exposure time setting value i.e. an exposure time control parameter for obtaining a photoelectric conversion characteristic, which makes it possible to match the sensor output of the image sensor 30a corresponding to the subject luminance Lt1 for exposure amount setting with a new target level Vtarget in the linear characteristic area in place of the provisional target level Vtarget'. It may be possible to obtain a photoelectric conversion characteristic after the shifting by keeping the value of the provisional target level Vtarget' in FIG. 59 unchanged, and by newly setting a value of the luminance Lt1 corresponding to the provisional target level Vtarget' for the control [C]. Since the process for calculating the exposure time setting value is the same as the process described referring to FIG. 41, description thereof is omitted herein. In the control [C] as shown in FIG. 60, the gradient of the linear characteristic area is changed, with the gradient and the position of the logarithmic characteristic area i.e. the dynamic range being unchanged, namely, with the sensor output corresponding to the luminance Lm10 being kept at Vmax2. Thereby, the photoelectric conversion characteristic 1103 is changed to a photoelectric conversion characteristic 1107, as the inflection point 1105 corresponding to the sensor output Vth2 is apparently shifted to the inflection point 1106 corresponding to the sensor output Vth2'.

After calculation of the control [C] as shown in FIG. 60 is completed, calculation of the dynamic range control parameter in the control [B] is performed as shown in FIG. 61. In this control, the dynamic range control parameter calculator 512a calculates a dynamic range control parameter i.e. a photoelectric conversion characteristic setting value for obtaining a dynamic range, which makes it possible to change the photoelectric conversion characteristic 1107 to a photoelectric conversion characteristic 1108 for lowering the provisional saturated output level Vmax2 to the saturated output level Vmax, because the sensor output corresponding to the luminance Lm10 is the provisional saturated output level Vmax2, which is higher than the desired saturated output level Vmax. In other words, a new photoelectric conversion characteristic 1109 for matching the sensor output Vmax2 corresponding to the current luminance Lm10 with the saturated output level Vmax is calculated by changing the inflection point 1110 of the photoelectric conversion characteristic 1107 to the inflection point 1111, namely, by lowering the sensor output at the inflection point from Vth2' to Vth3, so that the photoelectric conversion characteristic 1107 is shifted to the photoelectric conversion characteristic 1109 passing the point 1108.

In this way, a calculation error resulting from calculation of the exposure amount control parameter following calculation of the dynamic range control parameter in the first exposure control, namely, a calculation error concerning the saturated output level Vmax in relation to the luminance Lm10 can be corrected by the dynamic range control parameter calculation in the second exposure control.

By performing the dynamic range control as the second exposure control the sensor output corresponding to the subject luminance Lt1 for exposure amount setting is lowered than the target level Vtarget. However, since this arrangement securely enables to match the sensor output corresponding to the luminance Lm10 with the desired saturated output level Vmax, exposure control in the dynamic range prioritizing system of securing a required dynamic range can be executed.

In the AE control according to the dynamic range prioritizing system, the control [A] of calculating the aperture control parameter is carried out, followed by the control [C] of calculating the exposure time control parameter in the exposure amount control. Alternatively, the calculations of the control parameters may be performed in the reverse order, namely, in the order of [C] and [A]. In the embodiment, the priority is set with respect to the controls [A] and [C]. Alternatively, the controls [A] and [C] may be executed concurrently parallel to each other. In such a modification, the following modified priority patterns are conceived as examples of the priority pattern concerning the respective controls throughout the entire control comprised of the first exposure control and the second exposure control, including the dynamic range control [B]. In the modified priority patterns, the first three controls constitute the first exposure control, and the last control [B] constitutes the second exposure control. The priority pattern may be other than those described in the specification.

Modified priority pattern 5: calculations are executed in the order of [B], [C], [A], and [B].

Modified priority pattern 6**: calculations are executed in the order of [B], [A], [C], and [B].

** In the modified priority pattern 6, the controls [A] and [C] are executed simultaneously.

In the AE control according to the dynamic range prioritizing system, in the first exposure control, the dynamic range control, and the aperture control and/or the exposure time control are executed in this order, and in the second exposure control, the dynamic range control is executed. This arrangement enables to efficiently perform the exposure control of securing a required dynamic range in a sensing operation of a subject, and yet securing an appropriate exposure amount with high latitude.

In the AE control according to the dynamic range prioritizing system, after the first exposure control by the aperture control and/or the exposure time control, in the second exposure control, comparison is made between the output level e.g. Vmax2 corresponding to the subject luminance e.g. Lm10 for dynamic range setting, and the desired saturated output level e.g. Vmax, which has been set in advance in relation to the subject luminance Lm10, to match the output level Vmax2 after the first exposure control with the saturated output level Vmax by the dynamic range control. In other words, as compared with the second embodiment, in the fourth embodiment, the exposure amount control is divided into the aperture control and the exposure time control, which are executable independently of each other, to execute the first exposure control, and calculation of the control parameters is executed to match the output level of the image sensor 30a after the first exposure control with the desired output level. This arrangement enables to efficiently execute the AE control of securing a desired dynamic range with high latitude.

Figure 62:
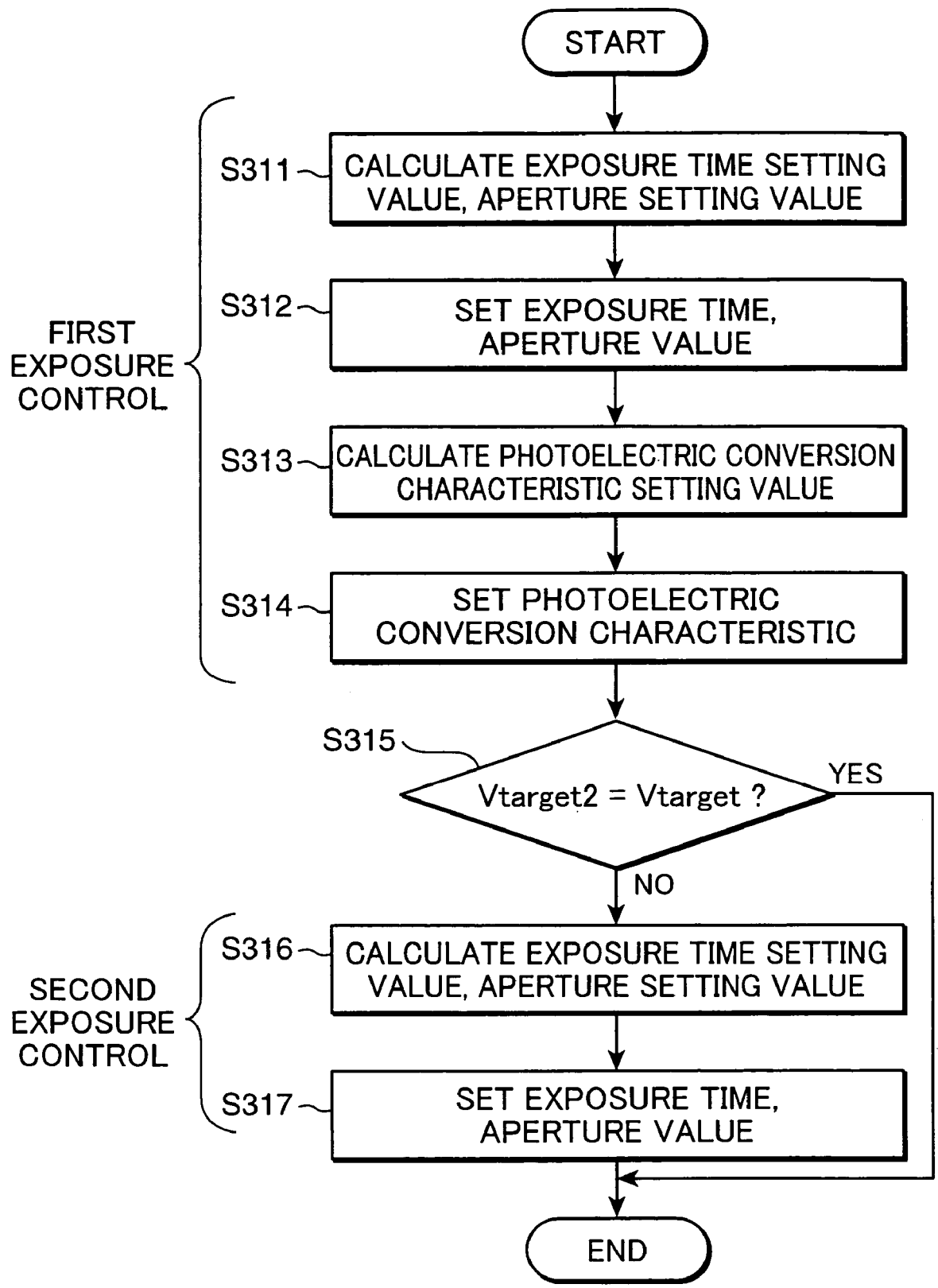
FIG. 62 is a flowchart showing a flow of AE control according to the target level prioritizing system in the fourth embodiment.

FIG. 62 is a flowchart showing a flow of AE control according to the target level prioritizing system in the fourth embodiment. First, a calculation priority setter 5111a of an AE control parameter calculating unit 5110a sets a priority concerning calculation of the control parameters, so that the exposure amount control parameter calculation by an exposure amount control parameter calculator 511a is prioritized. Specifically, the priority concerning calculation of the respective control parameters in the controls [A], [B], and [C], for instance, information relating to the priority of executing the controls in the order of [A], [C], [B], [A], and [C] is set.

In the former part of the first exposure control, upon detecting the AE evaluation values by the evaluation value detector 405, the exposure amount control parameter calculator 511a calculates, based on the detected AE evaluation values, a control parameter such as an aperture setting value and an exposure time setting value, so that the sensor output of the image sensor 30a corresponding to the subject luminance Lt1 for exposure amount setting coincides with the target level Vtarget in the linear characteristic area, for instance (Step S311). The aperture setting value is a value for matching the sensor output corresponding to the luminance Lt1 with the provisional target level Vtarget' in the linear characteristic area, and the exposure time setting value is a value for matching the output level corresponding to the luminance Lt1 with the target level Vtarget in place of the provisional target level Vtarget'. As the photoelectric conversion characteristic of the image sensor 30a, a certain characteristic e.g. an initial setting value, or a photoelectric conversion characteristic set at the time of acquiring the AE evaluation values last time is referred to.

The calculated control parameters such as the aperture setting value and the exposure time setting value are outputted to a control signal generator 520a. Upon receiving the control parameters, respective elements in the control signal generating section 520a generate control signals for operating a timing generating circuit 31a and a driving section 60, which in turn, generate drive signals for causing the respective elements to perform actual exposure amount control operation for setting an aperture value, an exposure time, and the like (Step S312). More specifically, a diaphragm 22 is driven based on an aperture control signal generated by an aperture control signal generator 525 in response to receiving the aperture setting value, so that the sensor output of the image sensor 30a corresponding to the subject luminance Lt1 for exposure amount setting coincides with the provisional target level Vtarget' in the linear characteristic area. Further, the image sensor 30a or a shutter 23 is driven based on an exposure time control signal generated by a sensor exposure time control signal generator 522a or a shutter control signal generator 523 in response to receiving the exposure time setting value, so that the sensor output of the image sensor 30a corresponding to the subject luminance Lt1 for exposure amount setting coincides with the target level Vtarget in the linear characteristic area.

Subsequently, in the latter part of the first exposure control, the dynamic range control parameter calculator 512a calculates, based on the AE evaluation values detected by the evaluation value detector 405, a control parameter i.e. a photoelectric conversion characteristic setting value, so that a subject luminance Lm10 for dynamic range setting coincides with a desired saturated output level Vmax (Step S313). The calculated dynamic range control parameter i.e. the photoelectric conversion characteristic setting value is outputted to a dynamic range control signal generator 521a of the control signal generating section 520a. The dynamic range control signal generator 521a generates a control signal for controlling a signal φVPS based on the control parameter, namely, a control signal relating to the photoelectric conversion characteristic setting value, and sends the control signal to the timing generating circuit 31a (Step S314). The first exposure control is completed by executing the above operations.

Next, the judger 5303 of the output level judging section 530 compares the provisional target level Vtarget2, which is a sensor output corresponding to the subject luminance Lt1 for exposure amount setting, with the target level Vtarget, based on the photoelectric conversion characteristic after the first exposure control is completed (Step S315). If it is judged that the provisional target level Vtarget2 coincides with the target level Vtarget (YES in Step S315), the AE control is terminated because the second exposure control is not necessary. Specifically, the judger 5303 outputs, to a second exposure control signal generator 5304, a judgment signal indicating that the second exposure control is not necessary. Upon receiving the judgment signal, the second exposure control signal generator 5304 sends, to the AE control parameter calculating unit 5110a, a control signal indicating the exposure control be terminated.

On the other hand, as shown in FIG. 55, if it is judged that the provisional target level Vtarget2 is lower than the target level Vtarget, namely, if the provisional target level Vtarget2 does not coincide with the target level Vtarget (NO in Step S315), the exposure amount control is executed as the second exposure control (Step S316). The exposure amount control in the second exposure control is a control for matching the provisional target level Vtarget2 with the target level Vtarget. The exposure amount control parameter calculator 511a calculates a control parameter such as an aperture setting value and an exposure time setting value. The aperture setting value is a value for matching the sensor output corresponding to the luminance Lt1 with the provisional target level Vtarget" in the linear characteristic area, and the exposure time setting value is a value for matching the output level corresponding to the luminance Lt1 with the target level Vtarget in place of the provisional target level Vtarget". If the judgment result in Step S315 is negative (NO in Step S315), the judger 5303 outputs, to the second exposure control signal generator 5304, a judgment signal indicating that the second exposure control is necessary. Upon receiving the judgment signal, the second exposure control signal generator 5304 sends, to the AE control parameter calculating unit 5111a, a control signal that the second exposure control be executed, as well as the information relating to the target level Vtarget stored in the output level storage 5302.

The calculated control parameters such as the exposure time setting value and the aperture setting value are outputted to the control signal generator 520a, as in the case of the first exposure control. Upon receiving the control parameters, the respective elements in the control signal generating section 520a generate control signals for operating the timing generating circuit 31a and the driving section 60, which in turn, generate drive signals for causing the respective elements to perform actual exposure amount control operation for setting an exposure time, an aperture value, and the like (Step S317). The second exposure control is completed by executing the above operations.

Figure 63:
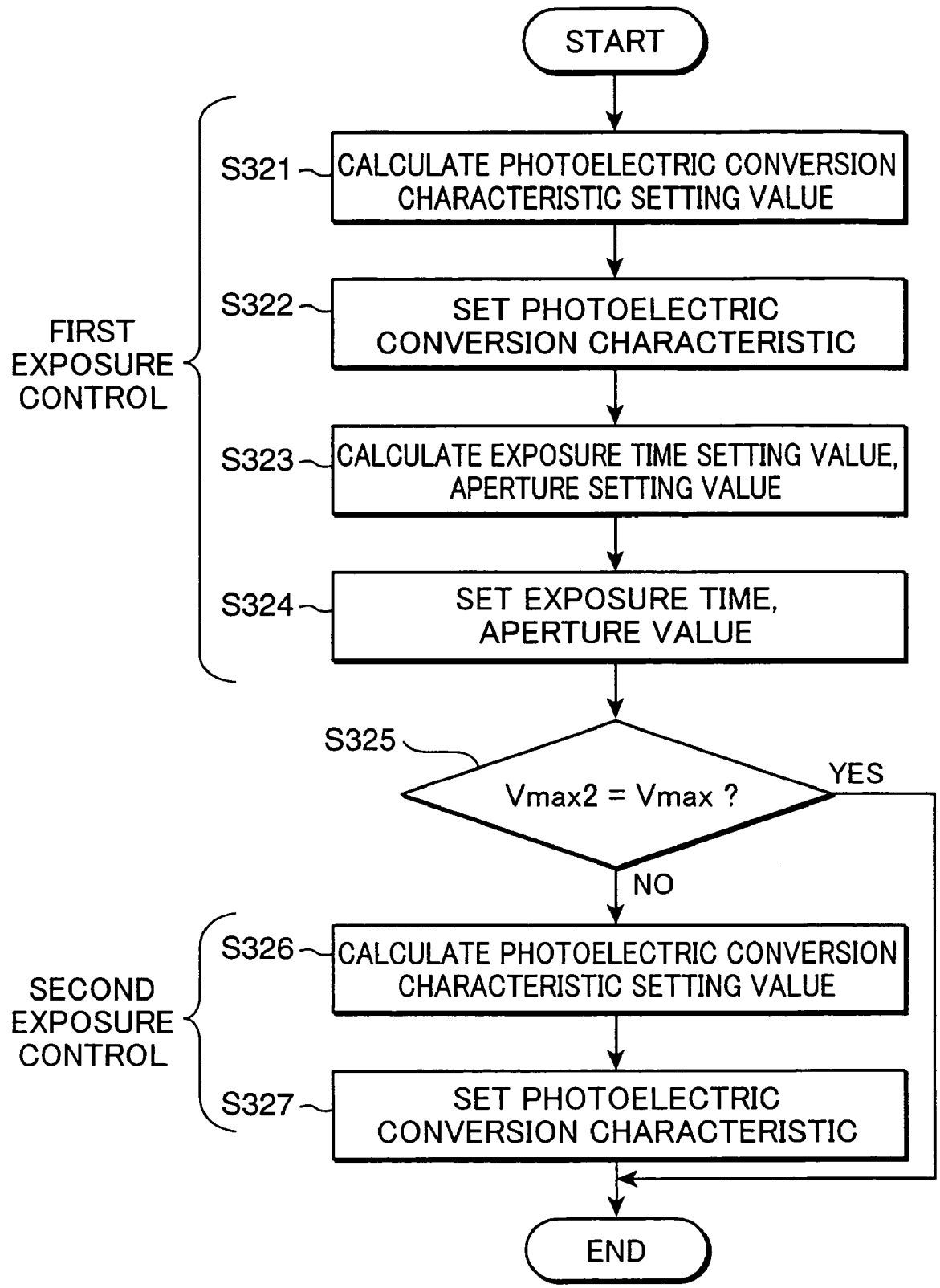
FIG. 63 is a flowchart showing a flow of AE control according to the dynamic range prioritizing system in the fourth embodiment.

FIG. 63 is a flowchart showing a flow of AE control according to the dynamic range prioritizing system in the fourth embodiment. First, the calculation priority setter 5111a of the AE control parameter calculating unit 5110a sets a priority concerning calculation of the control parameters, so that the dynamic range control parameter calculation by the dynamic range control parameter calculator 512a is prioritized. Specifically, the priority concerning calculation of the respective control parameters in the controls [A], [B], and [C], for instance, information relating to the priority of executing the controls in the order of [B], [A], [C], and [B] is set.

First, in the former part of the first exposure control upon detecting the AE evaluation values by the evaluation value detector 405, the dynamic range control parameter 512a calculates, based on the AE evaluation values, a control parameter i.e. a photoelectric conversion characteristic setting value, so that the sensor output of the image sensor 30a corresponding to the subject luminance Lm10 for dynamic range setting coincides with the saturated output level Vmax (Step S321). As the photoelectric conversion characteristic of the image sensor 30a, a certain characteristic e.g. an initial setting value, or a photoelectric conversion characteristic set at the time of acquiring the AE evaluation values last time is referred to.

The calculated dynamic range control parameter i.e. the photoelectric conversion characteristic setting value is outputted to the dynamic range control signal generator 521a of the control signal generating section 520a. Upon receiving the control parameter, the dynamic range control signal generator 521a generates a control signal for controlling the signal φVPS based on the control parameter, namely, a control signal relating to the photoelectric conversion characteristic setting value, and sends the control signal to the timing generating circuit 31a (Step S322).

Subsequently, in the latter part of the first exposure control, the exposure amount control parameter calculator 511a calculates, based on the AE evaluation values detected by the evaluation value detector 405, a control parameter such as an aperture setting value and an exposure time setting value, so that the sensor output of the image sensor 30a corresponding to the subject luminance Lt1 for exposure amount setting coincides with the target level Vtarget in the linear characteristic area, for instance (Step S323). The aperture setting value is a value for matching the sensor output corresponding to the luminance Lt1 with the provisional target level Vtarget' in the linear characteristic area, and the exposure time setting value is a value for matching the output level corresponding to the luminance Lt1 with the target level Vtarget in place of the provisional target level Vtarget'.

The calculated control parameters such as the aperture setting value and the exposure time setting value are outputted to the control signal generator 520a. Upon receiving the control parameters, the respective elements in the control signal generating section 520a generate control signals for operating the timing generating circuit 31a and the driving section 60, which in turn, generate drive signals for causing the respective elements to perform actual exposure amount control operation for setting an aperture value, an exposure time, and the like (Step S324). More specifically, the diaphragm 22 is driven based on an aperture control signal generated by the aperture control signal generator 525 in response to receiving the aperture setting value, so that the sensor output of the image sensor 30a corresponding to the subject luminance Lt1 for exposure amount setting coincides with the provisional target level Vtarget' in the linear characteristic area. Further, the image sensor 30a or the shutter 23 is driven based on an exposure time control signal generated by the sensor exposure time control signal generator 522a or by the shutter control signal generator 523 in response to receiving the exposure time setting value, so that the sensor output of the image sensor 30a corresponding to the subject luminance Lt1 for exposure amount setting coincides with the target level Vtarget in the linear characteristic area. The first exposure control is completed by executing the above operations.

Next, the judger 5303 of the output level judging section 530 compares the provisional saturated output level Vmax2, which is the sensor output corresponding to the subject luminance Lm10 for dynamic range setting, with the saturated output level Vmax, based on the photoelectric conversion characteristic obtained after the first exposure control (Step S325). If it is judged that the provisional saturated output level Vmax2 coincides with the saturated output level Vmax (YES in Step S325), the AE control is terminated because the second exposure control is not necessary. Specifically, the judger 5303 outputs, to the second exposure control signal generator 5304, a judgment signal indicating that the second exposure control is not necessary. Upon receiving the judgment signal, the second exposure control signal generator 5304 sends, to the AE control parameter calculating unit 5110a, a control signal indicating the exposure control be terminated.

On the other hand, as shown in FIG. 59, if it is judged that the provisional saturated output level Vmax2 is higher than the desired saturated output level Vmax, namely, if the provisional saturated output level Vmax2 does not coincide with the saturated output level Vmax (NO in Step S325), the dynamic range control is executed as the second exposure control. If the judgment result in Step S325 is negative (NO in Step S325), the judger 5303 outputs, to the second exposure control signal generator 5304, a judgment signal indicating that the second exposure control is necessary. Upon receiving the judgment signal the second exposure control signal generator 5304 sends, to the AE control parameter calculating unit 5110a, a control signal that the second exposure control be executed, as well as the information relating to the saturated output level Vmax stored in the output level storage 5302.

Then, the dynamic range control parameter calculator 512a calculates a control parameter i.e. a photoelectric conversion characteristic setting value, which makes it possible to match the sensor output of the image sensor 30a corresponding to the subject luminance Lm10 for dynamic range setting with the desired saturated output level Vmax for securing a target dynamic range (Step S326). As in the case of the first exposure control, the calculated dynamic range control parameter i.e. the photoelectric conversion characteristic setting value is outputted to the dynamic range control signal generator 521a of the control signal generating section 520a. Upon receiving the control parameter, the dynamic range control signal generator 521a generates a control signal for controlling the signal φVPS based on the control parameter, namely, a control signal relating to the photoelectric conversion characteristic setting value, and sends the control signal to the timing generating circuit 31a (Step S327). The second exposure control is completed by executing the above operations.

Figure 64:
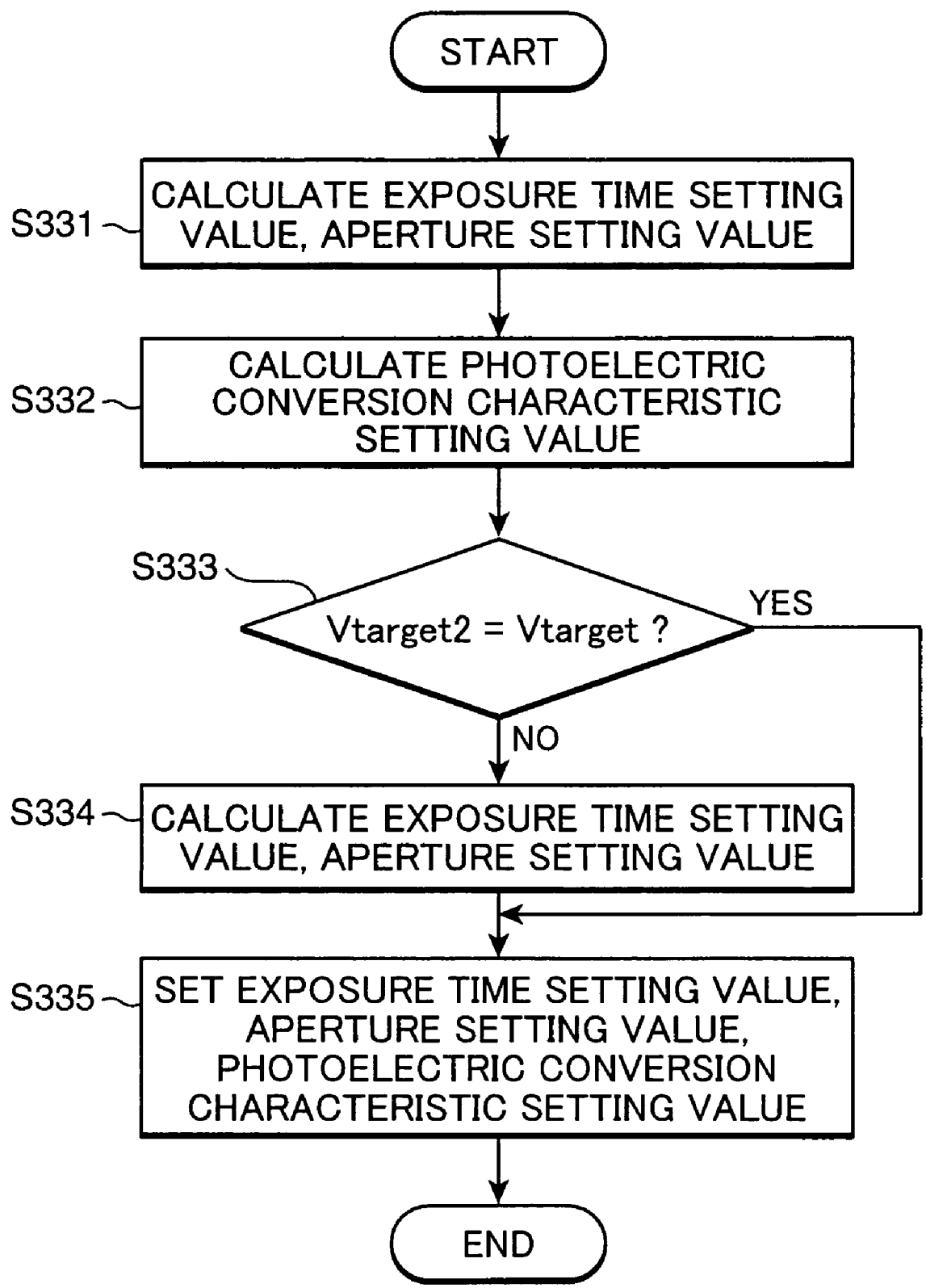
FIG. 64 is a flowchart showing a modification of the flow of AE control according to the target level prioritizing system shown in FIG. 62.

FIG. 64 is a flowchart showing a flow of AE control according to the target level prioritizing system in the fourth embodiment, wherein all the control parameters are calculated prior to various settings. The arrangement shown in FIG. 64 is different from the arrangement shown in FIG. 62 in that control parameter calculation by the exposure amount control parameter calculator 511a comprised of an exposure time control parameter calculator 5112 and an aperture control parameter calculator 5113 (Step S331), and control parameter calculation by the dynamic range control parameter calculator 512a (Step S332) are carried out in this order sequentially, as a first stage of controlling exposure control values. Then, control parameter calculation by the exposure amount control parameter calculator 511a (Step S334) is carried out, as a second stage of controlling. In other words, the flow in FIG. 64 is different from the flow in FIG. 62 in that after the control parameter calculation as the second stage of controlling in Step S334 is completed, various setting operations are executed (Step S335), in place of setting an exposure time, an aperture value, or a photoelectric conversion characteristic each time the control parameter calculations in Steps S331 and S332 are executed.

Specifically, first, in the former part of the first stage of controlling, the exposure amount control parameter calculator 511a calculates a control parameter, based on the AE evaluation values detected by the evaluation value detector 405. In this example, the aperture control parameter calculator 5113 calculates a provisional aperture setting value, and the exposure time control parameter calculator 5112 calculates a provisional exposure time setting value in this order (Step S331). In the latter part of the first stage of controlling, similarly to the former part of the first stage of controlling, the dynamic range control parameter calculator 512a calculates a control parameter, based on the detected AE evaluation values to calculate a provisional photoelectric conversion characteristic setting value (Step S332). Subsequently, the output level judging section 530 makes a comparison between the target level Vtarget, and the provisional target level Vtarget2, which is the sensor output corresponding to the subject luminance Lt1 for exposure setting based on the provisional photoelectric conversion characteristic obtained after the control parameter calculation in the first stage of controlling (Step S333).

If the provisional target level Vtarget2 coincides with the target level Vtarget (YES in Step S333), various setting operations are carried out based on the setting values obtained by the control parameter calculations corresponding to the first stage of controlling since there is no need of control parameter calculation corresponding to the second stage of controlling (Step S335). On the other hand, if the provisional target level Vtarget2 is lower than the target level Vtarget (NO in Step S333), then, the control parameter calculation for exposure amount control is executed as the second stage of controlling (Step S334). The exposure amount control in the second stage of controlling is a control for matching the provisional target level Vtarget2 with the target level Vtarget. In this example, calculation of the aperture setting value by the aperture control parameter calculator 5113, and calculation of the exposure time setting value by the exposure time control parameter calculator 5112 are executed in this order as the control parameter calculation. Then, various setting operations are executed for the parameters calculated in Step S334, namely, for the provisional exposure time setting value and the provisional aperture setting value obtained in Step S331, and the provisional photoelectric conversion characteristic setting value obtained in Step S332, based on the values to which correction has been applied to execute the target level prioritizing system (Step S335).

Figure 65:
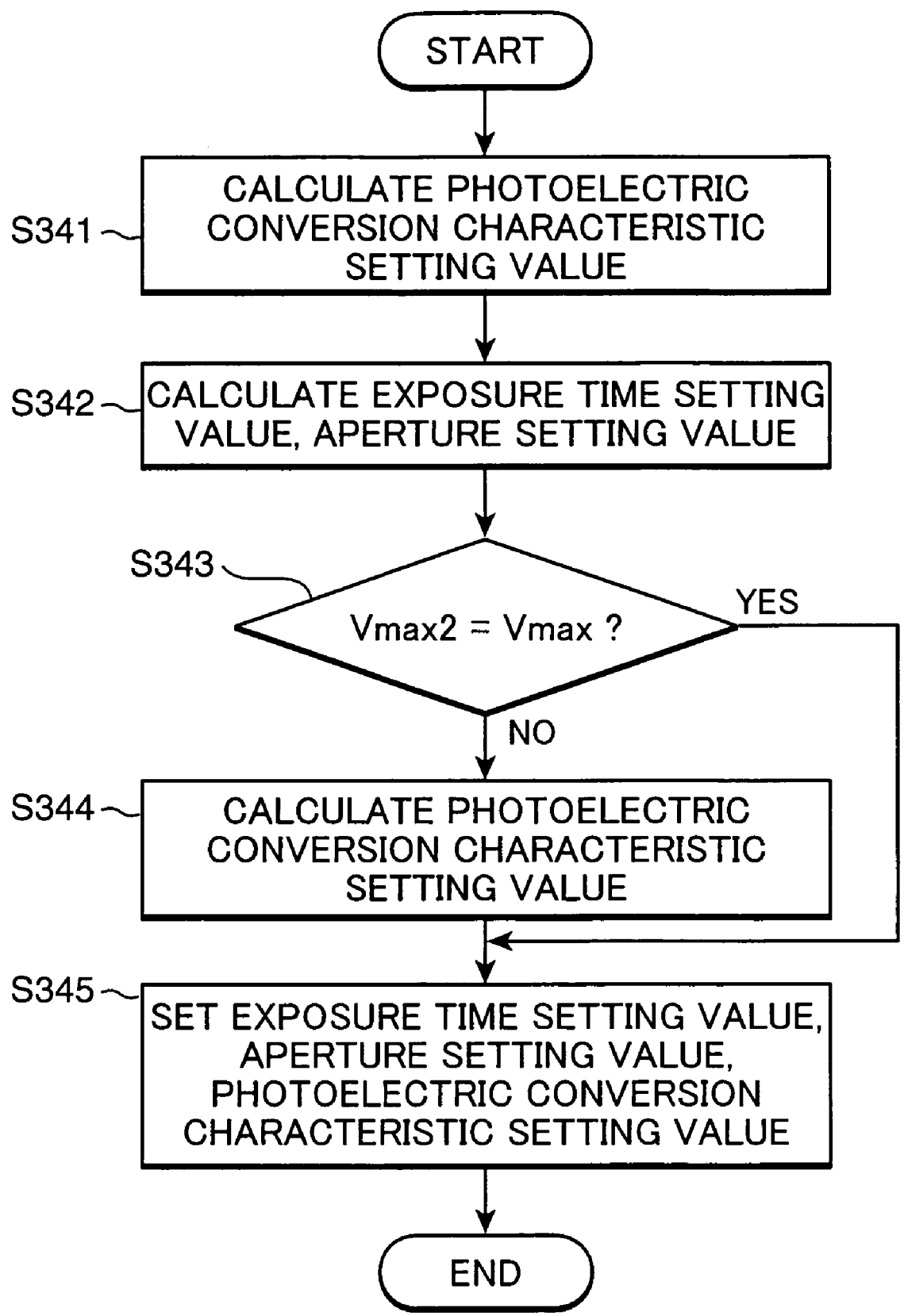
FIG. 65 is a flowchart showing a modification of the flow of AE control according to the dynamic range prioritizing system shown in FIG. 63.

Next, FIG. 65 is a flowchart showing a flow of AE control according to the dynamic range prioritizing system in the fourth embodiment, wherein all the control parameters are calculated prior to various settings. The arrangement shown in FIG. 65 is different from the arrangement shown in FIG. 63 in that control parameter calculation by the dynamic range control parameter calculator 512a (Step S341), and control parameter calculation by the exposure amount control parameter calculator 511a (Step S342) are carried out in this order sequentially, as the first stage of controlling. Then, control parameter calculation by the dynamic range control parameter calculator 512a (Step S344) is carried out, as the second stage of controlling. In other words, the flow in FIG. 65 is different from the flow in FIG. 63 in that after the control parameter calculation as the second stage of controlling in Step S344 is completed, various setting operations are executed (Step S345), in place of setting a photoelectric conversion characteristic, an exposure time, or an aperture value each time the control parameter calculations in Steps S341 and S342 are executed.

Specifically, first, in the former part of the first stage of controlling, the dynamic range control parameter calculator 512a calculates a control parameter, based on the AE evaluation values detected by the evaluation value detector 405 to calculate a provisional photoelectric conversion characteristic setting value (Step S341). Then, as in the case of the control as shown in FIG. 64, in the latter part of the first stage of controlling, the exposure amount control parameter calculator 511a calculates control parameters, based on the detected AE evaluation values. In this example, the aperture control parameter calculator 5113 calculates a provisional aperture setting value, and the exposure time control parameter calculator 5112 calculates a provisional exposure time setting value in this order (Step S342). Subsequently, the output level judging section 530 makes a comparison between the desired saturated output level Vmax, and the provisional saturated output level Vmax2, which is the sensor output corresponding to the subject luminance Lm10 for dynamic range setting based on the provisional photoelectric conversion characteristic obtained after the control parameter calculation in the first stage of controlling (Step S343).

If the provisional saturated output level Vmax2 coincides with the saturated output level Vmax (YES in Step S343), various setting operations are carried out based on the setting values obtained by the control parameter calculations corresponding to the first stage of controlling since there is no need of control parameter calculation corresponding to the second stage of controlling (Step S345). On the other hand, if the provisional saturated output level Vmax2 is higher than the saturated output level Vmax (NO in Step S343), the control parameter calculation for dynamic range control is executed as the second stage of controlling (Step S344). The dynamic range control as the second stage of controlling is a control for matching the provisional saturated output level Vmax2 with the saturated output level Vmax for securing a target dynamic range, and the dynamic range control parameter calculator 512a calculates a control parameter to realize this operation. Then, various setting operations are executed for the parameters calculated in Step S344, namely, for the provisional photoelectric conversion characteristic setting value obtained in Step S341, and the provisional exposure time setting value and the provisional aperture setting value obtained in Step S342, based on the values to which correction has been applied to execute the dynamic range prioritizing system (Step S345).

As mentioned above, by executing the AE control according to the target level prioritizing system or the dynamic range prioritizing system, the exposure amount control by the aperture control and/or the exposure time control, which are executable independently of each other, and the dynamic range control are executed in the first exposure control to perform exposure control of securing a target level corresponding to a target subject luminance, and yet securing a certain dynamic range in a sensing operation of a subject.

There is a case, however, that a desired target level or an appropriate dynamic range is not obtained, namely, an actually obtained value is slightly off the target value for control due to the co-existence of the two different exposure controls i.e. the exposure amount control, and the dynamic range control, if the photoelectric conversion characteristic after the exposure control is applied as it is. In view of this, the output level judging section 530 compares the output level corresponding to the subject luminance for exposure setting, namely, the subject luminance Lt1 for exposure amount setting in case of the exposure amount control, or the subject luminance Lm10 for dynamic range setting in case of the dynamic range control, with the desired output level, and confirms or judges whether these output levels coincide with each other. Then, the second exposure control is performed based on the comparison result by the output level judging section 530.

Specifically, the target level or the dynamic range is additionally controllable by performing the exposure amount control comprised of the aperture control and/or the exposure time control, or the dynamic range control in the second exposure control. This arrangement enables the user to re-execute the control of the target level or the dynamic range, which the user wishes to secure on a priority basis, namely, which the user wishes to securely control. This arrangement enables to perform the AE control of securing an output level of the image sensor 30a corresponding to the target subject luminance, and yet securing an appropriate dynamic range, or conversely, to perform the AE control of securing a required dynamic range of the image sensor 30a, and yet securing an appropriate exposure amount. This arrangement is advantageous in allowing the user to perform a shooting operation with an optimal exposure amount in relation to the amount of light from the subject and with an appropriate dynamic range, according to needs of the user. In this arrangement, since the exposure amount control can be executed by using the aperture control and/or the exposure time control, which are executable independently of each other, the AE control by the first exposure control and the second exposure control based on the priority can be efficiently executed with high latitude, and in accordance with the combination of the respective controls.

To summarize the invention, as mentioned above, in the image sensing apparatus, namely, the digital camera 1 as the first embodiment, the AE control is performed in such a manner that the evaluation value detector 405 detects the AE evaluation value based on the luminance information acquired from the subject, and the exposure amount control parameter calculator 511 serving as the exposure amount controller of the invention performs the exposure amount control, and the dynamic range control parameter calculator 512 serving as the dynamic range controller of the invention performs the dynamic range control based on the photoelectric conversion characteristic by using the AE evaluation value. The calculation priority setter 5111 sets the information relating to the priority between the exposure amount control by the exposure amount control parameter calculator 511 and the dynamic range control by the dynamic range control parameter calculator 512. In this way, the exposure amount control by the exposure amount control parameter calculator 511 and the dynamic range control by the dynamic range control parameter calculator 512 are performed in correlation with the photoelectric conversion characteristic of the image sensor 30 equipped in the digital camera 1, and the AE control of the digital camera 1 by the exposure amount control and the dynamic range control according to the priority is executable. This arrangement provides the digital camera 1 capable of performing the AE control with high latitude, wherein the subject is captured in an optimal exposure state in relation to the subject luminance, with a certain dynamic range being secured, and the exposure control primarily based on the exposure amount control or the exposure control primarily based on the dynamic range control is performed depending on the respective shooting conditions.

Further, the calculation priority setter 5111 sets the information indicating that the calculation of the exposure amount control parameter is prioritized, and the calculation of the exposure amount control parameter by the exposure amount control parameter calculator 5111 is performed prior to the calculation of the dynamic range control parameter based on the setting, followed by the calculation of the dynamic range control parameter by the dynamic range control parameter calculator 512. Thus, the arrangement enables to perform the AE control in such a manner that the exposure amount control is prioritized, namely, a desired exposure amount is secured based on the priority, and yet a required dynamic range e.g. a minimally necessary dynamic range is secured.

Further, the calculation priority setter 5111 sets the information indicating that the calculation of the dynamic range control parameter is prioritized, and the calculation of the dynamic range control parameter by the dynamic range control parameter calculator 512 is performed prior to the calculation of the exposure amount control parameter based on the setting, followed by the calculation of the exposure amount control parameter by the exposure amount control parameter calculator 511. Thus, the arrangement enables to perform the AE control in such a manner that the dynamic range control is prioritized, namely, a desired dynamic range is secured based on the priority, and yet a required exposure amount e.g. a minimally necessary exposure amount is secured.

Furthermore, the exposure amount is controlled, so that the output level of the image sensor 30 corresponding to the subject luminance Lt1 for exposure amount setting coincides with the predetermined target output level Vtarget in the linear characteristic area. This arrangement enables to secure a desired exposure amount based on the priority in a sensing operation in the linear characteristic area where a high contrast image signal is obtained even from a subject of a low luminance, and to secure a required dynamic range, namely, a certain range of the subject luminance, so that the output level of the image sensor 30 corresponding to the subject luminance e.g. the maximum subject luminance Lm20 for dynamic range setting coincides with the saturated output level Vmax, in other words, the sensor output corresponding to the subject luminance, namely, the range of the subject luminance falls within the range of the output level of the image sensor 30.

Furthermore, the dynamic range control parameter calculator 512 calculates the dynamic range control parameter, so that the output level Vth of the image sensor 30 at the inflection point is equal to or above the reference lower limit Vlimit. This arrangement enables to prevent likelihood that the exposure amount that has been secured by the exposure amount control based on the priority may be lost by the dynamic range control following the exposure amount control, namely, by the calculation of the dynamic range control parameter after the calculation of the exposure amount control parameter, in other words, to prevent failure of securing the exposure amount for matching the output level of the image sensor 30 corresponding to the subject luminance Lt1 for exposure amount setting with the target output level Vtarget. Thus, the exposure control prioritizing the exposure amount control can be securely carried out.

Furthermore, the exposure amount is controlled in such a manner that a desired dynamic range is secured based on the priority, so that the output level of the image sensor 30 corresponding to the subject luminance Lm20 for dynamic range setting coincides with the predetermined provisional saturated output level Vmax1, in other words, the sensor output corresponding to the subject luminance, namely, the range of the subject luminance falls within the range of the output level of the image sensor 30, and that the output level of the image sensor 30 corresponding to the subject luminance Lt1 for exposure amount setting coincides with the predetermined target output level Vtarget in the linear characteristic area. This arrangement enables to secure a required exposure amount in a sensing operation in the linear characteristic area where a high contrast image signal is obtained even from a subject of a low luminance.

Furthermore, the exposure amount control parameter calculator 511 calculates an exposure amount control parameter, so that the provisional saturated output level Vmax2 is not larger than the saturated output level Vmax. This arrangement enables to prevent likelihood that the dynamic range that has been secured by the dynamic range control based on the priority may be lost or reduced by the exposure amount control following the dynamic range control namely, by calculation of the exposure amount control parameter after the calculation of the dynamic range control parameter, in other words, to prevent the output level of the image sensor 30 corresponding to the subject luminance Lm20 for dynamic range setting from increasing over the saturated output level Vmax, which may lead to failure of securing a wide dynamic range by maximally utilizing the range of the output level of the image sensor 30. Thus, the exposure control prioritizing the dynamic range control can be securely performed.

In the image sensing apparatus, namely, the digital camera 1a as the third embodiment, the image sensor 30a is configured in such a manner that the photoelectric conversion in the logarithmic characteristic area is executable independently of the exposure time. The aperture control parameter calculator 5113 of the exposure amount control parameter calculator 511a serving as the aperture controller of the exposure time controller of the invention controls the exposure amount based on the aperture setting value relating to control of the aperture area of the diaphragm 22. The exposure time control parameter calculator 5112 of the exposure amount control parameter calculator 511a serving as the exposure time controller of the invention controls the exposure amount based on the exposure time setting value relating to control of the exposure time to the image sensor 30a. The calculation priority setter 5111a serving as the priority setter of the invention sets the calculation of the exposure amount control parameter, namely, calculation of the aperture control parameter by the aperture control parameter calculator 5113 and/or the exposure time control parameter by the exposure time control parameter calculator 5112, as the priority. The main controller 50a serving as the exposure controller of the invention performs the calculation of the aperture control parameter and/or the calculation of the exposure time control parameter, and the calculation of the dynamic range control parameter in this order according to the priority set by the calculation priority setter 5111a in the AE control by the aperture controller and/or the exposure time controller, and by the dynamic range controller, wherein the aperture controller, the exposure time controller, and the dynamic range controller are configured to perform the AE control independently of each other.

In this way, the calculation of the aperture control parameter and/or the calculation of the exposure time control parameter, and the calculation of the dynamic range control parameter are performed in this order according to the priority in correlation with the photoelectric conversion characteristic of the image sensor 30a having the feature that the photoelectric conversion in the logarithmic characteristic area is performed independently of the exposure time. This arrangement provides an image sensing apparatus capable of performing efficient AE control with high latitude, and in accordance with the priority, wherein the AE control primarily based on the exposure amount control by the aperture control and/or by the exposure time control is performed according to needs, and the priority is set between the aperture control and/or the exposure time control in the exposure amount control which is prioritized over the dynamic range control.

Further, the dynamic range control parameter calculator 512a serving as the dynamic range controller of the invention calculates the dynamic range control parameter, so that the output level Vth2 of the image sensor 30a at the inflection point (see FIG. 45) is equal to or above the reference lower limit Vlimit. This arrangement enables to prevent likelihood that that the exposure amount that has been secured by the exposure amount control based on the priority may be lost by the dynamic range control following the exposure amount control, namely, by the calculation of the dynamic range control parameter after the calculation of the aperture control parameter and/or the exposure time control parameter, in other words, to prevent failure of securing the exposure amount for matching the output level of the image sensor 30a corresponding to the subject luminance Lt1 for exposure amount setting with the target output level Vtarget, even if the aperture control and/or the exposure time control, and the dynamic range control are performed in this order according to the priority. Thus, the AE control prioritizing the exposure amount control can be securely performed.

Furthermore, the calculation of the dynamic range control parameter, the calculation of the aperture control parameter and/or the calculation of the exposure time control parameter are performed in this order according to the priority in correlation with the photoelectric conversion characteristic of the image sensor 30a having the feature that the photoelectric conversion in the logarithmic characteristic area is performed independently of the exposure time. This arrangement provides an image sensing apparatus capable of performing efficient AE control with high latitude and in accordance with the priority, wherein the AE control primarily based on the dynamic range control is performed according to needs, and the priority is set between the aperture control and the exposure time control in the exposure amount control which is executed after the dynamic range control.

Furthermore the exposure amount control parameter calculator 511a serving as the exposure amount controller of the invention calculates the exposure amount control parameter, so that the provisional saturated output Vmax2 (see FIG. 47) is equal to or below the saturated output level Vmax This arrangement prevents likelihood that the dynamic range that has been secured by the dynamic range control based on the priority may be lost by the exposure amount control following the dynamic range control, namely, by the calculation of the aperture control parameter and/or the calculation of the exposure time control parameter after the calculation of the dynamic range control parameter, in other words, to prevent the output level of the image sensor 30a corresponding to the subject luminance Lm20 for dynamic range setting from increasing over the saturated output level Vmax, which may lead to failure of securing a wide dynamic range by maximally utilizing the range of the output level of the image sensor 30a, even in a case that the dynamic range control, and the aperture control and/or the exposure time control are performed in this order according to the priority. Thus, the AE control prioritizing the dynamic range control can be securely performed.

Furthermore, the image sensor 30a includes the floating diffusion FD and the transistor T11 for applying the reset bias to the floating diffusion, and the image sensor 30a outputs the signal having the photoelectric conversion characteristic comprised of the linear characteristic area and the logarithmic characteristic area in response to setting of the gate voltage of the transistor to the medium potential Mid (see FIG. 32A). This arrangement enables to obtain the photoelectric conversion characteristic comprised of the linear characteristic area and the logarithmic characteristic area by using the image sensor 30a having a simplified construction, and to realize the AE control by the aperture control and/or the exposure time control, and by the dynamic range control, wherein the aperture control, the exposure time control, and the dynamic range control, as the AE control, are performed independently of each other, so that a different change of the photoelectric conversion characteristic is obtained among these controls, and the priority on the control has been set.

In the image sensing apparatus, namely, the digital camera 1 as the second embodiment of the invention, the evaluation value detector 405 serving as the exposure evaluation value detector of the invention detects the AE evaluation value based on the luminance information acquired from the subject in sensing an image of the subject. The exposure amount control parameter calculator 511 in the main controller 50 serving as the exposure amount controller in the exposure controller of the invention determines the subject luminance for exposure setting based on the AE evaluation value detected by the evaluation value detector 405 to control exposure amount to the image sensor 30 by the AE control of the image sensing apparatus. Further, the dynamic range control parameter calculator 512 serving as the dynamic range controller of the invention controls the photoelectric conversion characteristic of the image sensor 30. The output level judging section 530 compares the output level of the image sensor 30 corresponding to the subject luminance for exposure setting with the predetermined desired output level, after the first exposure control by combination of the exposure amount control parameter calculator 511 and the dynamic range control parameter calculator 512. The main controller 50 executes the second exposure control by the exposure amount control parameter calculator 511 or by the dynamic range control parameter calculator 512 based on the comparison result by the output level judging section 530.

In this way, the AE control is performed in such a manner that the predetermined output level or the target level in accordance with the target subject luminance is secured and yet, a certain dynamic range is secured in a sensing operation of the subject by combination of the exposure amount control and the dynamic range control in the first exposure control. There is a case, however, that a desired target level or an appropriate dynamic range is not obtained, namely, an actually obtained value is slightly off the target value for control due to the co-existence of the two different AE controls i.e. the exposure amount control, and the dynamic range control, if the photoelectric conversion characteristic after the AE control is applied as it is. In view of this, the output level judging section 530 compares the output level corresponding to the subject luminance for exposure setting, namely, the subject luminance for exposure amount setting in case of the exposure amount control, or the subject luminance for dynamic range setting in case of the dynamic range control, with the desired output level, and confirms or judges whether these output levels coincide with each other. Then, the second exposure control is performed based on the comparison result by the output level judging section 530. Specifically, the target level or the dynamic range is additionally controllable by performing the exposure amount control or the dynamic range control in the second exposure control. This arrangement enables the user to re-execute the control of the target level or the dynamic range, which the user wishes to secure on a priority basis, namely, which the user wishes to securely control.

Further, the exposure amount control by the exposure amount control parameter calculator 511 serving as the exposure amount controller of the invention, and the dynamic range control by the dynamic range control parameter calculator 512 serving as the dynamic range controller of the invention are executed in this order as the first exposure control, and the exposure amount control by the exposure amount control parameter calculator 511 is executed as the second exposure control. Thereby, the AE control of securing a desired exposure amount in relation to the subject luminance for exposure amount setting, and yet securing an appropriate dynamic range is performed.

Further, in the above arrangement, preferably, the output level judging section 530 compares the output level Vtarget2 corresponding to the subject luminance Lt1 for exposure amount setting after the first exposure control with the predetermined target output Vtarget corresponding to the subject luminance Lt1 for exposure amount setting. In this case, preferably, the second exposure control is performed to match the output level Vtarget2 corresponding to the subject luminance Lt1 for exposure amount setting after the first exposure control with the target level Vtarget. Thereby, the AE control of securing the desired target level can be performed.

Furthermore, preferably, the dynamic range control by the dynamic range control parameter calculator 512 serving as the dynamic range controller, and the exposure amount control by the exposure amount control parameter calculator 511 serving as the exposure amount controller are executed in this order as the first exposure control, and the dynamic range control by the dynamic range control parameter calculator 512 is executed as the second exposure control. Thereby, the AE control of securing a desired dynamic range in sensing an image of the subject, and yet securing an appropriate exposure amount is performed.

In the above arrangement, preferably, the output level judging section 530 compares the output level Vmax2 corresponding to the subject luminance Lm10 for dynamic range setting after the first exposure control with the predetermined desired saturated output level Vmax corresponding to the subject luminance Lm10 for dynamic range setting. In this case, preferably, the second exposure control is performed to match the output level Vmax2 corresponding to the subject luminance Lm10 for dynamic range setting after the first exposure control with the desired saturated output level Vmax. Thereby, the AE control of securing a desired dynamic range can be performed.

Furthermore, since the calculation priority setter 5111 serving as the priority setter of the invention sets the priority on the exposure control between the exposure amount control parameter calculator 511 serving as the exposure amount controller and the dynamic range control parameter calculator 512 serving as the dynamic range controller, the user can arbitrarily select the target level or the dynamic range, which the user wishes to prioritize.

Further, the image sensor 30 generates an electrical signal commensurate with the amount of incident light, and has a photoelectric conversion characteristic comprised of the first characteristic area where the electrical signal is outputted after being converted to the first characteristic in relation to the amount of incident light, and the second characteristic area where the electrical signal is outputted after being converted to the second characteristic in relation to the amount of incident light, wherein the second characteristic has a smaller output variation in relation to the amount of incident light than the first characteristic. The main controller 50 serving as the exposure controller which performs the AE control of the image sensing apparatus includes the exposure amount control parameter calculator 511 serving as the exposure amount controller which controls the exposure amount to the image sensor 30, and the dynamic range control parameter calculator 512 serving as the dynamic range controller which controls the photoelectric conversion characteristic of the image sensor 30. The evaluation value detector 405 serving as the exposure evaluation value detector detects the AE evaluation value based on the luminance information acquired from the subject in sensing an image of the subject. The calculating section 510 serving as the exposure control parameter determiner determines the subject luminance for exposure setting based on the AE evaluation value detected by the evaluation value detector 405, and determines the exposure amount control parameter by the exposure amount control parameter calculator 511 for controlling the exposure amount, and the dynamic range control parameter by the dynamic range control parameter calculator 512 for controlling the dynamic range. The output level judging section 530 compares the output level of the image sensor 30 corresponding to the subject luminance for exposure setting with the predetermined desired output level. The calculating section 510 serving as the exposure control parameter determiner determines the exposure amount control parameter and the dynamic range control parameter by carrying out steps comprising: the first stage of controlling the exposure amount control parameter and the dynamic range control parameter based on the subject luminance for exposure setting; comparing these output levels with each other after the first stage of controlling; and the second stage of controlling the exposure amount control parameter or the dynamic range control parameter based on the comparison result. The main controller 50 serving as the exposure controller executes the AE control based on the determined exposure amount control parameter and the determined dynamic range control parameter.

In this way, the actual AE control operation is carried out based on the exposure amount control parameter and the dynamic range control parameter by performing the steps comprising the first stage of controlling the exposure amount control parameter and the dynamic range control parameter, and the second stage of controlling the exposure amount control parameter or the dynamic range control parameter based on the computation result on the exposure amount control parameter and the dynamic range control parameter in the first stage of controlling, without performing AE control operations such as setting of the exposure time or the aperture value, or setting of the photoelectric conversion characteristic each time the exposure amount control parameter and the dynamic range control parameter are calculated.

Further, the control of the exposure amount control parameter, and the control of the dynamic range control parameter are executed in this order as the first stage of controlling, and the control of the exposure amount control parameter is executed as the second stage of controlling. In this arrangement, preferably, the output level judging section 530 compares the output level Vtarget2 corresponding to the subject luminance Lt1 for exposure amount setting after the first stage of controlling with the predetermined target output level Vtarget corresponding to the subject luminance Lt1 for exposure amount setting. In this case, preferably, the second stage of controlling is performed to match the output level Vtarget2 corresponding to the subject luminance Lt1 for exposure amount setting after the first stage of controlling with the target output Vtarget.

Further, the control of the dynamic range control parameter, and the control of the exposure amount control parameter are executed in this order as the first stage of controlling, and the control of the dynamic range control parameter is executed as the second stage of controlling. In this arrangement, preferably, the output level judging section 530 compares the output level Vmax2 corresponding to the subject luminance Lm10 for dynamic range setting after the first stage of controlling with the predetermined saturated output level Vmax corresponding to the subject luminance Lm10 for dynamic range setting. In this case, preferably, the second stage of controlling is performed to match the output level Vmax2 corresponding to the subject luminance Lm10 for dynamic range setting after the first stage of controlling with the saturated output level Vmax.

Furthermore, preferably, the calculation priority setter 5111 serving as the priority setter of the invention sets the priority on the control between the exposure amount control parameter and the dynamic range control parameter.

In the image sensing apparatus, namely, the digital camera 1a as the fourth embodiment of the invention, the image sensor 30a is configured in such a manner as to perform photoelectric conversion in the logarithmic characteristic area independently of the exposure time. The exposure amount control parameter calculator 511a serving as the exposure amount controller includes the aperture control parameter calculator 5113 serving as the aperture controller which controls the exposure amount based on the aperture setting value relating to control of the aperture area of the diaphragm 22, and/or the exposure time control parameter calculator 5112 serving as the exposure time controller which controls the exposure amount based on the exposure time setting value relating to control of the exposure time to the image sensor 30a, wherein the aperture control parameter calculator 5113 and the exposure time control parameter calculator 5112 are configured to perform the exposure amount control independently of each other. The output level judging section 530 compares the output level of the image sensor 30a corresponding to the subject luminance for exposure setting with the predetermined desired output level, after the first exposure control by combination of the exposure amount control parameter calculator 511a serving as the exposure amount controller and the dynamic range control parameter calculator 512a serving as the dynamic range controller. The main controller 50a serving as the exposure controller performs the second exposure control by the exposure amount control parameter 511a serving as the exposure amount controller or by the dynamic range control parameter calculator 512a serving as the dynamic range controller based on the comparison result by the output level judging section 530.

According to the above arrangement, in the first exposure control the exposure amount control by the aperture control and/or the exposure time control, and the dynamic range control are carried out, wherein the aperture control, the exposure time control, and the dynamic range control are independently operable for exposure amount control or AE control, namely, the respective control parameters for the aperture control, the exposure time control, and the dynamic range control are obtainable by changing the photoelectric conversion characteristic according to the respective controls. Thereby, the AE control of securing a predetermined target level in relation to the target subject luminance, and yet securing a certain dynamic range in a sensing operation of the subject is performed. There is a case, however, that a desired target level or an appropriate dynamic range is not obtained, namely, an actually obtained value is slightly off the target value for control due to the co-existence of the two different AE controls i.e. the exposure amount control, and the dynamic range control, if the photoelectric conversion characteristic after the AE control is applied as it is. In view of this, the output level judging section 530 compares the output level corresponding to the subject luminance for exposure setting, namely, the subject luminance for exposure amount setting in case of the exposure amount control, or the subject luminance for dynamic range setting in case of the dynamic range control, with the desired output level, and confirms or judges whether these output levels coincide with each other. Then, the second exposure control is performed based on the comparison result by the output level judging section 530. Specifically, the target level or the dynamic range is additionally controllable by operating the exposure amount control parameter calculator 511a, namely, the aperture control parameter calculator 5113 and/or the exposure time control parameter calculator 5112, or the dynamic range control parameter calculator 512a in the second exposure control. This arrangement enables the user to re-execute the control of the target level or the dynamic range, which the user wishes to secure on a priority basis, namely, which the user wishes to securely control. In this arrangement, the exposure amount control can be executed by using the aperture control and the exposure time control which are operated independently of each other, including a case that the aperture control or the exposure time control is singly operated. This arrangement enables to efficiently perform the AE control by the first exposure control and the second exposure control on the priority basis, with high latitude, and in accordance with the combination of the respective controls.

Further, the aperture control and/or the exposure time control by the aperture control parameter calculator 5113 and/or the exposure time control parameter calculator 5112, and the dynamic range control by the dynamic range control parameter calculator 512a are executed in this order as the first exposure control, and the aperture control and/or the exposure time control as the exposure amount control by the exposure amount control parameter calculator 511a is executed as the second exposure control. In this way, in the first exposure control, the aperture control and/or the exposure time control, and the dynamic range control are performed in this order, and in the second exposure control, the exposure amount control by the aperture control and/or the exposure time control is performed. This arrangement enables to efficiently perform the AE control of securing an exposure amount in relation to the subject luminance for exposure amount setting on a priority basis, and yet securing an appropriate dynamic range with high latitude.

Further, in the above arrangement, preferably, the output level judging section 530 compares the output level Vtarget2 corresponding to the subject luminance Lt1 for exposure amount setting after the first exposure control with the predetermined target output level Vtarget corresponding to the subject luminance Lt1 for exposure amount setting. In this arrangement, preferably, the second exposure control is performed to match the output level Vtarget2 corresponding to the subject luminance Lt1 for exposure amount setting after the first exposure control with the predetermined target output level Vtarget by the exposure amount control by the aperture control and/or the exposure time control. Thereby, the AE control of securing a desired target level can be efficiently performed with high latitude.

Further, the dynamic range control by the dynamic range control parameter calculator 512a, and the aperture control and/or the exposure time control by the aperture control parameter calculator 5113 and/or the exposure time control parameter calculator 5112 as the exposure amount control by the exposure amount control parameter calculator 511a are executed in this order as the first exposure control, and the dynamic range control by the dynamic range control parameter calculator 512a is executed as the second exposure control. In this way, in the first exposure control, the dynamic range control, the aperture control and/or the exposure time control are performed in this order, and in the second exposure control, the dynamic range control is performed. This arrangement enables to efficiently perform, the AE control of securing a dynamic range in a sensing operation of the subject, and yet securing an appropriate exposure amount with high latitude.

Further, in the above arrangement, preferably, the output level judging section 530 compares the output level Vmax2 corresponding to the subject luminance Lm10 for dynamic range setting after the first exposure control with the predetermined saturated output level Vmax corresponding to the subject luminance Lm10 for dynamic range setting. In this arrangement, preferably, the second exposure control is performed to match the output level Vmax2 corresponding to the subject luminance Lm10 for dynamic range setting after the first exposure control with the predetermined saturated output level Vmax by the dynamic range control. Thereby, the exposure control of securing a desired dynamic range can be efficiently performed with high latitude.

Further, preferably, the calculation priority setter 5111a serving as the priority setter of the invention sets the priority on control between the aperture control parameter and/or the exposure time control parameter, and the dynamic range control parameter. With this arrangement, the user can arbitrarily select the target level or the dynamic range, which the user wishes to prioritize with high latitude.

Further, the image sensor 30a generates an electrical signal commensurate with the amount of incident light, and has a photoelectric conversion characteristic comprised of the first characteristic area where the electrical signal is outputted after being converted to the first characteristic in relation to the amount of incident light, and the second characteristic area where the electrical signal is outputted after being converted to the second characteristic in relation to the amount of incident light, wherein the second characteristic has a smaller output variation in relation to the amount of incident light than the first characteristic. The image sensor 30a is so configured as to perform photoelectric conversion in the second characteristic independently of the exposure time. The main controller 50a serving as the exposure controller of the invention which controls the AE control of the image sensing apparatus includes the exposure amount control parameter calculator 511a serving as the exposure amount controller, and the dynamic range control parameter calculator 512a serving as the dynamic range controller which controls the photoelectric conversion characteristic of the image sensor 30a. The exposure amount control parameter calculator 511a has the aperture control parameter calculator 5113 serving as the aperture controller and/or the exposure time control parameter calculator 5112 serving as the exposure time controller which are configured to control the exposure amount to the image sensor 30a independently of each other. The evaluation value detector 405 serving as the exposure evaluation value detector of the invention detects the AE evaluation value based on the luminance information acquired from the subject in sensing an image of the subject. The calculating section 510a serving as the exposure control parameter determiner of the invention determines the subject luminance for exposure setting based on the AE evaluation value detected by the evaluation value detector 405, and determines the aperture control parameter and/or the exposure time control parameter by the aperture control parameter calculator 5113 and/or the exposure time control parameter calculator 5112 for exposure amount control, and the dynamic range control parameter by the dynamic range control parameter calculator 512a for dynamic range control. The output level judging section 530 compares the output level of the image sensor 30a corresponding to the subject luminance for exposure setting with the predetermined desired output level. The calculating section 510a serving as the exposure control parameter determiner determines the aperture control parameter and/or the exposure time control parameter, and the dynamic range control parameter by carrying out steps comprising: the first stage of controlling the aperture control parameter and/or the exposure time control parameter, and the dynamic range control parameter based on the subject luminance for exposure setting; comparing these output levels with each other after the first stage of controlling; and the second stage of controlling the aperture control parameter and/or the exposure time control parameter, or the dynamic range control parameter based on the comparison result. The main controller 50a executes the AE control based on the determined aperture control parameter and/or the determined exposure time control parameter, and the determined dynamic range control parameter.

In this way, the actual AE control operation is carried out based on the exposure amount control parameter and the dynamic range control parameter by performing the steps comprising the first stage of controlling the exposure amount control parameter, namely, the aperture control parameter and/or the exposure time control parameter, and the dynamic range control parameter, and the second stage of controlling the exposure amount control parameter, namely, the aperture control parameter and/or the exposure time control parameter, or the dynamic range control parameter based on the computation result on the exposure amount control parameter and the dynamic range control parameter in the first stage of controlling, without performing exposure control operations such as setting of the aperture value or the exposure time, or setting of the photoelectric conversion characteristic each time the exposure amount control parameter and the dynamic range control parameter are calculated.

Further, preferably, in the first stage of controlling, the control of the aperture control parameter and/or the exposure time control parameter as the control of the exposure amount control parameter, and the control of the dynamic range control parameter are executed in this order, and in the second stage of controlling, the control of the aperture control parameter and/or the exposure time control parameter is executed as the control of the exposure amount control parameter. This arrangement enables to efficiently perform the exposure control of securing a desired exposure amount in relation to the subject luminance for exposure amount setting, and yet securing an appropriate dynamic range with high latitude.

Further, in the first stage of controlling, the control of the dynamic range control parameter, and the control of the aperture control parameter and/or the exposure time control parameter as the control of the exposure amount control parameter are executed in this order, and in the second stage of controlling, the control of the dynamic range control parameter is executed. This arrangement enables to efficiently perform the exposure control of securing a desired dynamic range in a sensing operation of the subject, and yet securing an appropriate exposure amount with high latitude.

In the foregoing, the preferred embodiments of the invention have been fully described. The invention is not limited to the above. For instance, the following modifications (I) through (X) are applicable.

(I) In the first and the second embodiments, the p-channel MOSFET is used in each of the pixels of the image sensor 30. Alternatively, an n-channel MOSFET may be used. In the third and the fourth embodiments, the n-channel MOSFET is used in each of the pixels of the image sensor 30a. Alternatively, a p-channel MOSFET may be used.

(II) As far as an image sensor can implement the operations as shown in the image sensors according to the first through the fourth embodiments, any image sensor may be used. For instance, in the first and the second embodiments, the entirety of the photoelectric conversion characteristic is changed in relation to the aperture control and the exposure time control, as the exposure amount control. In the third and the fourth embodiments, although the entirety of the photoelectric conversion characteristic is changed in relation to the aperture control, observing the exposure time control, the linear characteristic area has an integration effect, and the photoelectric conversion characteristic in the linear characteristic area is changed in relation to the exposure time, but the logarithmic characteristic area does not have an integration effect, and the photoelectric conversion characteristic in the logarithmic characteristic area is not changed irrespective of change of the exposure time. In both of the first and second embodiments, however, dynamic range control based on control of the position of the inflection point is performed.

(III) In the first and the second embodiments, or in the third and the fourth embodiments, the subject luminance is detected by the image sensor 30 or by the image sensor 30a. Alternatively, the subject luminance i.e. the AE evaluation values may be detected with use of a metering device which is provided independently of the image sensor 30 or the image sensor 30a, such as a device for metering the subject luminance according to multi-pattern metering with use of plural light receiving elements. However, it is desirable to detect the subject luminance or the AE evaluation value based on an image signal obtained from an image actually captured by the image sensor 30 or by the image sensor 30a in light of simplifying the mechanism of the image sensing apparatus.

(IV) The first and the second embodiments (the third and the fourth embodiments) are constructed such that the image sensing apparatus comprises the shutter 23 and the image sensor 30 (image sensor 30a) to control the exposure time. Alternatively, it is possible to provide either one of the shutter 23 and the image sensor 30 (image sensor 30a) to control the exposure time.

(V) In the first and the second embodiments, the setting values for the image sensor 30, the shutter 23, and the diaphragm 22, which are obtained by data conversion with respect to the exposure time T2 and the aperture area S2 with use of the lookup tables, are set as the exposure time setting value and the aperture setting value, respectively. Alternatively, it is possible to set the exposure time gain Gt and the aperture gain Gs, or the exposure time T2 and the aperture area S2, as the exposure time setting value and the aperture setting value, respectively. Likewise, the output level Vth2 or the changed amount ΔVth at the inflection point may be set as the photoelectric conversion characteristic setting value. Similarly to the first and the second embodiments, in the third and the fourth embodiments, it is possible to set the exposure time gain Gt and the aperture gain Gs as the exposure time setting value and the aperture setting value, respectively, and to set the output level at the inflection point as the photoelectric conversion characteristic setting value.

(VI) In the first through the fourth embodiments, RGB data is used as image data for calculating evaluation values. Alternatively, it is possible to use image data other than the RGB data, such as complementary color image data and monochromatic image data.

(VII) Dividing the image sensing area 330, namely area dividing may be performed e.g. by a spot metering system or by a partial metering system using a central part, in place of the multi-pattern metering. Further alternatively, the block arrangement concerning the image sensing area 330 comprised of the main subject image area 331 and the peripheral subject image area 332 may be other than the arrangement as shown in FIG. 15. Further, in the first and second embodiments, the evaluation value is calculated with respect to each of the blocks. Alternatively, it is possible to calculate evaluation values in each of two blocks of the image sensing area 330 consisting of the main subject image area 331 and the peripheral subject image area 332. Further alternatively, it is possible to divide the image sensing area 330 into three or more blocks, in place of dividing the image sensing area 330 into the main subject image area 331 and the peripheral subject image area 332, to calculate evaluation values based on luminance information in each of the blocks, and to perform AE control based on the evaluation values. As a further altered form, it is possible to calculate a single evaluation value in the image sensing area 330 without dividing the image sensing area 330 into blocks, and to perform AE control based on the single evaluation value. Further alternatively, it is possible to arbitrarily set the blocks in the image sensing area 330 as mentioned above in response to user's manipulation/instruction.

(VIII) In the first and the second embodiments (in the third and the fourth embodiments), the image sensor 30a (the image sensor 30a) showing a photoelectric conversion characteristic comprised of a linear characteristic area where the electrical signal is outputted after being linearly converted in relation to the amount of incident light, and a logarithmic characteristic area where the electrical signal is outputted after being logarithmically converted in relation to the amount of incident light is used. The image sensor 30 (the image sensor 30a) is advantageous because it has a very wide dynamic range, and enables to realize a sensor of generating pixel output having the above photoelectric conversion characteristic relatively easily by utilizing a subthreshold characteristic of a MOS transistor, namely, by utilizing a FD or a reset gate transistor. Alternatively, various types of image sensors having two characteristic areas different in output variation to the amount of incident light are applicable. For instance, an image sensor having a first characteristic area, and a second characteristic area having a smaller output variation to the amount of incident light than the first characteristic area may be usable.

(IX) In the third and the fourth embodiments, the AE control is performed by setting the aperture-control-based exposure control [A], the dynamic range control [B], and the exposure-time-control-based exposure control [C]. Alternatively, the AE control may be performed by setting either one of the controls [A], [B], and [C]. Specifically, the following modifications (a), (b), and (c) are proposed.

(a) The control [A] is exclusively performed to match the sensor output of the image sensor corresponding to the subject luminance or the main subject luminance for exposure amount setting e.g. the subject luminance Lt1 shown in FIG. 40 with the target output level Vtarget in the linear characteristic area. In this case, the output level Vth at the inflection point is set at a level higher than the target level Vtarget. The AE control solely by the control [A] is effective in controlling the exposure amount in its entirety, namely, in controlling the linear characteristic area or an image of a low luminance e.g. the contrast of the image while controlling the brightness of the entirety of the image by changing the dynamic range.

(b) The control [B] is exclusively performed, so that the subject luminance or the main subject luminance for exposure amount setting is obtained from the linear characteristic area. For instance, if the luminance Lt10 shown in FIG. 42 is the subject luminance for exposure amount setting, control is executed to move the position of the inflection point of the photoelectric conversion characteristic, namely, the output level of the image sensor, from Vth2 to Vth1, so that the subject luminance Lt10 lies in the linear characteristic area. If the subject luminance for exposure amount setting lies in the logarithmic characteristic area, as described referring to FIG. 19, the logarithmic characteristic area is converted into a linear characteristic area by using a lookup table, and the sensor output value corresponding to the subject luminance for exposure amount setting in the linear conversion characteristic area is calculated to set a photoelectric conversion characteristic, so that the output level of the image sensor at the inflection point is higher than the calculated sensor output value. The AE control solely by the control [B] is effective in controlling the dynamic range, with the linear characteristic area or the exposure amount gain (Gain) of an image of a low luminance being unchanged.

(c) The control [C] is exclusively performed to match the sensor output of the image sensor corresponding to the subject luminance or the main subject luminance for exposure amount setting with a desired target level Vtarget in the linear characteristic area. In this case, the control is performed, so that the output level Vth at the inflection point is not lowered than the target level Vtarget. The AE control solely by the control [C] is effective in controlling the linear characteristic area or an image of a low luminance, with the dynamic range being unchanged.

(X) Concerning the modification (IX), the exposure amount control in each of the prioritizing modes or the prioritizing systems may be performed by either one of the controls [A] and [C]. Specifically, in the third embodiment, in the exposure amount control parameter calculation prioritizing mode, the controls may be executed in the order of [A] and [B], namely, the control [C] may not be executed, or the controls may be executed in the order of [C] and [B], namely, the control [A] may not be executed. On the other hand, in the dynamic range control parameter calculation prioritizing mode, the controls may be executed in the order of [B] and [A], namely, the control [C] may not be executed, or the controls may be executed in the order of [B] and [C], namely, the control [A] may not be executed.

Further, in the fourth embodiment, in the target level prioritizing system, the following priority patterns are proposed as modifications.

Modified priority pattern 7: calculations are executed in the order of [A], [B], and [A].

Modified priority pattern 8: calculations are executed in the order of [C], [B], and [C].

Further, in the dynamic range prioritizing system, the following priority patterns are proposed as modifications.

Modified priority pattern 9: calculations are executed in the order of [B], [A], and [B].

Modified priority pattern 10: calculations are executed in the order of [B], [C], and [B].

If the modified priority pattern 10 is applied by executing the control [C] exclusively as the exposure amount control the control [C] is executed as the exposure amount control in the latter part of the first exposure control. This arrangement enables to execute AE control wherein the second exposure control is performed without unduly changing the dynamic range which has been controlled by the dynamic range control [B] in the former part of the first exposure control, namely, without unduly narrowing the dynamic range by shifting of the photoelectric conversion characteristic 1102 to the photoelectric conversion characteristic 1103 as shown in FIG. 59, in other words, with the dynamic range controlled in the former part of the first exposure control being unchanged, and an error due to the first exposure amount control, in this example, a minor calculation error of the dynamic range can be corrected according to needs. With this arrangement, the AE control of securing a certain dynamic range on the priority basis, and yet securing a required exposure amount can be securely carried out in a short time, with the calculation time of the AE control parameters being shortened.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image sensing apparatus comprising:

an image sensor which generates an electrical signal commensurate with an amount of incident light, and has a photoelectric conversion characteristic comprised of a first area where the electrical signal is outputted after being converted according to a first characteristic in relation to the amount of incident light, and a second characteristic area where the electrical signal is outputted after being converted according to a second characteristic different from the first characteristic in relation to the amount of incident light, the electrical signal is outputted after being linearly converted in relation to the amount of incident light in the first area, and the electrical signal is outputted after being logarithmically converted in relation to the amount of the incident light in the second area;

an exposure evaluation value detector which detects an exposure evaluation value based on luminance information acquired from a subject in sensing an image of the subject;

an exposure controller which determines a subject luminance for exposure setting based on the exposure evaluation value detected by the exposure evaluation value detector to control exposure of the image sensing apparatus, the exposure controller including:

an exposure amount controller which controls an exposure amount to the image sensor, and a dynamic range controller which controls the photoelectric conversion characteristic of the image sensor; and a priority setter which sets a priority between the exposure amount control by the exposure amount controller and the dynamic range control by the dynamic range controller;

wherein the priority represents information as to which is to be prioritized between calculation of an exposure amount control parameter by the exposure amount controller and calculation of a dynamic range control parameter by the dynamic range controller, the priority setter sets the calculation of the exposure amount control parameter as the priority, the exposure controller implements the calculation of the exposure amount control parameter by the exposure amount controller, and the calculation of the dynamic range control parameter by the dynamic range controller in this order according to the priority set by the priority setter, the exposure amount controller calculates the photoelectric conversion characteristic, so that an output level of the image sensor corresponding to a subject luminance (Lt1) for exposure amount setting coincides with a predetermined target output level (Vtarget) in the first area, and calculates an exposure amount setting value as the exposure amount control parameter in relation to the calculated photoelectric conversion characteristic, and the dynamic range controller calculates, after the calculation of the exposure amount setting value by the exposure amount controller, the photoelectric conversion characteristic, so that an output level of the image sensor corresponding to a subject luminance (Lm20) for dynamic range setting coincides with a predetermined saturated output level (Vmax), and calculates a photoelectric conversion characteristic setting value as the dynamic range control parameter in relation to the calculated photoelectric conversion characteristic.

2. The image sensing apparatus according to claim 1, wherein the dynamic range controller calculates the dynamic range control parameter, so that an output level (Vth2) of the image sensor at an inflection point of the calculated photoelectric conversion characteristic is equal to or above a predetermined reference lower limit (Vlimit).

3. An image sensing apparatus comprising:

an image sensor which generates an electrical signal commensurate with an amount of incident light, and has a photoelectric conversion characteristic comprised of a first area where the electrical signal is outputted after being converted according to a first characteristic in relation to the amount of incident light, and a second characteristic area where the electrical signal is outputted after being converted according to a second characteristic different from the first characteristic in relation to the amount of incident light, the electrical signal is outputted after being linearly converted in relation to the amount of incident light in the first area, and the electrical signal is outputted after being logarithmically converted in relation to the amount of the incident light in the second area;

an exposure evaluation value detector which detects an exposure evaluation value based on luminance information acquired from a subject in sensing an image of the subject;

an exposure controller which determines a subject luminance for exposure setting based on the exposure evaluation value detected by the exposure evaluation value detector to control exposure of the image sensing apparatus, the exposure controller including:
   an exposure amount controller which controls an exposure amount to the image sensor, and
   a dynamic range controller which controls the photoelectric conversion characteristic of the image sensor; and a priority setter which sets a priority between the exposure amount control by the exposure amount controller and the dynamic range control by the dynamic range controller;

wherein the priority represents information as to which is to be prioritized between calculation of an exposure amount control parameter by the exposure amount controller and calculation of a dynamic range control parameter by the dynamic range controller, the priority setter sets the calculation of the dynamic range control parameter as the priority, the exposure controller implements the calculation of the dynamic range control parameter by the dynamic range controller, and the calculation of the exposure amount control parameter by the exposure amount controller in this order according to the priority set by the priority setter, the dynamic range controller calculates the photoelectric conversion characteristic, so that an output level of the image sensor corresponding to a subject luminance (Lm20) for dynamic range setting coincides with a predetermined provisional saturated output level (Vmax 1), which is preliminarily set for the dynamic range setting in the priority setting, and calculates a photoelectric conversion characteristic setting value as the dynamic range control parameter in relation to the calculated photoelectric conversion characteristic, and the exposure amount controller calculates, after the calculation of the photoelectric conversion characteristic setting value by the dynamic range controller, the photoelectric conversion characteristic, so that an output level of the image sensor corresponding to a subject luminance (Lt1) for exposure amount setting coincides with a predetermined target output level (Vtarget) in the first area, and calculates an exposure amount setting value as the exposure amount control parameter in relation to the calculated photoelectric conversion characteristic.

4. The image sensing apparatus according to claim 3, wherein the exposure amount controller calculates the exposure amount control parameter, so that a reference output level (Vmax2) of the image sensor corresponding to the subject luminance (Lm20) for dynamic range setting in the calculated photoelectric conversion characteristic is equal to or below a predetermined saturated output level (Vmax).

5. An image sensing apparatus comprising:

an image sensor which generates an electrical signal commensurate with an amount of incident light, and has a photoelectric conversion characteristic comprised of a first area where the electrical signal is outputted after being converted according to a first characteristic in relation to the amount of incident light, and a second characteristic area where the electrical signal is outputted after being converted according to a second characteristic different from the first characteristic in relation to the amount of incident light, the electrical signal is outputted after being linearly converted in relation to the amount of incident light in the first area, and the electrical signal is outputted after being logarithmically converted in relation to the amount of the incident light in the second area, the image sensor is configured in such a manner as to perform photoelectric conversion in the second area independently of an exposure time;

a diaphragm;

an exposure evaluation value detector which detects an exposure evaluation value based on luminance information acquired from a subject in sensing an image of the subject;

an exposure controller which determines a subject luminance for exposure setting based on the exposure evaluation value detected by the exposure evaluation value detector to control exposure of the image sensing apparatus, the exposure controller including:
   an exposure amount controller which controls an exposure amount to the image sensor, the exposure amount controller including an aperture controller which controls the exposure amount based on an aperture setting value relating to control of an aperture area of the diaphragm, and/or an exposure time controller which controls the exposure amount based on an exposure time setting value relating to control of the exposure time to the image sensor, and
   a dynamic range controller which controls the photoelectric conversion characteristic of the image sensor; and a priority setter which sets a priority between the exposure amount control by the exposure amount controller and the dynamic range control by the dynamic range controller;

wherein the priority represents information as to which is to be prioritized between calculation of an exposure amount control parameter by the exposure amount controller and calculation of a dynamic range control parameter by the dynamic range controller, the priority setter sets the calculation of the exposure amount control parameter comprised of calculation of an aperture control parameter by the aperture controller, and/or an exposure time control parameter by the exposure time controller, as the priority, the exposure controller implements the calculation of the exposure amount control parameter by the exposure amount controller, and the calculation of the dynamic range control parameter by the dynamic range controller in this order according to the priority set by the priority setter, and the exposure controller performs the calculation of the aperture control parameter and/or the calculation of the exposure time controller parameter, and the calculation of the dynamic range control parameter in this order according to the priority set by the priority setter in exposure control by the aperture controller and/or the exposure time controller, and by the dynamic range controller, the aperture controller, the exposure time controller, and the dynamic range controller being configured to perform the exposure control independently of each other.

6. The image sensing apparatus according to claim 5, wherein the dynamic range controller calculates the dynamic range control parameter, so that an output level (Vth2) of the image sensor at an inflection point of the calculated photoelectric conversion characteristic is equal to or above a predetermined reference lower limit (Vlimit).

7. An image sensing apparatus comprising:
an image sensor which generates an electrical signal commensurate with an amount of incident light, and has a photoelectric conversion characteristic comprised of a first area where the electrical signal is outputted after being converted according to a first characteristic in relation to the amount of incident light, and a second characteristic area where the electrical signal is outputted after being converted according to a second characteristic different from the first characteristic in relation to the amount of incident light, the electrical signal is outputted after being linearly converted in relation to the amount of incident light in the first area, and the electrical signal is outputted after being logarithmically converted in relation to the amount of the incident light in the second area, the image sensor is configured in such a manner as to perform photoelectric conversion in the second area independently of an exposure time;
a diaphragm;
an exposure evaluation value detector which detects an exposure evaluation value based on luminance information acquired from a subject in sensing an image of the subject;
an exposure controller which determines a subject luminance for exposure setting based on the exposure evaluation value detected by the exposure evaluation value detector to control exposure of the image sensing apparatus,
the exposure controller including:
an exposure amount controller which controls an exposure amount to the image sensor, the exposure amount controller including an aperture controller which controls the exposure amount based on an aperture setting value relating to control of an aperture area of the diaphragm, and/or an exposure time controller which controls the exposure amount based on an exposure time setting value relating to control of the exposure time to the image sensor, and a dynamic range controller which controls the photoelectric conversion characteristic of the image sensor; and
a priority setter which sets a priority between the exposure amount control by the exposure amount controller and the dynamic range control by the dynamic range controller;
wherein the priority represents information as to which is to be prioritized between calculation of an exposure amount control parameter by the exposure amount controller and calculation of a dynamic range control parameter by the dynamic range controller,
the priority setter sets the calculation of the dynamic range control parameter, as the priority, over calculation of an aperture control parameter by the aperture controller, and/or calculation of an exposure time control parameter by the exposure time controller,
the exposure controller implements the calculation of the dynamic range control parameter by the dynamic range controller, and the calculation of the exposure amount control parameter by the exposure amount controller in this order according to the priority set by the priority setter, and
the exposure controller performs the calculation of the dynamic range control parameter, and the calculation of the aperture control parameter and/or the calculation of the exposure time control parameter in this order according to the priority set by the priority setter in exposure control by the aperture controller and/or the exposure time controller, and by the dynamic range controller, the aperture controller, the exposure time controller, and the dynamic range controller being configured to perform the exposure control independently of each other.

8. The image sensing apparatus according to claim 7, wherein
the exposure amount controller calculates the exposure amount control parameter, so that a reference output level (Vmax2) of the image sensor corresponding to a subject luminance (Lm20) for dynamic range setting in the calculated photoelectric conversion characteristic is equal to or below a predetermined saturated output level (Vmax) of the image sensor.

* * * * *

UNITED STATES PATENT AND TRADEMARK OFFICE
CERTIFICATE OF CORRECTION

PATENT NO. : 7,667,764 B2
APPLICATION NO. : 11/143988
DATED : February 23, 2010
INVENTOR(S) : Kamon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1301 days.

Signed and Sealed this

Seventh Day of December, 2010

David J. Kappos
*Director of the United States Patent and Trademark Office*